US007142232B2

(12) United States Patent
Kremen

(10) Patent No.: US 7,142,232 B2
(45) Date of Patent: Nov. 28, 2006

(54) SYSTEM AND APPARATUS FOR RECORDING AND PROJECTING 3-DIMENSIONAL IMAGES

(76) Inventor: Stanley H. Kremen, 4 Lenape La., East Brunswick, NJ (US) 08816

(*) Notice: Subject to any disclaimer, the term of this patent is extended or adjusted under 35 U.S.C. 154(b) by 587 days.

(21) Appl. No.: 10/292,137

(22) Filed: Nov. 12, 2002

(65) Prior Publication Data

US 2003/0160864 A1    Aug. 28, 2003

Related U.S. Application Data

(63) Continuation of application No. 09/749,984, filed on Dec. 27, 2000, now Pat. No. 6,593,958, which is a continuation of application No. 09/111,990, filed on Jul. 8, 1998, now Pat. No. 6,229,562.

(60) Provisional application No. 60/051,972, filed on Jul. 8, 1997.

(51) Int. Cl.
*H04N 13/04*  (2006.01)

(52) U.S. Cl. ........................................ 348/51; 359/368

(58) Field of Classification Search ................ 348/40, 348/49, 51, 46, 60; 352/43, 59; 359/368
See application file for complete search history.

(56) References Cited

U.S. PATENT DOCUMENTS

| | | |
|---|---|---|
| 1,350,836 A | 8/1920 | Prud'homme |
| 1,402,879 A | 1/1922 | Meacham |
| 1,494,785 A | 5/1924 | Muller |
| 1,497,357 A | 6/1924 | Comstock |
| 1,840,461 A | 1/1932 | Maynard |
| 2,001,256 A | 5/1935 | de Barbier |
| 2,016,937 A | 10/1935 | Barnes |
| 2,082,781 A | 6/1937 | Adler |
| 2,101,979 A | 12/1937 | Brock |
| 2,157,138 A | 5/1939 | Mendez |
| 2,238,629 A | 4/1941 | Deninson |
| 2,331,941 A | 10/1943 | Tervilliger |
| 2,351,032 A | 6/1944 | Gabor |
| 2,351,033 A | 6/1944 | Gabor |
| 2,351,034 A | 6/1944 | Gabor |
| 2,418,345 A | 4/1947 | Grimson |

(Continued)

*Primary Examiner*—Gims Philippe

(57) ABSTRACT

A system for the production of a second three-dimensional image magnified from a first three-dimensional image in substantially the same proportions, including a first active optical system for creating from the three-dimensional image, a first two-dimensional array. The array is comprised of two-dimensional elemental images. The first active optical system has a number of elements which is equal to the number of elemental images in the array. The configuration of the elements of the first active optical system corresponds to the configuration of the elemental images in the array. The first array is magnified equally in all directions to create a second two-dimensional array comprised also of two-dimensional elemental images. A second active optical system reconstructs a second three-dimensional image that is a magnification of the first three-dimensional image. The second active optical system has an F-number equal to the F-number of the first active optical system. The number of elements in the second active optical system is equal to the number of elemental images in the array. The configuration of the elements in the second active optical system corresponds to the configuration of the elemental images in the array. All of the component parts of an equation for determining the F-number of the second active optical system are the same multiples of all of the component parts used for determining the F-number of the first active optical system, respectively. The multiple is equal to the selected magnification factor.

51 Claims, 83 Drawing Sheets

U.S. PATENT DOCUMENTS

| | | |
|---|---|---|
| 2,492,738 A | 12/1949 | Gabor |
| 2,493,200 A | 1/1950 | Land |
| 2,770,166 A | 11/1956 | Gabor |
| 2,823,578 A | 2/1958 | Gordon, Jr. |
| 2,950,644 A | 8/1960 | Land |
| 2,982,176 A | 5/1961 | Kay |
| 3,063,333 A | 11/1962 | Pareto |
| 3,083,615 A | 4/1963 | El-Sum |
| 3,107,170 A | 10/1963 | Netke |
| 3,161,509 A | 12/1964 | Howe et al. |
| 3,178,720 A | 4/1965 | Collender |
| 3,187,339 A | 6/1965 | Clay |
| 3,284,799 A | 11/1966 | Ross |
| 3,400,363 A | 9/1968 | Silverman |
| 3,410,203 A | 11/1968 | Fischbeck |
| 3,415,587 A | 12/1968 | Cathey, Jr. |
| 3,427,090 A | 2/1969 | Justh et al. |
| 3,427,104 A | 2/1969 | Buikken et al. |
| 3,434,339 A | 3/1969 | Stetson et al. |
| 3,435,244 A | 3/1969 | Burckhardt et al. |
| 3,442,566 A | 5/1969 | Forward et al. |
| 3,443,861 A | 5/1969 | Leith et al. |
| 3,444,316 A | 5/1969 | Gerritsen |
| 3,447,438 A | 6/1969 | Kaufer et al. |
| 3,449,577 A | 6/1969 | Kogelnik |
| 3,479,111 A | 11/1969 | Gabor |
| 3,502,411 A | 3/1970 | Wells |
| 3,506,327 A | 4/1970 | Leith |
| 3,515,452 A | 6/1970 | Pole |
| 3,529,083 A | 9/1970 | Nelson |
| 3,532,406 A | 10/1970 | Hartman |
| 3,532,407 A | 10/1970 | Upatnieks |
| 3,539,241 A | 11/1970 | Upatnieks |
| 3,545,835 A | 12/1970 | Leith |
| 3,547,510 A | 12/1970 | De Bitetto |
| 3,552,858 A | 1/1971 | Haines |
| 3,561,257 A | 2/1971 | Brenden |
| 3,564,572 A | 2/1971 | Nelson |
| 3,564,905 A | 2/1971 | Brenden |
| 3,580,655 A | 5/1971 | Leith |
| 3,586,412 A | 6/1971 | Leith |
| 3,591,268 A | 7/1971 | Neale |
| 3,597,525 A | 8/1971 | Kozma |
| 3,610,722 A | 10/1971 | Bestenreiner |
| 3,614,190 A | 10/1971 | Haines |
| 3,617,754 A | 11/1971 | Hildebrand |
| 3,625,584 A | 12/1971 | St. John |
| 3,632,181 A | 1/1972 | Lee |
| 3,632,183 A | 1/1972 | Haines |
| 3,632,866 A | 1/1972 | King |
| 3,637,313 A | 1/1972 | Upatnieks |
| 3,639,032 A | 2/1972 | Haines |
| 3,639,033 A | 2/1972 | Haines |
| 3,640,598 A | 2/1972 | Neeley |
| 3,642,472 A | 2/1972 | Mays |
| 3,647,289 A | 3/1972 | Weber |
| 3,655,258 A | 4/1972 | Hildebrand |
| 3,667,946 A | 6/1972 | Standevant |
| 3,677,616 A | 7/1972 | Lewis |
| 3,677,617 A | 7/1972 | Upatnieks |
| 3,687,219 A | 8/1972 | Langlois |
| 3,716,286 A | 2/1973 | St. John |
| 3,721,312 A | 3/1973 | St. John |
| 3,754,814 A | 8/1973 | Leith |
| 3,758,186 A | 9/1973 | Bramm |
| 3,762,215 A | 10/1973 | Aleksoff |
| 3,765,741 A | 10/1973 | Kimura |
| 3,799,643 A | 3/1974 | Maller |
| 3,813,685 A | 5/1974 | St. John |
| 3,815,979 A | 6/1974 | Bruce |
| 3,823,604 A | 7/1974 | Burch |
| 3,838,903 A | 10/1974 | Leith |
| 3,860,950 A | 1/1975 | Wick |
| 3,879,989 A | 4/1975 | Brenden |
| 3,894,787 A | 7/1975 | Leith et al. |
| 3,900,884 A | 8/1975 | St. John |
| 3,902,798 A | 9/1975 | Trumbull et al. |
| 3,978,500 A | 8/1976 | Brachet |
| 3,985,419 A | 10/1976 | Matsumoto. |
| 4,176,923 A | 12/1979 | Collender |
| 4,231,642 A | 11/1980 | Collender |
| 4,329,019 A | 5/1982 | Okoshi et al. |
| 4,337,992 A | 7/1982 | Johnson |
| 4,509,835 A | 4/1985 | Adler |
| 4,547,050 A * | 10/1985 | Collender ............... 352/43 |
| 4,621,897 A | 11/1986 | Bonnet |
| 4,732,453 A | 3/1988 | de Montebello |
| 4,740,073 A | 4/1988 | Meacham |
| 4,783,133 A | 11/1988 | Chen |
| 4,878,735 A | 11/1989 | Vilums |
| 4,915,497 A | 4/1990 | Loth |
| 4,925,294 A | 5/1990 | Geshwind |
| 4,927,238 A | 5/1990 | Green |
| 4,993,828 A * | 2/1991 | Shaw et al. ............. 352/59 |
| 5,004,335 A | 4/1991 | Montes |
| 5,013,147 A | 5/1991 | Montes |
| 5,040,871 A | 8/1991 | Davies |
| 5,111,236 A | 5/1992 | Lo |
| 5,223,925 A | 6/1993 | Hattori |
| 5,237,353 A | 8/1993 | Montes |
| 5,337,096 A | 8/1994 | Qu et al. |
| 5,361,106 A | 11/1994 | Ashbey |
| 5,379,133 A | 1/1995 | Kirk |
| 5,430,474 A | 7/1995 | Hines |
| 5,469,187 A | 11/1995 | Yaniv |
| 5,614,941 A | 3/1997 | Hines |
| 5,717,453 A * | 2/1998 | Wohlstadter ............ 348/46 |
| 5,719,620 A | 2/1998 | Allio |
| 5,726,800 A | 3/1998 | Ezra et al. |
| 5,883,662 A * | 3/1999 | Zanen .................... 348/49 |
| 5,923,465 A * | 7/1999 | Byrd ..................... 359/368 |
| 6,005,608 A | 12/1999 | Chakrabarti |
| 6,049,352 A | 4/2000 | Allio |

* cited by examiner

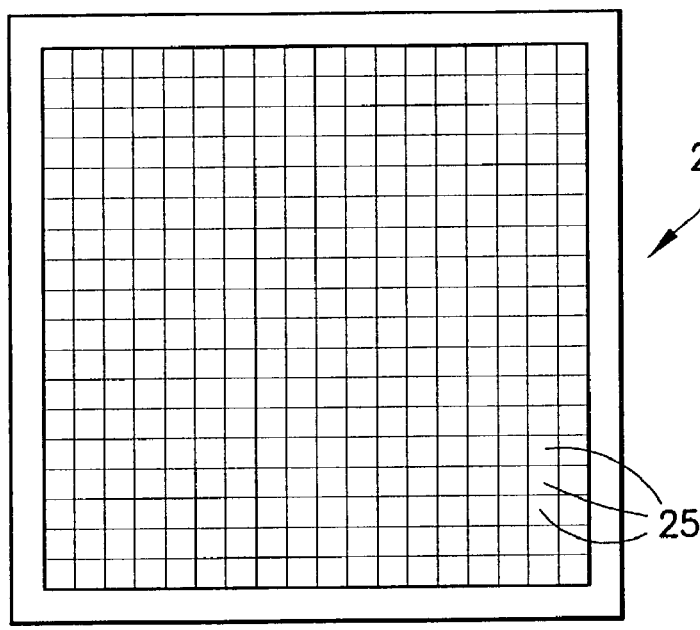
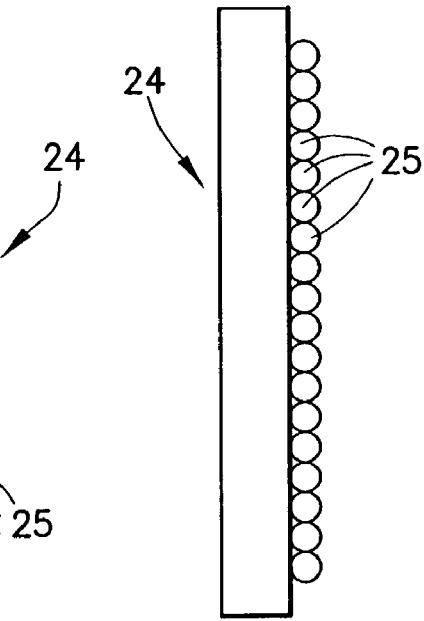
FIG.10(a)    FIG.10(b)
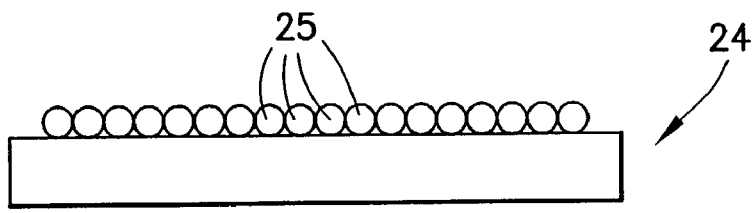
FIG.10(c)

+1 - ORDER
0- ORDER
-1 - ORDER

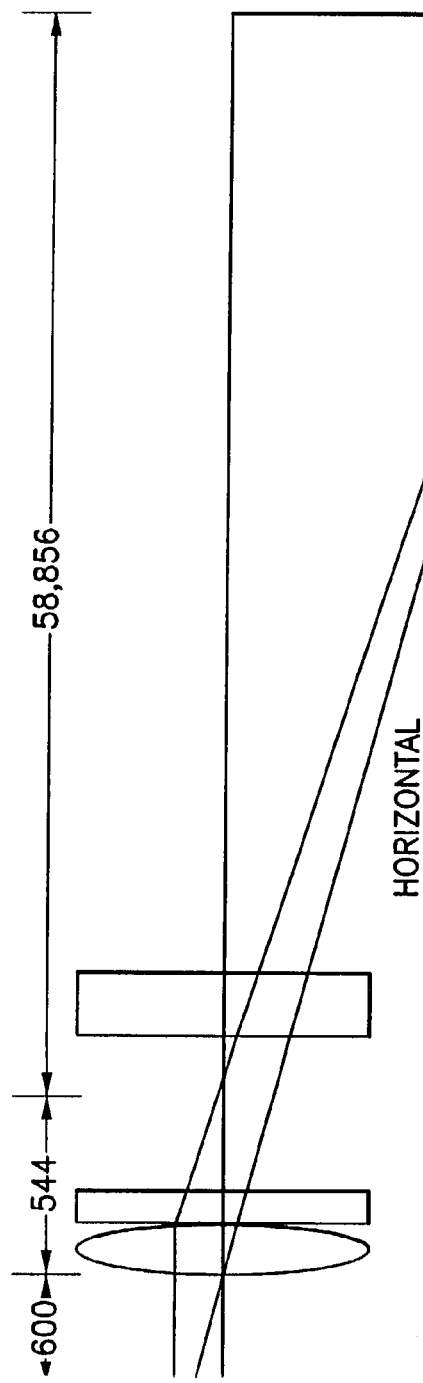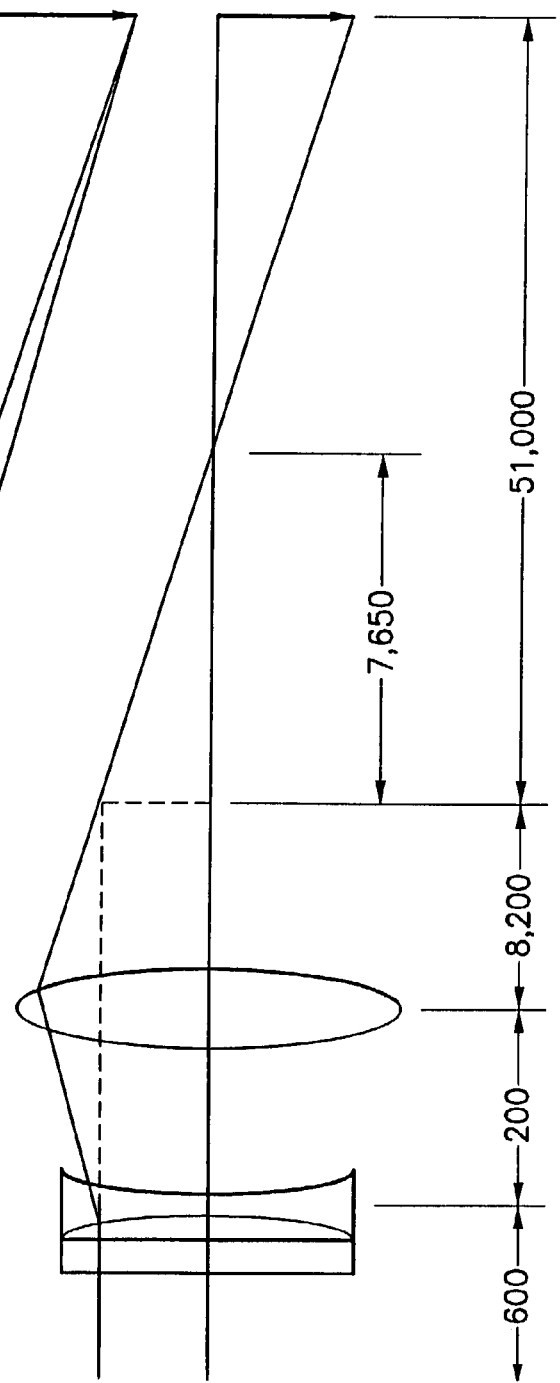

SYSTEM AND APPARATUS FOR RECORDING AND PROJECTING 3-DIMENSIONAL IMAGES

CROSS-REFERENCE TO RELATED APPLICATIONS

This application is a continuation of and claims benefit of U.S. Non-Provisional application Ser. No. 09/749,984 filed Dec. 27, 2000, now U.S. Pat. No. 6,593,958, which in turn is a continuation and claims the benefit of Non-Provisional application Ser. No. 09/111,990 filed Jul. 8, 1998, now U.S. Pat. No. 6,229,562 granted on May 8, 2001, which in turn claims the benefit of U.S. Provisional Application Ser. No. U.S. 60/051,972 filed Jul. 8, 1997. The foregoing applications and U.S. patent are incorporated by reference in their entirety herein.

FIELD OF THE INVENTION

This invention relates to method and apparatus for making and projecting three-dimensional images recorded via the principles of holography and/or integral photography.

BACKGROUND OF THE INVENTION

The artistic and photographic rendering of three-dimensional images is not new. During the late nineteenth century, commercial stereoscopes became very popular toys and novelties. These devices employed the principle of stereoscopy. Most people see with two eyes. When a person opens only one eye, he sees a two-dimensional image of a life-scene from a particular view point. By using his eyes one at a time, he sees two different two-dimensional images but from slightly different view points. When both eyes are open, the individual's mind merges the two images and acquires depth information. Therefore, both eyes are needed to enable the mind to perceive a three-dimensional scene. The principle of stereoscopy tricks a person into perceiving depth by presenting each of his eyes with separated pictures representing a given scene from slightly different view points. If the distance between the view points is approximately equal to the distance between his eyes, he will see the scene in full three-dimensions.

Over the years, a number of stereoscopic devices were invented to enable people to view three-dimensional scenes. The first scenes were reconstructed from pairs of drawings of the same scene. The two drawings were only slightly different, and were drawn as geometric projections of the same object or scene from a slightly different perspective. Eventually, stereoscopic cameras were invented that would produce photographs that would enable three-dimensional reconstruction of a photographed scene. These cameras normally have two lenses situated a distance apart equal to the interoccular separation. The camera normally takes two stereo paired photographs of the same scene with a single exposure. When these photographs are developed and viewed with an appropriate viewing device, a three-dimensional picture is perceived First, people were able to purchase various types of stereoscopes for viewing these pictures. Then, during the earlier part of the twentieth century, lenticular stereograms became available. These are integrated photographs (or drawings) for which no external viewing device is necessary to be able to perceive a three dimensional image. A stereogram employs a lenticular sheet comprised of small parallel cylindrical lenses. This cylindrical lenticular sheet is often called a Bonnet Screen. To prepare a stereogram, first a stereo pair of pictures are produced of the scene. These stereo pairs are exposed separately, but from slightly different angles, on a photographic film through a Bonnet Screen. After development, a viewer looking at the photograph through a Bonnet Screen sees each of the two stereo pairs reconstructed at the same angles at which they were exposed. Therefore, the two two-dimensional pictures are separated so that they are each seen by the viewer individually with each eye. Because of this, the viewer perceives a three-dimensional scene. The lenticular stereogram was the first device available wherein the stereo paired pictures were integrated into the same frame. Photographs designed for viewing with a stereoscope are individually viewable as two-dimensional pictures when the stereoscope is not in use. However, the lenticular stereogram, when viewed without the Bonnet Screen, is a very confusing picture.

Two additional processes were developed that integrated the stereo paired pictures into the same frame—the anaglyph and the vectograph. The anaglyph permitted two black-and-white stereo paired pictures to be exposed on color film—one picture being exposed using a red filter and the other exposed using a blue or green filter. When viewed with special glasses, one lens being colored red and the other colored blue (or green), a three-dimensional scene is perceived. The vectograph permitted two stereo paired pictures to be exposed on a film with an emulsion on both sides—one picture being exposed on one side of the film and the other picture being exposed on the other side of the film. The two pictures are developed such that light passing through one is polarized in one direction while light passing through the other is polarized in the other direction. This permits a viewer to use special glasses consisting of Polaroid filters to see the three-dimensional scene. Vectography has the advantage over anaglyphic photography that avoids the annoyance of seeing the red-blue tint in the scene. Anaglyphic and vectographic slides (transparencies that could be viewed in a slide projector) were widely sold. This resulted in an audience being able to view a magnified three-dimensional scene on a screen.

Eventually, anaglyphic motion pictures were displayed in theaters and ultimately on television. They were never popular as audiences found the red blue tints very annoying. The process was refined for television to permit viewing of full color movies in three-dimensions. However, use of the red and blue glasses still produced the annoying red-blue tint. Movies employing this process were broadcast on television as late as the mid-1980's.

Vectography was never used in the cinema, but a process called "3-D" was used to produce motion pictures. This process enjoyed reasonable popularity during the 1950's. It employed a special projector with two lenses that projected each of the two stereo pairs onto an aluminized screen. Each stereo pair had a different polarity such that when a viewer used special Polaroid viewing glasses he would see a different picture with each eye. Since Polaroid filters are untinted, the 3-D movies could be viewed in full color. However, the popularity of 3-D movies eventually waned. The process is occasionally revived in present day movies, but it remains unpopular. Audiences often experienced eye strain and headaches while watching these films. They erroneously blamed this on being required to wear special glasses.

Several attempts were made to create stereoscopic motion pictures that could be viewed as three-dimensional scenes without glasses. In 1969, Dennis Gabor, inventor of the hologram, developed a process wherein a stereoscopic movie could be viewed by the unaided eye using a special screen. This process was never implemented. Had these movies been produced, the process would have required viewers to keep their heads in relatively fixed positions.

It is interesting that most people blamed the eye strain and headaches resulting from viewing 3-D movies on the glasses. One-half of all Americans wear glasses and are not bothered by them. However, the use of glasses was the only thing that appeared different to audiences, and therefore, must have caused the problem. However, the problem was actually caused by a basic problem inherent in the process of stereoscopy. When someone observes a real object, his eyes both converge and focus on the object at the same time. However, when he observes a stereo pair his eyes converge on the apparent position of the object but focus on the screen or picture focal plane. A condition where one's eyes converge and focus at different positions is an unnatural viewing condition. The result is eye strain. All stereoscopic processes have this problem. It cannot be avoided.

Dennis Gabor invented the hologram in 1948, and in 1964, Emmet Leith and Juris Upatnicks made holography practical for the production of three-dimensional images. Holography produces three-dimensional images using a principle different from stereoscopy. In order to understand what holography is, one must first understand the concept of interference. If a small pebble is thrown into a still pool of water, waves are generated, traveling as circles away from the point of origin. A second pebble thrown into the water will generate a new set of waves. When these two waves meet, a new wave pattern is set up in the water, resulting from the interference of the two original waves Light is also a wave-like phenomenon. Two intersecting light beams will similarly interfere to generate a resulting wave pattern. Were the two light beams to interact at the surface of a photographic plate, the interference pattern would then be photographed. Such a photograph is called an interferogram.

A hologram is a special type of interferogram. In order to produce a hologram, one of the interfering light waves must have an identifiable wavefront which can be easily reproduced or regenerated. This is called the reference beam. The second light wave is generally more complex and is usually characteristic of the wavefront reflected from some object or scene. This is called the object beam. If, after the resulting interferogram is developed, were it to be illuminated by a wavefront identical to the reference beam, the object wavefront would be reconstructed. In other words, were a viewer to look into the direction where the object was originally, he would observe the object wavefront. He would see the object before him in three-dimensions with such reality that it would be impossible for him to determine visually whether or not the object really exists. An interferogram of this type is called a hologram. The hologram is not a photograph of the object, but rather of the interference pattern containing all the information about the object It should be noted that no lenses need be used in making holograms. Of course, more than one object beam can be used, and all of these wavefronts will be reconstructed simultaneously by a single reference beam. Because the hologram is not a photograph of this scene, but rather a visual reconstruction of the objects in space as they existed at the time the hologram was taken, the viewer can observe the scene as he would were it to really exist. If one object blocks another, the viewer merely looks around it as he would ordinarily, and, behold, the hidden object becomes visible. Holography, therefore, provides a stark reality that no other three-dimensional process can produce.

Integral photography is a photographic technique of producing three-dimensional photographs by an integration process from many two-dimensional photographs each taken of the same object and event but at a slightly different viewing angle. In order to recreate the three-dimensional effect from all these two-dimensional photographs, a wavefront represented by the composite of all these elemental photographs is reconstructed after development, and this wavefront is similar to the wavefront produced by the three-dimensional scene itself provided that the integral photograph is viewed at a sufficient distance away. In fact, were the viewer to be positioned sufficiently far away as not to be able to resolve the individual elements in the photograph (i.e., at minimum visual acuity), he would be unable to distinguish the wavefront reconstructed from the integral photograph from that produced by the actual scene. The viewer would observe the scene in true three-dimensions. Unlike stereoscopic three-dimensionality, no special device need by worn by the viewer, and the illusion of depth of the scene in integral photography does not have to be created in the mind of the viewer: the three-dimensional images actually exist in space. A hologram is a photograph which is capable of reconstructing the same wavefront as would be created by the actual scene. In fact, were the hologram to be properly illuminated, it would not be possible for the viewer to perform any visual test to determine whether or not the objects in the scene were real Were one to view the hologram through a small aperture, the entire scene would be visible. Moving the aperture around only changes the viewing angle. No matter how small the aperture is (within reason—limited by a size somewhat larger than the grain of the film) the entire scene would still be visible. A hologram can, then, be thought of as an integral photograph whose elemental photographs are of infinitesimal size. Therefore, an integral photograph can be though of as being equivalent to a hologram when the viewer is positioned at minimum visual acuity.

Projection of magnified three-dimensional scenes from holograms or integral photographs before large audiences has never been implemented. First, if one were to project a hologram onto a conventional screen, no image of the scene would be produced. Since a hologram is a photograph that contains information about an object and not of the object itself, a hologram projected onto a screen as a magnified photograph would not be seen as anything meaningful On the other hand, if one were to produce a large magnified hologram so as to enable viewing before a large audience, the principles of holography dictate that the reconstructed three-dimensional image would be de-magnified. Second, there is a basic principle governing the magnification of three-dimensional images. If the three-dimensional image itself were to be magnified, the magnification in depth would be equal to the square of the lateral magnification. Such an image would not be viewable as a natural three-dimensional object. Finally, a number of engineering difficulties exist in the current state-of-the-art that have made projection of magnified three-dimensional scenes before large audiences impractical.

In view of the above it is therefore an object of the invention to provide a three-dimensional system and method in which non-stereoscopic images can be magnified and projected before large audiences Another object of the invention is to provide such system wherein said images are still life pictures and/or moving pictures. Yet another object of the invention is to provide a three-dimensional system which is adaptable for use in animation, home entertainment and computer technology.

SUMMARY OF THE INVENTION

These and other objects of the invention which shall be hereinafter apparent are achieved by the SYSTEM AND APPARATUS FOR THE RECORDING AND PROJECTION OF IMAGES IN SUBSTANTIALLY 3-DIMENSIONAL FORMAT comprising a method and apparatus for reducing a three-dimensional scene to an integral photograph and thereafter magnifying the integral photograph as well as the optics used to create the integral photograph by the same scaling factor so as to project a magnified three-dimensional image. The invention comprises a camera for photographing the scene, a projector for reconstructing the scene in three-dimensions, a screen which is an active optical element in the process and a method of editing motion picture film used in this process. The invention also includes a method and apparatus for fabricating holograms of live three-dimensional scenes, for projecting magnified three-dimensional images produced from these holograms before large audiences, and for editing motion picture film This invention provides a system which is adaptable to animation, home entertainment and computer technology.

BRIEF DESCRIPTION OF THE DRAWINGS

The invention will be better understood by the Detailed Description of the Preferred and Alternate Embodiments with reference to the drawings, in which:

FIG. 4 shows how the integral photograph shown in FIG. 3 can be multiplexed onto a rectangular film format.

FIG. 10 is a drawing showing a matrix lens array consisting of a square array of small criss-crossed cylindrical lenslets.

FIG. 24 represents three drawings showing a solution to the registration problem.

FIG. 26 are optical ray traces showing the different types of three-dimensional images that can be projected for viewing by a theater audience.

FIG. 56 is a schematic and optical ray trace for an anamorphic lens.

DETAILED DESCRIPTION OF THE PREFERRED AND ALTERNATE EMBODIMENTS

The present invention, in all its embodiments, is based upon a method that permits magnification of a three-dimensional image produced from a photograph, hologram, optical system or other system or device, regardless of the medium or the method, in such manner as to preserve the depth to height and width relationship of the image as it existed prior to magnification. This method requires the three-dimensional image prior to magnification to be rendered as an array of two-dimensional images by some form of matrix lens array, such as a fly's eye lens. Were this array of two-dimensional images to be magnified by some magnification factor, and then viewed or projected through a new matrix lens array that has been scaled up from the lens array that produced the original array of two-dimensional images, such that the scaling factor is equal to the magnification (i.e., the focal length and diameter of each lenslet must be multiplied by the same magnification factor), a new three-dimensional image would be produced that would be magnified by the same magnification factor, and all image dimensions would be magnified by the same factor such that all dimensions of the final three-dimensional image would be proportional to the dimensions of the original image. The utility of magnifying three-dimensional images using this method would be the ability to enlarge holograms or integral photographs or other media from which three-dimensional images are produced, or to project still or moving three-dimensional images before a large audience.

Figure 1:
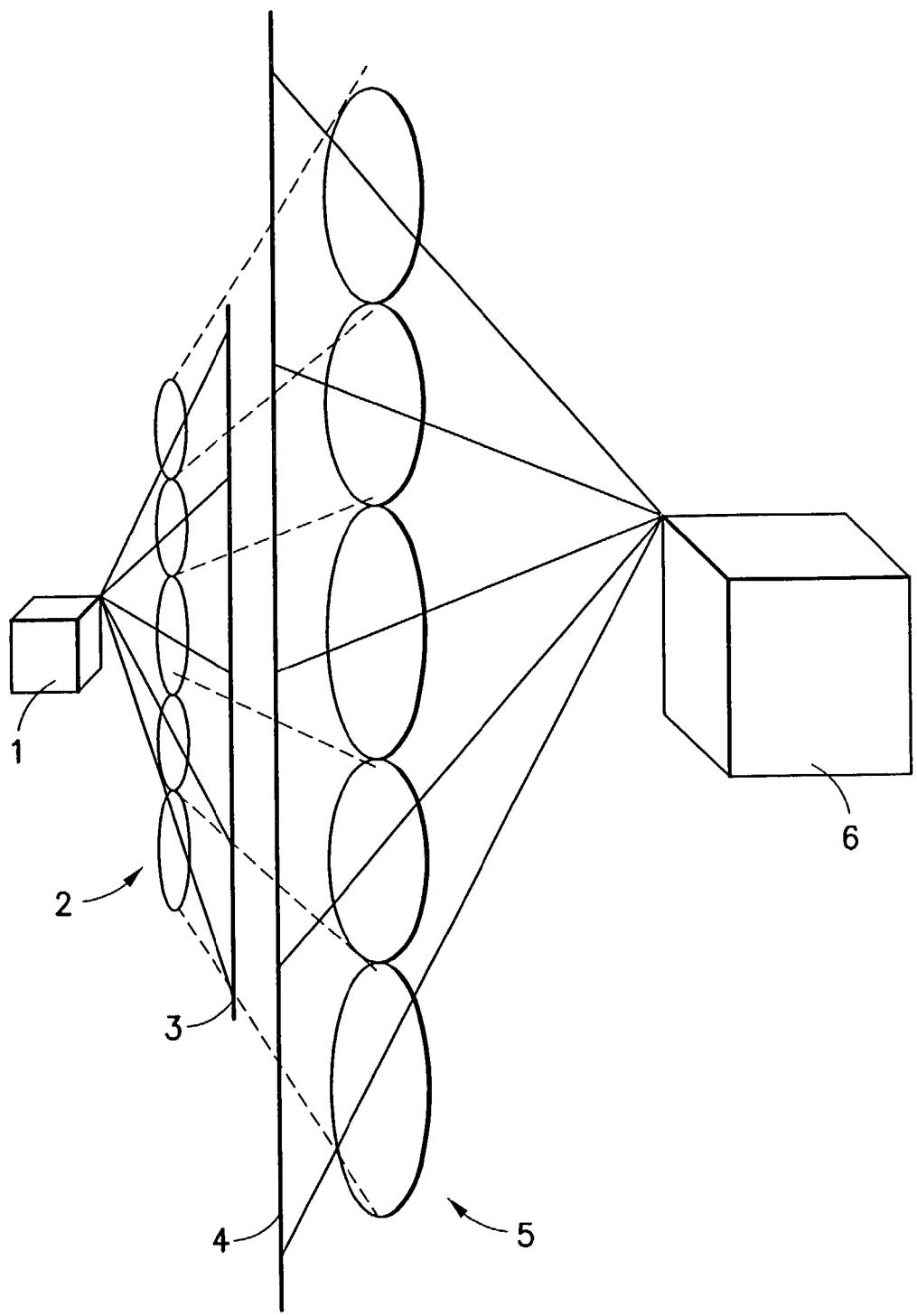
FIG. 1 illustrates the method of magnification that is the basis for this application.

The magnification principle is illustrated in FIG. 1. Object 1 is photographed by matrix lens array 2, thereby producing integral photograph 3. Integral photograph 3 is then magnified to give integral photograph 4 which is then placed behind matrix lens array 5. This combination yields magnified image 6. It must be noted here, that during scaling-up, the (F/#) of the lenslets remains constant.

Figure 2:
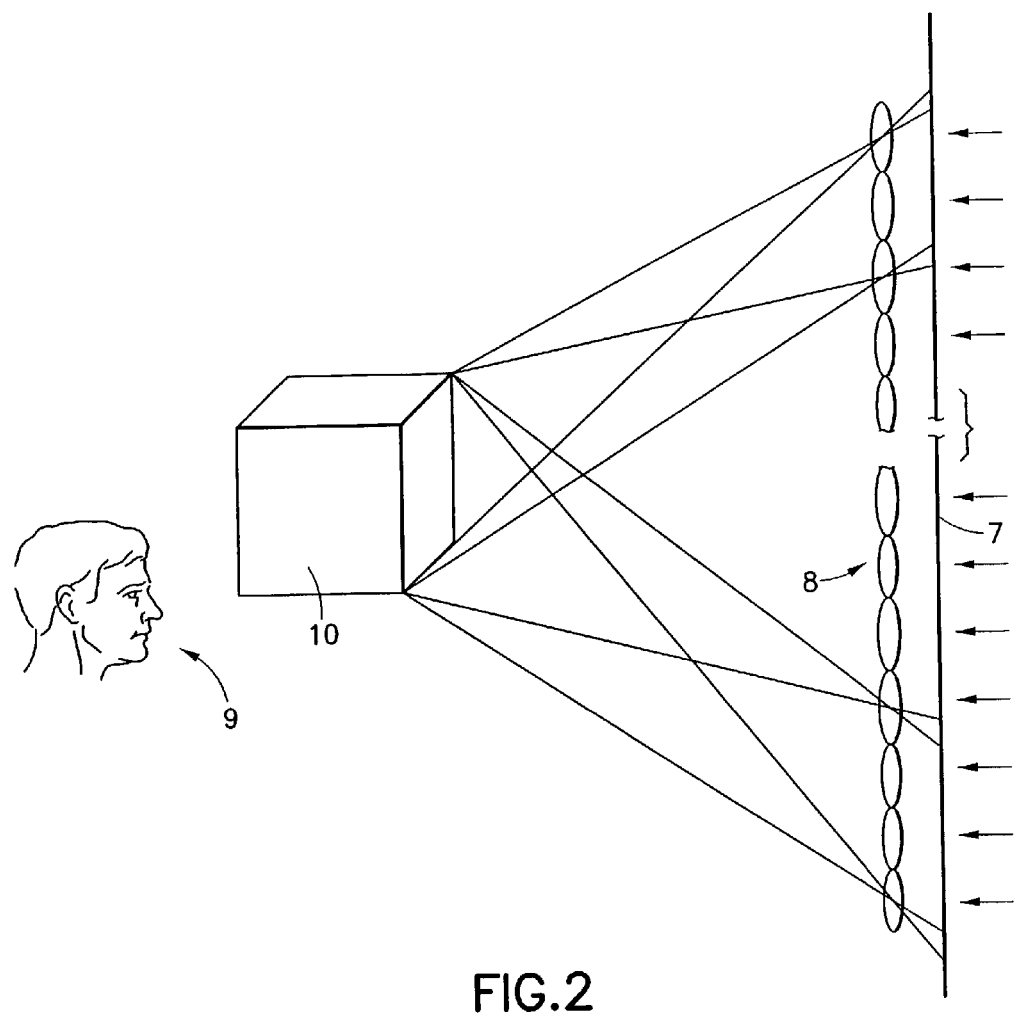
FIG. 2 illustrates how a magnified image can be projected before an audience.

Projection is merely another form of magnification. The only difference lies in the fact that no permanent record is produced as in photography. To illustrate the principle of projection, let us use as an example, the technique of rear projection shown in FIG. 2. (As will be seen later, it is also possible to illustrate this principle with front projection.) Were an integral photographic transparency to be projected at some given magnification onto a translucent screen 7 which is behind a large matrix lens array 8, an observer 9 in the audience sitting in front of the matrix lens array will see the magnified three-dimensional image 10. The three-dimensional image can be made orthoscopic, and can be made to appear either in front of or behind the matrix lens array. This will be discussed later.

What requires description is the optical and mechanical system needed to produce the initial two-dimensional array from the unmagnified three-dimensional image (i.e., the camera), the optical and mechanical system needed to produce the magnified three-dimensional image (i.e., the projector), any intermediate medium needed to produce the magnified three-dimensional image (i.e., the screen and/or any intermediate optical system), and any devices that may be required for editing the two-dimensional images used to produce the three-dimensional image. Also required is a description of the methods of photographing, projecting and editing magnified three-dimensional images.

The camera consists of an optical system that would produce the two-dimensional array of two-dimensional images on a plane, the plane and/or recording medium whereon the two-dimensional array is produced, the mechanical apparatus (if any) associated with the image plane and/or recording medium, a means (if any) for adjusting the optical system for focus and/or special effects, and the housing (if any) that integrates the optical system, the mechanical system and the image plane and/or recording medium into a single unit An example of the optical system is a matrix lens array such as a fly's eye lens arranged so as to produce a rectangular matrix array of rectangular two-dimensional images. The image plane, for example, would contain a film for recording the two-dimensional images. Once developed, the matrix array photograph would be called an integral photograph. If the camera is a motion picture camera capable of capturing moving three-dimensional images in the form of a sequential series of integral photographs, a film motion mechanism would be required. Finally, such a camera might require a housing to integrate the components and to provide a dark environment so as to not expose the film unnecessarily.

In the preferred embodiment of this invention, three-dimensional images will be projected in a theater. Studies have indicated a desired audience viewing distance of from two to six times screen width. Thus, audience size and location can help determine acceptable screen size Although many cinemas currently place their audiences closer to the screen than twice the screen width, those spectators sitting this close to the screen view even the present two-dimensional pictures uncomfortably. Insofar as theater and screen designs are concerned, the following boundary conditions apply:

(1) To maximize the audience size, the (F/#) of both camera and screen lenslets must be chosen as low as possible. The upper limit on the (F/#) should be approximately 2.0, although slightly more can be tolerated, and one should try to achieve as close to an (F/#) of 1.0 or below as possible. This is due to the acceptance angle and flipping limitations on audience size. These limitations will be discussed later.

(2) The number of elements in the matrix lens array of the camera must equal the number of elements in the screen. Since there is a minimum size that each lenslet in the camera lens array can practically be, an extraordinarily high number of elements will make utilization of the matrix lens array for normal motion picture photography very impractical. Since the size of each element, and, therefore, the number of elements in the screen are determined by the viewing distance, this would impose severe limitations on camera design. A viewing distance of approximately twice the width of the screen seems to be practical, although this figure can be slightly adjusted.

Given the above two boundary conditions, the number of elements on the screen may be determined as follows:

$$\phi_S = 2.91 \times 10^{-4} S$$

$$n_{LINEAR} = w/\phi_S, \text{ therefore,}$$

$$n_{LINEAR} = 3.46 \times 10^3 (W/S) \quad [1]$$

where: $\phi_S$=the angle of minimum visual acuity
w=the width of a frame of film
$n_{LINEAR}$=the number of elements of minimum size that can be placed in a given width in one direction on the film or screen
W=the width of the screen
S=the minimum distance of a viewer from the screen If (S/W)=2, then the screen and the camera will have 1,730 elements in the W or horizontal direction. Convention has it today that the width of a movie theater screen is thrice its height. Therefore, the screen and camera will have 865 elements in the height direction.

$$n_{TOTAL} = 1.496 \times 10^6 \text{ elements}$$

Considering a square array of elements on the film, since there are 1,730 such elemental photographs in the horizontal direction, each such elemental photograph will have a linear dimension of $5.78 \times 10^{-4}$ w (where w is the width of the frame). If we use conventional 70 mm film, the width of the frame is 65 mm, and, therefore, the linear dimension of each elemental photograph would be 0.0375 mm. Even were a film resolution of 2,000 lines/mm to be used (this is the resolution of KODAK Emulsion 649-F which has an ASA Rating of 0.003), each picture would have the total information given by 75 line pairs. However, elemental lens resolution cannot be made better than 500 lines/mm. This reduces the total available information for each picture to approximately 19 line pairs. Furthermore, the ASA rating of this high resolution film is so small as to make using this film highly impractical. For best results, the film resolution should be approximately matched to the lenslet resolution, which, in this case is between 400–500 lines/mm. Even this is high resolution black & white film, but it is useable.

If we try to match the element size to that which would give a reasonable elemental resolution, one must look for a total information capacity of approximately 400–500 line pairs, (possessing the image quality of a commercial television picture). This would require lenslets one-mm square. The size of the film frame will be 1.73 meters×0.865 meters. That is ridiculous! Even were the lenslets to be 0.4 mm, the frame would be 69.2 cm×34.6 cm, and with 0.1 mm lenslets (a situation of unacceptable resolution) the frame size would be 173 mm×86.5 mm. Even film of this size is impractically large. While it is true that extremely small lenses and very high resolution film can produce a frame size which just enters the field of usability, the image resolution is so poor that the popularity of such a three-dimensional process would be in question.

Figure 3:
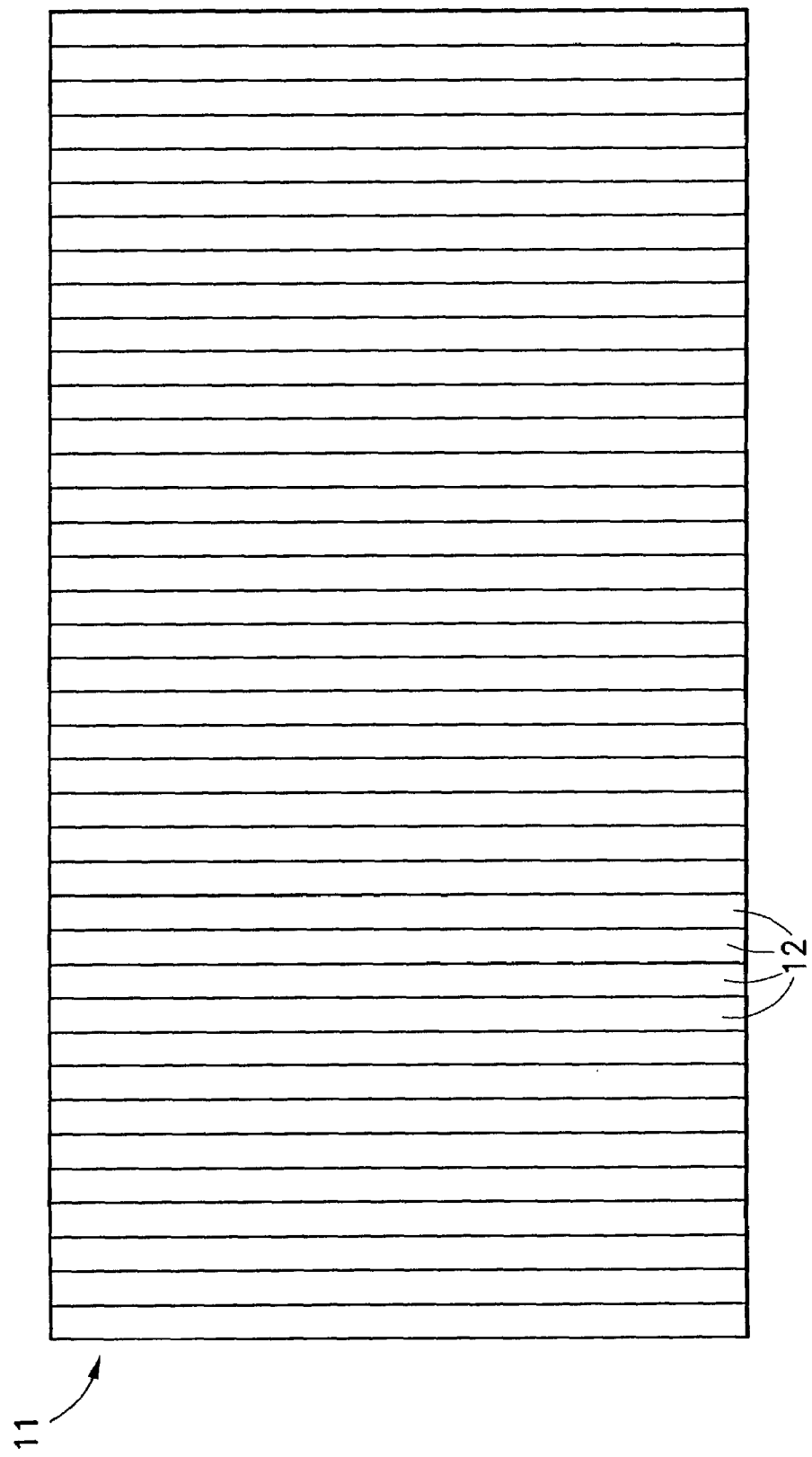
FIG. 3 illustrates the appearance of a two-dimensional integral photograph projected upon a screen using the preferred embodiment of this invention.
Figure 4A:
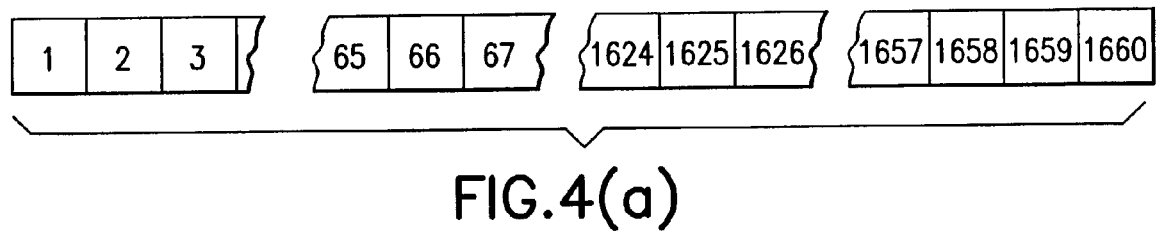
FIG. 4(a) shows the format of the original integral photograph.
Figure 4B:
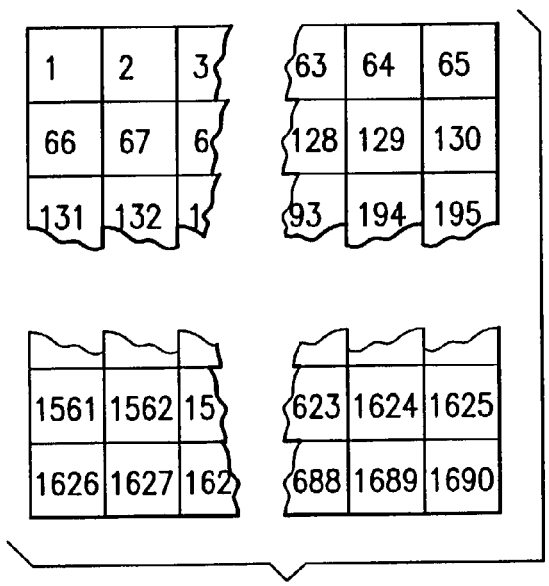
FIG. 4(b) shows the format of the multiplexed film.

A solution is available that avoids the problems of resolution; that is the elimination of vertical parallax, the use of black-and-white film for color photography, and the use of elemental multiplexing on the film. This is the preferred embodiment of the camera. Theoretically, an integral photograph produced by this type of camera will appear as shown in FIG. 3. The entire two-dimensional projected image 11 would consist of a multiplicity of two-dimensional elements 12. A projected integral photograph with only horizontal parallax would look to be exactly the same as the "lenticular" three-dimensional pictures currently on the market. Vertical parallax would be missing, but horizontal parallax would be present. In normal use of stereoscopic vision, vertical parallax is not used, and horizontal parallax alone is sufficient to give a true three-dimensional effect. Since vertical parallax is not needed for three-dimensional photography, horizontal elements can be multiplexed vertically on the film. This is illustrated in FIG. 4. FIG. 4(a) shows the original integral photograph with the elements arranged horizontally. FIG. 4(b) shows how the same elements can be arranged in a rectangular format on the film.

It is highly desirable to use a practical commercial film with the highest possible resolution. (It is extremely important that the maximum amount of information be recorded on each elemental photograph. This is determined not only by the lenslet characteristics but also by the film resolution.) Unfortunately, color films are not commonly manufactured with the high resolution available from black-and-white films. For best results in reconstructing a sharp three-dimensional picture, high resolution black-and-white film should be used. However, color pictures are essential if the process described herein is to be commercially successful If the camera matrix lens array is designed to be used with a color filter plate (having red, blue and green elements alternating), each elemental photograph of the integral photograph will possess the characteristics of having been photographed by monochromatic light (alternating red, blue and green). If black-and-white film were to be used in such a camera, and the final projected integral photograph be passed through a color filter plate, such that the red color is added to each elemental photograph taken using a red filter, blue color added to those taken using a blue filter, and green color added to those taken using a green filter, then the final projected picture will appear in full natural color, provided that the audience is far enough back from the screen that the individual elements cannot be resolved. (Color plates can be used for this purpose even where integral photography is not used. Such a color plate can be used in any conventional camera with black-and-white film, and, as long as a second appropriate color plate is used for projection, color pictures can be obtained.)

Figure 5:
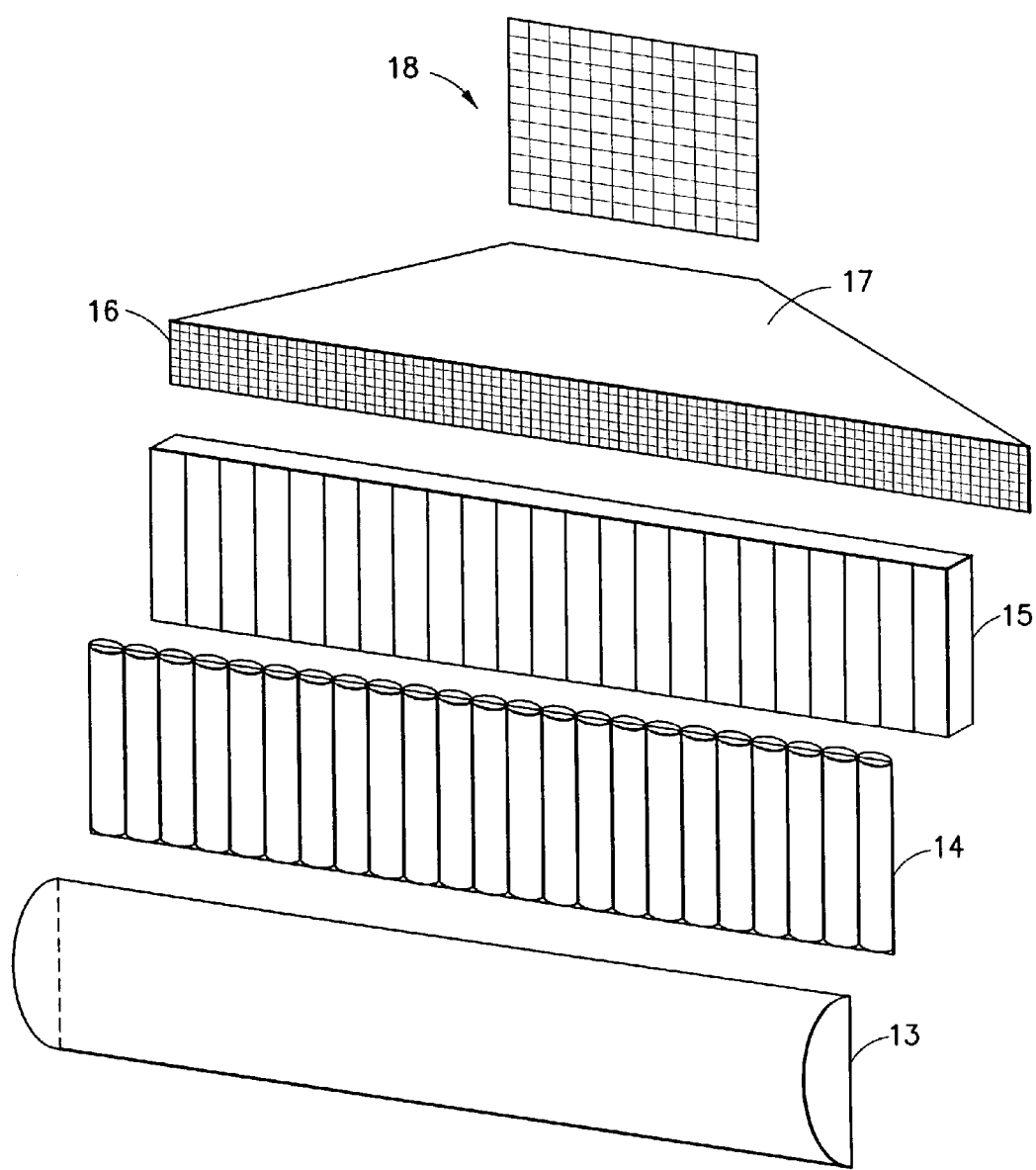
FIG. 5 is a schematic of the preferred embodiment of the camera.
Figure 6:
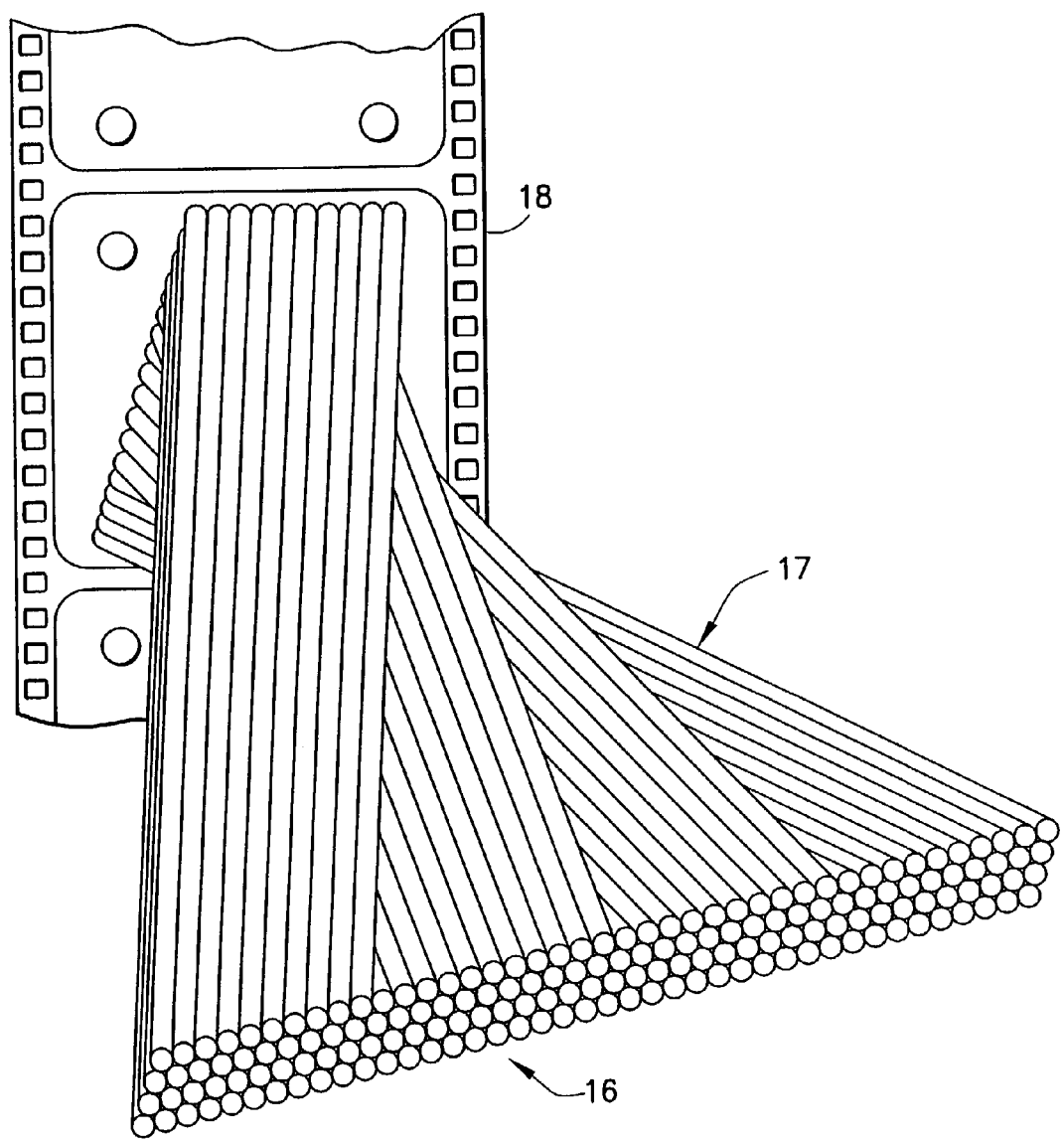
FIG. 6 is a drawing showing a fiber optics image dissector and multiplexer.

FIG. 5 illustrates the basic concept of a camera which would do this. In stage 1 of the camera, the scene is first compressed in the vertical direction by a cylindrical lens 13, but no focusing occurs in the horizontal direction. Only when this vertically compressed picture impinges on the Bonnet lens 14 (with its associated color plate 15) is it focused in the horizontal direction to the correct number of elemental photographs (horizontal) which have been foreshortened in the vertical direction as shown in FIG. 4(a). Stage 2 of the camera diverts sections of this horizontal line of pictures onto different vertical positions on As shown in FIG. 5, a two-dimensional image 18 of the type shown in FIG. 4(a) is focused onto an image plane consisting of a fiber optics face plate 16. The image is then transformed using a fiber optics image dissector and multiplexer 17. This optical device transforms a two-dimensional image of the type shown in FIG. 4(a) impinging upon one of its two image planes to a two-dimensional image of the type shown in FIG. 4(b) upon its second image plane. This transformed image is exposed on the film 18 which is in contact with the second image plane of device 17. The method of performing the multiplexing is also shown in FIG. 6. The fiber optics image dissector and mutiplexer 17 serves to divert sections of the picture on image plane 16 to different positions on the film 18. The usual purpose of such a device is to act as a shape transducer to increase the resolution of a television camera. It consists of several fiber optics sections, each section transmitting and directing the image with which it is in contact through the optical fibers to a different position relative to the image in contact with an adjacent section. FIG. 6 shows this function being performed using an image orthocon tube. However, such fiber optics image dissectors can be constricted to convert a strip image to a rectangular image on a film. Similarly, such a device can convert a multiplexed integral photograph rectangular image on a film to a strip image for projection onto a screen. A fiber optics device of this type is quite standard, although it would need to be constructed to provide the particular format which will be decided upon. Each transmitting section would have the dimensions 65 mm×δ, and 2-micron fibers would be used, separated by ½-micron. Such a fiber optics device would provide a resolution of 400 lines/mm. This device would be manufactured from rigid fibers and would not be flexible. The adhesive which bonds the fibers together would be opaque, and, therefore, no crosstalk between fibers would occur.

The configuration of the matrix lens array of the camera is such that it will be a long strip of lenslets. Immediately, this eliminates the use of a hand held camera. For most practical applications, the matrix lens array will be between 1 and 2 meters long. Certainly, both structural considerations and the difficulties in fabricating the multiplexing image dissector prohibit the lens from being much larger than this. Even with this size lens, the camera must be moved with a dolly (a technique which is quite standard in motion picture technology). Much larger matrix lens arrays would have to be held stationary. Although this option is not really practical, were camera motion to be eliminated, much larger matrix lens arrays could be used.

In terms of its mechanical stability, the matrix lens array must be structurally braced so that no relative motion occurs between the lenslets, and so that no relative motion occurs between the matrix lens array and the image plane.

To playback the system described above, one need merely reverse the optics for projection; i.e., a highly anamorphic lens (for the vertical direction) must be used to project this frame onto a special screen.

The screen is a set of vertical cylindrical lenses arranged horizontally, similar to what is used for the lenticular three-dimensional process, along with a color plate if necessary. Instead of cylindrical lenses, vertical cylindrical zone plates (stamped or photographed or made by holography) or reflective optics can be used The magnification principle still applies as has been previously described, but only in the horizontal direction This will be discussed further.

To Perform a Typical Resolution Problem:

Assume the audience will be seated at a minimum distance of twice the width of the screen. This requires 1,730 elements in the horizontal direction. Using the method of elimination of vertical parallax, these elements are cylindrical, and run along the entire height of the screen, i.e., only one element exists in the vertical direction. Assume that each Bonnet element is 1 mm diameter, with a resolution of 500 lines per mm. Therefore, the size of the Bonnet Lens Array is 1.73 meters horizontally×0.865 meters vertically. This will produce 1,730 individual elemental photographs. The size of the frame on 70 mm film is 65 mm horizontally×32.5 mm vertically. This means that 65 individual pictures can fit on one row of the frame. This requires approximately 27 vertical rows to produce the 1,730 pictures. Therefore, each element is approximately 1 mm×2.5 mm for a square format or 5 mm if the height of the frame is twice the width. The latter format is possible provided that the film moves twice as fast. This is feasible. 1 mm elements provide sufficient resolution in the horizontal direction. This is further enhanced by the redundancy factor (which will be discussed later) which will make the vertical resolution sufficient for comfortable viewing.

Figure 7A:
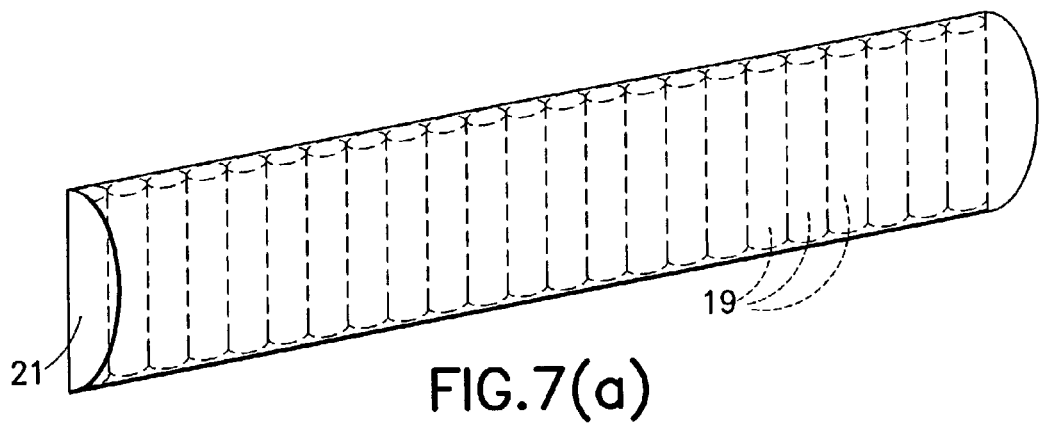
FIG. 7 shows the design considerations for the camera matrix lens array.
Figure 7B:
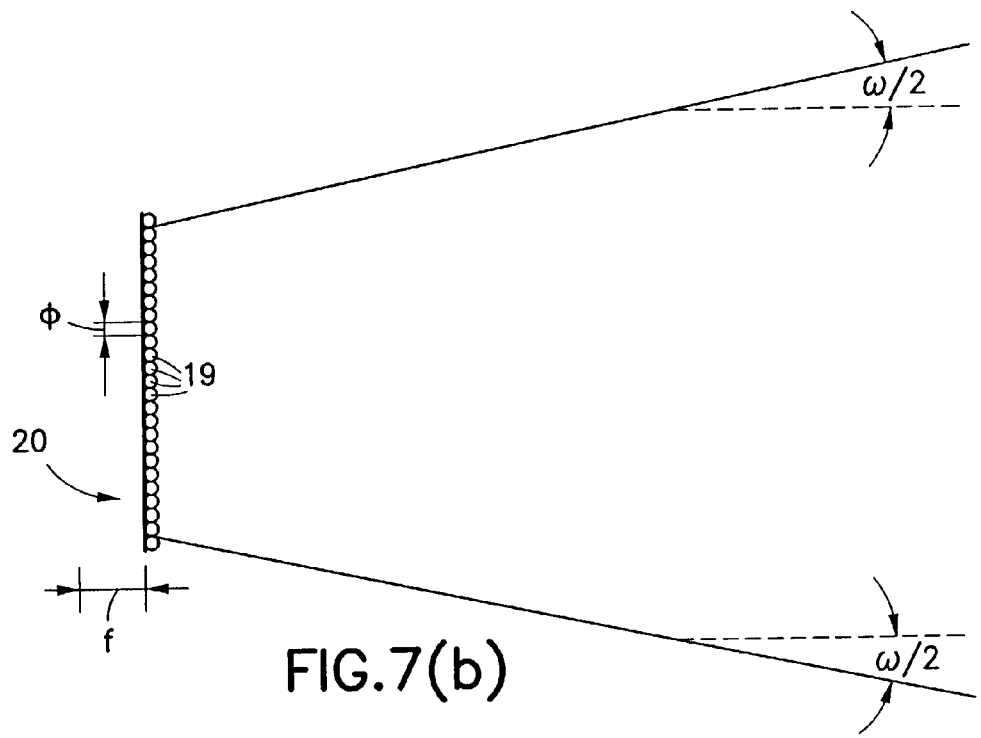
Figure 7C:
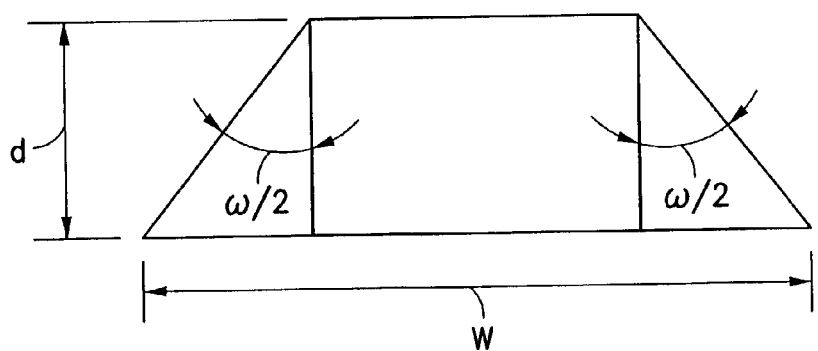
Figure 7D:
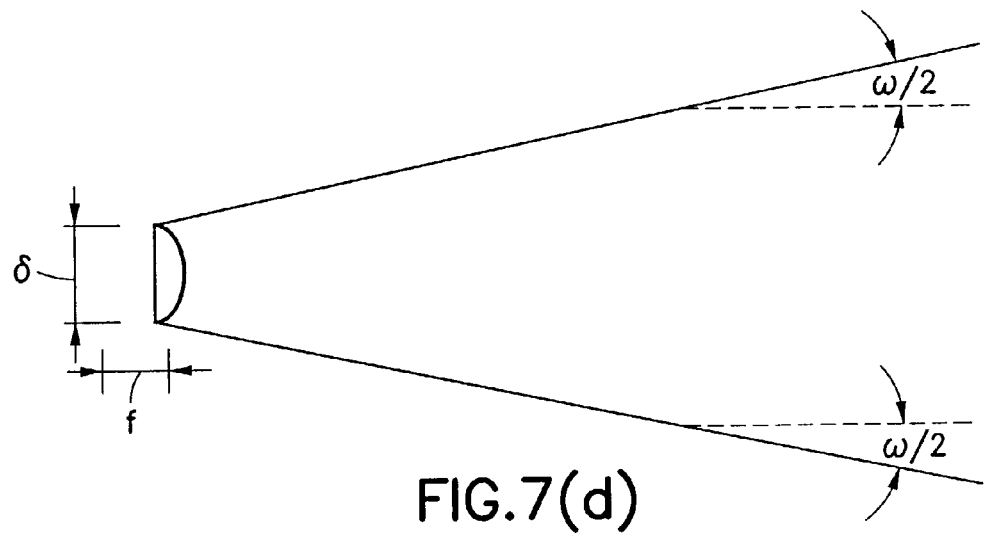

FIGS. 7(a) through (e) are to be used for the camera lens design computations. FIG. 7(a) shows a section of the camera matrix lens array. It consists of a Bonnet Screen 20 consisting of 1,730 plano-convex vertical cylindrical lenses 19 arranged in the horizontal direction crossed with one plano-convex cylindrical lens 21 in the horizontal direction. FIG. 7(b) shows a horizontal section of the matrix lens array. The parameters illustrated in this figure are arranged for computation in FIG. 7(c). FIG. 7(d) shows a vertical section of the matrix lens array, and its parameters are arranged for computation in FIG. 7(e).

Figure 8:
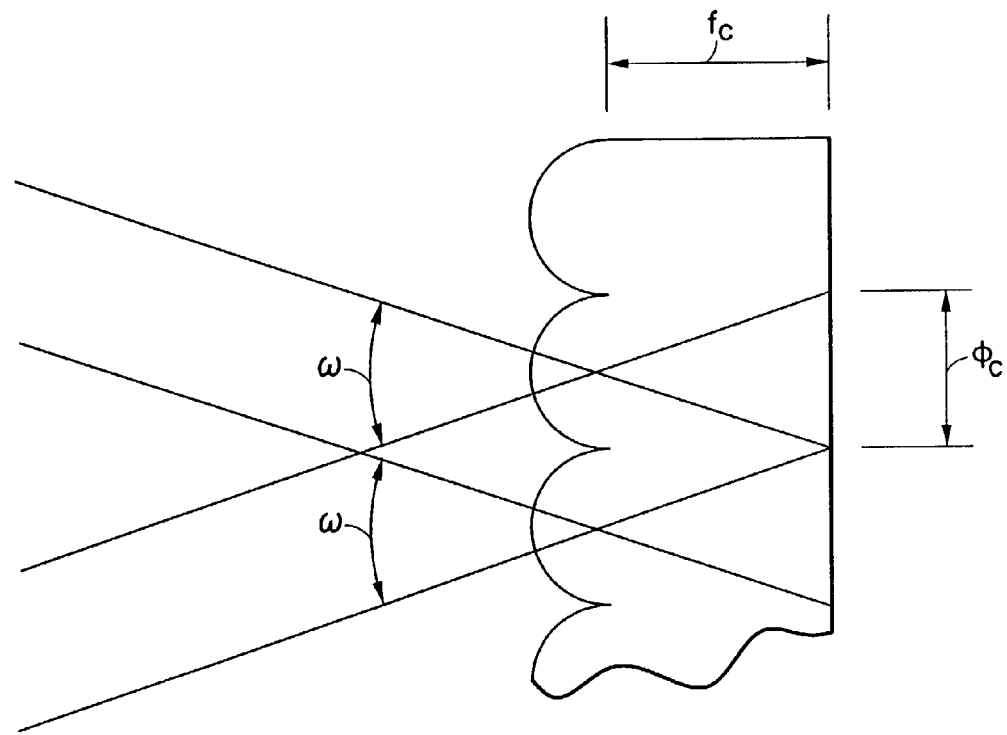
FIG. 8 shows the parameters for the determination of acceptance angle.

Integral photography imposes a severe limitation on theater design, i.e., the total angle under which a spectator sitting on the perpendicular bisector of the screen views the three-dimensional virtual image cannot be greater than the acceptance angle, ω, of each individual lenslet in the matrix lens array (as will be seen later, holography does not impose this limitation). The parameters for the determination of this acceptance angle are shown in FIG. 8.

$$\tan\frac{\omega}{2} = \frac{\phi_C}{2f_C} = \frac{1}{2(F/\#)} \quad [2]$$

where, $\omega$=the acceptance angle
$\phi_C$=the diaimeter of a single lenslet
$f_C$=the focal length of a single lenslet From equation 2, for each lens 19 in the Bonnet Screen 20, we have:

$$\frac{\phi}{2f} = \tan\frac{\omega}{2} \quad [3]$$

and, similarly, for the crossed cylindrical element 21, we have:

$$\frac{\delta}{2f} = \tan\frac{\psi}{2} \quad [4]$$

where $\delta$ is the height of the lens (equivalent to the diameter of a spherical lens), f is the focal length, and $\psi$ is the cylindrical lens acceptance angle. From FIG. 7(c), we can see that:

$$\frac{x}{d} = \tan\frac{\omega}{2}.$$

Substituting into equation 3, we have $$x = \frac{d\phi}{2f}, \quad [5]$$

and $$w = \phi\left(n + \frac{d}{f}\right) \quad [6]$$

Figure 7E:
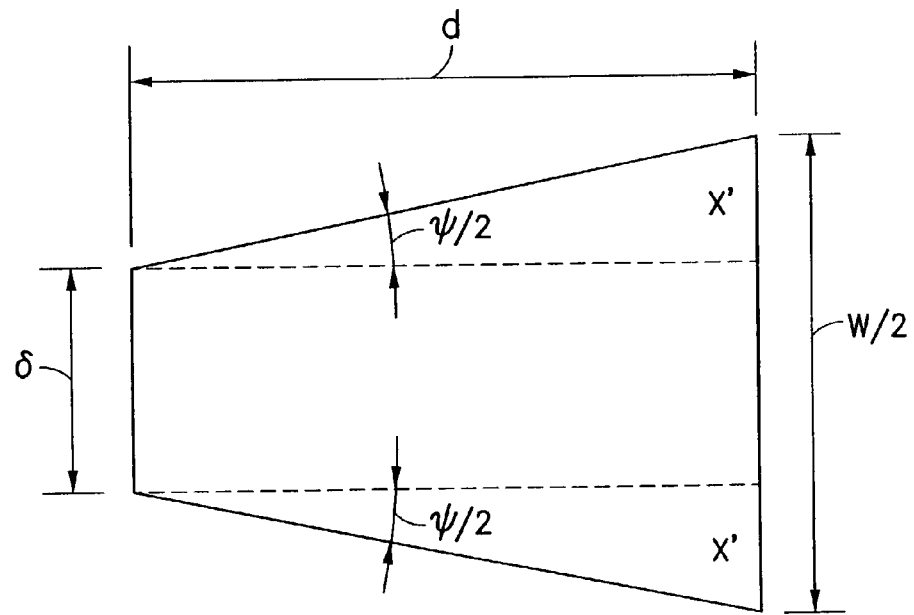

From FIG. 7(e), we can see $$\frac{x'}{d} = \tan\frac{\psi}{2}$$

and, similarly, substitution into equation 4 yields $$x' = \frac{d\delta}{2f}.$$

Now, the total height of the frame at d is W/2. So, once again from FIG. 7(c), we have $$\frac{W}{2} = \delta\left(1 + \frac{d}{f}\right)$$

Substituting this expression into equation 6, we obtain $$\left(1 + \frac{d}{f}\right) = \frac{\phi}{2}\left(n + \frac{d}{f}\right)$$

which yields:

$$f = \frac{2d\delta}{\phi(n+d) - 2\delta} \quad [7]$$

A more useful form of this equation is:

$$d = \frac{n\phi ff - 2ff}{2f - f\phi} \quad [8]$$

where d represents the distance from the camera lens to an imaginary frame or aperture whose width is twice its height and through which the scene would be seen in the same size and perspective as were the image from the film to be projected onto a small screen of the same size (W×W/2) at that same distance d. As can be seen from equation 8, while d is dependent on both the diameter and focal length of each lenslet in the Bonnet Screen, it is also dependent on the (F/#) of the cross cylindrical element.

The following procedure should be used for the camera lens design. First, select $\phi$, n, and the size of the film frame. $\delta$ is thus determined. Then select the (F/#) of the lenslets in the Bonnet Screen portion of the lens and f is determined. Select the (F/#) of the cylindrical element of the lens, and f is determined. Now, from the lens maker's formula:

$$\frac{1}{F.L.} = (\eta - 1)\left(\frac{1}{r_1} - \frac{1}{r_2}\right).$$

For the cylindrical element of the lens which is plano-convex, either $r_1$ or $r_2$ is infinite.

$$r = f(\eta - 1) \quad [9]$$

where r is the radius of the cylindrical element, and $\eta$ is the refractive index of the lens material. Then:

$$2r \geq \delta \quad [10]$$

(The relationship $2r=\delta$ will hold true only when the (F/#) of the cylindrical lens is 1.)

Now, let us show some examples:

Let $(F/\#)_1$ be that of the Bonnet lenslet and $(F/\#)_2$ be that of the crossed cylindrical element. In this case, select a film frame size of 65 mm×130 mm. Also, $\eta$ is assumed to be 1.52.

TABLE 1

| n | φ, mm | (F/#)$_1$ | f, mm | δ, mm | (F/#)$_2$ | f, mm | r, mm | d, mm | W, mm |
|---|---|---|---|---|---|---|---|---|---|
| 1,734 | 1.2 | 1.7 | 2.04 | 4.06 | 1.7 | 6.91 | 3.59 | 3,530 | 4,150 |
| 1,707 | 0.8 | 1.7 | 1.36 | 6.18 | 1.7 | 10.53 | 5.39 | 2,330 | 2,733 |
| 1,707 | 0.8 | 1.7 | 1.36 | 6.18 | 1.2 | 7.42 | 3.81 | 1,285 | 2,122 |
| 1,756 | 1.0 | 1.7 | 1.70 | 4.81 | 1.2 | 5.58 | 3.00 | 1,626 | 2,687 |
| 1,734 | 1.2 | 1.7 | 2.04 | 4.06 | 1.2 | 4.88 | 5.08 | 1,776 | 2,970 |

The results shown in Table 1 show that it is very important to make (F/#)$_2$ as small as possible. The figure of F/1.2 for the cylindrical lens seems possible, as is shown by the figures for r. When (F/#)$_2$ is made small, φ can be made somewhat larger without increasing d and W by too much. In such a case, there is a trade-off between horizontal and vertical resolution. d should be kept as low as possible, since any object coming closer to the camera than the distance d will appear in front of the screen after projection. A value for d ranging between 1 and 2 seems optimum.

The design of the camera discussed above would apply to taking still pictures or moving pictures. Clearly, in order to use this camera to produce three-dimensional motion picture films, a film motion mechanism is required. However, before discussing the film motion mechanism, some alternate embodiments of camera design will be presented.

Figure 9:
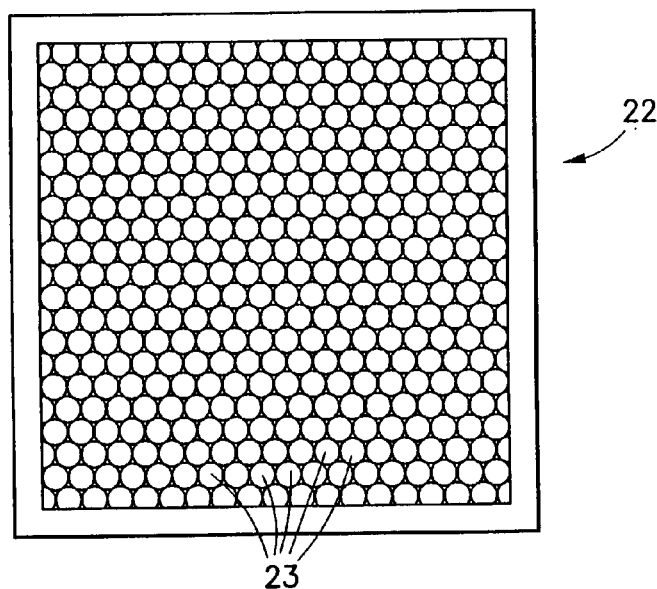
FIG. 9 is a drawing showing a matrix lens array consisting of small spherical lenslets that are hexagonally close-packed.

There are several alternatives for the matrix lens array used to create the two-dimensional array of elemental pictures. One such alternative is an array of small spherical lenslets that are hexagonally close-packed. A matrix lens array of this type has often been referred to as a "fly's-eye lens." These lens arrays are usually formed by pouring molten glass or plastic into a mold. The mold is usually made by pressing small metal spheres into a copper master. In this case, the small spheres are arranged so that the maximum number can be contained in the smallest possible space. This is done to eliminate as much dead space as possible. Therefore, the spherical lenslets are hexagonally close packed. Such a matrix lens array is shown in FIG. 9. The matrix lens array 22 consists of many small spherical lenslets 23, each lenslet being surrounded by six identical lenslets. This close packing pattern of the lenslets is duplicated by the arrangement of the two-dimensional elemental pictures on the film. Each elemental picture on the film must also be surrounded by six elemental pictures.

A second alternative for the matrix lens array would be a square array of small criss-crossed cylindrical lenslets. This array provides the closest possible packing of lenslets with the complete elimination of dead space. This is highly desirable. Equivalent spherical lenslets are produced by crossing two sheets of cylindrical lenses and mating them orthogonal to each other. These cylindrical lens sheets, individually, are often called "lenticular lens sheets" or Bonnet Screens. Obviously, the focal lengths of the lenslets in the two arrays must be different and computed so that they each focus on the image plane. Such a matrix lens array is shown in FIG. 10. FIG. 10(a) is a top view of the device while FIGS. 10(b) and 10(c) represent side and front views respectively. This device 24 consists of two matrix lens arrays of the type described as element 14 of FIG. 5. Each of these two matrix lens arrays are comprised of small cylindrical lenslets 25. When the two arrays are crossed such that the axes of the cylindrical lenslets on the arrays are orthogonal or perpendicular to each other, a two-dimensional array of two-dimensional elemental pictures can be produced.

Figure 11A:
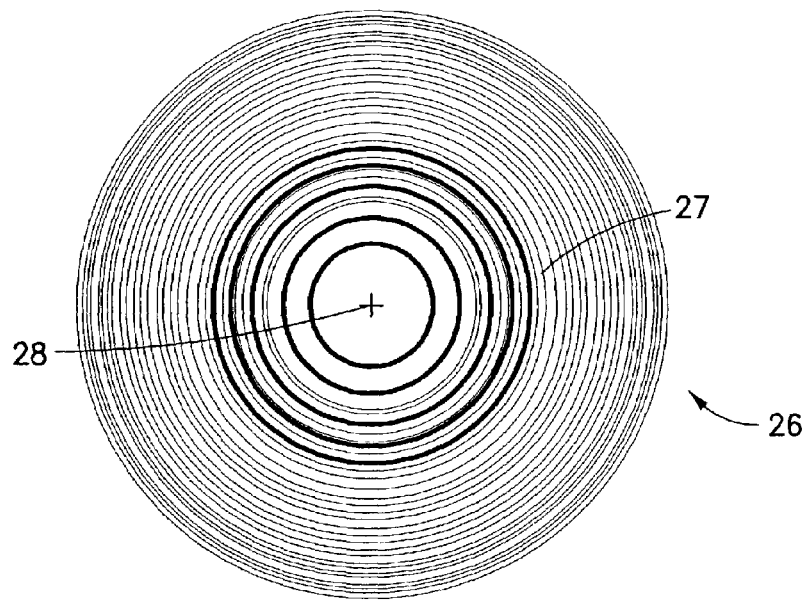
FIG. 11 is a schematic of a Fresnel Zone Plate.
Figure 11B:
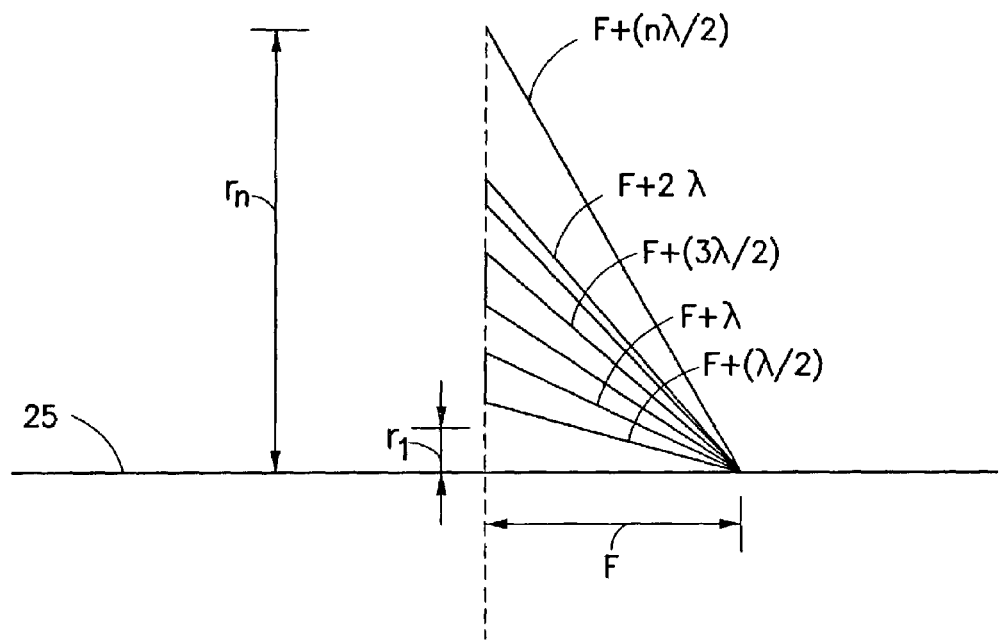

A third alternative for the matrix lens array would be an arrangement of zone plates. These are less commonly used devices for focusing electromagnetic radiation. It has been used to focus radiation ranging from the infrared down to the soft X-Ray region. A Frensel Zone Plate consists essentially of concentric alternately opaque and transparent rings. A Fresnel Zone Plate can either be produced photographically, or by carving, etching, or stamping the zones in plastic or glass. The FZP is shown schematically in FIG. 11. FIG. 11(a) shows the appearance of the Fresnel Zone Plate 26. The concentric circles 27 are drawn so that the difference in path length between adjacent transparent zones to a point on the axis 28 of the zone plate is just equal to λ, the wavelength of the incident radiation. FIG. 9(b) shows the parameters for the following formulae. Referring to FIG. 11(b), for this path difference to occur:

$$r_n^2 = nF\lambda + \frac{n^2\lambda^2}{4} \quad [11]$$

where, r$_n$=radius of the nth zone
n=number of zones subtended by r$_n$
F=primary focal length
λ=wavelength of the incident radiation If n is small, the radii are given approximately by:

$$r_n^2 = nF\lambda \quad [12]$$

If a plane wave is incident on the zone plate, the diffracted waves passing through the transparent zones and arriving at the point F on the zone plate axis will interfere constructively with each other. The path differences for all the transparent zones are an integral number of wavelengths. An image of the source emitting the plane waves will be formed at the point F on the axis of the zone plate.

From equation 12, $$F = \frac{r_n^2}{n\lambda} \quad [13]$$

Also a point at a distance s in front of a Fresnel Zone Plate will be imaged at a point s' behind the zone plate as given by:

$$\frac{1}{s} + \frac{1}{s'} = \frac{1}{F} \quad [14]$$

This is the same expression as that used for a thin lens. Using the Rayleigh Criterion for the formation of optical images, it can also be proven that angular resolution of a zone plate is the same as for a lens of the same aperture and is given by:

$$\sin \theta = 1.22(\lambda/D) \quad [15]$$

Equation 13 shows that the focal length of the zone plate is inversely proportional to the wavelength of the incident radiation. In the visible spectrum, there is approximately a 2:1 variation in λ; therefore, there will be a 2:1 variation in the focal length of a zone plate over this region and 1,000:1 variation in focal length in the region extending from the near infrared ($0^4$ Å) down to the soft X-Ray (0 Å) wavelengths. Therefore, the zone plate is inherently a highly monochromatic device.

If a plane wave is incident on a Fresnel Zone Plate, several diffracted waves are generated. These are separated into three categories: positive, negative and zero orders. The positive orders consist of a number of wavefronts converging toward the axis of the FZP; the negative orders are those wavefronts which appear to diverge from points along the axis in front of the zone plate; and the zero order consists of a plane usable similar to the incident wave, but reduced in amplitude. FIG. 11 illustrates the basic theory of the zone plate. As can be seen in FIG. 11, a plane wave will not only focus at the primary focal point F (65), but also with successively lower intensity, at a distance from the zone plate of F/3, F/5, F/7, etc. The diverging wavefronts appear to emanate from points along the axis in front of the zone plate at -F, -F/3, -F/5, etc. The zero and negative order wavefronts may be removed from the point at which the positive order wavefronts focus by placing a stop so that it blocks off the inner zones of the zone plate, or by simply not forming the inner zone of the zone plate.

Figure 12:
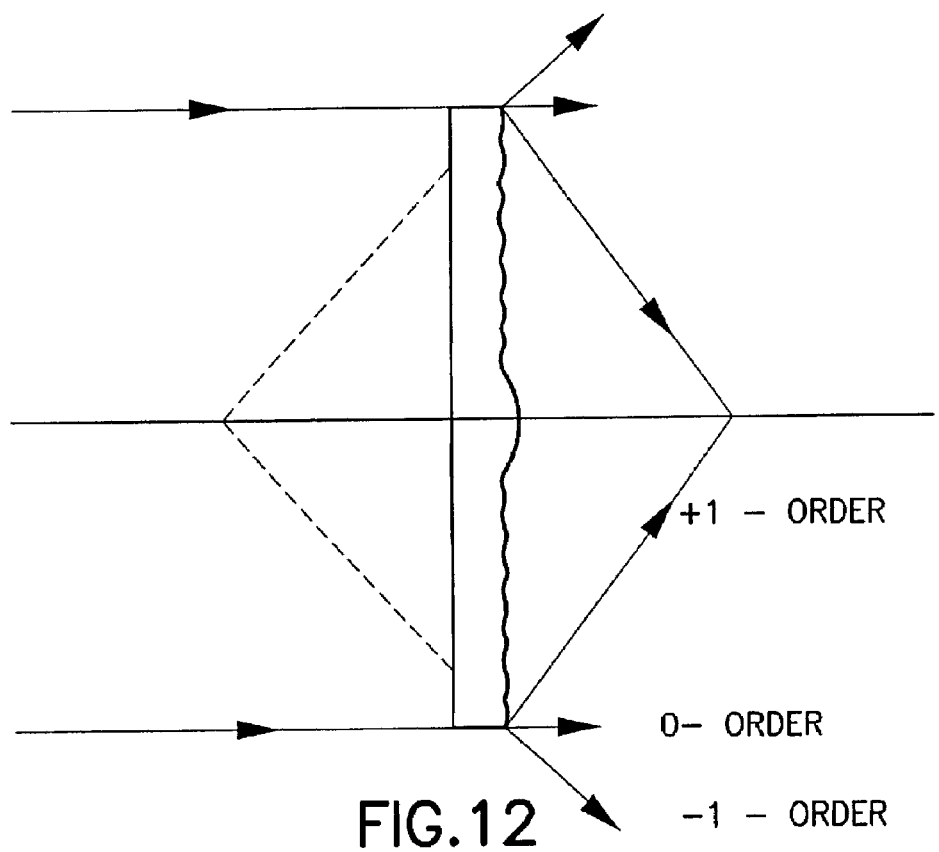
FIG. 12 is a schematic of a Gabor Zone Plate.
Figure 13:
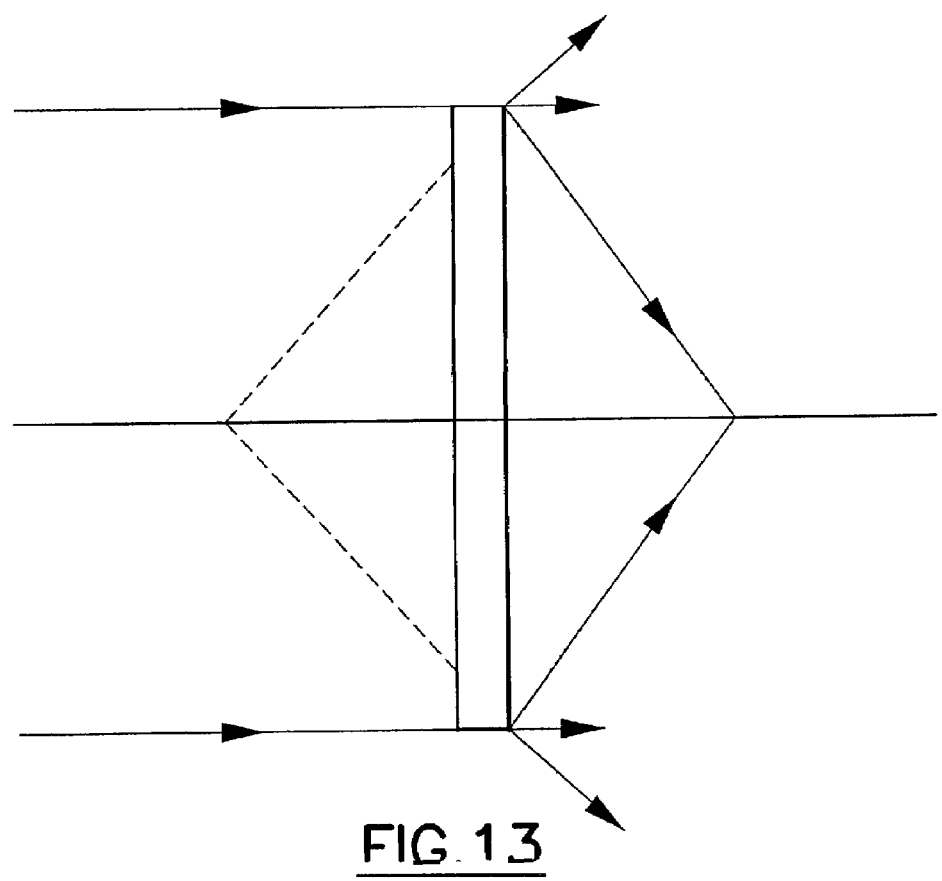
FIG. 13 is a schematic of a Holographic Zone Plate.

A Gabor Zone Plate is defined as that zone plate which, when illuminated by spherical (or plane) wavefronts of monochromatic light, produces only one real and one virtual point image. A schematic of this is shown in FIG. 12. The zero-order represents that light passing through the zone plate that is not used to produce an image. The +1-order represents that light used to focus the real image, and the -1-order represents that light used to focus the virtual image. This zone plate can be produced photographically or by holography on an emulsion whose developing power varies sinusoidally as the intensity of the incident light, or it can be stamped onto plastic. FIG. 13 shows a schematic of a Gabor Zone Plate that has been produced holographically. Note the absence of physical features on the surface of the emulsion (This is not quite true, since a developed emulsion would have some physical features. It is true that some "surface holograms" perform active focusing by using surface features of the developed emulsion However, holograms often perform active focusing by using diffractive properties caused by different features within the volume of the emulsion. These are called "volume holograms" or "Bragg Angle Holograms.")

Refer to equation 11. Since the focus is different for each wavelenth, for the magnification principle to hold true for zone plates illuminated with white light, the following equation must be true:

$$\left.\frac{F_2}{F_1}\right)\lambda_1 = \left.\frac{F_2}{F_1}\right)\lambda_2,$$

in other words, the ratio of focal lengths both before and after magnification must be the same for all wavelengths. We now obtain:

$$\frac{(F_2/F_1)\lambda_2}{(F_2/F_1)\lambda_1} = \frac{(\lambda_2^2)}{(\lambda_1^2)} \frac{[4(r_n^2)_1(\beta-1)+n^2\lambda_1^2(3-\beta)]}{[4(r_n^2)_1(\beta-1)+n^2\lambda_2^2(3-\beta)]}$$

where, n=number of fringes
β=magnification

This can be approximated by:

$$\frac{(F_2/F_1)\lambda_2}{(F_2/F_1)\lambda_1} = \left(\frac{\lambda_2^2}{\lambda_1^2}\right)^2 \quad [16]$$

Therefore, when dealing with zone plates, the basic magnification principle, upon which this application is based, does not hold true for white light. It could work if the lenslets were to be arranged so that the focal lengths for the different primary wavelengths alternate; then each lenslet would require an attached color filter, and a color filter would then become part of the matrix lens array as is shown in FIG. 14.

Figure 14A:
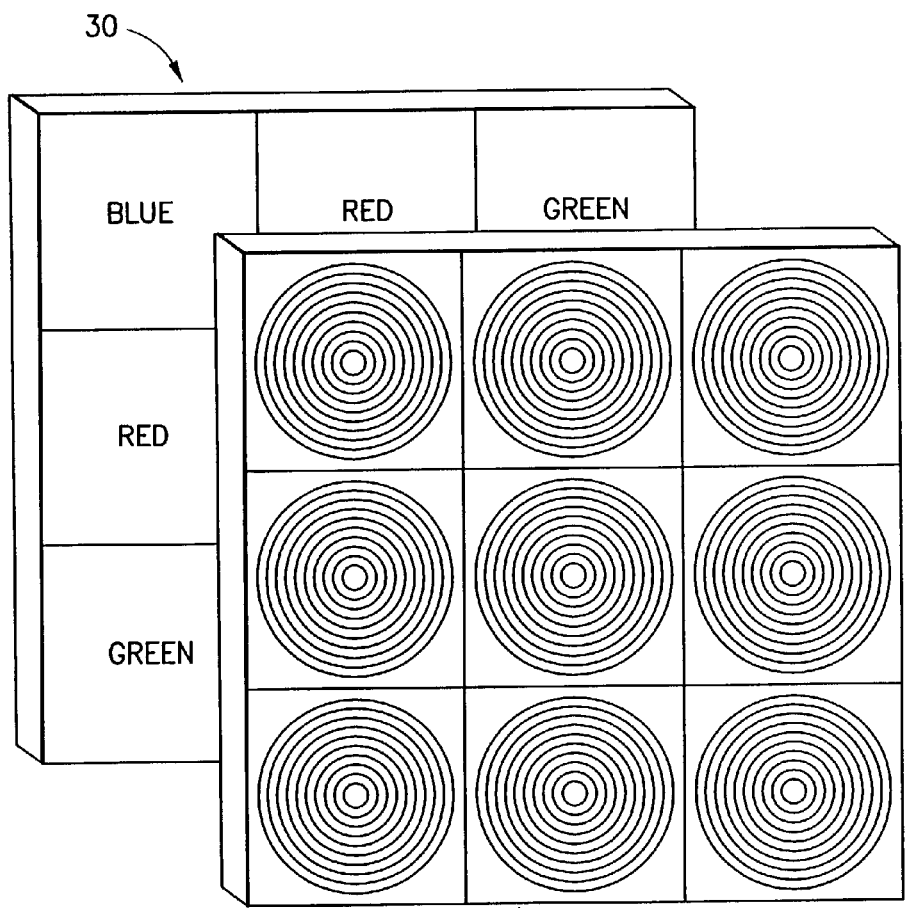
FIG. 14 is a schematic of a zone plate matrix lens array optical system.
Figure 14B:
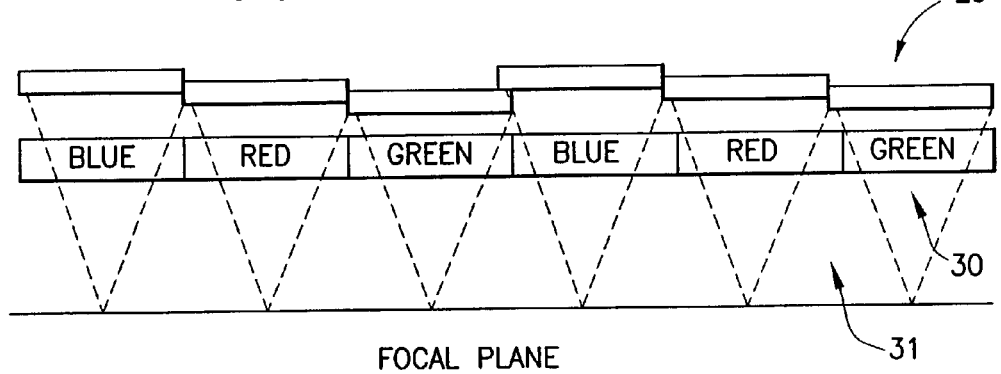

FIG. 14 is a schematic of a zone plate matrix lens array optical system. FIG. 14(a) represents a cross section of the matrix lens array optical system, while FIG. 14(b) shows a schematic of how this optical system works. The optical system consists of both a matrix zone plate array 29 and a color plate 30. Both these elements in combination serve to produce a two-dimensional image of two-dimensional elemental photographs on a focal plane or film plane 31. The elemental photographs alternate as monochromatic blue, red and green pictures. It is less desirable to use color film than black-and-white film due to the higher resolution of black-and-white film. Playback with another color plate will reproduce the blue, red and green monochrome colors associated with each elemental photograph, and, if the elemental photographs are unresolvable by the audience due to minimum visual acuity, a viewer will see a reconstructed image in full color.

Figure 15:
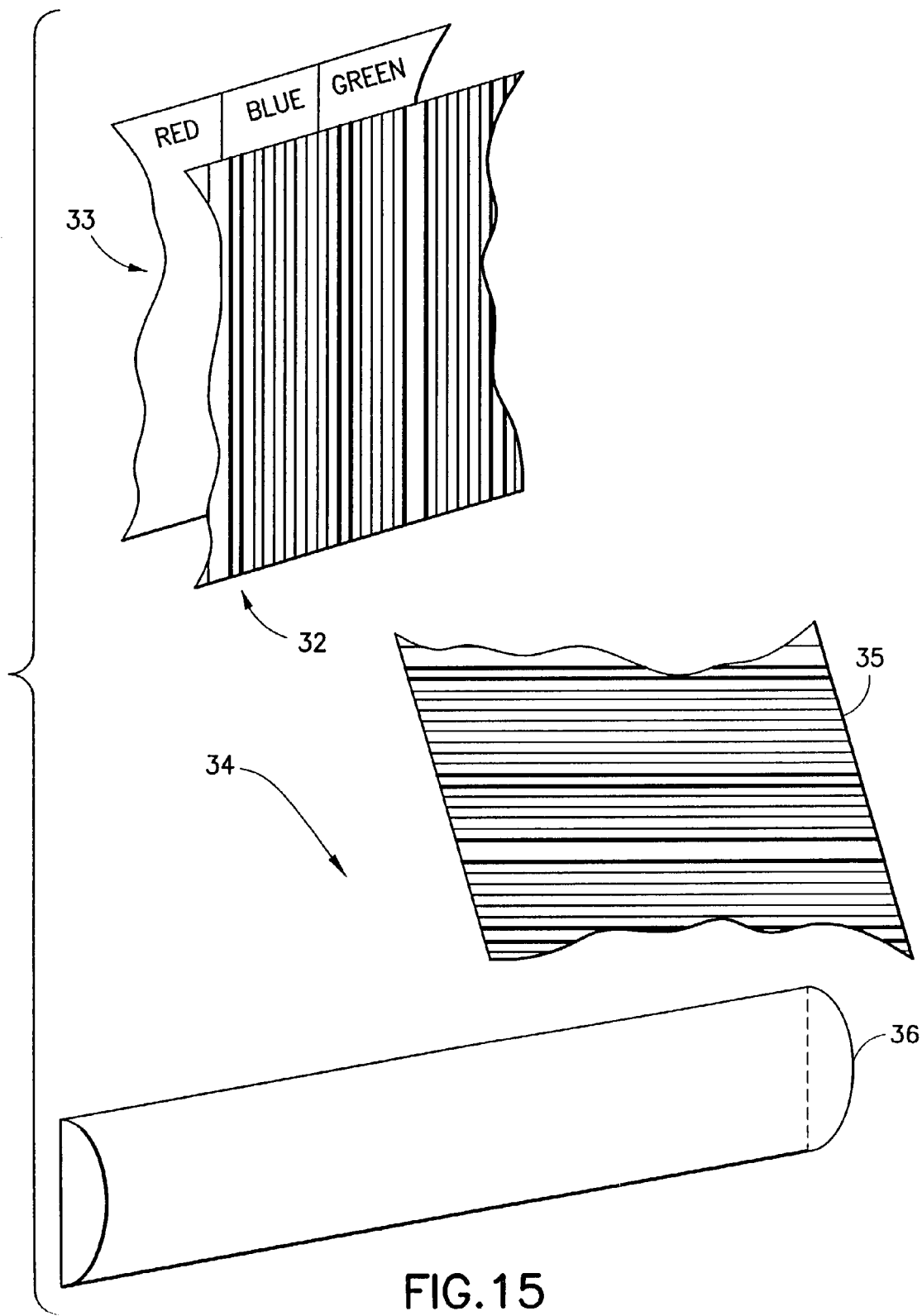
FIG. 15 is a schematic of a zone plate matrix lens array optical system where vertical parallax has been eliminated.

FIG. 15 is a schematic of a zone plate matrix lens array optical system with vertical parallax eliminated This consists of a series of cylindrical zone plates arranged horizontally 32 and a color plate 33. Of course, the optical system must also contain a means 34 for focusing in the vertical direction. Such focusing means can consist of a single cylindrical zone plate 35 or a cylindrical lens 36.

Use of the alternate lens embodiments could present film resolution problems. However, in the photographic industry, film manufacture is constantly being improved, and higher film resolution is becoming available. Once sufficient film resolution has been achieved, many of the resolution economies discussed for the preferred embodiment will not be necessary Therefore, the alternate lens design embodiments may become desirable at that time.

However, the resolution problems could be due to conditions other than film resolution limitations (viz., diffraction and abberations). When examining the resolution limitation due to film resolution, it must be understood that the resolvable distance, d, upon the film is given by $$d = \frac{1}{R}, \text{mm} \quad [17]$$

With a film resolution of 400 lines/mm, the smallest resolvable spot would be 0.0025 mm.

We now examine the resolution limitation due to diffraction. Consider the fact that each lenslet is a pair of crossed cylinders, each having a horizontal dimension of φ and a vertical dimension of δ. For diffraction calculations these lenslets can be represented by a rectangular aperture whose dimensions are φ×δ The Franhofrer Diffraction from this aperture gives an expression for the intensity at any point P:

$$I(P) = \left[\frac{\sin(kp\phi/2)}{kp\phi/2}\right]^2 \left[\frac{\sin(kq\delta/2)}{kq\delta/2}\right]^2 I_o \qquad [18]$$

where $I_o$ is the intensity at the center of the pattern, and is given by:

$$I_o = \frac{EA}{\lambda^2} \qquad [19]$$

where E is the total energy incident upon the aperture and A is the area of the aperture.

$A = \phi\delta$

Equation [18] shoes that the intensity is the product of two similar expressions, one depending on the horizontal dimension and the other on the vertical dimension of the rectangular aperture. The expression:

$$y = \left(\frac{\sin x}{x}\right)^2$$

has the following maxima and minima:

TABLE 3.1

| RECTANGULAR APERTURE | |
|---|---|
| x | y |
| 0.000 | 1.00000 |
| 1.000 π | 0.00000 |
| 1.430 π | 0.04718 |
| 2.000 π | 0.00000 |
| 2.459 π | 0.01694 |
| 3.000 π | 0.00000 |
| 3.470 π | 0.00834 |
| 4.000 π | 0.00000 |
| 4.479 π | 0.00503 |

When comparing this with the Franhoffer Diffraction Pattern for a circular aperture, we look at the expression $$y = \left(\frac{2J_1[x]}{x}\right)^2$$

This expression has the following maxima and minima:

TABLE 3.2

| CIRCULAR APERTURE | |
|---|---|
| x | y |
| 0.000 | 1.0000 |
| 1.220 π | 0.0000 |
| 1.635 π | 0.0175 |
| 2.233 π | 0.0000 |
| 2.679 π | 0.0042 |
| 2.238 π | 0.0000 |
| 3.699 π | 0.0016 |

The abscissa of the first lobe of the diffraction pattern for the rectangular aperture in the horizontal direction:

$$p = \pm \frac{\lambda}{\phi} \qquad [20]$$

because $kp\phi/2 = \pm u\pi$ ($u=1,2,3,\ldots$)

and $$k = \frac{2\pi}{\lambda}.$$

Also:

$\lambda = 5{,}000$ A $$q = \pm \frac{\lambda}{\delta} \qquad [21]$$

because $kq\delta/2 = \pm v\pi$ ($v=1,2,3,\ldots$)

Comparing this with the abscissa of the Airy Disc for a circular aperture:

$$r = \pm \frac{1.22\lambda}{D}$$

where D is the diameter of the aperture.

The basic difference between the diffraction pattern of a rectangular aperture and a circular aperture is that much less of the energy is in the central lobe for a rectangular aperture than for a circular one. In a rectangular aperture, the secondary maxima are of greater importance. However, most of the energy does go into the central lobe, and it can be considered to be the prime characteristic of the diffraction pattern. Actually, p and q are angles, and the actual diameter of the minimum spot which can be produced at the focal plane by a lens is $$d = 2f\theta \qquad [22]$$

Substituting equations [20] and [21] into equation [22], we obtain:

$$a_{horizontal} = 2\lambda(F/\#)_1 \quad \& \quad b_{vertical} = 2\lambda(F/\#)_2$$

where a & b are the dimensions of the rectangular central lobe, $(F/\#)_1$ is the numerical aperture of the lens in the horizontal direction, and $(F/\#)_2$ is the numerical aperture of the lens in the vertical direction.

Consider an example where $(F/\#)_1 = 1.7$ and $(F/\#)_2 = 1.2$, and use the wavelength,
°. Then,
a = 0.0017 mm
b = 0.0012 mm.

Therefore, the smallest spot that can be focused by the above lenslet is a rectangle whose horizontal dimension if 0.0017 mm and whose vertical dimension is 0.0012 mm. This means that the resolution limitation due to diffraction for this lenslet would be 585 lines/mm in the horizontal direction and 825 lines/mm in the vertical direction.

Figure 16:
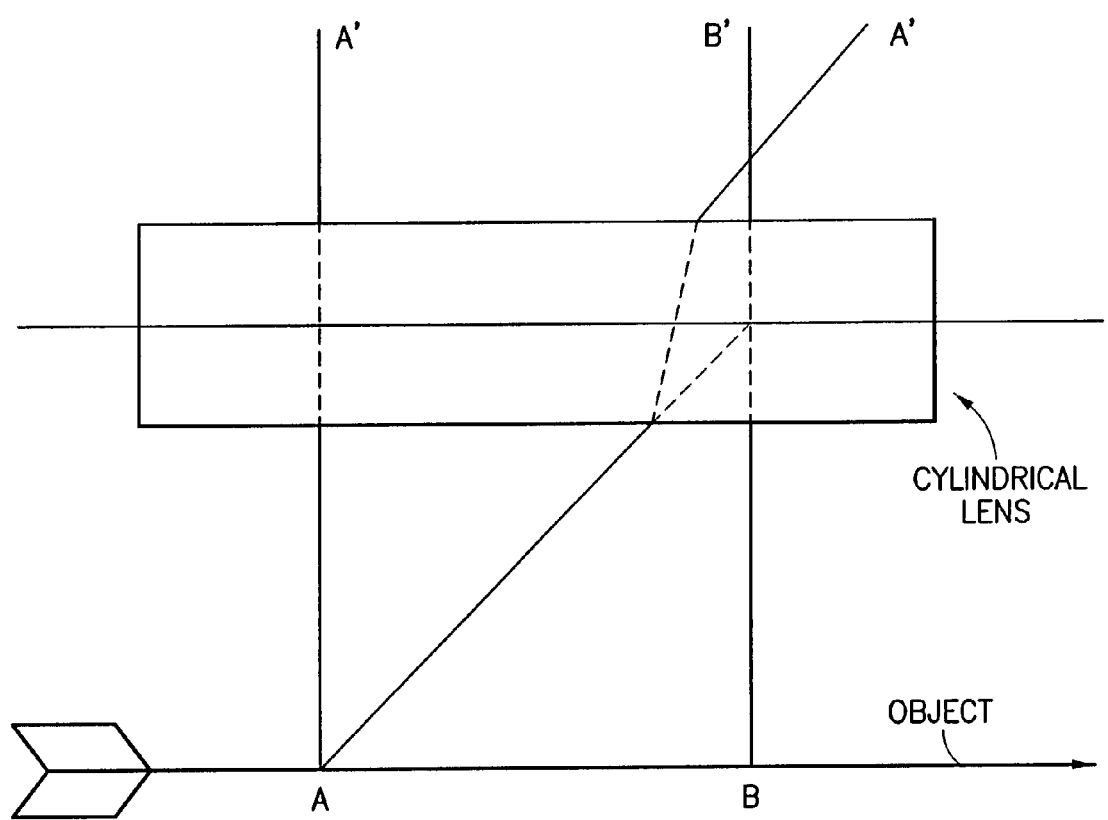
FIG. 16 is a schematic showing the abberations caused by a cylindrical lens.
Figure 17A:
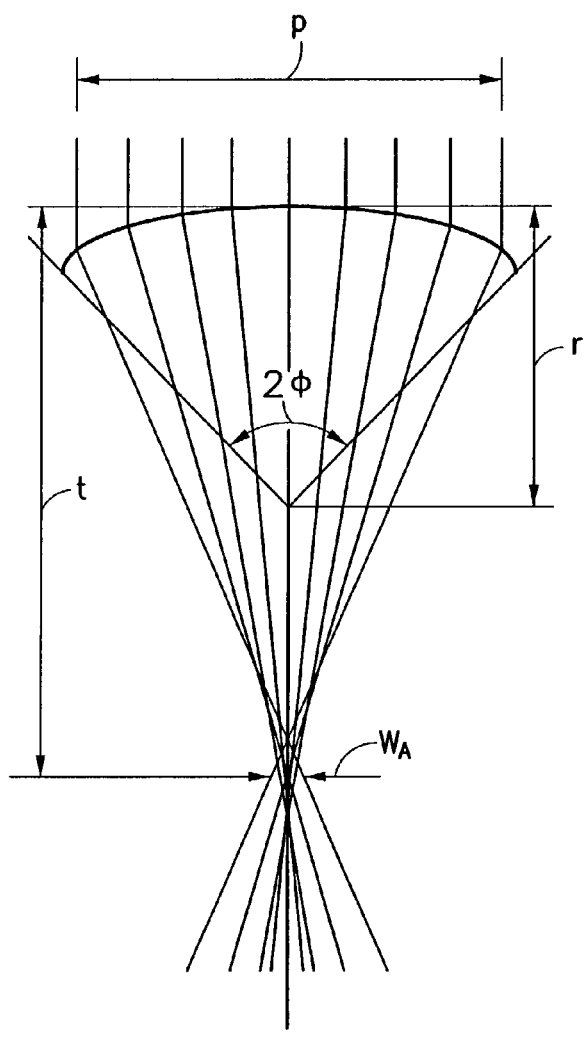
FIG. 17 shows lenslet resolution limitations due to abberation.
Figure 17B:
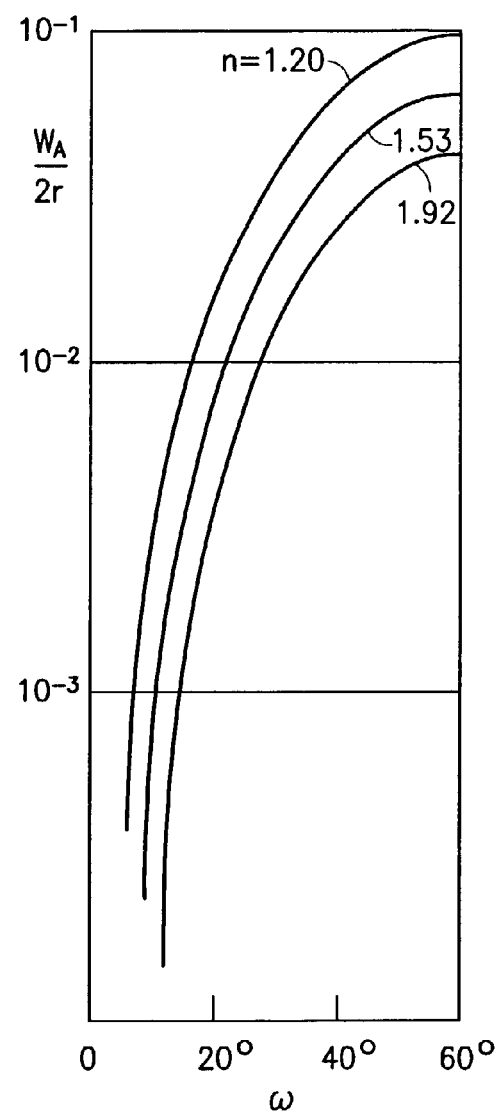

We now examine the resolution limitation due to abberation. FIG. 16 shows abberation in a cylindrical lens. As can be seen, point A from the object transmits directly along an axis perpendicular to the axis of the cylindrical lens and appears as image point A'. However, it can be seen that image point A' can appear as a multiplicity of points on the image plane. Refer to FIG. 17. FIG. 17(*a*) is an optical ray trace showing abberation in a cylindrical-spherical lenslet. FIG. 17(*b*) is a graph showing the spread of focus due to abberation. From FIG. 17(*a*) the radius of curvature of the lens is r and the relative aperture is ω which is defined by the equation:

$$\tan\omega = \frac{4(F/\#)}{4(F/\#)^2 - 1} \quad [23]$$

which will be derived later. Therefore, $$(F/\#) = \frac{1}{2\tan(\omega/2)} \quad [24]$$

Now, according to equation [23], when the (F/#) is 1.7, ω is 32.8°. The radius of the lens is given by:

$$r = f(\eta - 1) \quad [25]$$

When η=1.53, φ=1.0 mm and f=1.7 mm, r=0.90 mm. From FIG. 16(*b*):

$W_A/2r = 6.8 \times 10^{-3}$. $W_A = 0.01224$ mm and the resolution is 81.7 lines/mm.

Figure 18:
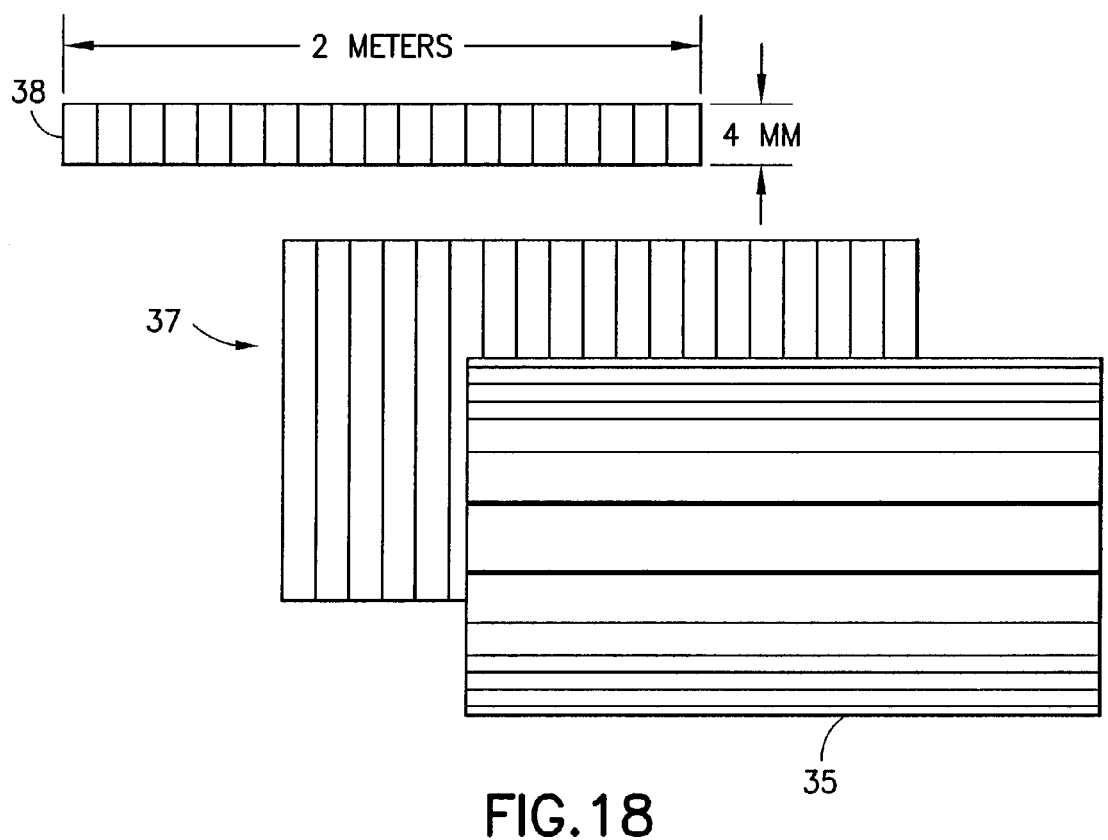
FIG. 18 is a schematic of a zone plate matrix lens array optical system where vertical parallax has been eliminated and correction has been made for abberations.

The problem of lens abberation from a 1 or two meter long cylindrical lens can be solved by using a cylindrical Fresnel Zone as shown in FIGS. 15 and 18. In these cases the cylindrical zone plate 35 is situated so that the focusing occurs in the horizontal direction only. In FIG. 15, a cylindrical zone plate array 32 (in combination with a color plate array 33) is used to provide focusing in the vertical direction so that the combination of lens systems 35 with 32 produces the two-dimensional array of elemental pictures In FIG. 18, the cylindrical zone plate 35 is also situated so that the focusing occurs in the horizontal direction only. However in this case, a Bonnet Screen 37 consisting of vertical cylindrical lenslets is used to provide focusing in the vertical direction so that the combination of lens systems 35 and 37 produces the two-dimensional array of elemental pictures 38. In the case of FIG. 18, a color plate array is not required.

When selecting the resolution parameters of camera systems, one must select these parameters according to the minimum resolution figures. For example, cylindrical lenses are available of 1 mm diameter having a resolution of 400 lines/mm. It would be useless, therefore, to use a film whose resolution is 2,000 lines/mm. No element in the optical system need possess a greater resolution than that optical element necessarily possessing the worst resolution.

Figure 19:
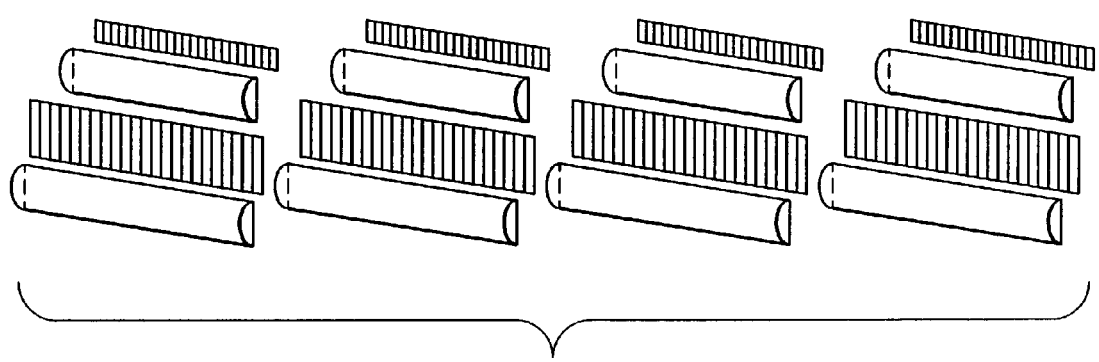
FIG. 19 is a schematic of a multistage camera.

Much of the resolution problems resulting from the alternate embodiments can be avoided by implementing yet another alternate embodiment, i e., a multistage camera. This is shown schematically in FIG. 19. In this case, several camera stages of the type shown in FIG. 5 are positioned horizontally within the same camera housing so as to be exposed on several film frames. Clearly the lenses, matrix lens arrays, color plates, and multiplexing optics need not be the same number as the number of film frames. The key issue is that multiple film frames arranged horizontally are used. One can even design a single camera stage that will focus different sections of the two-dimensional elemental array on multiple film frames. In this way because each film frame contains only a fraction of the information contained within the preferred embodiment, the resolution requirements are decreased by a factor of the number of frames used.

Figure 20:
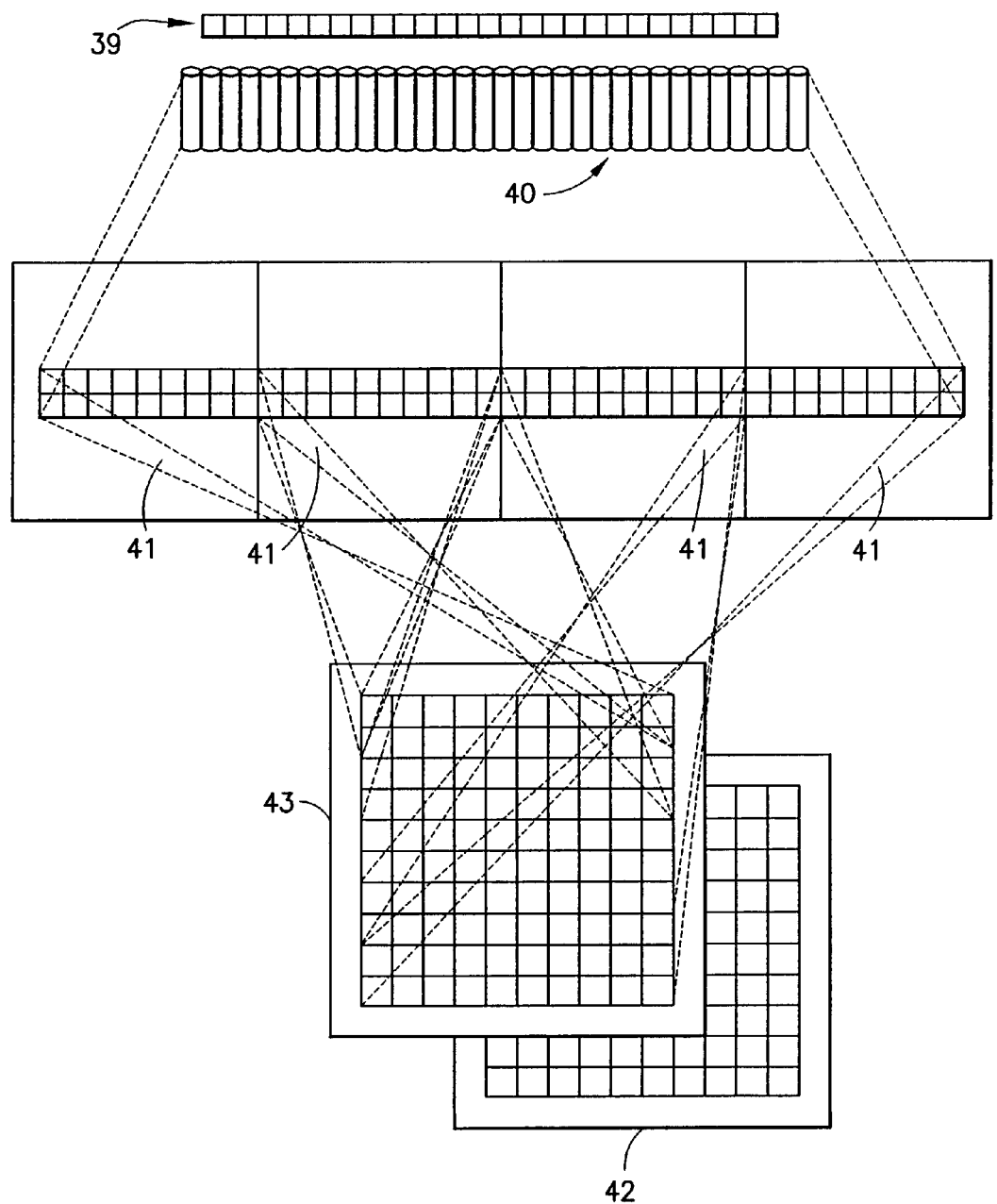
FIG. 20 is a schematic of holographic multiplexing optics.
Figure 21:
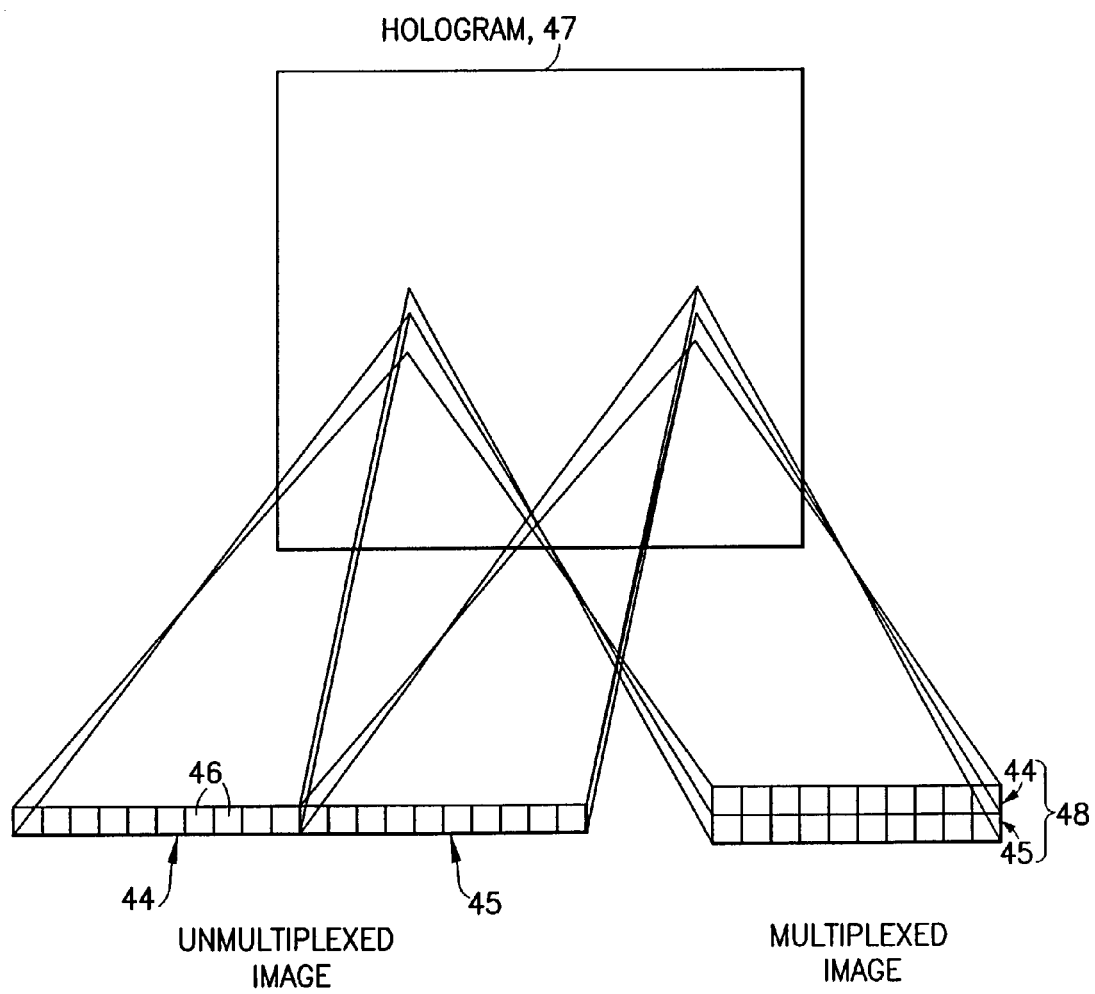
FIG. 21 is a schematic showing the method of holographic multiplexing using the optics shown in FIG. 20.

Another aspect of an alternate embodiment in the camera design would be the use of holographic optics to accomplish the dissection and multiplexing performed by the fiber optics image dissector and multiplexer in the preferred embodiment. This is shown conceptually in FIG. 20. In this case, reflection holograms would be used because of their high diffraction efficiency (95–100%), although the process would work conceptually even with transmission holograms. (The diagrams, however, are shown using reflection holograms.) This process involves the transfer of images from one holographic plane to another plane with 1:1 magnification. (Several methods exist to provide abberation free magnification using holography, should this be desirable.) In the figure, the image 39 is projected through the camera matrix lens array 40 or otherwise focused onto hologram plane 41 which, in turn, projects the appropriate multiplexed frame onto the film, 42, using intermediate holographic planes (shown symbolically as planes 43) if necessary These intermediate planes serve the purpose of allowing the image to impinge onto the film from a far less severe angle, thereby decreasing the abberations. But, these intermediate planes may not be necessary. FIG. 21 shows conceptually how such a holographic plane can be made. For clarity, multiplexing will be accomplished, in this figure, for only two rows. The image on the left with two rows, 44 and 45, arranged horizontally is projected using lens 46 onto hologram 47. This projected image acts as a reference beam for the hologram, therefore, reconstructing an object beam which focuses an image in space 48, consisting of rows 44 and 45 arranged vertically.

The final design consideration for the camera occurs where its use to produce three-dimensional motion pictures is desired. The usual production of motion pictures depends upon a viewer's persistence of vision to interpolate still images from multiple frames In a conventional motion picture, a certain amount of flutter (or misregistration of the picture on the screen) from frame to frame can be allowed before the audience begins to be bothered by it Obviously, any movement less than minimum visual acuity would not be noticed This resolution is one-minute of arc or approximately $3 \times 10^{-4}$ radians. Assuming a minimum seating distance of twice the screen widths a practical maximum level of misregistration would be:

$$(6W \times 10^{-4}) \text{ or } (\pm 3W \times 10^{-4})$$

where W is the screen width Considering a ten-meter wide screen, permissible maximum flutter would be ±3 mm or a total flutter of 6 mm. Actually, misregistration is greater than this figure and misregistration which exceeds the acceptable limits manifests itself in image defocus. This defocus is often tolerated and frequently goes undetected by much of the audience. Of course, as the flutter becomes greater, the entire picture begins to jitter.

For integral photography, as the projected image moves with respect to the screen, the three-dimensional image will move also (as a unit). Therefore, flutter would result in a blurring of the three-dimensional image. However, the problem is far more severe for integral photography than for conventional photography. Were the projected image within each element to be misregistered with respect to the central position of each elemental lens on the screen by a given percentage, the reconstructed three-dimensional image will move with respect to the screen boundaries by the same given percentage. Since the field in which the image can move horizontally is confined to a certain percentage of each element, and since there are 1,730 elements in the horizontal field, the maximum allowable misregistration in the horizontal direction is a factor of 1/1,730 times that of conventional films, or:

$$\Delta w = \pm 1.375 \times 10^{-7} \quad [26]$$

where w=the width of the film frame. The same misregistration is allowed for the vertical direction. (It will be seen later that misregistration in the vertical direction will not be important. Furthermore, any vertical misregistration can be dealt with in the same manner as horizontal misregistration.) It is important to note at this point that if conventional film frame format is used with commercially available films, the registration tolerance becomes prohibitive.

Figure 22:
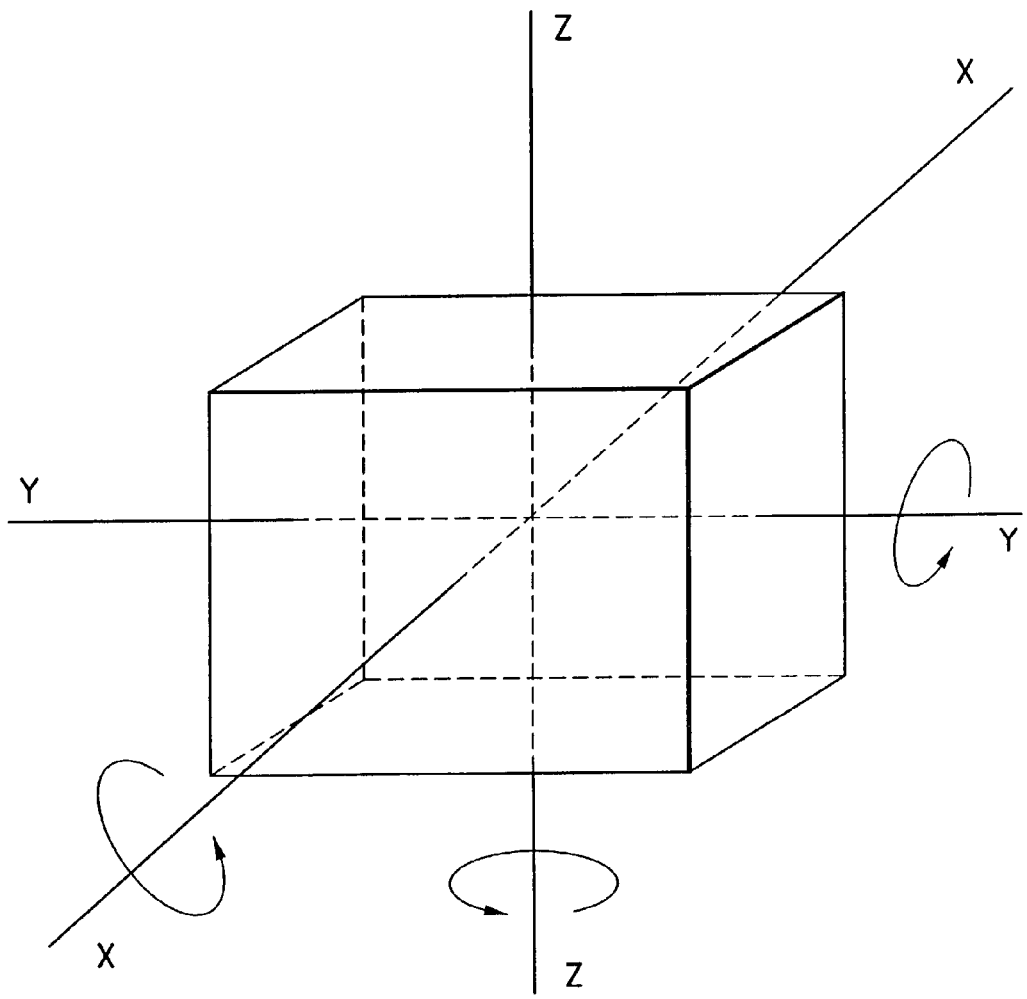
FIG. 22 is a schematic showing the conventions used in describing axes of rotation.

Misregistration of the picture on the screen malt be caused by several factors:

(1) side-to-side motion of the screen, which may be compensated for,
(2) misregistration of the film, which, based upon calculations, should be held to one-half micron for best results; and
(3) projector motion, mainly due to vibration, which may be divided into two components:
   (a) Translation:
      [1] Forward Lateral—This type of motion affects the focus.
      [2] Vertical—Registration is not critical here if vertical parallax is eliminated.
      [3] Sideways Lateral—This is the most critical of translatory movements. Whatever the absolute motion of the projector, this will be the screen misregistration. For a ten-meter wide screen, the comfortable upper limit of movement is about 2.85 microns.
   (b) Rotation (Refer to FIG. 22):
      [1] X-Axis Rotation—This can cause some misregistration but is not highly critical.
      [2] Y-Axis Rotation—This is not critical as it will cause only vertical misregistration.
      [3] Z-Axis Rotation—This is critical and must be held to below about 0.0347 arc-seconds.

The problems discussed in this section concerning jitter are important, as they must be taken into consideration in the designs of both the theater and the screen. However, the solution to these problems must be attended to in the designs of both the camera and the projector.

Figure 23A:
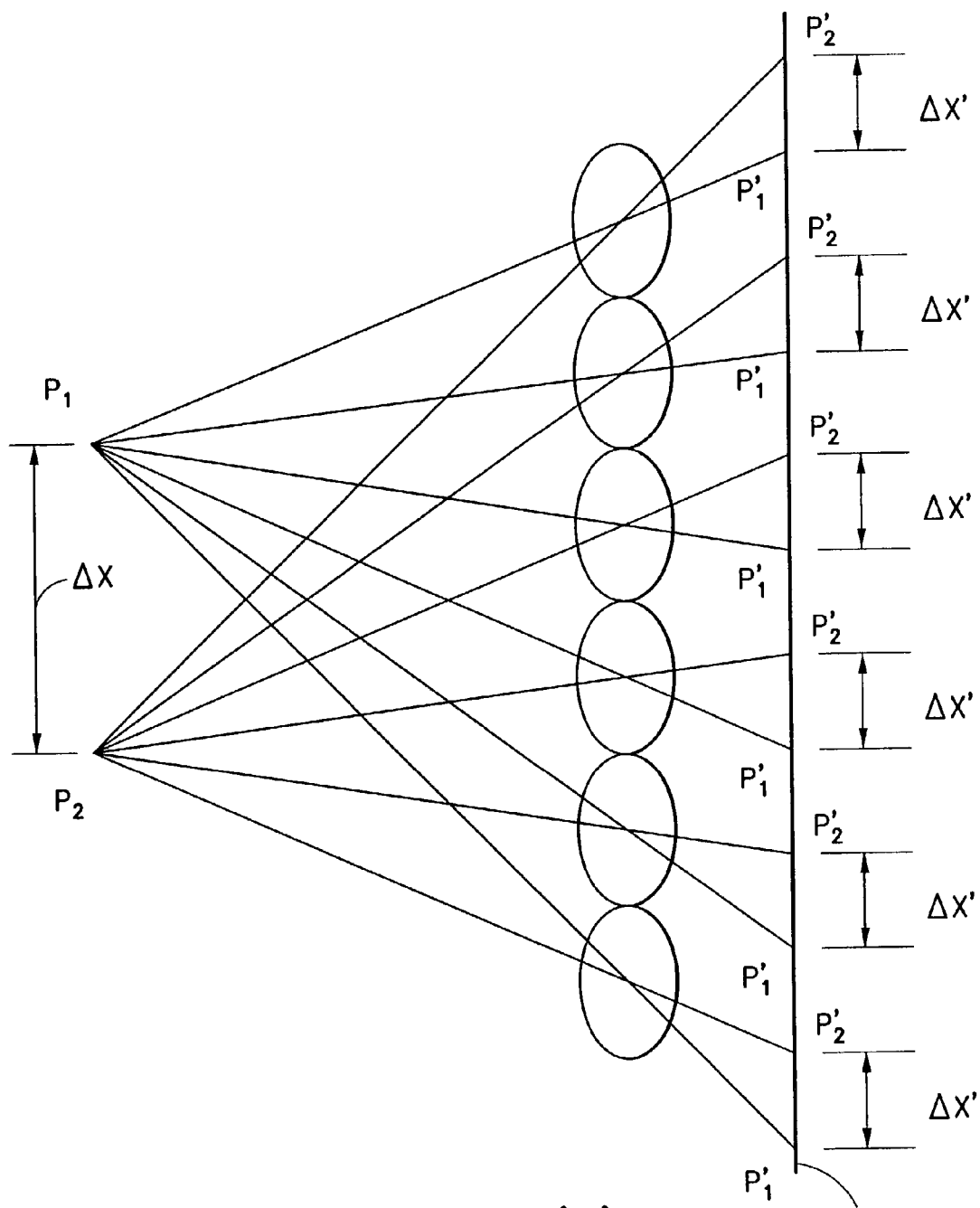
FIG. 23 is an optical ray trace to aid in an optical evaluation of the registration problem.
Figure 23B:
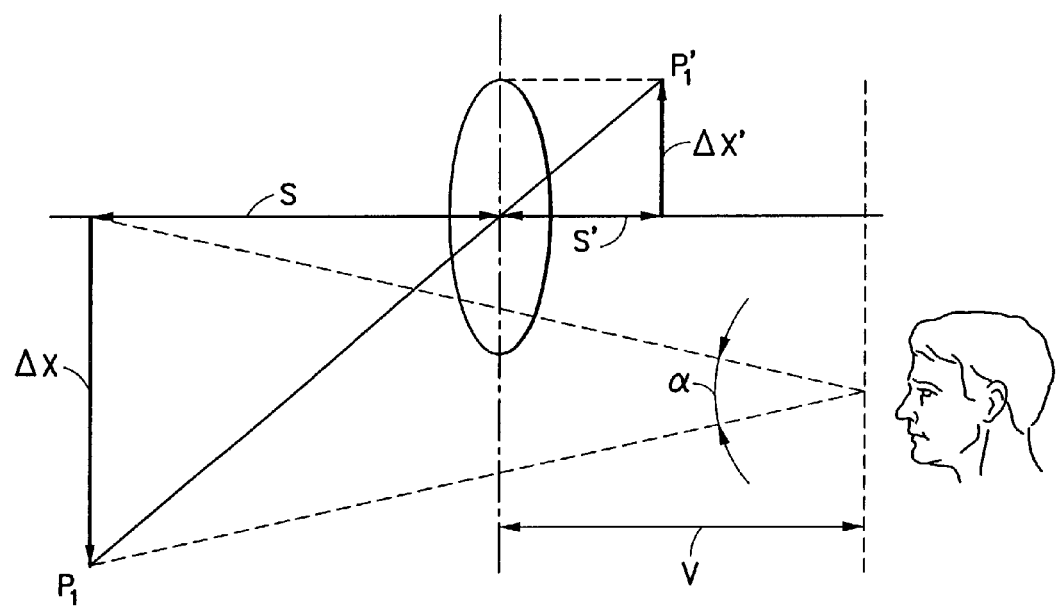

Refer to FIG. 23(*a*). Assume an object point $P_1$ which appears on the screen 49 as a multiplicity of points $P_1'$. Should tie points $P_1'$ be misregistered to $P_2'$, a distance of $\Delta x'$, the image point $P_2$ will be misregistered with respect to $P_1$ by a distance $\Delta x$, such that:

$$\frac{\Delta x}{\Delta x'} = \beta$$

Where β is the magnification factor of each lenslet. This argument holds true whether the image is real or virtual Referring to FIG. 23(*b*):

$$\beta = \frac{s}{s'}$$

but s'≈f. Therefore, $$\beta \approx \frac{s}{f}$$

where f is the focal length of each lenslet, and s is the distance from the screen to the image (assuming a virtual image).

$$\Delta x' = \frac{\Delta x}{\beta} = \frac{\Delta x f}{s}$$

The viewer will observe the image shifting by:

$$\Delta x = \alpha(V + s) \quad [27]$$
MAXIMUM TOLERABLE where V is the viewing distance from the screen and α is the angle of minimum visual acuity. Therefore, $$\Delta x' = \frac{\alpha f(V + s)}{s} \text{ or}$$

$$\Delta x' = \alpha f\left(\frac{V}{s} + 1\right)$$

Since $\alpha = 2.91 \times 10^{-4}$ and V=2W (where W is the width of the screen, then $$\Delta x' = 2.91 \times 10^{-4} f\left(\frac{2W}{s} + 1\right) \quad [28]$$

As the reconstructed image moves further away from the viewer, the maximum screen misregistration (so as to maintain acceptable quality) becomes smaller and smaller. The worst case is when the image is at infinity. Therefore, since some objects will be at infinity, we can tolerate a maximum misregistration of $$\Delta x' = 2.91 \times 10^{-4} f \quad [29]$$

To express this equation in more convenient terms, $f=D(F/\#)$, and $D=W/n$ Therefore, $$\Delta x' = 2.91 \times 10^{-4} \frac{W}{n}(F/\#) \quad [30]$$

Let us now cite an example. In this case, W=10 meters, n=1,730, and (F/#)=1.7. Therefore, $\Delta x'$=2.85μ. For a ten-meter screen and for images at infinity, to estimate the amount of misregistration tolerable for images not at infinity, from equation [28]

$$\Delta x' = 2.91 \times 10^{-4} f\left(\frac{2W}{s} + 1\right) \quad [31]$$

Using our example.

$$\Delta x' = \frac{5.70 \times 10^{-4}}{s} + 2.85$$

| Distance of Image from Screem s, μ | Maximum Tolerable Misregistration x', μ |
|---|---|
| 0 | ∞ |
| 1 m = $10^6$ | 59.85 |
| 2 m = 2 × $10^6$ | 31.35 |
| 10 m = $10^7$ | 8.55 |
| 100 m = $10^8$ | 3.14 |
| ∞ | 2.85 |

$\Delta x'$ is the maximum allowable misregistration for an image located at a distance s from the screen to be in best focus Now, maximum tolerable misregistration of the film is less than the misregistration allowed for the screen, since magnification takes place during projection. Therefore, the expressions for $\Delta x_F$ become:

$$\Delta x_F = \frac{\Delta x'}{M}$$

where: $\Delta x_F$ is the maximum allowable film misregistration,
$\Delta x'$ is the maximum allowable screen misregistration, and
M is the magnification factor for projection.

$$M = \frac{\phi_S}{\phi_C}$$

where: $\phi_S$ is the width of a cylindrical lenslet in tile screen,
and $\phi_C$ is the width of a cylindrical lenslet in the lens array of the camera.

Substituting these two equations into the equations above, respectively, and remembering that $\phi_C$ (F/#)=$f_C$, we obtain $$\Delta x_F = 2.91 \times 10^{-4} f_C \left(\frac{2W}{s} + 1\right) \quad [32]$$

$$\lim_{S \to \infty} \Delta x_F = 2.91 \times 10^{-4} f_C \quad [33]$$

In our example, M=5.78

| s, μ | $\Delta x_F$, μ |
|---|---|
| 0 | ∞ |
| $10^6$ | 10.18 |
| 2 × $10^6$ | 5 42 |
| $10^7$ | 1.480 |
| $10^8$ | 0.543 |
| ∞ | 0.493 |

Therefore, the maximum tolerable film misregistration with respect to the camera and projector (so that objects at infinity will be in focus) is ½-micron on the film.

Figure 24A:
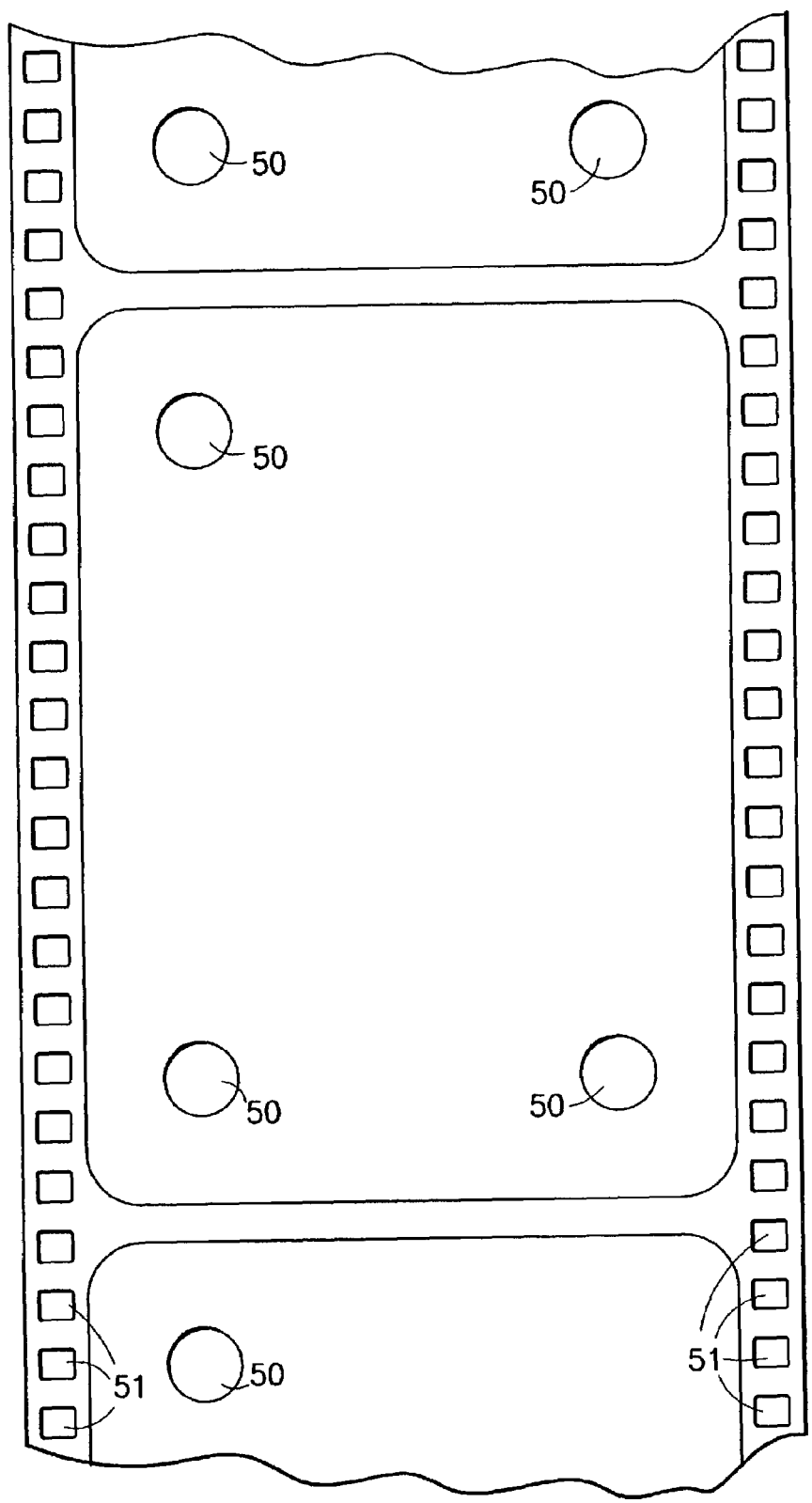
FIG. 24(a) shows the three-point film registration system.
Figure 24B:
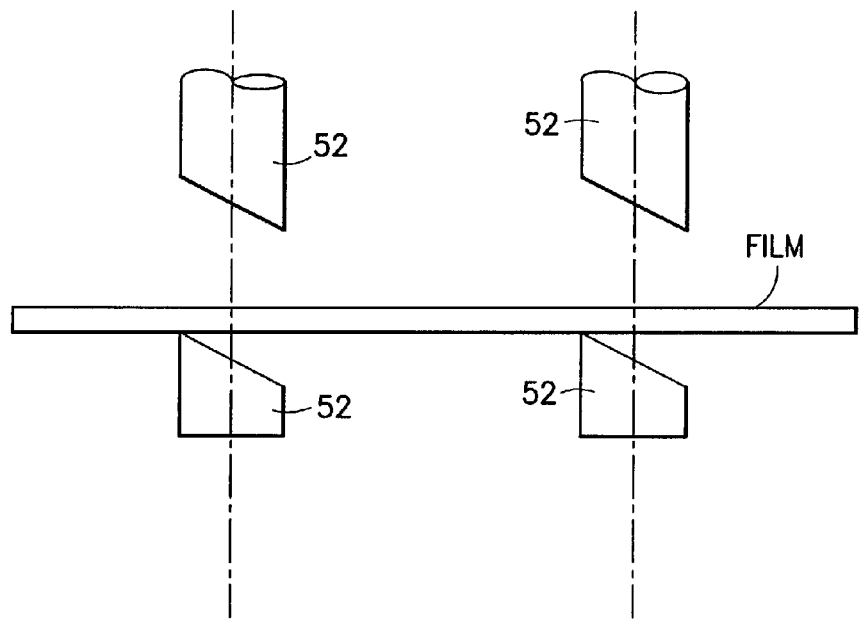
FIG. 24(b) shows how the film registration holes can be formed.
Figure 24C:
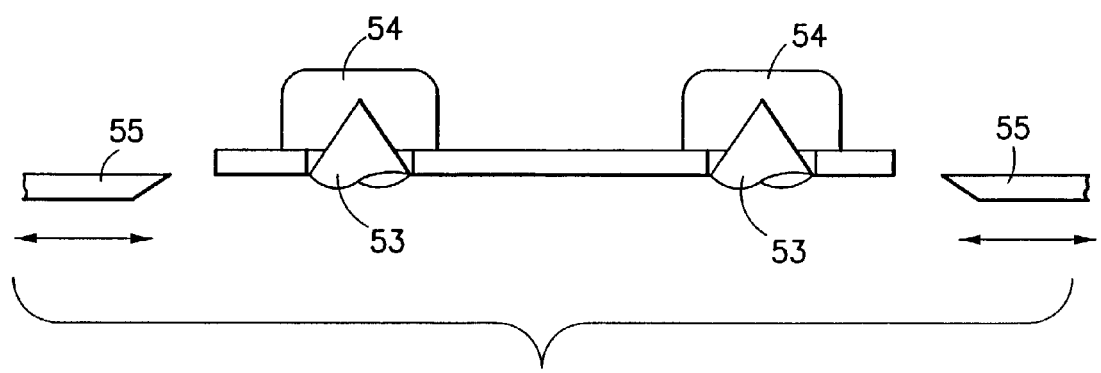
FIG. 24(c) shows how the film is registered during photography and projection.

Since it is required to register each frame within ½-micron in the sideways lateral direction, we must employ a 3-point registration system. The semiconductor industry currently registers photographic masters to within one-micron using this method, and for holographic interferometry, registration of 0.3-micron is common. Obviously, standard sprocket holes cannot adequately register the film. However, three reasonably sized heavy duty holes can. Referring to FIG. 24(a), we see the positioning of the registration holes 50 on the frame. Of course these holes may be located anywhere on the frame. The regular sprocket holes 51 can be used to move the film through the camera and the projector, but the film must be stopped for each frame and three probes move out to enter the three registration holes 50 and to register the film. It is obvious that the three registration holes 50 must be both accurately positioned and sized. FIG. 24(b) shows how these holes can be manufactured. Three accurately positioned wedge shaped circular conventional punches produce holes in each frame. With the punch and dye set 52 shown in the figure, the diameter of the holes can be easily controlled. FIG. 24(c) illustrates one method of registering the film in the camera or projector using the registration holes. When the film is stopped for the exhibition of the frame three registration cones 53 enter the holes as is shown in the figure, and mate with registration caps 54 on the other side of the film. The registration cones are spring-loaded such that when contact with the film is made, no additional pressure is applied. The cones position each frame both in the plane of the registration caps and with respect to the central position of the registration caps. Stripper plates 55 then come from the sides and make contact with both the film and the cones 53. These plates apply pressure to the film to position it firmly in the plane of the registration caps 54. In this manner, each frame is kept in perfect registration both in the sideways lateral position and with respect to the focal plane of the lens. It is important that the cones emerge and retract while the film is stopped. If the film is looped properly the film in the gate can be kept free of tension or compression. The film is then both stopped and positioned by the emerging cones. This can be accurately performed at the required film speeds There are two additional problems which must be dealt with in order to register the photograph with respect to each frame. It is one thing to register the film itself, but unless the photographic information is positioned accurately on the film, gross movement of the projected image will occur. Since registration must be held to within ½-micron, the two considerations are that dimensional changes in the film must be avoided, and emulsion shrinkage must be eliminated. The former problem can be solved by using thicker film, and the latter problem can be solved by processing the film properly. The latter problem will be discussed later in the section on intermediate processing, but it should be noted here that such processing has been used for holographic interferometry where dimensional changes of as much of half the wavelength of the light used (this is usually 0.3–0.4μ) will invalidate the measurement.

Figure 25:
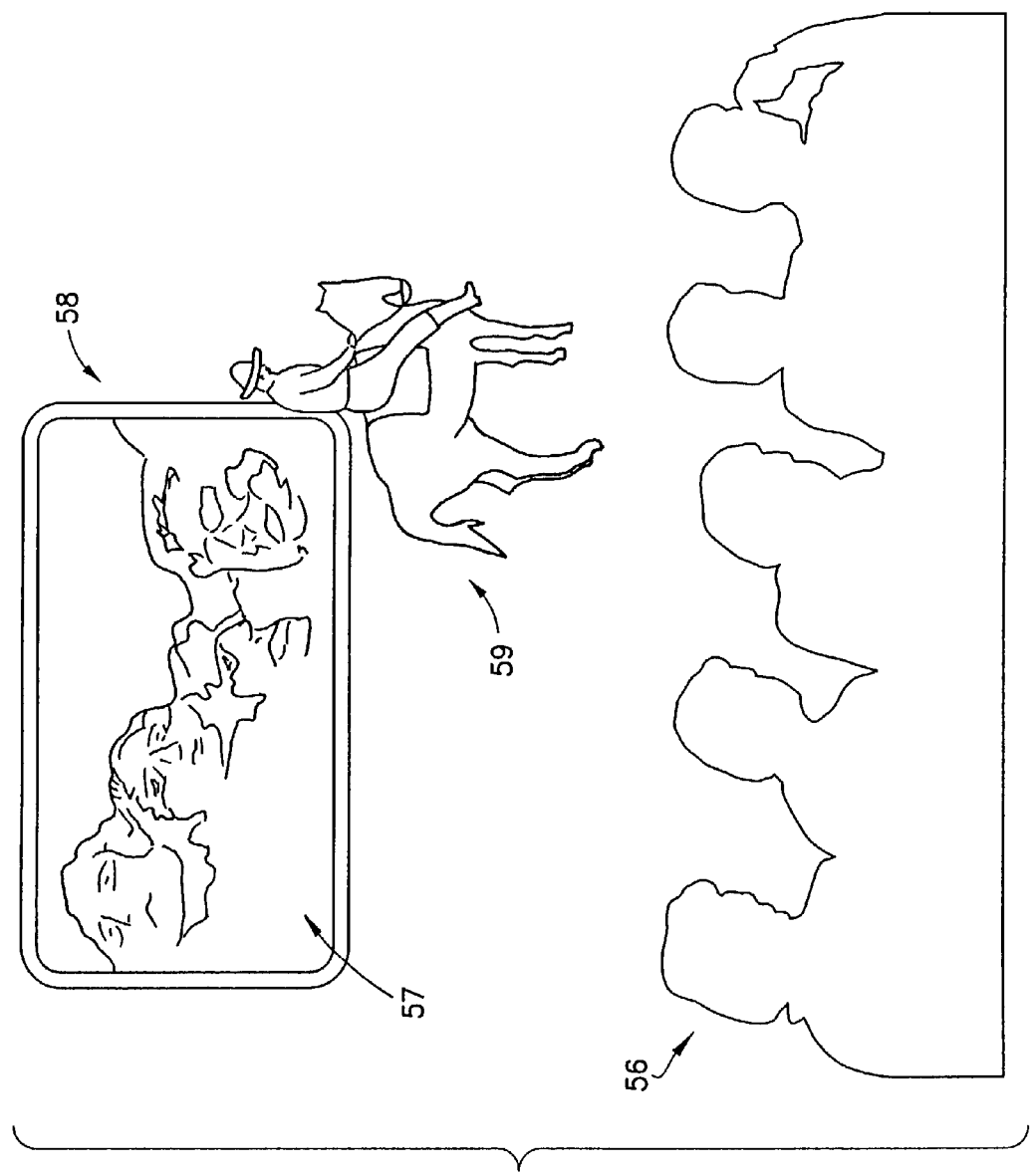
FIG. 25 shows the different types of three-dimensional images that can be projected for viewing by a theater audience.

Once a film has been produced by the cameras described above consisting of single photographs or frames wherein the two-dimensional array of elemental photographs has been recorded thereon, such photographs or frames must be projected in such a manner that a magnified three-dimensional image of the original scene would be visible to an audience. For the process and system described herein, a special screen and projector are required. In order to continue with a discussion of the screen and projector design, certain theater design considerations must be taken into account. When producing three-dimensional pictures in a theater by wavefront reconstruction, audience placement is dictated by the type of image that is projected. The different types of projected three-dimensional images are illustrated in FIG. 25. An audience 56 will generally see a projected three-dimensional virtual image 57 as appearing behind the screen 58 while it will generally see a projected three-dimensional real image 59 appearing in front of the screen 58.

For real image projection, severe limitations exist on theater design. When virtual images are projected to appear behind screen, it is not essential that the complete image be visible. In that case, if the periphery of the scene is blocked by the screen boundaries, it is not important, especially if the action takes place in the center of the screen For a real image, the above is not the case. Since a real image is projected in front of the screen, a partially visible image may seem weird because those parts of the image which the audience cannot see will just be invisible. It does not have the excuse that the screen boundaries block those parts of the object which are not visible. Those parts of the object which are not visible will just seem to disappear. Furthermore, spectators seated in different parts of the theater will observe different parts of the object. The theater should be designed for real image projection to achieve optimum viewing conditions so that the entire object will be completely visible to every member of the audience This can place a severe limitation on where the audience may be placed.

Figure 26A:
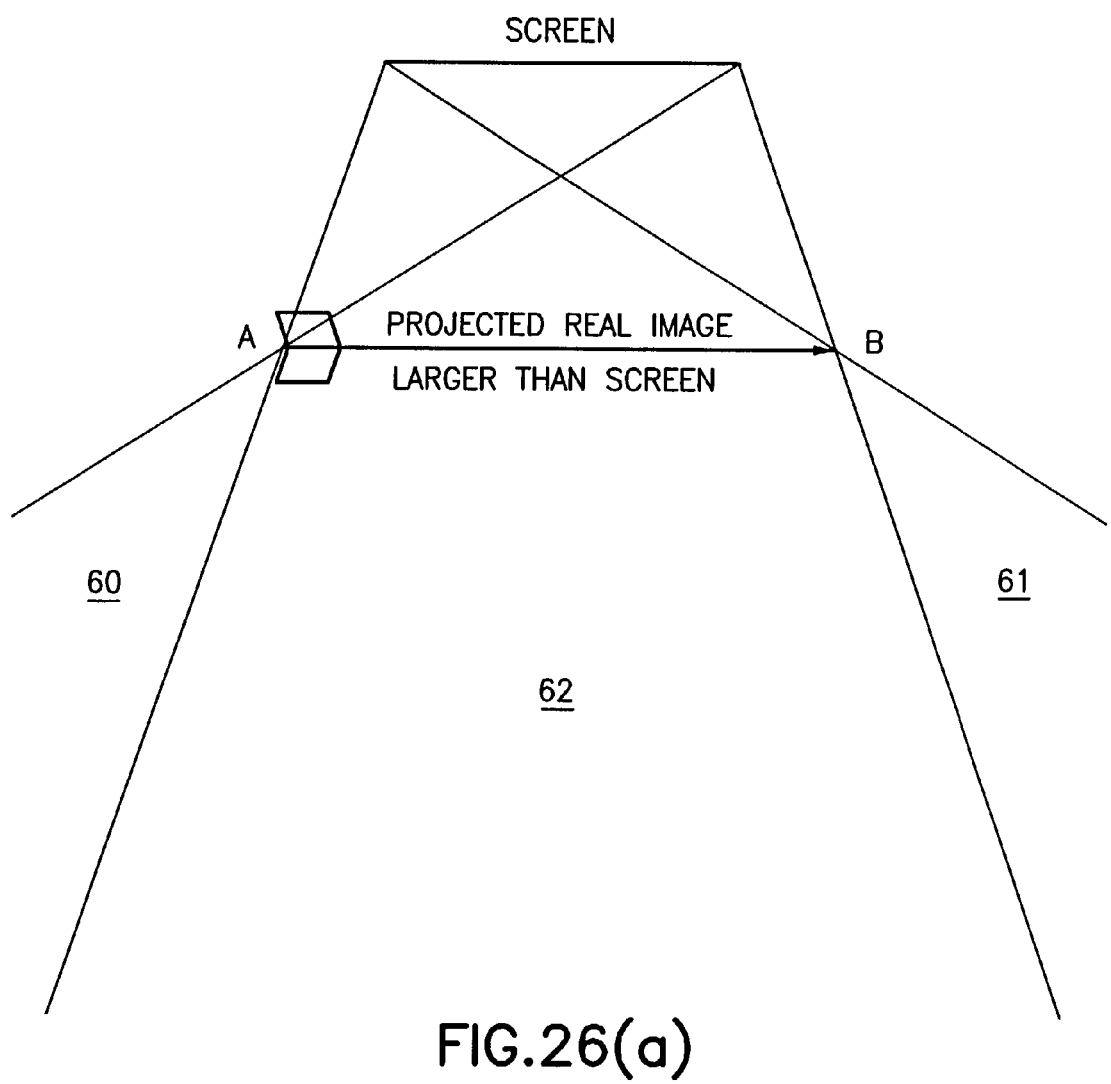
FIG. 26(a) shows the projection of a real image that is larger than the screen.

FIG. 26(a) illustrates the case where a real image larger than the screen is projected into the theater. An arrow AB has been used as the object. In order for a member of the audience (not shown) to see the entire arrow, both points A and B must be visible simultaneously. That is only possible if light from both points A and B reach his eyes. FIG. 26(a) is, therefore, an optical ray trace to determine the size of the audience. Point A is only visible in the triangular area 60 on the left. While point B is only visible in the triangular area 61 on the right. In the central region 62, neither points A nor B are visible, meaning that the central portion of the arrow can be seen but not the outer boundaries. For best results, a theater should not be designed for real image projection when the size of the projected image is larger than the screen.

Figure 26B:
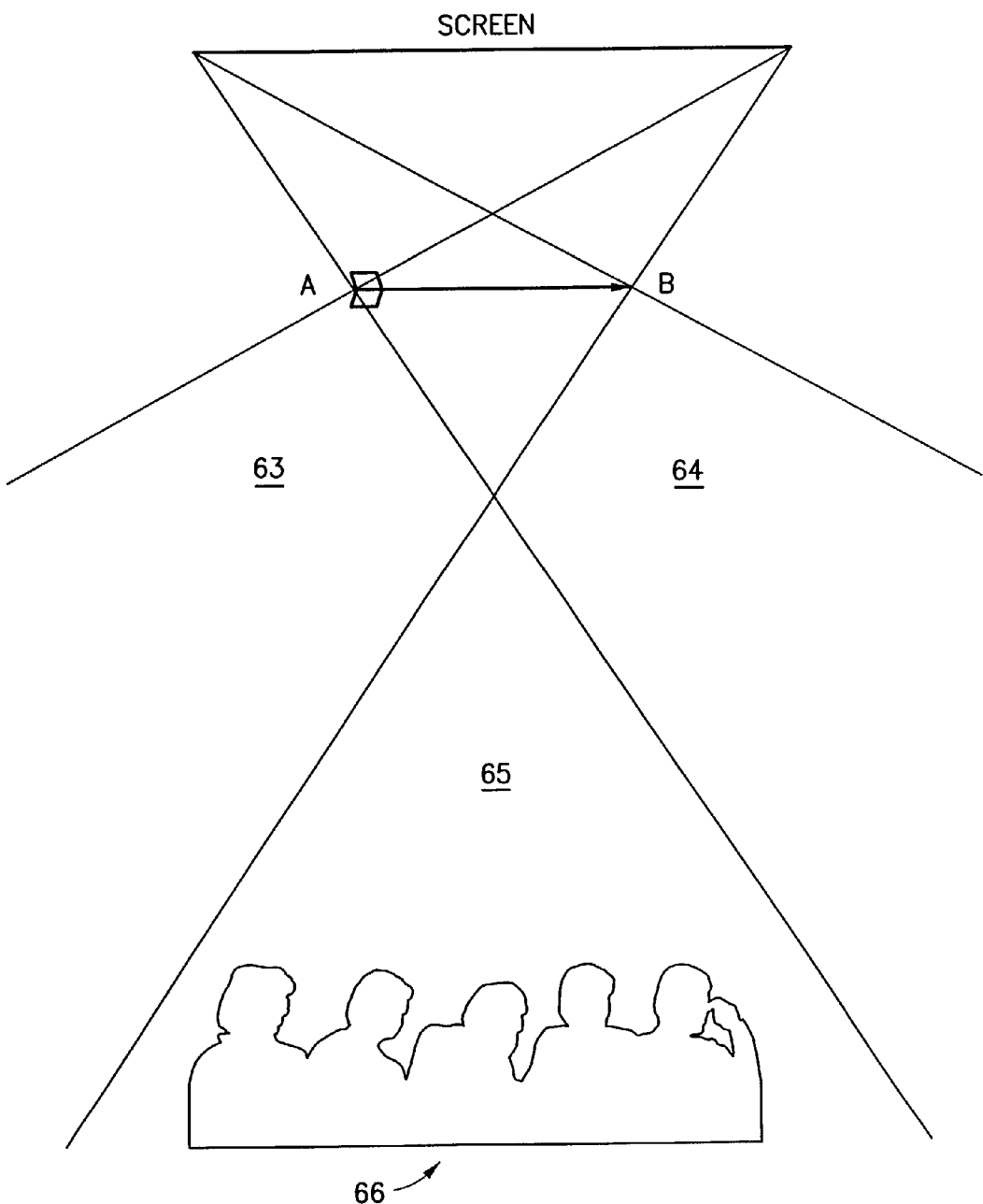
FIG. 26(b) shows the projection of a real image that is smaller than the screen.

FIG. 26(b) illustrates the case where a real image smaller than the screen is projected into the theater. Once again, a ray trace is used to determine the size of the audience in which all spectators will see both points A and B. Point B is not visible within the tetragonal area 63 on the left, while point A is not visible within the tetragonal area 64 on the right Only in the central triangular area 65 can both points A and B, and, therefore the entire object, be seen. The seating of the audience 66, for best results, should be arranged within triangular area 65 as illustrated in the figure.

Figure 26C:
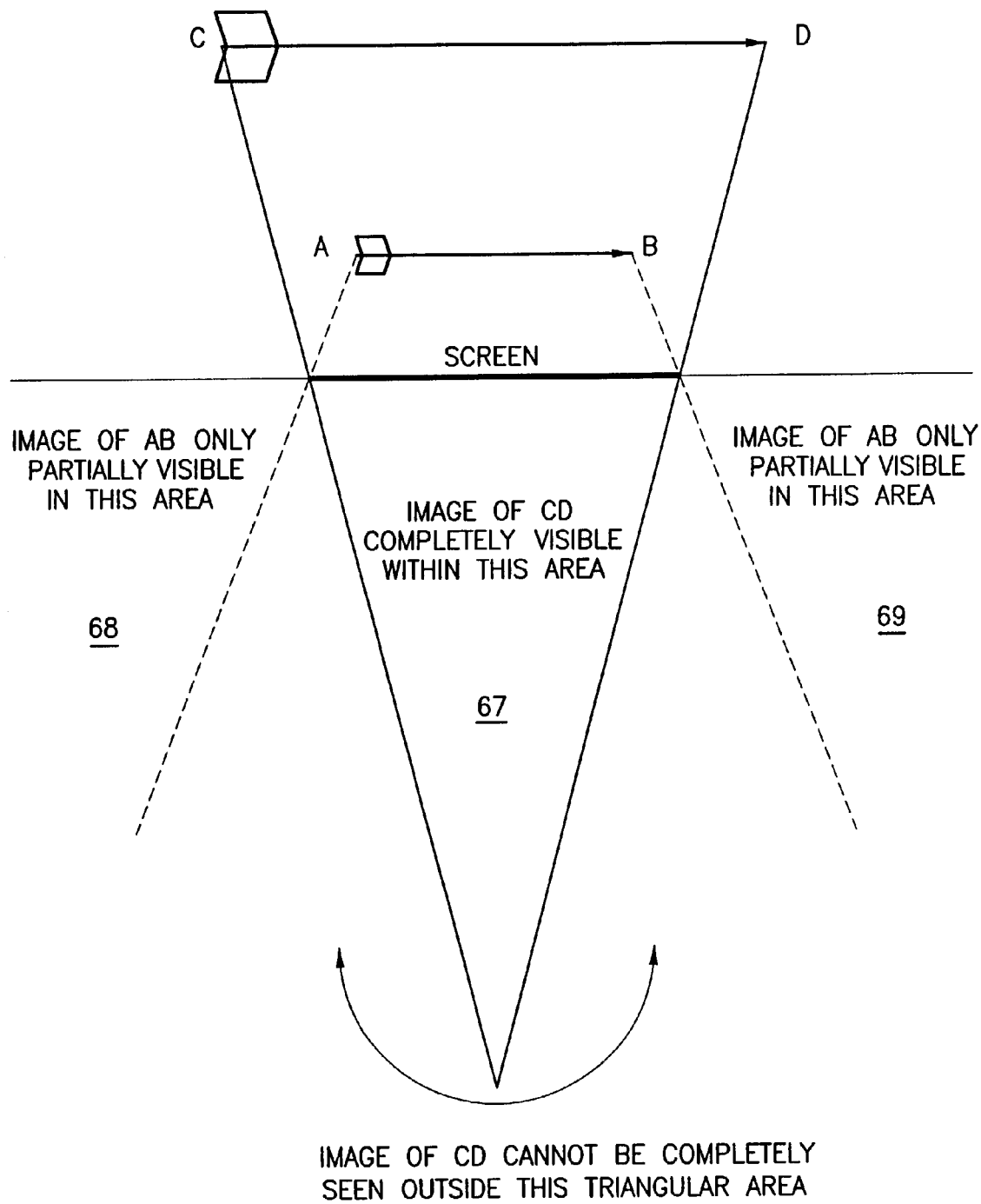
FIG. 26(c) shows the projection of virtual images both smaller and larger than the screen.

For comparison purposes, FIG. 26(c) illustrates some of the concepts of theater design for virtual image projection In this case, consider CD to be the same size as the entire scene, and arrow AB to be the size of the region in which the action takes place. Outside of the central triangular region 67, the entire scene CD will not be completely visible. However, except for the two triangular regions 68 and 69 on both left and right, the center of action AB can be seen throughout the rest of the theater. The audience can be seated so that all or most of AB will be seen. This concept is similar to a live theater presentation where no two members of the audience see the scene identically, and some members of the audience have their view partially obstructed.

When looking at FIG. 26(c), from a very simple viewpoint, it becomes obvious that, for the same size theater, a virtual image process will likely be more economical than a real image process, as it can accommodate more spectators. This would be so if the only thing to worry about was the production of three-dimensional images by wavefront reconstruction. However, integral photography imposes one additional severe limitation on theater design than does holography, i.e., the total angle under which a spectator sitting on the perpendicular bisector of the screen views the three-dimensional virtual image cannot be greater than the acceptance angle, ω, of each individual lenslet in the matrix lens array. The parameters for the determination of this acceptance angle are shown in FIG. 8.

$$\tan\frac{\omega}{2} = \frac{\phi_C}{2f_C} = \frac{1}{2(F/\#)} \quad [34]$$

However $$\tan\omega = \frac{2\tan\left(\frac{\omega}{2}\right)}{1 - \tan^2\left(\frac{\omega}{2}\right)}$$

Therefore $$\tan\omega = \frac{4\phi_C f_C}{4f_C^2 - \phi_C^2} = \frac{4(F/\#)}{4(F/\#)^2 - 1} \quad [35]$$

Figure 27:
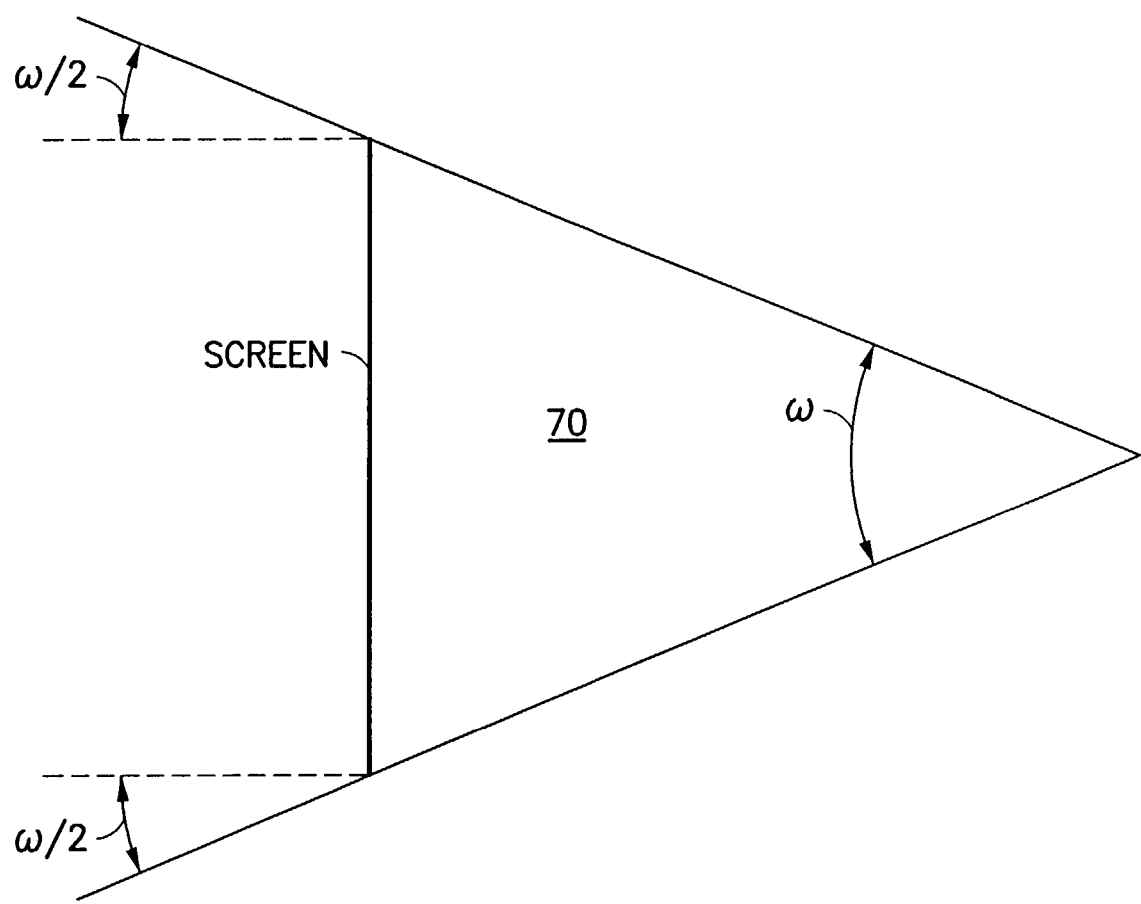
FIG. 27 shows the acceptance angle limitation on audience size.
Figure 28:
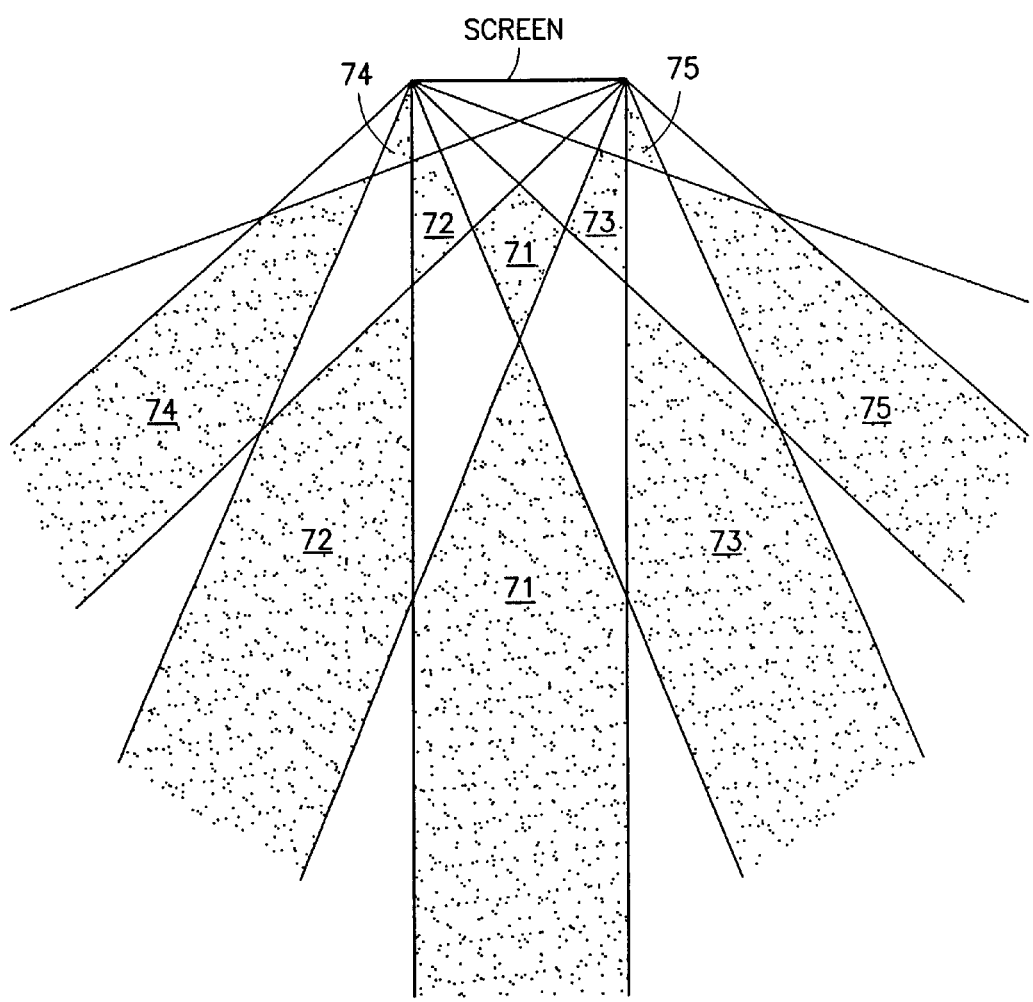
FIG. 28 shows the flipping limitation on audience size.
Figure 29:
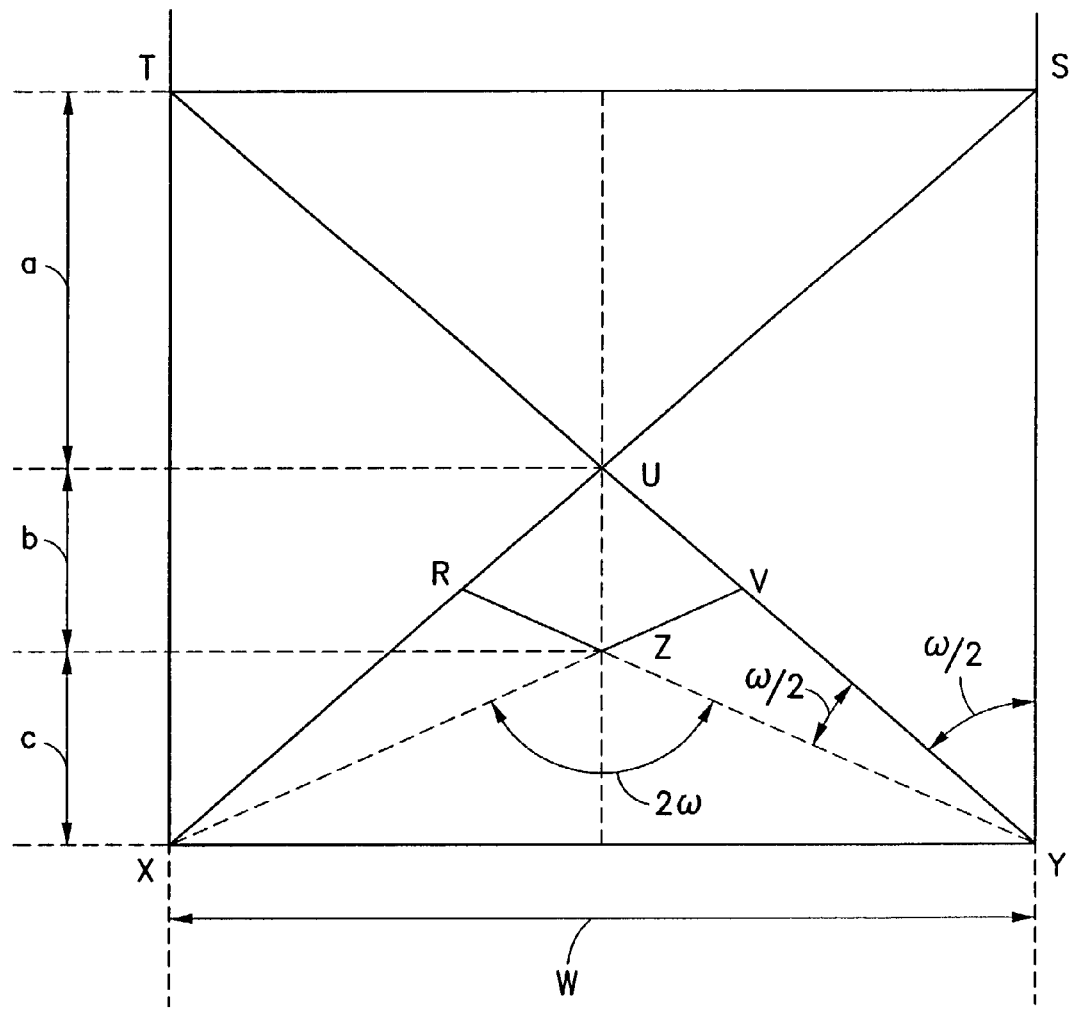
FIG. 29 shows geometric parameters used for computation of limitations on audience size.

The above equation shows that the acceptance angle, ω, is dependent only on the (F/#) of each lenslet. FIG. 27 shows the acceptance angle limitation. From FIG. 8 we can see that each lenslet in the lens array has the same acceptance angle. This angle limits the ratio of object size to distance from the camera or screen. It is obvious that the total acceptance angle of the lens array of the camera or screen will also be ω. A spectator in the audience seated within the triangular area 70 shown in FIG. 27 can see more of the scene than is allowed by the acceptance angle limitation. This, however, is not possible. Only outside this triangle can a viewer see less than the total scene encompassed by the angle ω. Anyone sitting inside the triangle will see a very confusing picture which is caused by a phenomenon denoted here by the term "flipping". Wherever in the theater the total viewing angle is greater than ω, the scene will begin to repeat itself The image at these points will appear double. This phenomenon of scene repetition as the viewing angle changes is called flipping. Flipping will occur over a total angle of ω/2. This places a practical limitation on where the audience may sit. No viewers should be placed in the area in which a double image can be seen. FIG. 28 shows the areas in which a double image can be seen, and in which the audience can be seated. In this figure, the theater is divided into five pairs of acceptable areas within which the audience can be seated. In each of these areas, the audience will see the entire picture, since the flipping phenomenon causes the scene to be repealed each time flipping occurs. Each of the five areas 71, 72, 73, 74, 75 consists of three regions: the first is the tetragonal area closest to the screen, then followed by a triangular area and then by an area bounded by two parallel lines at a distance away equal to the width of the screen and going to the rear of the theater with no limit. FIG. 29 shows the appropriate geometric parameters used for calculation.

From $\Delta XYZ$:

$$\frac{2c}{W} = \cot\omega$$

$$c = \frac{W}{2}\cot\omega \quad [36]$$

where, W=the width of the screen
c=the distance to the first tetragonal area.

From $\Delta UXY$:

$$b + c = \frac{W}{2}\cot\left(\frac{\omega}{2}\right) \quad [37]$$

and, finally, $\Delta STU \cong \Delta UXY$. Therefore, $a=b+c$, and $$a + b + c = \cot\left(\frac{\omega}{2}\right) \quad [38]$$

where, b+c=distance from the screen to the triangular area, and
a+b+c=distance from the screen to the rectangular area.

Substituting equation [34] into equation [36]

$$c = \frac{W}{2}\left[\frac{4(F/\#)^2 - 1}{4(F/\#)}\right] \quad [39]$$

Substituting equation [35] into equation [37]

$b+c=W(F/\#)$ [40]

and, finally, from equation [38]

$a+b+c=2W(F/\#)$ [41]

Returning for the moment to the theory of real image projection, we must now examine its compatibility with virtual image projection. As can be seen from FIG. 28, the triangular area for virtual image projection in area 71 is identical to the acceptable area for real image projection shown in FIG. 11(b). Since the real image acceptable area overlaps even the rectangular region of area 71, the entire area 71 is suitable for viewing projected real images, provided that the size of the image is not so large as not to enable it to fall within the triangular region of complete visibility just in front of the tetragonal region shown in FIG. 28 or in FIG. 26(c) Similarly, as each area (71, 72, 73, 74 and 75 ) sees its own complete scene, it also has its own projected real images. Therefore, the same rule for acceptability of such real image projection applies in each of the five areas. Of course the real image cannot be seen in the tetragonal region, even though the virtual image can be seen in this region.

Now, it must be understood that a screen used with this process for the creation of three-dimensional images before a theater audience must be an active optical element of the entire optical system used for projection. The screen itself must contain a matrix lens array having the same number of elements (or lenslets) and in the same configuration as the camera matrix lens array used to photograph the scene. This principle is illustrated in FIG. 1 as the basic method of magnification and projection.

The preferred embodiment of the screen is an array of cylindrical zone plates with associated color filtration. Zone plates can be produced holographically. However, instead of being produced as transmission holograms, they are produced as reflection holograms. Reflection holograms are commonly manufactured by a process called Bragg-Angle Holography. In this instance, instead of the diffraction pattern being formed on the surface of the photographic emulsion which makes up the hologram, the diffraction pattern is formed in the volume of the emulsion itself. Such a holographic zone plate would have the following advantages:

(1) Since it is formed as a reflection hologram, this type of screen is applicable to front projection, the technique now in use in most theaters.

(2) A reflection holographic screen accepts white light emanating from a point source and reflects it into the audience at the wavelength with which the hologram was initially made. Since the zone plate screen consists of a mosaic of alternating zone plates, each one produced as a hologram by laser light having a different wavelength, it becomes obvious that a holographic screen of this type already has its own color plate "built-in". Separate color filters are not required.

The screen is a Bragg Angle Reflection Hologram, which when illuminated from the front with a beam of white light having a spherical wavefront, the reconstruction will be a series of thin vertical lines, each line a different color, the colors alternating between red, green and blue, each line projected in front of the screen a distance f, and the vertical lines will be arranged horizontally across the width of the screen. A Bragg Angle Hologram is really a diffraction grating whose diffracting elements are distributed throughout the volume of the emulsion. A reconstruction can only be obtained by a reference beam of the same wavelength as was used to make the hologram. For this wavelength, the reconstruction efficiency is extremely high. If a white light reference beam should be used, only the appropriate color component will be selected to perform the reconstruction.

Figure 30A:
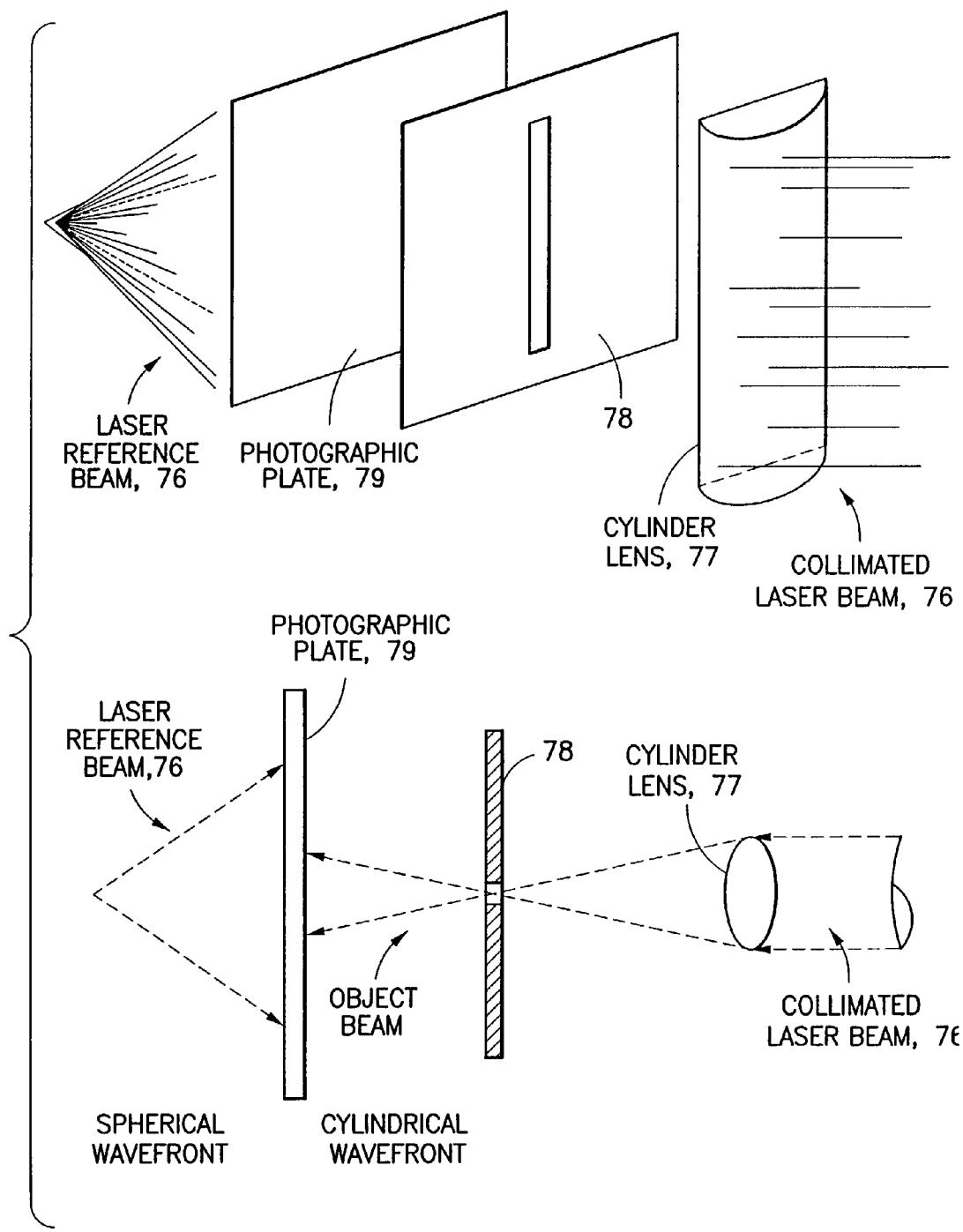
FIG. 30 shows the process for formation or manufacture of the front projection holographic screen.
Figure 30B:
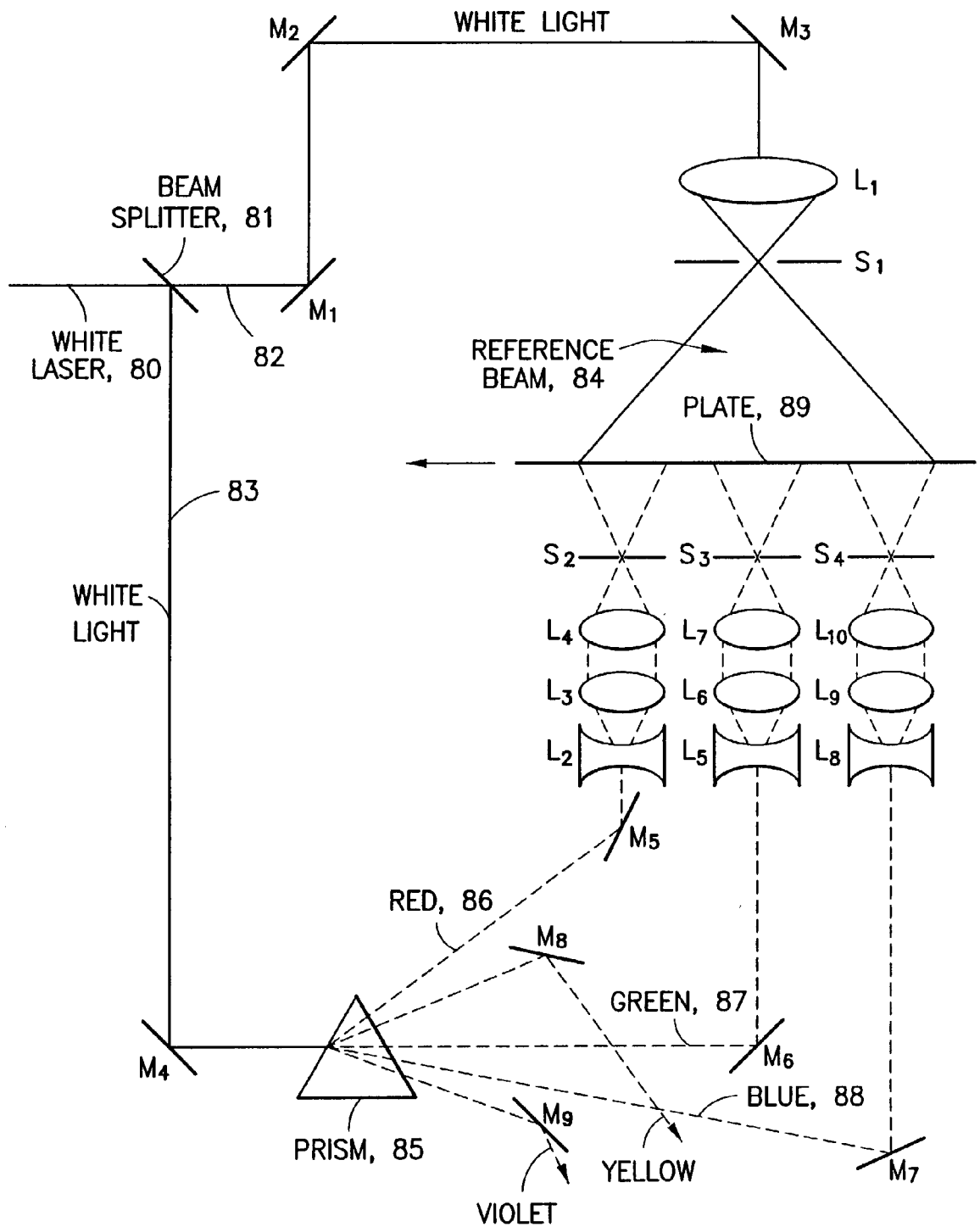
Figure 31:
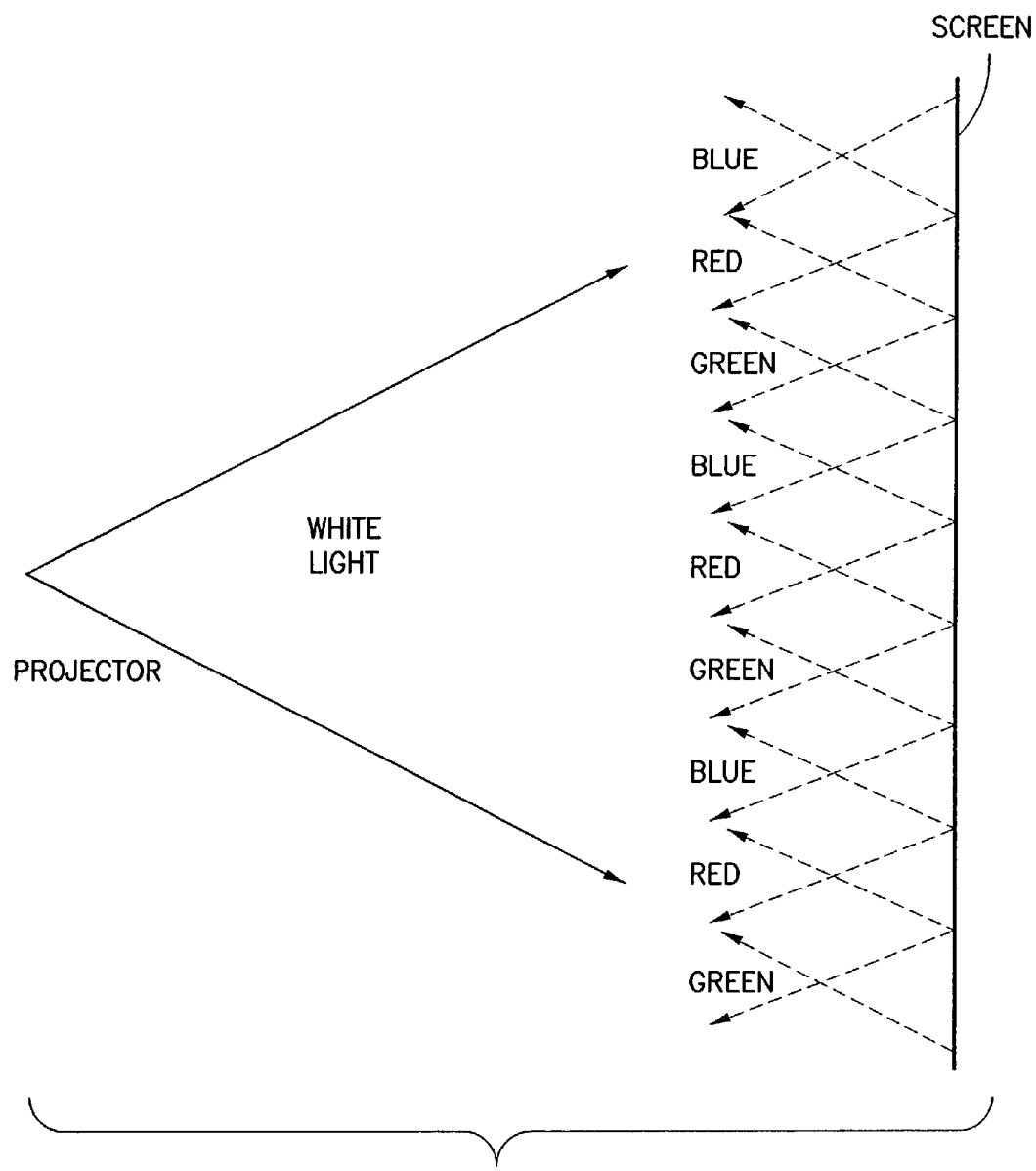
FIG. 31 shows the method of reconstruction from projection onto the front projection holographic screen.

FIG. 30(a) shows the fabrication of a reflection hologram faith monochromatic light. The reference beam is a spherical wavefront and the reconstruction is a real image of a single vertical line projected in front of the hologram. The object beam is created by passing a laser beam 76 through a cylindrical lens 77 which focuses through a slit 78 positioned at a distance f from the photographic plate 79. This operation can be performed separately for each wavelength needed, or the hologram can be fabricated as shown in FIG. 30(b). A white light, or multi-wavelength laser 80, such as a krypton laser, is used. The complete beam having all color components is used as the reference beam 84. The laser beam is split in two using a beam splitter 81 into two components 82 and 83. Beam 82 ultimately becomes the reference beam 84 after passing the optical components (mirrors $M_1$, $M_2$ and $M_3$, and concave lens $L_1$ and circular aperture $S_1$). Beam 83 ultimately becomes the object beams. First, the color components are separated by a prism 85. The unwanted wavelength components are removed by mirrors $M_0$ and $M_3$ leaving only the three red 86, green 87 and blue 88 object beams to be used to create the hologram. (Of course, colors other than red, green and blue can be used as long as they are complementary colors which are used to form white.) Thus far only three zone plates have been created on the photographic plate 89. The photographic plate 89 is then moved, and a new section is exposed in exactly the same manner. The method of reconstruction is shown in FIG. 31. A while light reference beam with a spherical wavefront is used to reconstruct alternating red, green and blue cylindrical wavefronts. Should the reference beam emanate from a projector in the rear of the theater with the image of an integral photograph impressed on the beam such that the image of the integral photograph is focused onto the screen, then a three-dimensional image will be reconstructed from the integral photograph. In this case, a color filter is not required, as the image will be properly broken down into the appropriate color pattern, and black & white film must be used.

Figure 32:
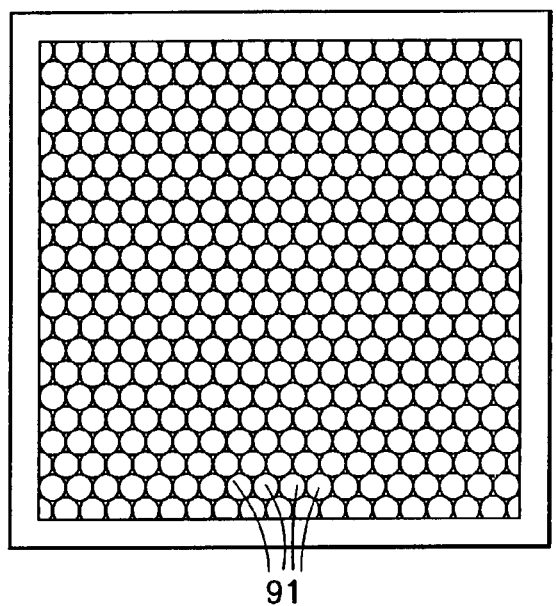
FIG. 32 shows a screen consisting of hexagonally close-packed spherical lenslets.

Alternate embodiments for the screen are as follows In one alternate embodiment, the screen can be comprised of spherical lenslets that are hexagonally close-packed. This concept is shown in FIG. 32. The screen 90 consists of spherical lenslets 91, each lenslet being surrounded by six other spherical lenslets. This type of screen would be used if the camera optics used are those previously described as an alternate camera embodiment and depicted in FIG. 9.

Figure 33A:
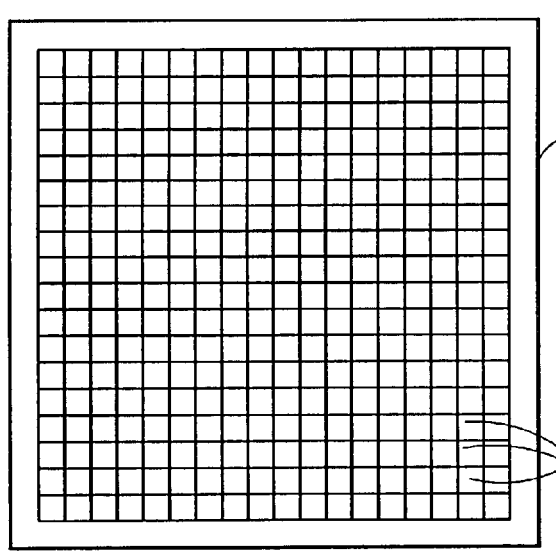
FIG. 33 shows a screen consisting of crossed cylindrical lenslets.
Figure 33B:
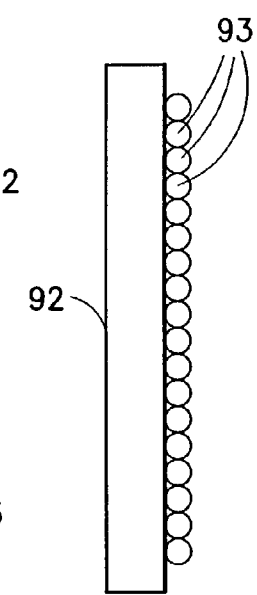
Figure 33C:
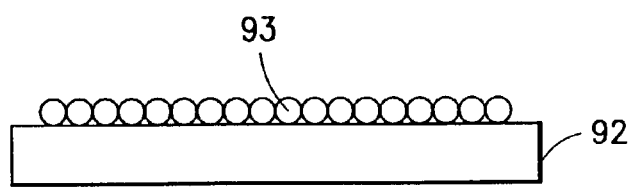

In another alternate embodiment, the screen can be comprised of crossed cylindrical lenslets (i.e., a fly's eye lens). This concept is shown in FIG. 33. FIG. 33(a) is a top view of the device while FIGS. 33(b) and 33(c) represent side and front views respectively. This device 92 consists of two crossed cylindrical matrix lens arrays or Bonnet Screens. Each of these two matrix lens arrays or Bonnet Screens are comprised of cylindrical lenslets 93. The two arrays are crossed such that the axes of the cylindrical lenslets on the arrays are orthogonal or perpendicular to each other.

Figures 34A, 34B:
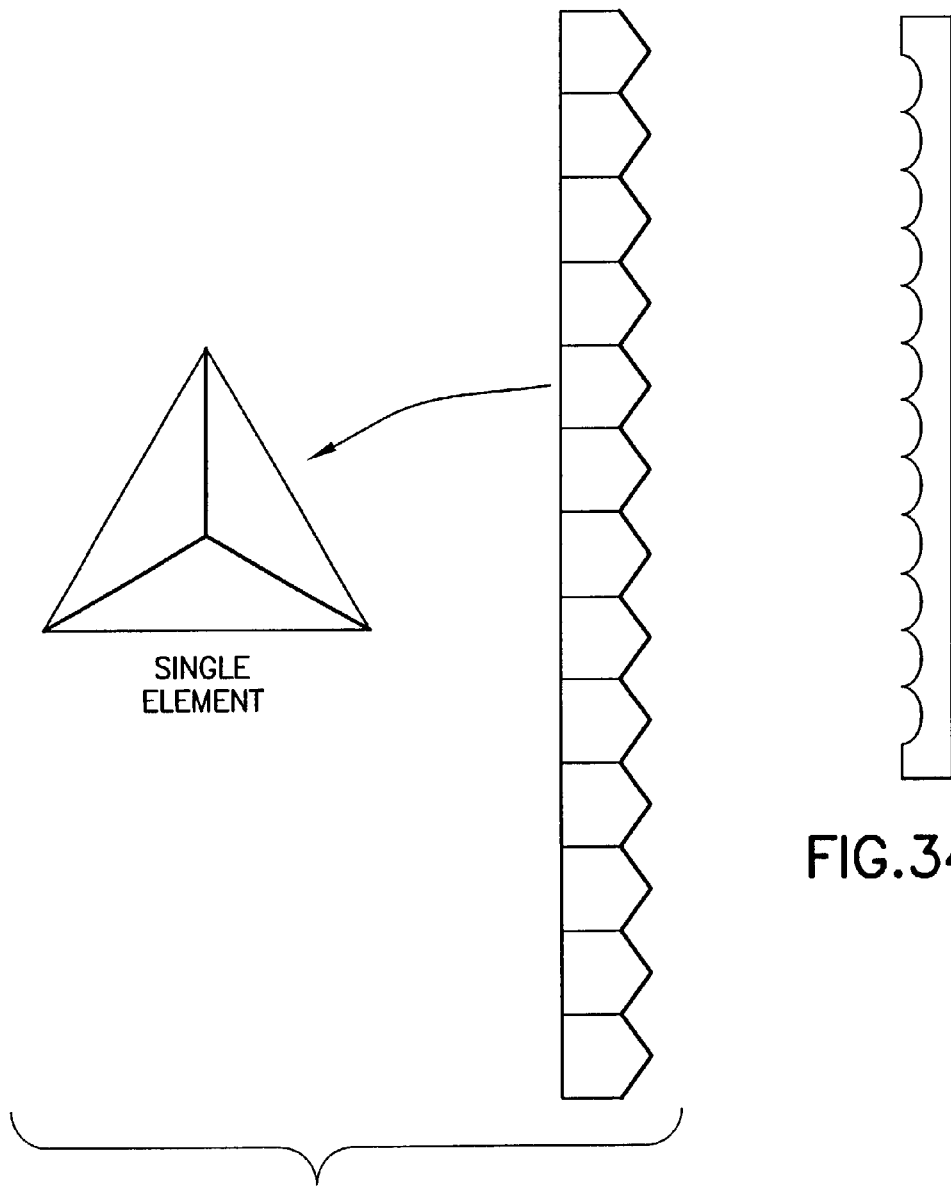
FIG. 34 shows a screen consisting of reflective concave lenslets (a) and corner cubes (b).
Figure 35:
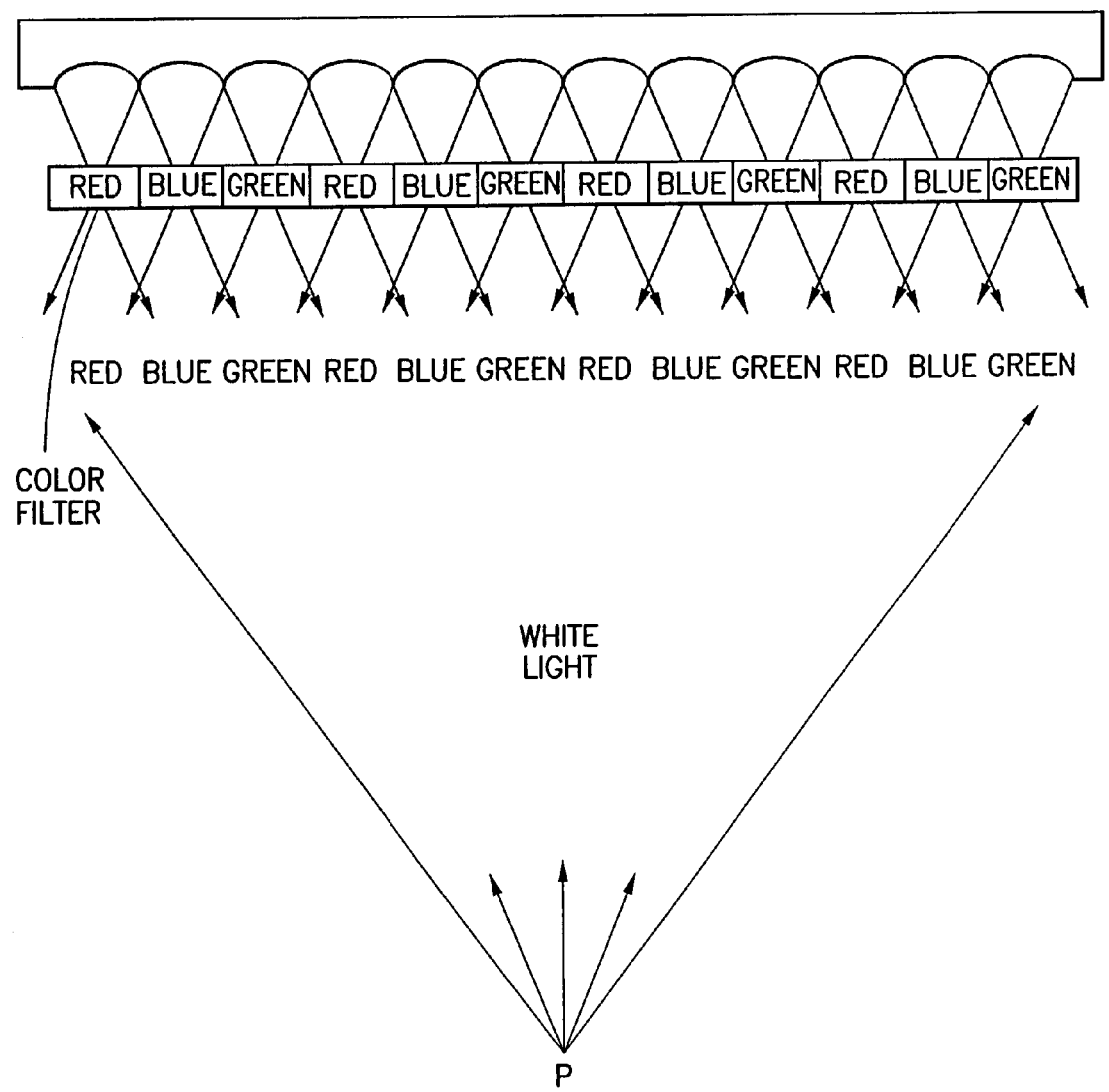
FIG. 35 shows a projection from a reflective cylindrical front projection screen.

Another alternate embodiment is a screen comprised of reflective concave lenslets. This concept is shown in FIG. 34(a). Alternatively, reflective corner cubes can be used as shown in FIG. 34(b). The elements can be spherical lenslets that are hexagonally close-packed, or the carved equivalent of crossed cylindrical lenslets, or corner cubes, or just plain cylindrical lenslets arranged horizontally with their axes vertical for the elimination of vertical parallax. The method of projection using this screen is shown in FIG. 35. A color plate is shown for reproduction of color images from black-and-white film.

Figure 36A:
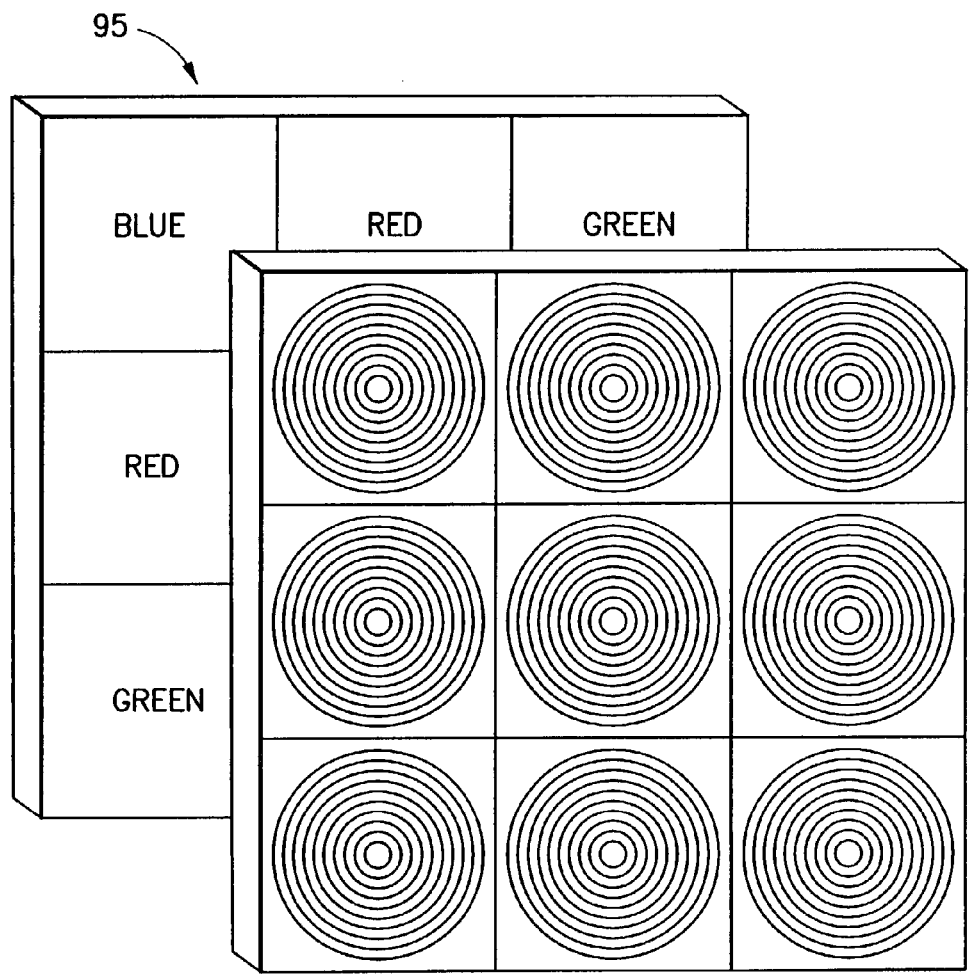
FIG. 36 shows a circular zone plate screen.
Figure 36B:
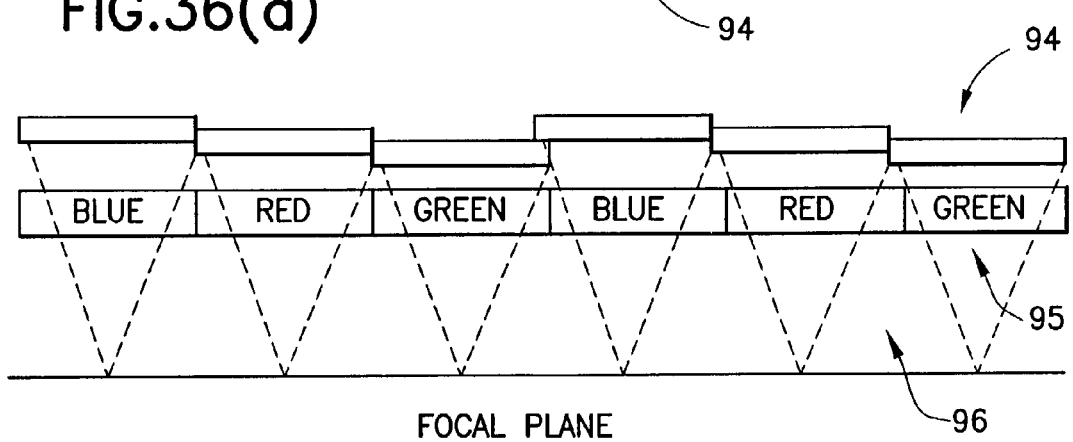

Another alternate embodiment would be to have a screen consist of a zone plate matrix lens array. This concept is shown in FIG. 36. This screen would consist of a zone plate matrix array 94, each zone plate having alternating different focal lengths for their respective alternating monochrome colors A color plate 95 would be necessary in this case. The image would then be focused onto a focal plane 96 as shown.

Figure 37:
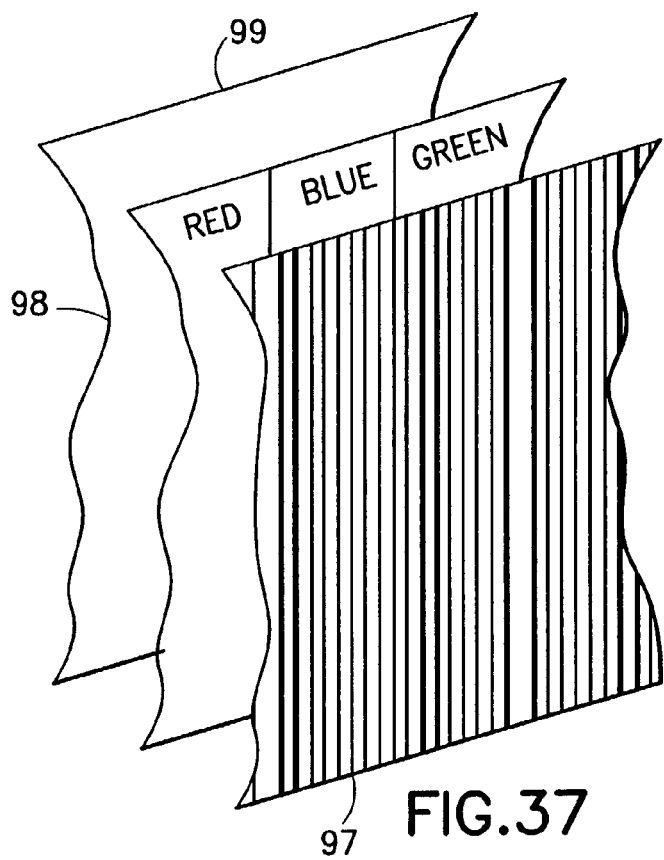
FIG. 37 shows a cylindrical zone plate screen.

Another alternate embodiment shown in FIG. 37 is a zone plate screen consisting of horizontally arranged cylindrical zone plates 97 arranged so that their axes are vertical along with a color plate 98 consisting of vertical strip filters of alternating colors. The focal lengths of the zone plates are different and are allied respectively with the monochrome colors of the associated color plate. A diffusing screen 99 is located at the focal plane of the zone plate and color plate arrays. The primary portion of the screen is a flat plate onto which is drawn parallel vertical lines which can separate the plates into a series of zones. For each zone plate, the lines are drawn a distance $r_n$ apart such that equations [11] through [14] hold true for the horizontal direction. Once again, the vertical lines are grooves which make up the cylindrical zone plates, can be produced either mechanically, photographically or holographically. When using a cylindrical zone plate screen, the color plate is not optional. It is required due to the severe chromatic selectivity of a zone plate.

Figure 38:
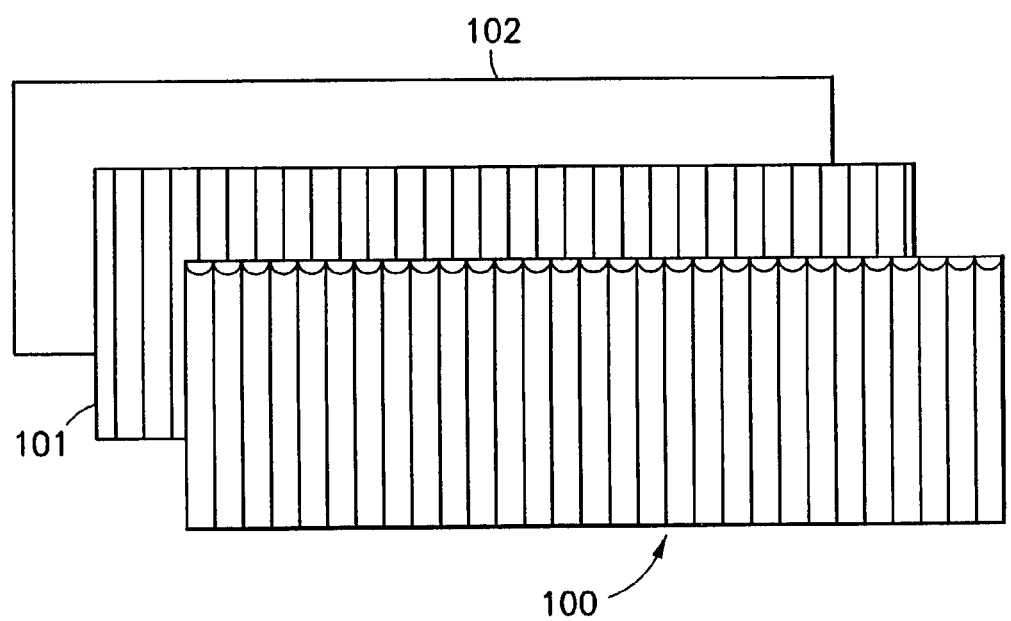
FIG. 38 shows a cylindrical lenticular screen.

The final alternate embodiment, shown in FIG. 38 for the screen consists of a large Bonnet Screen 100 an associated color plate 101 and a diffusing screen 102.

Figure 39:
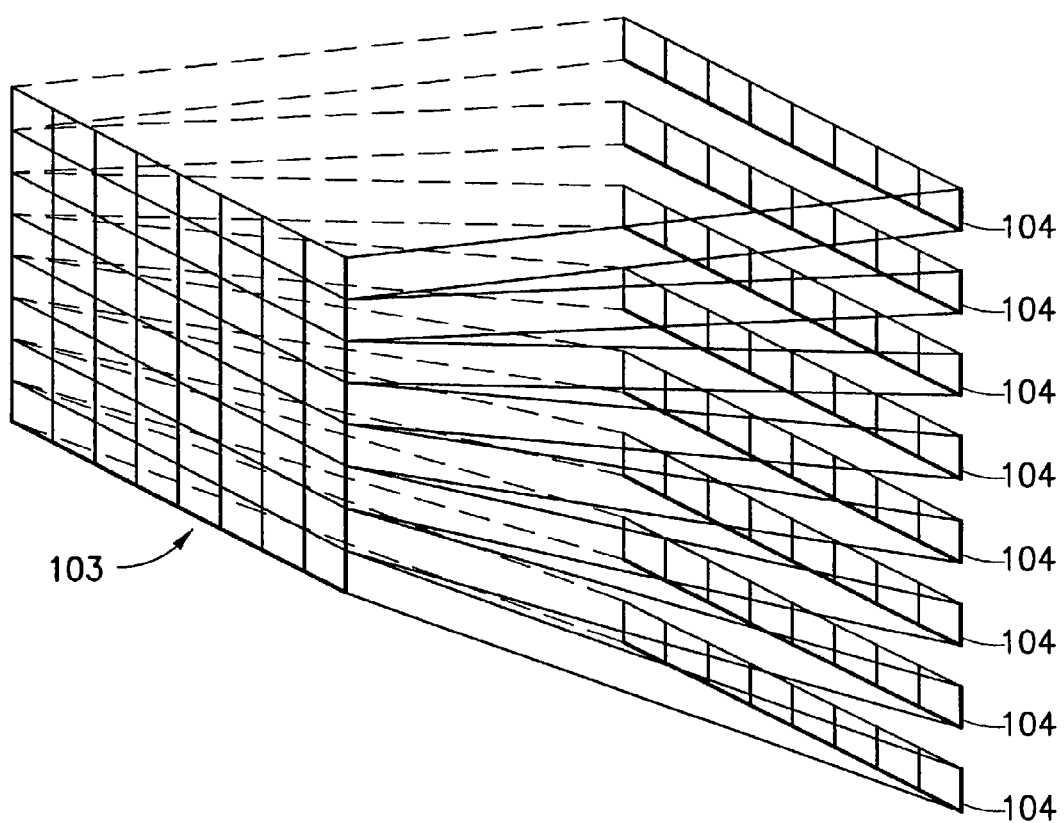
FIG. 39 is a schematic showing the separation of multiplexed images.
Figure 40:
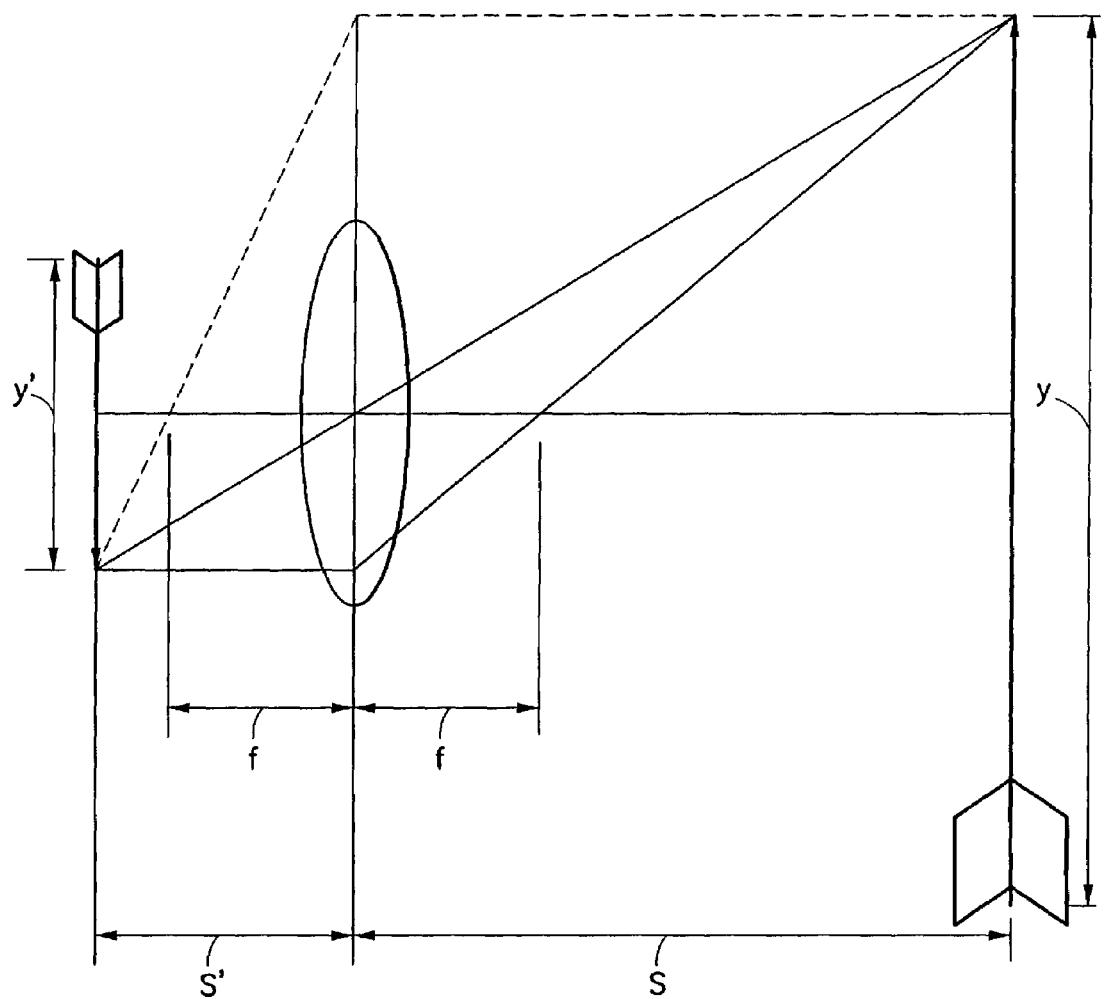
FIG. 40 is an optical ray trace used for the design of projection optics.

The discussion now turns to the concept of projection. The theoretical concept of projection is really quite simple. It consists of two stages. In the first step, shown schematically in FIG. 39, the multiplexed images 103 must be separated into rows 104, then, each row in 104 must be projected onto the screen in its proper position, horizontally adjacent to the next row. In this second step, the magnification in height is much greater than that in width. Therefore, a highly anamorphic system must be used. FIG. 40 is an optical ray trace that illustrates this second step design. To properly design a simple projection system, the following procedure should be used. Known is the size of the frame y', the size of the image on the screen, y, and the distance, s, of the projector lens from the screen. The magnification of the projected image for the lens is y/y'. This magnification factor can also be expressed as the ratio of the distance of the two images from the lens s/s'.

Therefore, $$M = \frac{s}{s'} = \frac{y}{y'}, \text{ and}$$

$$s' = \frac{sy'}{y} \qquad [42]$$

We also know that $$\frac{1}{f} = \frac{1}{s} + \frac{1}{s'}$$

$$f = \frac{ss'}{s+s'}$$

Substituting equation [42] into this expression for f, we have:

$$f = \frac{sy'}{y+y'} \quad [43]$$

Now, for our example, for the X-direction $$s = \wp W \quad [44]$$

where: W is the width of the screen, and is the factor indicating the size of the audience.

$y = W/\#$ rows and $$\# \text{ rows} = \frac{n\phi}{y'}$$

and $y' = w$ where w is the width of the frame.
Then:

$$y = \frac{Ww}{n\phi}$$

Substituting these terms in equation [42], we have $$s'_x = \wp n\phi \quad [45]$$

Similarly, using equation [43], $$f_x = \frac{\wp W n\phi}{W + n\phi} \quad [46]$$

where: n=number of elements
$\phi$=diameter of camera lenslet.

Using the same method for the Y-direction, $s = \wp W$ and $y = W/2$ (The total magnification of the element in the height direction is to bring it to the total height of the screen. For our examples, the screen is twice as wide as it is high.)

From equation [42], we have:

$$s'_y = \frac{\wp' W n y'}{W/2} = 2\wp' y'$$

In this case, $$y' = \delta = \frac{h}{\# \text{ rows}} = \frac{hw}{n\phi}$$

$$s'_y = \frac{2\wp' hw}{n\phi} \quad [47]$$

$$f_y = \frac{2\wp' hWw}{n\phi \; W + 2hw} \quad [48]$$

Let us choose an example. $\phi = 1.0$ mm, $$= \frac{hw}{n\phi} = 4.81 \text{ mm},$$

n=1,756, h=130 mm, w=65 mm, W=10,000 mm, $\wp$=6. Now, from equation [44], s≈60 meters, and from equations [45] through [48], we have:
$f_x$=8.97 meters $f_y$=6.73 meters
$s'_x$=10.53 meters $s'_y$=67.3 mm
$\wp'$=7.

An anamorphic lens of this type is highly unlikely, and the concept of projection is not as simple as it looks on the surface. For a thorough analysis of the projection system, the problem must be divided into the following sections:

(1) Primary Projecion System

The resolution of the film and its image will range between 300–500 lines/mm. There is no projection lens in existence which can project such a high resolution image from a small frame onto a large screen. Therefore a projection system must be devised to project the image with a reasonable magnification so as to enable a more standard projection system to project the image on the screen.

(2) Image Multiplexing System (3) Image Inversion

The picture taken by the camera, when projected, will have a pseudoscopic three-dimensional reconstruction. It is necessary to invert this three-dimensional image so as to create an orthoscopic reconstruction. This concept will be discussed in detail later. One method of performing this operation is projecting the pseudoscopic reconstruction and photographing the reconstruction on an integral photograph or a hologram. The new reconstruction will be orthoscopic. However, this process introduces a theoretical resolution loss factor of $\sqrt{2}$. Should it be possible to perform this function in the projector without necessitating an intermediate reconstruction, it would be possible to avoid this loss in resolution.

(4) Secondary Projecion System

A projection system must be devised which will project the magnified image from the primary system onto the screen. This projection system will be highly anamorphic.

(5) Registration System

A method must be devised which can register the projected images (intermediate and final) exactly where they should be on their respective image planes. The focal position must also be registered.

(6) Illumination System (7) Mechanical Registration System (8) Mechanical Stabilization System.

The primary projection system does not include the optics for projecting the integral photographic image onto the screen. Instead, it is required to magnify the high resolution film format to some intermediate stage while maintaining the same number of resolution elements so as to facilitate theater projection using more standard optics.

The function of the primary lens is simply the aforementioned preliminary magnification. First, the lens must have the required resolution or $$\frac{1}{R} = 2.44\lambda(F/\#)$$

$$(F/\#) = \frac{1}{2.44\lambda \ R}$$

For our example, $\lambda=5{,}000$ Å$=0.5\times10^{-3}$ mm and R=400 lines/mm.

Therefore, $(F/\#)=2.05$.

This means that any F/2.05 lens, even a simple one, would provide a resolution of 400 lines/mm in the center of the field. A small lens, such as one used as a lenticule to take an integral photograph possesses the ability to resolve 400 lines/mm over the entire field. However, the field of such a lenslet is very small, and the light gathering characteristics for this lens is very poor.

Second, this high resolution must be maintained over the entire field of the film (i.e., 65 mm×130 mm) without distortion or abberation. The design of such a lens is not simple, and it will not be included in this application. However, lenses with characteristics similar to that required by this system already exist and designing such lenses is well known to those familiar with the art. The lens which must be used for the primary projection must be designed using a computer. It will have between 10 and 15 elements. The depth of focus required to maintain the total information of the projected image is very poor. However, this is much more controllable when projecting to an intermediate magnification than on a large screen.

A special case of this intermediate projection is when it is performed at no magnification. This will prove useful in certain of the final projection systems which will be described later. What is required is that an image be transferred from one image plane to another at 1:1 magnification with the resolution preserved, i.e., the total information must be transferred from one image to the other. In order to accomplish this, a special optical system must be designed, but such an optical system is much simpler than the one previously mentioned. One such system was designed by PERKIN-ELMER several years ago. This optical system uses mirrors instead of lenses, but there are not a great number of components, and the components are not difficult to construct Such an imaging system was designed for a microprojector and semiconductor circuits. It covered a field of two-inches. Resolution was one-micron or 500 line pairs/mm. Of course, lenses can be used to accomplish the same result. However, the optical system as a whole is an extremely practical one.

Figure 41:
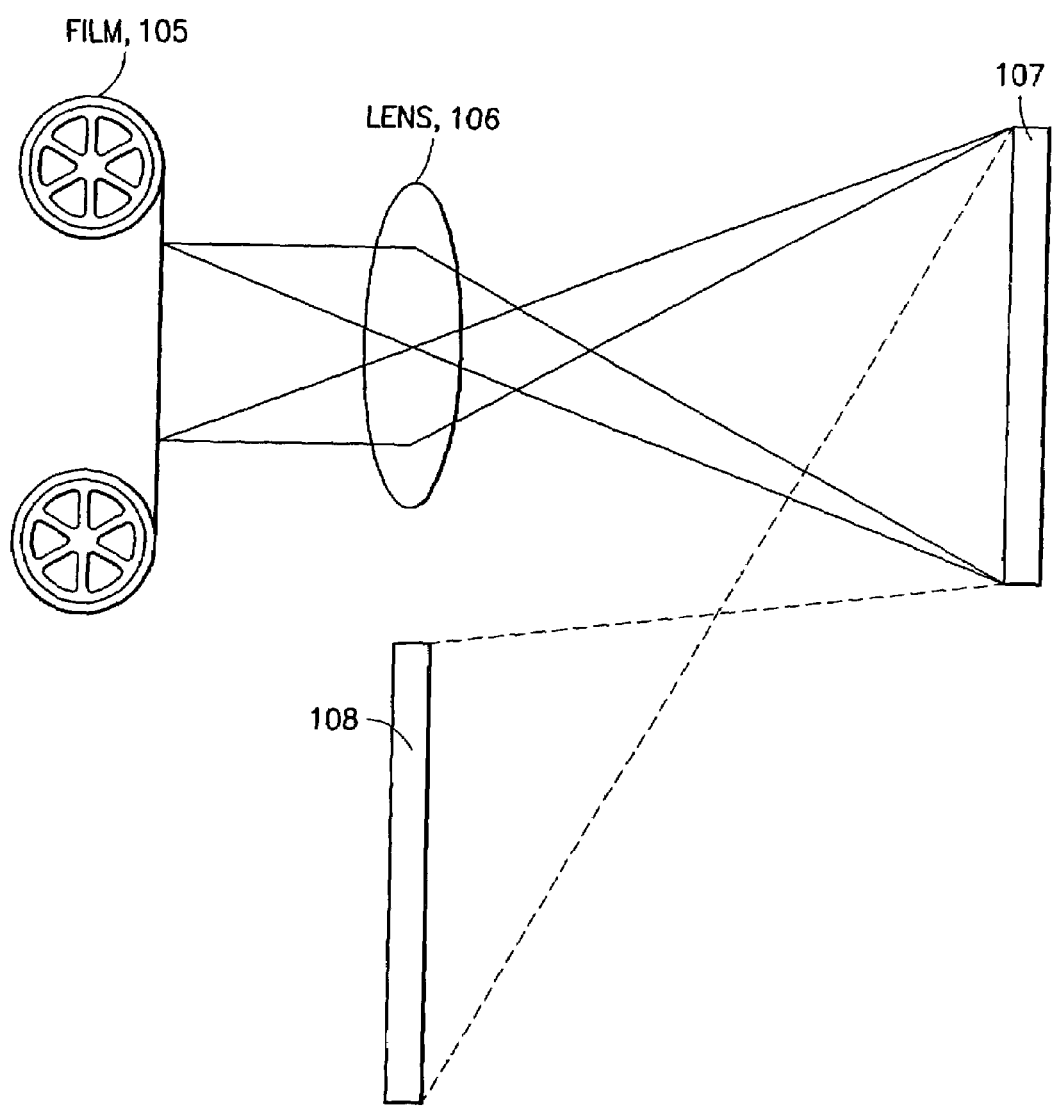
FIG. 41 is a schematic showing the basic principle of primary holographic projection.
Figure 42:
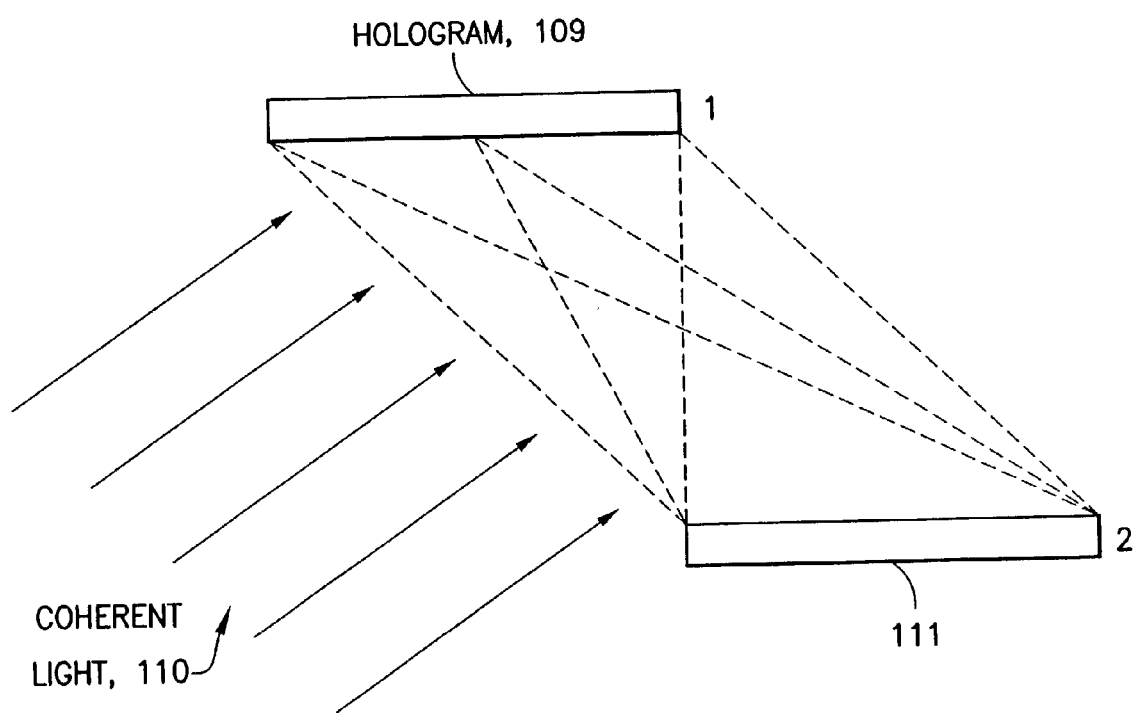
FIG. 42 is a schematic showing projection of a real image from a hologram.
Figure 43:
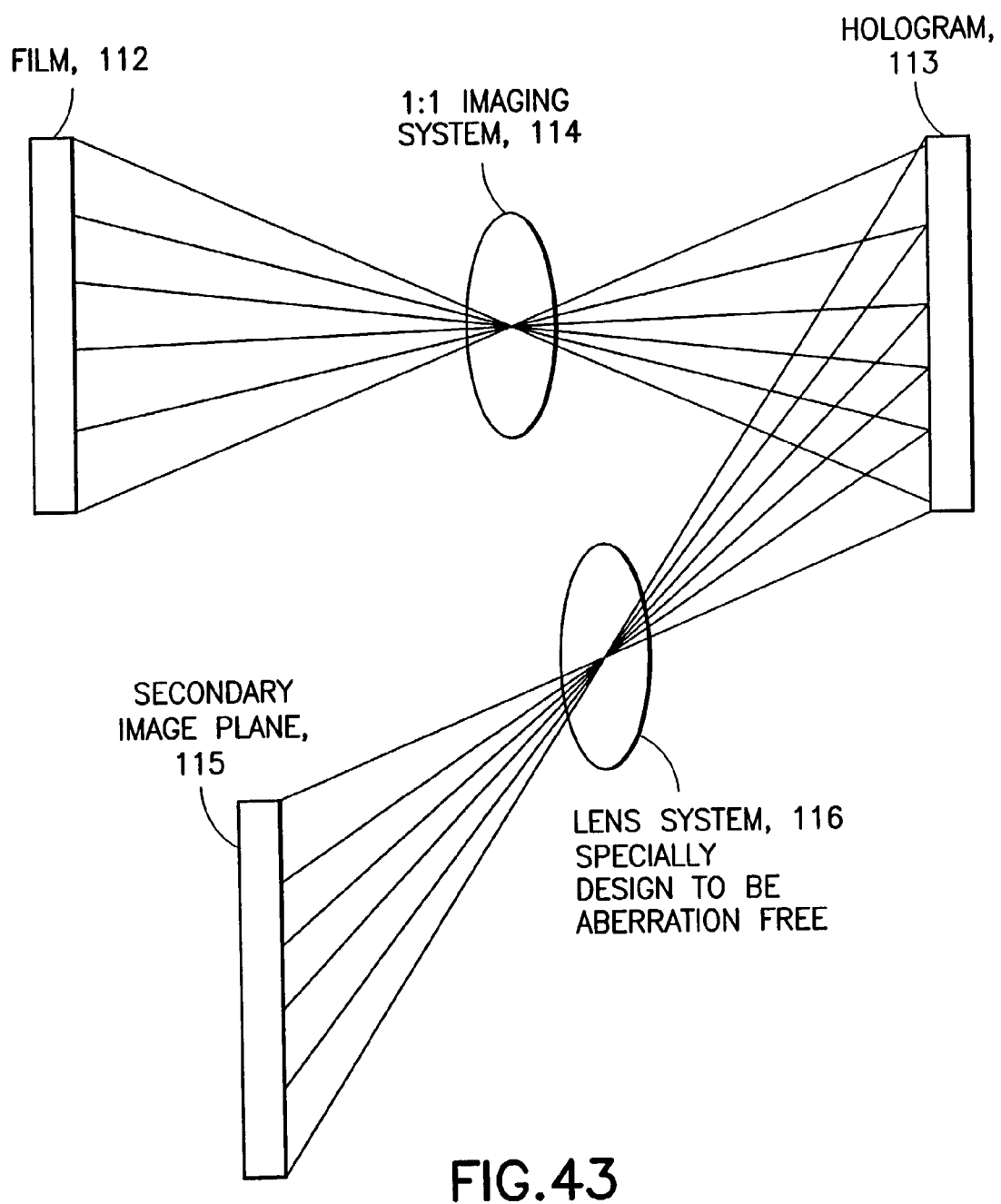
FIG. 43 is a schematic of a primary holographic imaging system using high quality optics.
Figure 44A:
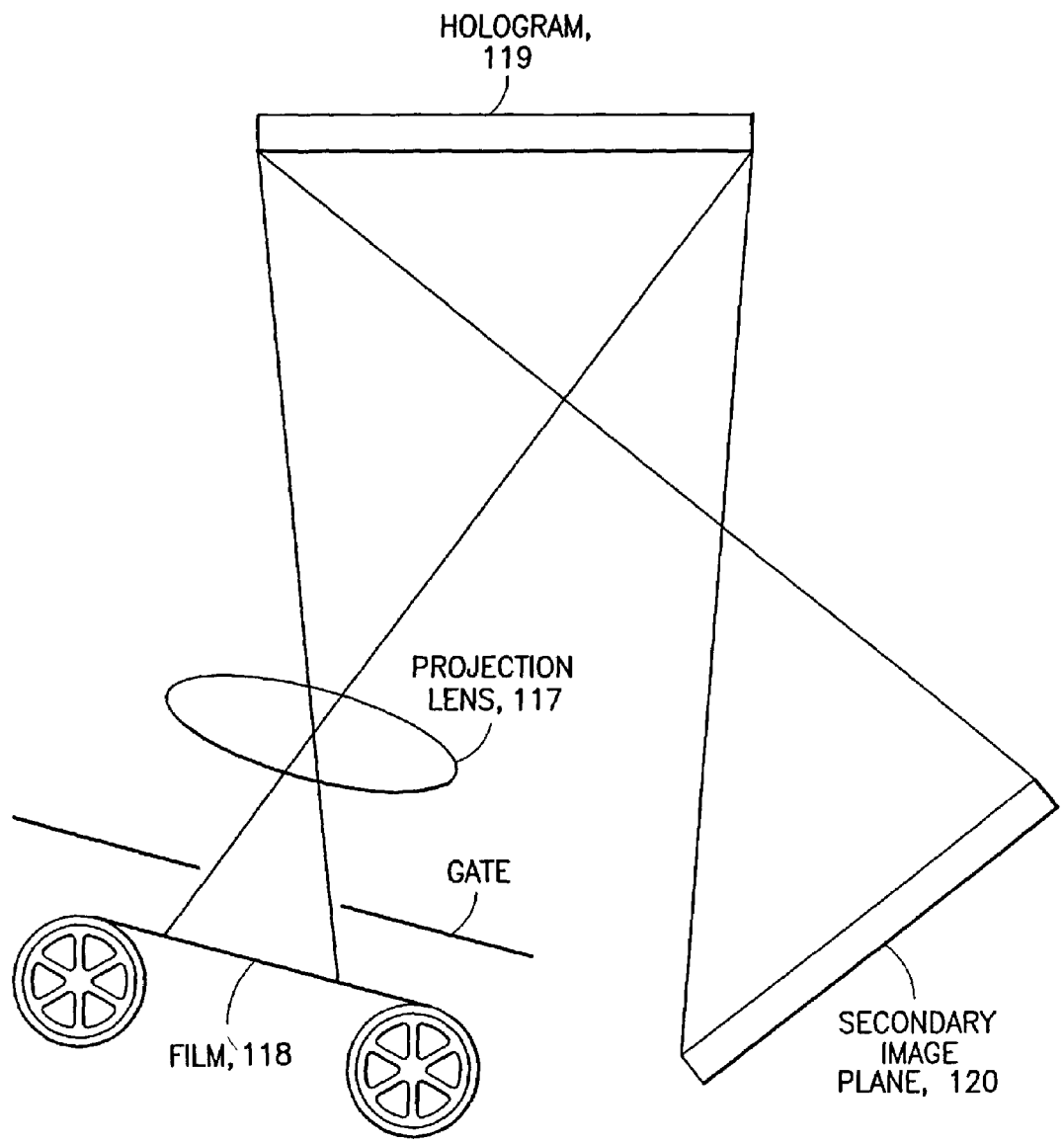
FIG. 44(a) is a schematic of primary projection using a high quality holographic lens.
Figure 44B:
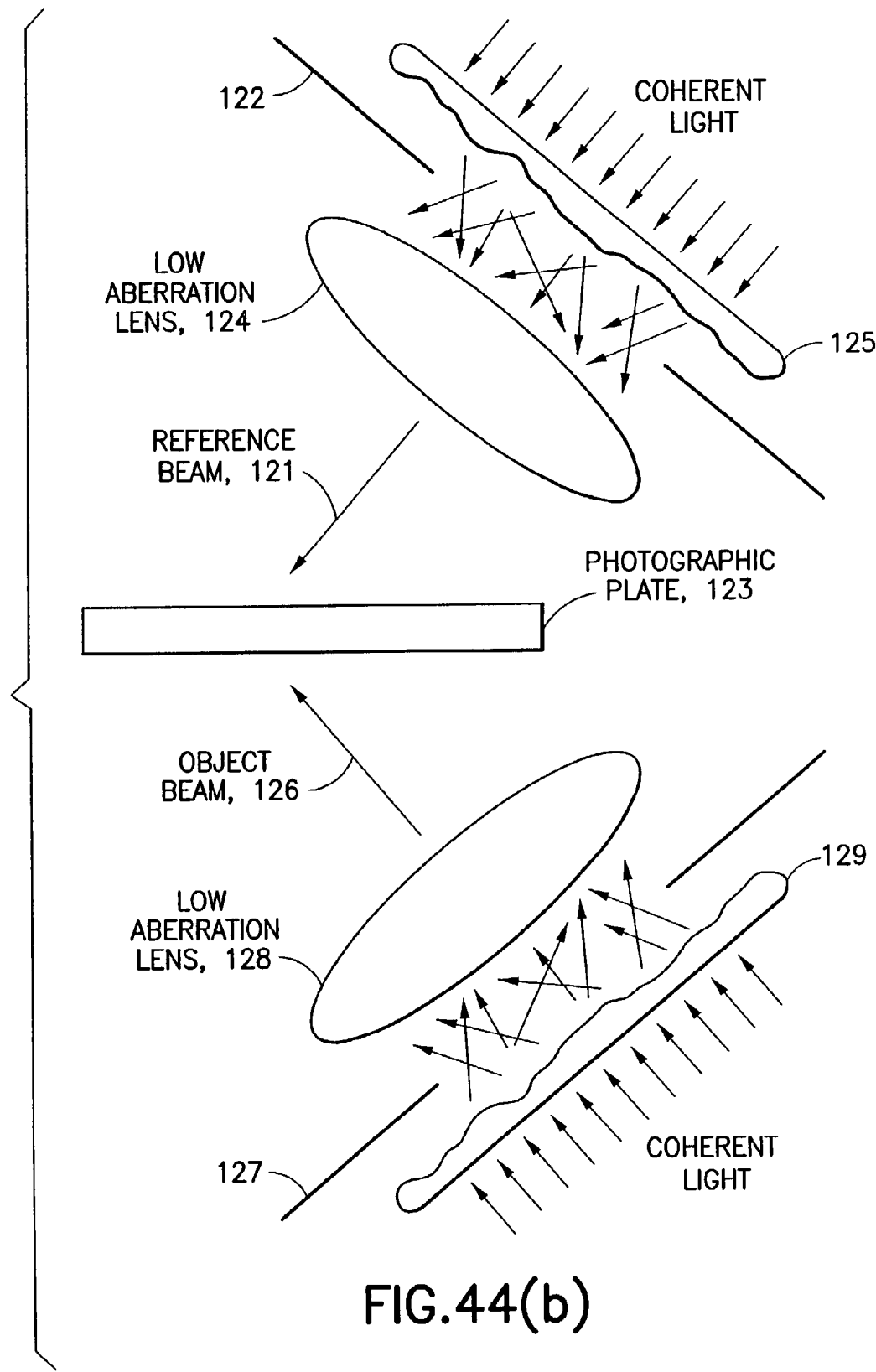
FIG. 44(b) shows a method of making the holographic lens described in FIG. 44(a).

Another way to accomplish the primary projection is to use holography. FIG. 41 shows the basic principle of holographic primary projection The image from the film 105 is projected, using lens 106 onto a hologram 107 which is designed to project the real image of the film onto the secondary image plane 108 at a suitable magnification. Coherent light must be used as the illuminating source in this case if perfect imagery is to be obtained. FIG. 42 shows a method which is currently used to project a real image from a hologram. A hologram 109 which is taken as a permanent record of the object to be reproduced is illuminated using coherent light 110 A real image is projected from the hologram 109 onto the secondary image plane 111. The figure shows this being accomplished using a reflection hologram, but transmission holograms would work just as well. Once again, coherent light must be used for perfect imagery. In the manner shown, an image can be projected at a 1:1 magnification with a resolution of 650 lines/mm Should incoherent light be used, the image would degrade to approximately 500 lines/mm. For perfect imagery, unit magnification should be used, even though holographic images can be magnified, but not without abberation This 1:1 projection is used in microprojectors in the semiconductor industry. The problem with this method is the need for preparing a permanent hologram for each frame for projection, i.e., the film would have to be a hologram. (This technique will be discussed later.) The 1:1 magnification would not present a problem since the object in the hologram can be made quite large (i.e., the size required for primary projection). Reflection holography should definitely be used since the diffraction efficiency is much higher than for transmission holography. FIG. 43 shows how a non-permanent image can be projected using the principle of primary holographic projection. The two-dimensional image from the film 112 is projected onto a reflection hologram 113 using a 1:1 imaging optical system 114. The image is then focused onto a secondary image plane 115. In this case, a specially designed abberation free lens 116 is used in conjunction with the hologram for projection. Since this expensive lens must be used during normal projection of the film, this method is not very practical. However, since a hologram is an imaging device itself, the hologram can be used as a high quality lens FIG. 44(a) illustrates this principle. A standard projection lens 117 images the film frame 118 onto a specially prepared hologram 119, which, in turn, acts as a reflecting lens to image the film frame onto the secondary image plane 120 at some greater magnification. This hologram is a high quality Leith Hologram, and is indicated operating as a reflection hologram because the diffraction efficiency is much higher for reflection than for transmission. FIG. 44(b) shows how such a holographic lens can be made. For the reference beam 121, one should project the image of an aperture 122 which is the size of the film frame onto the photographic plate 123 using the same projection lens 124 as will be used in the projector. This lens 124 does not have to be of high quality. A diffuser plate 125 should be used as shown. For the object beam 126, one should project the image of a larger aperture 127, which is the size of the magnified image, onto the photographic plate 123 using an extremely high quality projection lens 128. Once again, a diffuser plate 129 must be used as shown. The advantage of this method over the previously mentioned methods is the elimination of the expensive high quality lens during projection. This lens 128 only need be fabricated once, and then it will be used to manufacture all of the holographic projection lenses.

Figure 45:
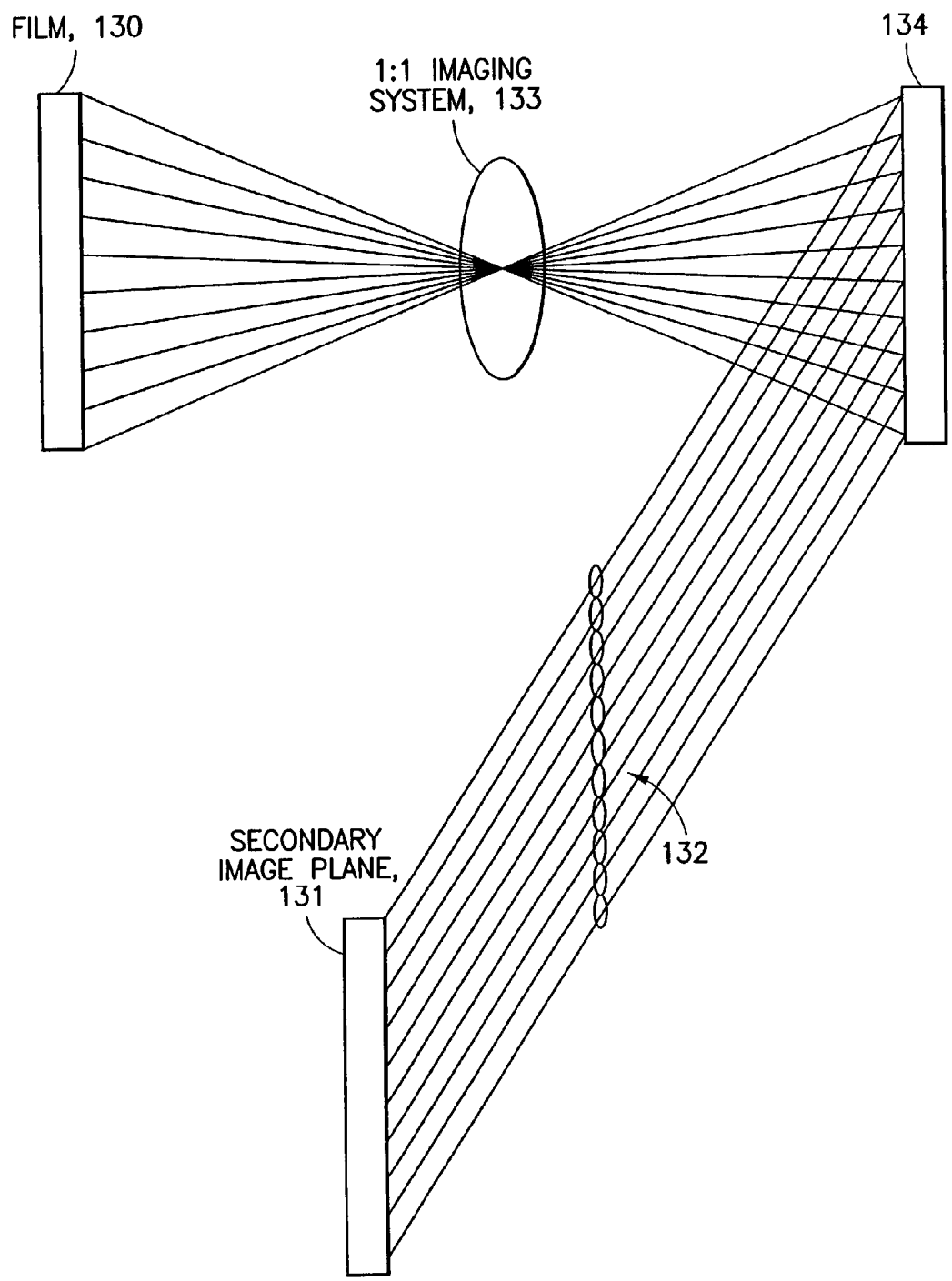
FIG. 45 is a schematic of primary holographic projection using a matrix lens array.

Another method of accomplishing the primary projection by holographic means, but without the use of an expensive lens, is illustrated in FIG. 45. In this method the entire frame 130 is not imaged as a whole from the film onto the secondary image plane 131 using a hologram, but, rather, each individual element is imaged using each lens from a matrix lens array 132 in the same manner as is shown in FIG. 43. This method is illustrated in FIG. 45. Once again a 1:1 imaging system 133 is used to produce an unmagnified image of the film frame 130 onto reflection hologram 134. This image is then reconstructed onto the secondary image plane 131 using the matrix lens array 132. Since the individual lenses in the matrix lens array 132 have the ability to perform high quality projection imaging of each element, it is no longer necessary to fabricate the expensive, high quality lens. In this instance, the matrix lens array 132 will be used for projection in conjunction with the holographic lens. This configuration would probably be of more utility with transmission holograms, even though the principle is illustrated here for reflection holograms.

Figure 46:
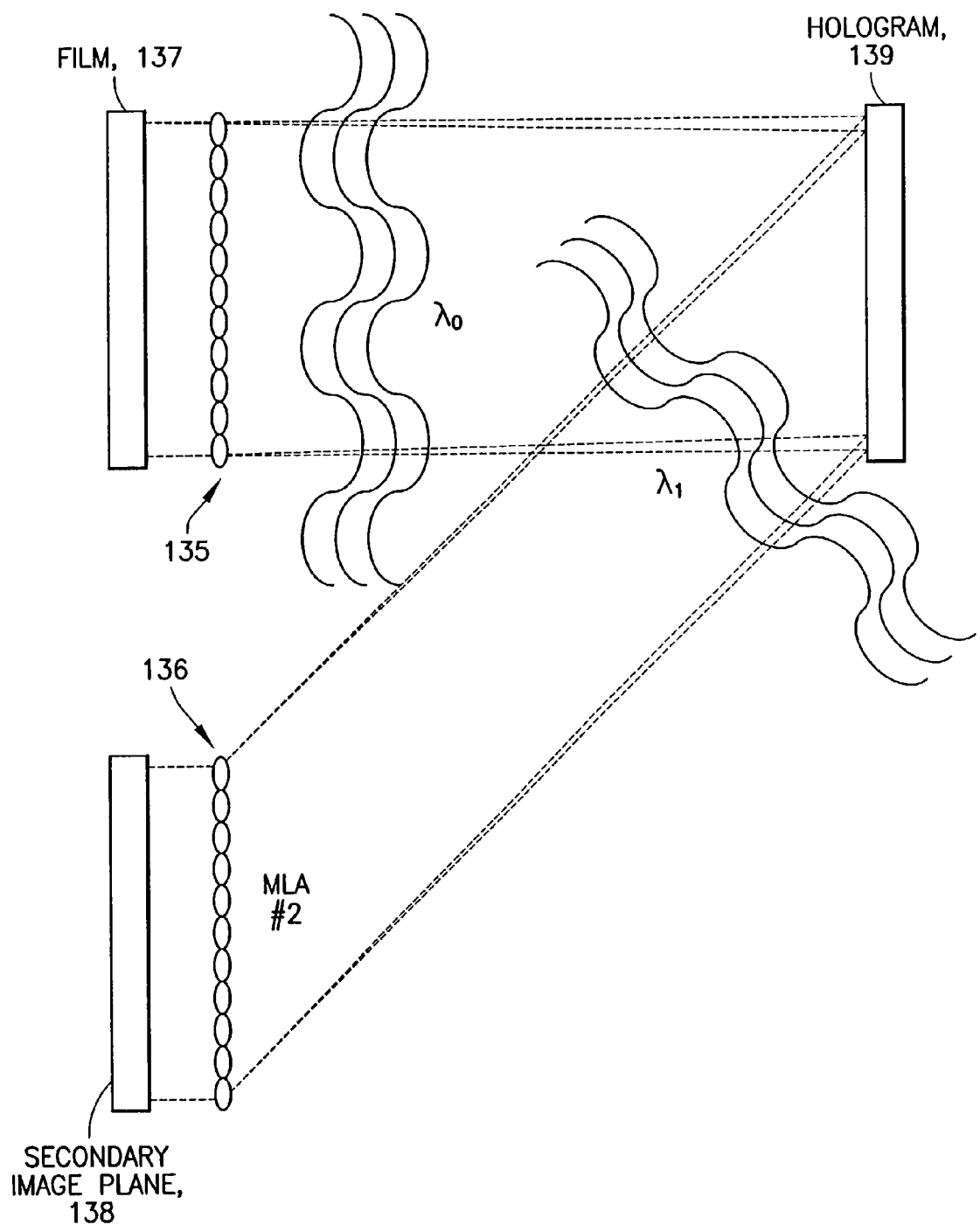
FIG. 46 is a schematic of primary holographic projection using two matrix lens arrays.

Another method of accomplishing projection using a holographic imaging device is shown in FIG. 46. This is the preferred embodiment of the projection system. In this case, instead of using expensive projection lenses, two matrix lens arrays, 135 and 136, are used as shown. On the secondary image plane, the image is magnified by the desired amount, and the ratio of the size of the elements of matrix lens array 136 to matrix lens array 135 is equal to the magnification. The hologram is prepared as follows. In the setup shown in FIG. 46, replace both the film 137 and the secondary image plane 138 by two diffuser plates. Between the film plane diffuser plate and matrix lens array 135, place a movable aperture which is the size of one element on the film frame 137, and between the secondary image plane and matrix lens array 136, place a similar movable aperture which is the size of a magnified element on the secondary image plane 138 A high resolution photographic plate is positioned in the hologram plane 139. The film plane aperture is placed in front of the first elemental position and the secondary image plane aperture is placed in the corresponding first elemental position. Both diffuser plates, 137 and 138, are then trans-illuminated by an appropriate laser for a sufficient time to expose the hologram 139. (This may have to be done for each element by exposing it with many bursts of low intensity laser radiation.) Both apertures are then moved to the second elemental positions and the hologram is exposed again; and so-on for every elemental position. Another method of preparing the same hologram is to also place an appropriate elemental aperture in front of the hologram plane 139. This elemental aperture moves to a different position in front of the hologram plane every time the other two apertures move. The addition of this third aperture will avoid reciprocity problems with the photographic emulsion. (Reciprocity problems will also be avoided by the short-burst method mentioned above. The advantage of the short-burst method over the third aperture method is that crosstalk between elements is avoided.) This method of projection using holographic imaging seems to be the most practical embodiment of the projection principle.

Holographic lenses and imaging devices have the major advantages over conventional optics in that holograms use less expensive fabrication procedures and fewer elements are needed to produce an abberation free and distortion free image. Its major disadvantages lie in the fact that processing is difficult (during wet processing, a photographic emulsion will usually shrink—a phenomenon which must be prevented here), and that coherent light must be used during projection (except, as will be seen, for the method outlined in FIG. 46) However, the, advantages may prove to outweigh these disadvantages.

Figure 47C:
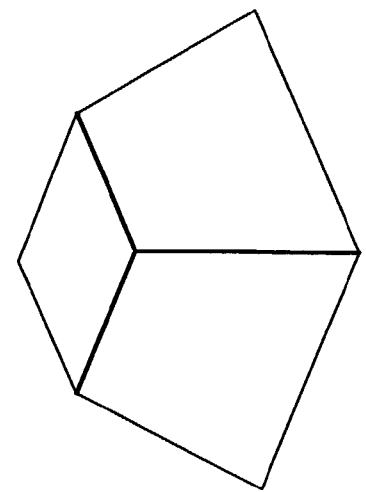
FIG. 47 shows the method of fabricating a fiber optics magnifier.
Figure 47B:
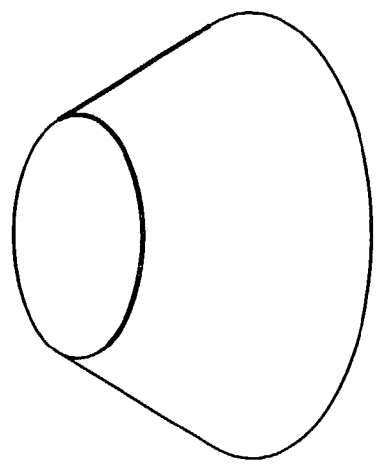
Figure 47A:
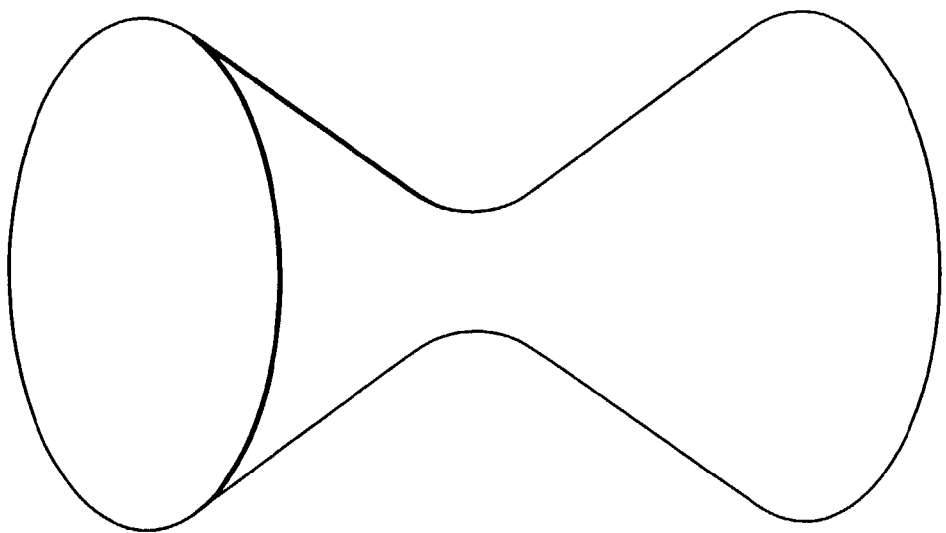
Figure 48:
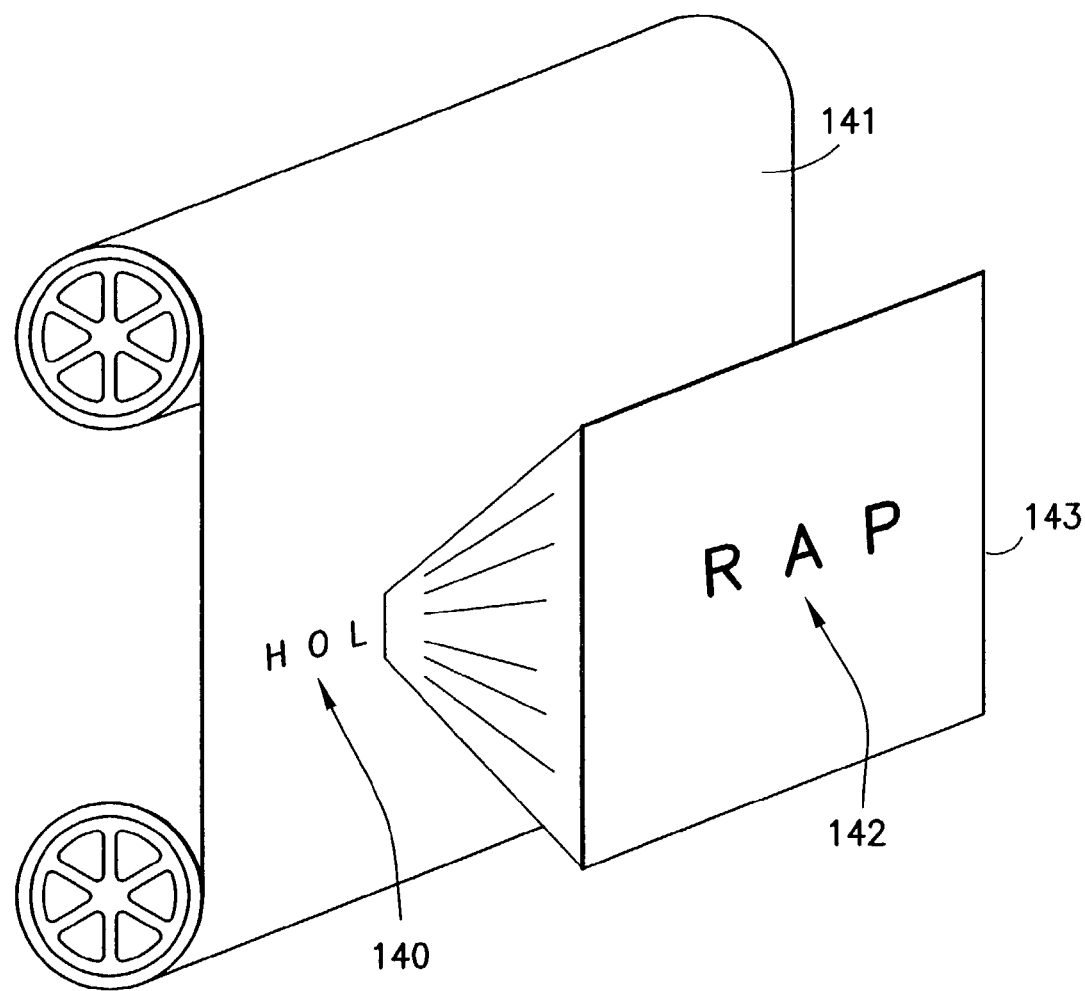
FIG. 48 illustrates primary magnification using fiber optics.
Figure 49A:
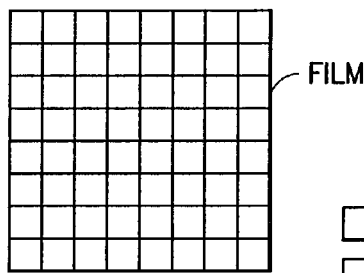
FIG. 49 shows the steps that must be accomplished during the unmultiplexing process.
Figure 49B:
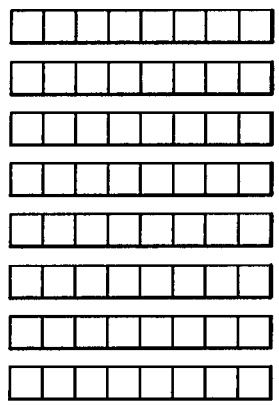
Figure 49C:
Figure 49D:
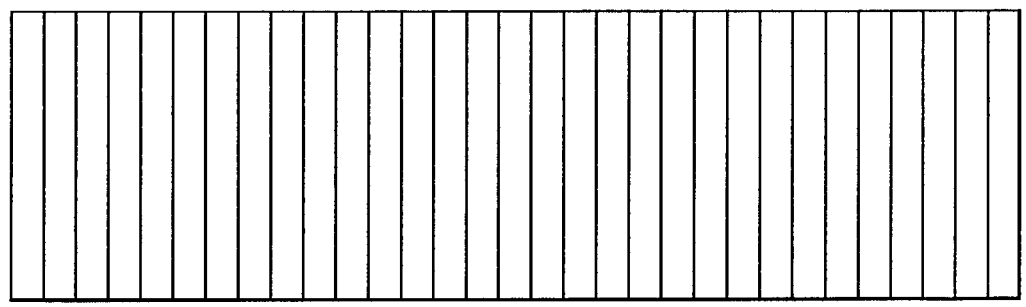

Another method of accomplishing the primary magnification and an alternate embodiment is by direct magnification instead of by primary projection. This can be done using a fiber optics magnifier, a device which is fabricated from a fiber optics cone. The light from the image is not only transmitted from one surface to the other by the fiber bundle, but, since the fibers are smaller at one surface than they are at the other, magnification or demagnification can occur depending upon which surface is in contact with the primary image. FIG. 47 illustrates just how such a fiber optics magnifier can be fabricated. A large fiber optics boule is suspended in a vertical cylindrical furnace such that one end will become sufficiently molten so that it can be pulled into a cone. For fabricating two cones, a bundle of fibers is hung in a small furnace and fairly intense heating is applied to the middle of the boule, which when softened, is drawn apart. However, unless the thermal conditions are completely symmetrical, the cone is deformed. Furthermore, after the cones are pulled, they must be annealed or considerable strains and fractures occur. The appearance of the two cones is shown in FIG. 47(*a*) The cones should be fabricated in a vacuum so as to prevent air from becoming encapsulated in the fibers. The cone that is to be used is then truncated and two faces are polished. This is shown in FIG. 47(*b*). From this point on, the fiber optics cone is cut into the shape of a truncated pyramid in such a way that one face is the size of the film frame and the other face is the size of the magnified image. This is shown in FIG. 47(*c*). Another way to fabricate the cone would be out of metal tubing. Once the fiber optics magnifier is fabricated, FIG. 48 illustrates how it can be used. The primary face plate of a fiber optics magnifier 143 is in contact with the film 141. The unmagnified image 140 on the film 141 becomes a magnified image 142 on the secondary face plate of the fiber optics magnifier 143.

The advantage of a fiber optics magnifier is that if the fiber optics cone is symmetrically formed, there will be no abberations. However, with fibers whose diameters are as small as these must necessarily be, there will be many fractures in the fibers. This will serve to reduce the resolution. This problem can be solved by using metal fibers. Another disadvantage occurs due to the fact that original multiplexing of the film in the camera was performed using a fiber optics image dissector. Because of this, there will be a resolution loss due to coupling of two fiber optics surfaces. This can be expressed as follows:

$$R^{\otimes} = \frac{R_1 \sqrt{2}}{2} \qquad [49]$$

where: $R_1$ is the film resolution, and $R^{\otimes}$ is the maximum resolution which can be transferred by a fiber optics bundle whose two faces are the same size Equation [49] indicates a definite loss of information upon magnification.

Image unmultiplexing and inversion must now be discussed. FIG. 49 illustrates the concept of unmultiplexing. The fully multiplexed film is shown in FIG. 49(*a*). This is the image as it appears on the final processed film prior to projection. The first step which must be accomplished is the separation of the vertical rows for projection. This is shown in FIG. 49(*b*). As long as the adjacent rows are positioned so that they are touching one another, they cannot be projected separately to different positions relative to each other Therefore, this separation step is necessary. The second step of the process is the projection or positioning of the vertical rows side-by-side horizontally so that they may be in the same order as they were when the photograph was originally taken before the multiplexing step in the camera. This is shown in FIG. 49(*c*). The final step (which can be accomplished during the final projection) is magnification in the vertical direction so as to bring the dimensions in the vertical direction into correct proportion when the three-dimensional image is produced. This is shown in FIG. 49(*d*).

Figure 50:
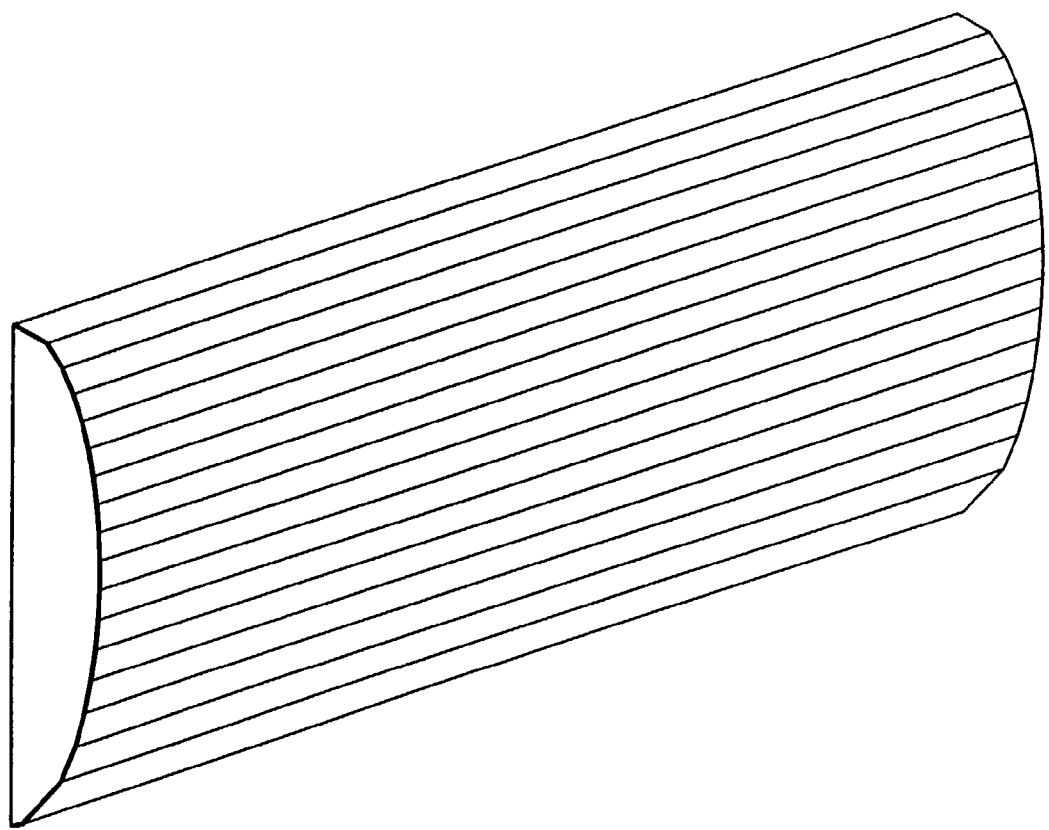
FIG. 50 is a drawing of an unmultiplexing prism.

The first step of separation can be accomplished either with the use of prisms (or mirrors) or the use of fiber optics. The former method must imply a multi-faceted prism of the type shown in FIG. 50, each face directing light in a different direction, one face corresponding to each vertical row. Fiber optics can be particularly useful for accomplishing this step, especially since the initial image upon which it is operating is magnified, and, therefore, possesses a reasonably low resolution.

The second step, which is the actual unmultiplexing step (placing the vertical rows side-by-side horizontally), can be accomplished by projection with lenses or by proper positioning with fiber optics. In the former method, at least one lens must be used to project each row, but more lenses can be used. A particular embodiment of this technique would be the fabrication of a combination lens, similar to a matrix lens array, having all the necessary directional lenses mated together in one structure. Using the latter method, both steps 1 and 2 can be combined. What would be needed here would be a fiber optics image dissector of the type shown in FIG. 6, a similar device which was used for the original multiplexing.

Figure 51:
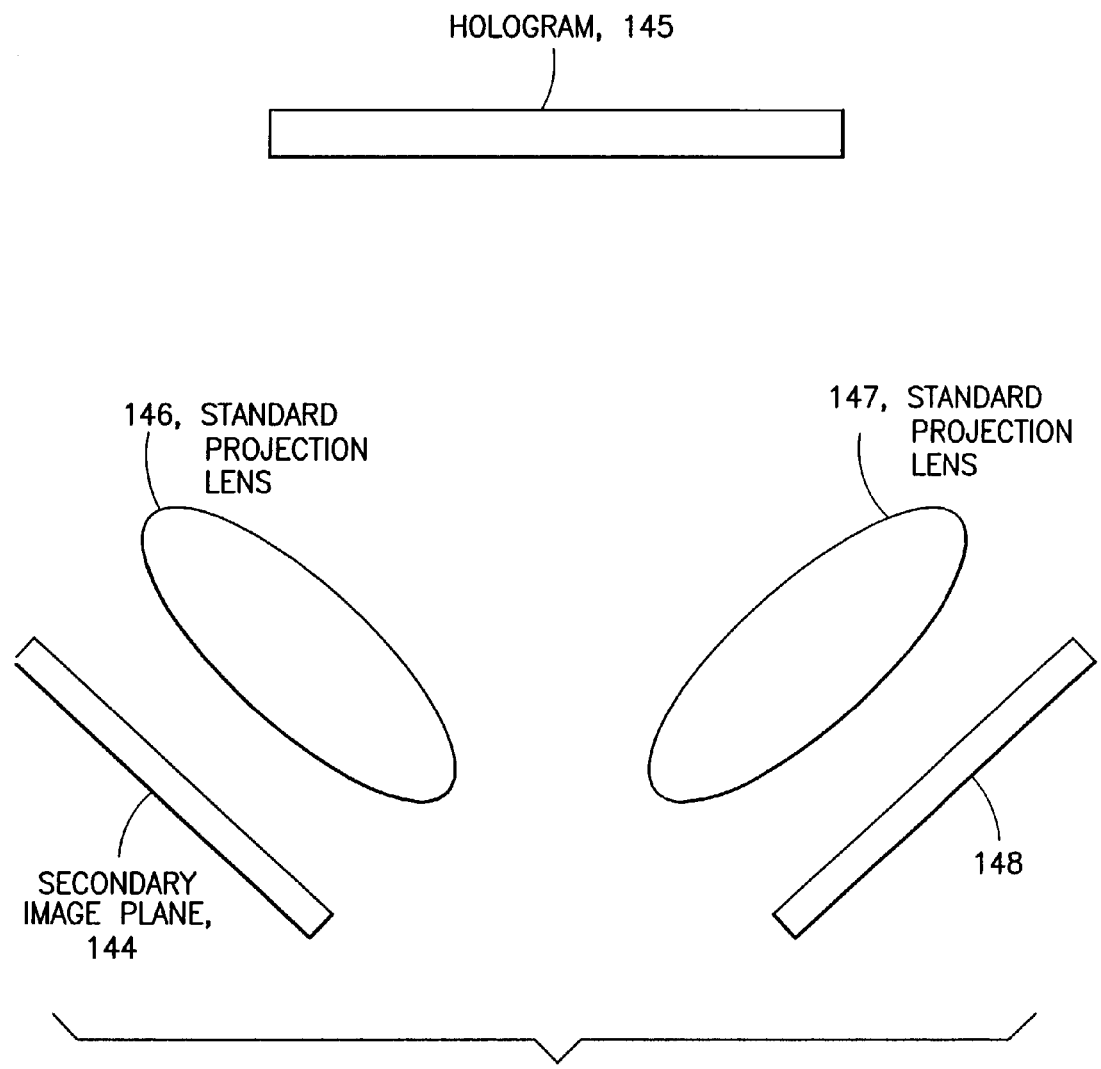
FIG. 51 is a schematic showing unmultiplexing using a holographic imaging device.

By far, the most practical method and the preferred embodiment of unmultiplexing is with the use of a holographic imaging device. Not only can the entire image unmultiplexing process be accomplished in one step using such an element, but so also can both the inversion of the image from pseudoscopy to orthoscopy and the final projection (if these steps are desired to be performed using this method). The utilization of the holographic imaging technique to perform these latter two functions will be discussed in the next two sections. The use of this method is shown in FIG. 51. The magnified image from the secondary image plane 144 is projected onto a specially prepared hologram 145, using a standard projection lens 146. The hologram is so designed that when illuminated with such a reference beam, it will generate an object beam which when projected through a second projection lens 147, will image onto another plane a picture having the vertical rows arranged side-by-side horizontally 148. (It will be shown later that it is highly desirable to replace the projection lenses by two matrix lens arrays.) The method to fabricate such a hologram can be illustrated using FIG. 51. Replace the secondary and unscrambled image planes (144 and 148 respectively) by diffusing screens. Apertures must be used with both reference and object beams so as to direct the location, size and shape of each corresponding row between the secondary and unscrambled image planes. This holographic imaging device is then fabricated by the same method as that which is shown in FIG. 46 as previously described. (This is not to say that the holographic imaging device described here is the same as previously described and illustrated in FIG. 46, but only that it is fabricated in a similar manner.) Similarly, as with the previous holographic imaging device, an aperture could be used with the photographic plate to solve the problem of emulsion reciprocity, or the short-burst method can be used.

Figure 52:
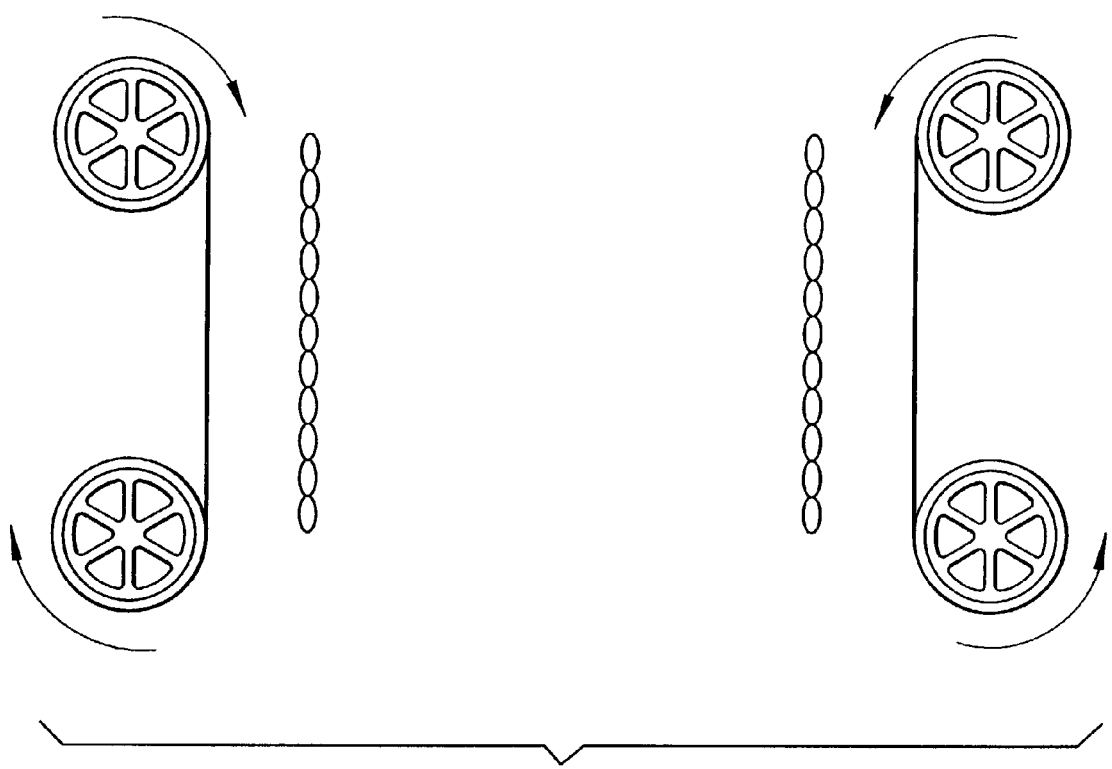
FIG. 52 is a schematic showing the standard method of image inversion.

A necessary step in either film processing or in projection is the inversion of the three-dimensional image from pseudoscopy to orthoscopy. Any integral photograph projected by the standard method to produce a three-dimensional image will also project a pseudoscopic image (i.e., three-dimensionally, the image will appear inside out). The standard method of inverting a pseudoscopic image is to reconstruct the three-dimensional image in the usual manner and then to re-photograph the reconstruction with a second camera. The reconstruction of this second film will produce a pseudoscopic image of the three-dimensional image which was photographed. Since, this image was originally pseudoscopic, the pseudoscopic reconstruction of this image would be orthoscopic. This method of image inversion is shown in FIG. 52. This technique has two major disadvantages. First, an intermediate processing step is required in which a second film must be made: second, there is an inherent resolution loss of $\sqrt{2}$ when going from one film to the other.

Figure 53A:
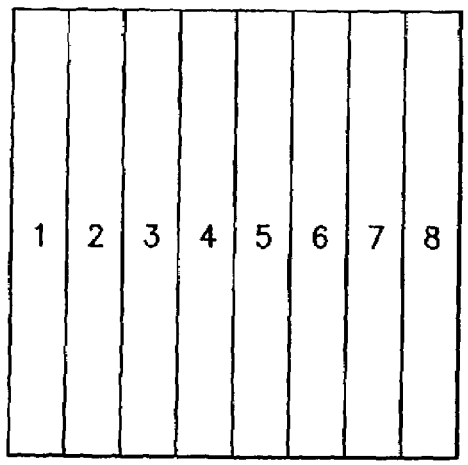
FIG. 53 shows how image inversion can be accomplished without loss of resolution.
Figure 53B:
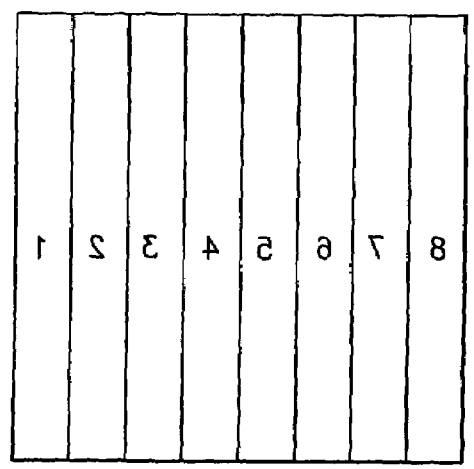
Figure 53C:
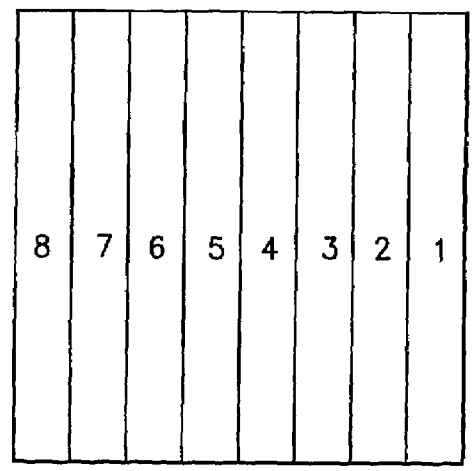

There is another basic method of producing orthoscopic images from pseudoscopic images which will not incur this resolution loss. This method is new and novel. The basic principle is quite simple. Referring to FIG. 53, if the film format shown in FIG. 53(*a*) produces a pseudoscopic image, then it can be shown by an optical analysis of what a second film record would look like were three-dimensional image from FIG. 53(*a*) to be photographed, that the film format of both FIGS. 53(*b*) and (*c*) would produce an orthoscopic mirror image of the pseudoscopic three-dimensional image produced by the format of FIG. 53(*a*), while format of FIG. 53(*c*) will produce a correct orthoscopic image.

The method for image inversion which is to be discussed here will concern itself only with its performance in the projector. Any intermediate processing where another film must be prepared will be discussed in a later section. The proposed method is to perform this inversion during unmultiplexing when a holographic imaging device is used (refer to FIG. 46). In this case, each element would be mirror image inverted, but the order of the elements could be kept in-tact holographically. In fact, the elements can be holographically arranged in any order that is desired.

Figure 54:
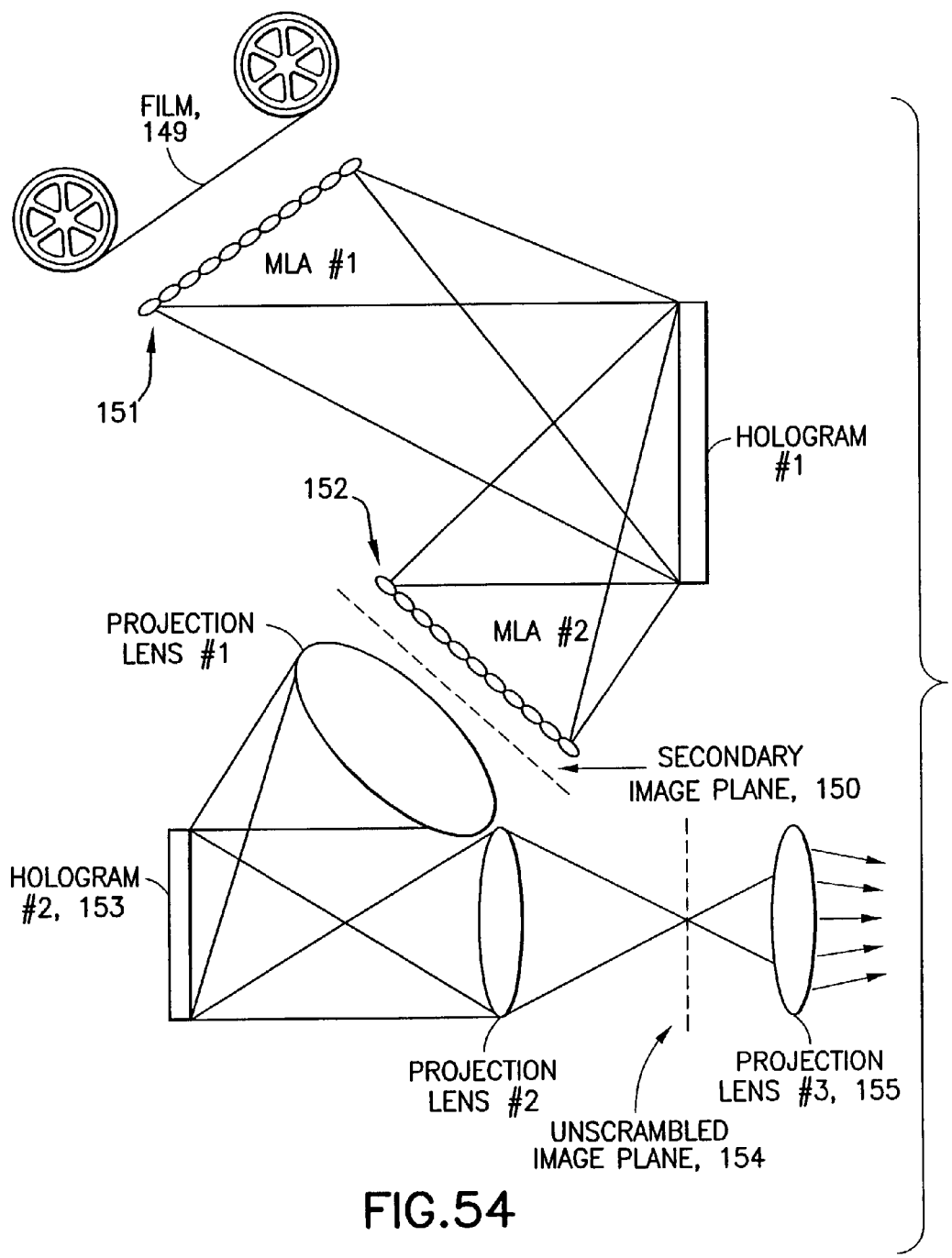
FIG. 54 is a schematic showing the optics of the preferred embodiment of the holographic projector.

Holographic imaging devices can be used with more-or-less standard, inexpensive lenses to accomplish all projection functions. FIG. 54 shows the final schematic configuration of this type of projector. This represents the preferred embodiment of the optics of the holographic projector. The image on the film 149 is first magnified onto a secondary image plane 150 holographically using two matrix lens arrays, 151 and 152, by the concept shown in FIG. 46. This magnified image is then used as the reference beam for the second hologram 153 so as to reconstruct a magnified, unmultiplexed, inverted image on the unscrambled image plane 154. This unscrambled image plane can either be an intermediate plane or the screen itself. In the configuration shown, it is an intermediate plane, and a position adjustable projection lens 155 is used to project the image formed at this plane onto the screen. No diffuser plates are needed at the intermediate image planes (although they can be used if necessity dictates), and their use is undesirable since they add greatly to the required illumination levels. The only non-holographic optical elements in the projector are either simple projection lenses or matrix lens arrays. Therefore, the holographic projector represents a far simpler system than the projector using more conventional optics.

The secondary projection system will now be discussed. The final projection lens should be basically defined by equations [45], [46], [47] and [48], where h and w are the dimensions of the image on the secondary image plane. However, the magnification of this system in the horizontal direction is very close to one. This means that the horizontal element of the projection lens must be positioned midway between the projector and the screen. This is highly impractical.

Figure 55A:
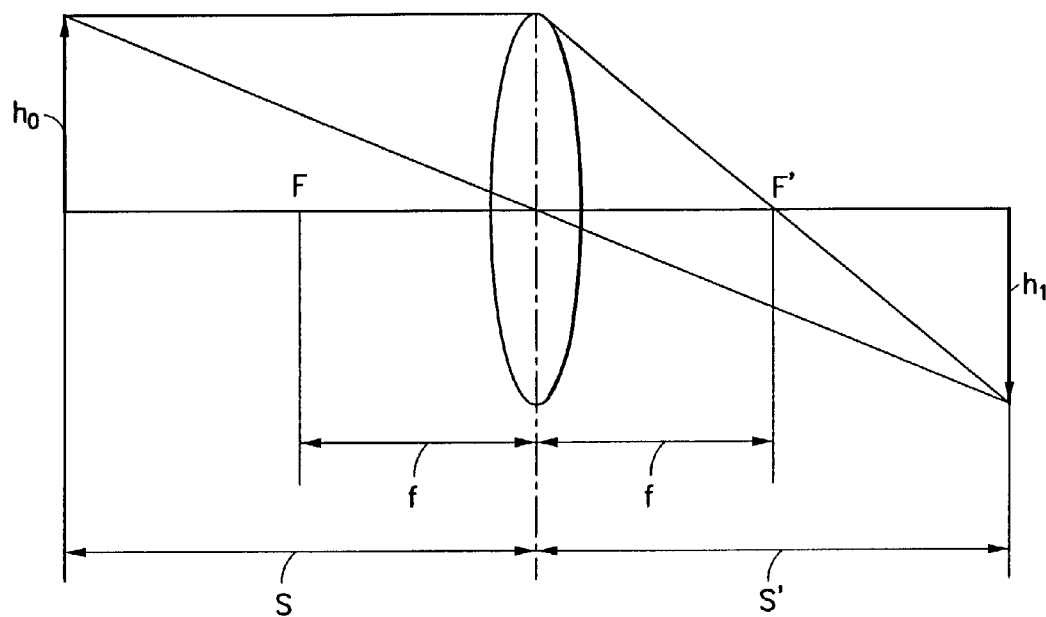
FIGS. 55(a) and (b) are optical ray traces used for the design of the lenses for final projection.

In actuality, the ratio of the magnification in the vertical direction to that in the horizontal direction is 18.28·1. As an example, for a ten-meter wide screen, the vertical magnification is 104 while the horizontal magnification is 5.69. FIG. 55(*a*) shows the arrangement for projection of an image by a simple projection lens. $h_o$ represents the object whose image is to be projected while $h_i$ represents the projected image itself. For simplicity, the object to be projected is represented by an arrow, and, therefore, so also is the projected image. f is the focal length of the lens, and s and s' represent the distances of the lens from the object and image planes respectively. The magnification M is given by:

$$M = \frac{h_1}{h_0} = \frac{s'}{s}$$

Figure 55B:
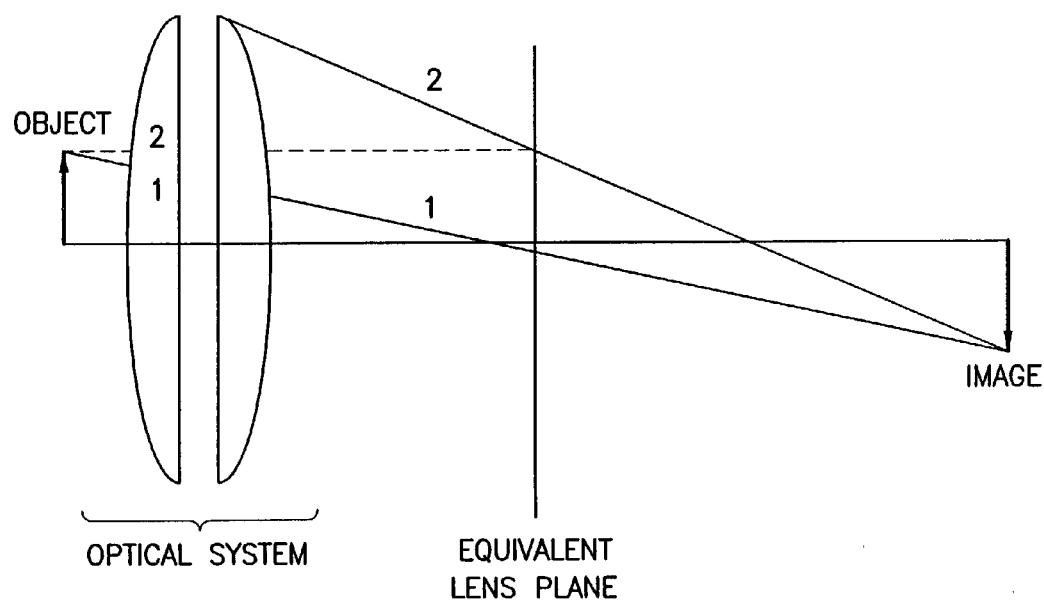

Obviously, if (s+s') is large as it would be in a large movie theater, and if, in addition, the magnification is small, then the lens must be placed at a great distance away from the object or film plane. This is highly impractical An alternative lens system for the horizontal direction to that just described is shown in FIG. 55(b) The lens system shown here will direct all rays from the object plane to the image plane, and yet, will be located close to the object plane, thereby making it possible to project a low magnification image in a theater situation. FIG. 56 schematically illustrates just such a lens example. This lens system is a basic three cylindrical element, anamorphic lens system. The first lens, a positive cylinder, serves to magnify in the vertical direction, while the second two lenses, a negative plus a positive cylinder, serves to magnify in the horizontal direction. The screen is ten meters wide by five meters high, and the theater is approximately sixty meters long. The dimensions of the lenses along with their focal lengths are shown in the figure. The horizontal magnification is 5.69 while the vertical magnification is 99.0.

The exact design of this lens system is not included here. Even were the exact system described in FIG. 56 to be needed, the lens system shown in the figure only indicates a first order solution. To reduce abberation and distortion, each lens in the optical system is, in itself, a multi-element lens. Therefore, approximately a dozen lenses will be required in this lens system. Even though this lens is a complex optical system, it is possible to use such a lens to adequately project the highly anamorphic image onto the screen.

As has been mentioned many times before, it is essential that the projected image be registered on the screen to very close tolerances. This registration must be performed in three directions: the horizontal and vertical directions and the focus. Registration in the horizontal and vertical directions can be best accomplished by using Moiré Patterns created by circular bulls-eyes. One bulls-eye would permanently be affixed to the screen, and a second would be projected onto the screen by the projector. Both bulls-eyes, when superimposed on each other on the screen, will be the same size. Should the images be misregistered, a Moiré Pattern would appear. When the Moiré Pattern disappears, the projector is positioned so that the projected image is properly registered on the screen. An electronic servo-mechanism would insure proper registration by this method.

To insure proper focus, several automatic focusing devices can be used. Such a device could be a cadmium sulfide (CdS) photocell with indium (In) electrodes. Should this automatic focusing device be positioned on the screen, and should a portion of the image be projected onto this device, an electronic signal would insure that the image is properly focused.

The same techniques which are used to register and focus the image on the screen, can also be used for the intermediate image planes within the projector.

The illumination system will now be discussed. The brightness of an image viewed from the screen depends upon the size of the theater, and, therefore, from our human engineering considerations, the size of the screen. For a 10×5 meter screen, whose area is 538 square feet, the brightness of the image should be 867 foot-lamberts The screen is divided into alternating red, green and blue vertical zones. 18.82% of the spectrum of the incident light is used for the red portion of the image, 38.2% is used for green and 13.18% for blue. Since these vertical elements are so small as not to be resolved, there is a summing of these colors, and the efficiency can be averaged at 23.4% This means that whenever color images are produced from black-and-white film by an additive process of three colors, the image brightness is only 23.4% of what it would have been by a standard color projection process. (This statement also holds true for the standard methods of producing color television pictures.)

Since the most preferred configuration of the screen is to construct it as a reflection hologram, as is shown in FIG. 31, the diffraction efficiency (conservatively speaking) should be approximately 80%. The overall efficiency of our three-color holographic screen is, therefore, 18.7%.

The incident illuminance must be 867÷0.187 or 4,630 foot-candles×538 square feet or approximately 2.5-million lumens. To calculate the optical system efficiency, assume that 70% of the light is collected by a very efficient condenser, and that 80% of the light is transmitted through the condenser. Furthermore assume that 85% of the light is transmitted through the film. To calculate the efficiency of the projection system, assume an optical system for projection to consist of:

| ELEMENT | EFFICIENCY |
| --- | --- |
| Matrix Lens Array #1 | 0.92 |
| Hologram #1 | 0.80 |
| Matrix Lens Array #2 | 0.92 |
| Projection Lens #1 | 0.85 |
| Hologram #2 | 0.80 |
| Projection Lens #2 | 0.85 |
| Projection Lens #3 | 0.85 |

This is the projection system shown in FIG. 54. The total projection optics efficiency is 0.333. Assume a 33.3% efficiency. Therefore, the overall optical system efficiency is 15.85%.

$$\text{TOTAL FLUX FROM SOURCE} = \frac{2.5 \times 10^6}{0.1585}$$
$$= 1.575 \times 10^7 \text{ lumens}$$

or 15-million lumens.

Figure 57A:
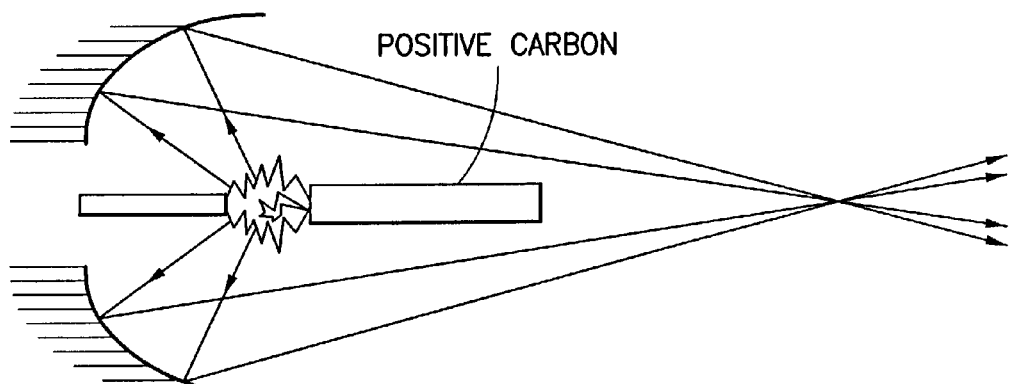
FIG. 57 is a schmatic showing two types of carbon arc lamps.
Figure 57B:
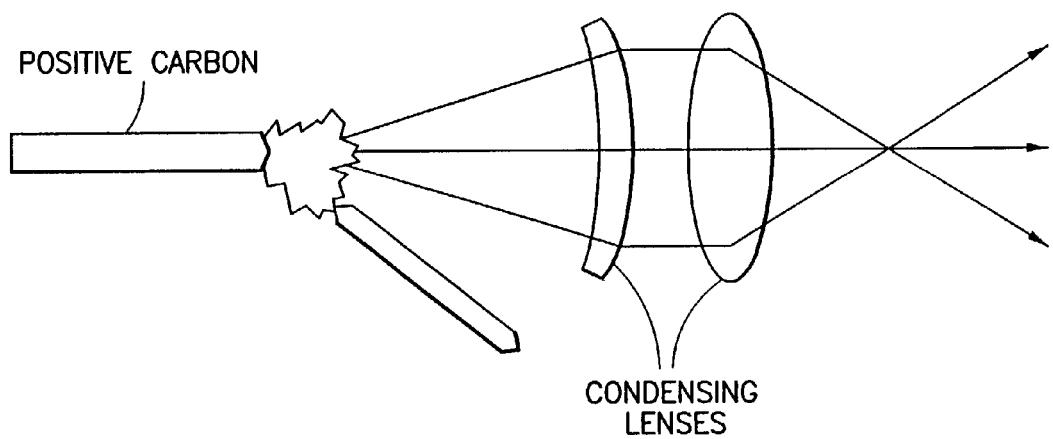

The brightest source of incoherent illumination is the carbon arc. Rods of carbon from 6–12 inches in length and from ¼-inch to ½-inch in diameter are placed either horizontally, as shown in FIG. 57(a), or at an angle, as shown in FIG. 57(b). FIG. 57 shows two types of carbon arcs:

(a) with condensing mirror for moderately sized motion picture theaters, and (b) with condensing lenses for large motion picture theaters.

Sometimes, the carbon rods are copper coated to improve electrical conductivity. To start a carbon arc, the two carbons are connected to a 110-V or 220-V DC source, are allowed to touch momentarily, and are then withdrawn. Intense electron bombardment of the positive carbon causes an extremely hot crater to form at the end of the positive carbon. This end, at a temperature of approximately 4,000° C. is the source of light. An electric motor or a clockwork mechanism is used to keep the carbons close to each other as they burn away Carbon arcs are used in all motion picture theaters, where they operate on from 50 to several hundred amperes. Extremely high intensity carbon arcs use much electric power, generate much heat and must be water cooled.

Figure 58A:
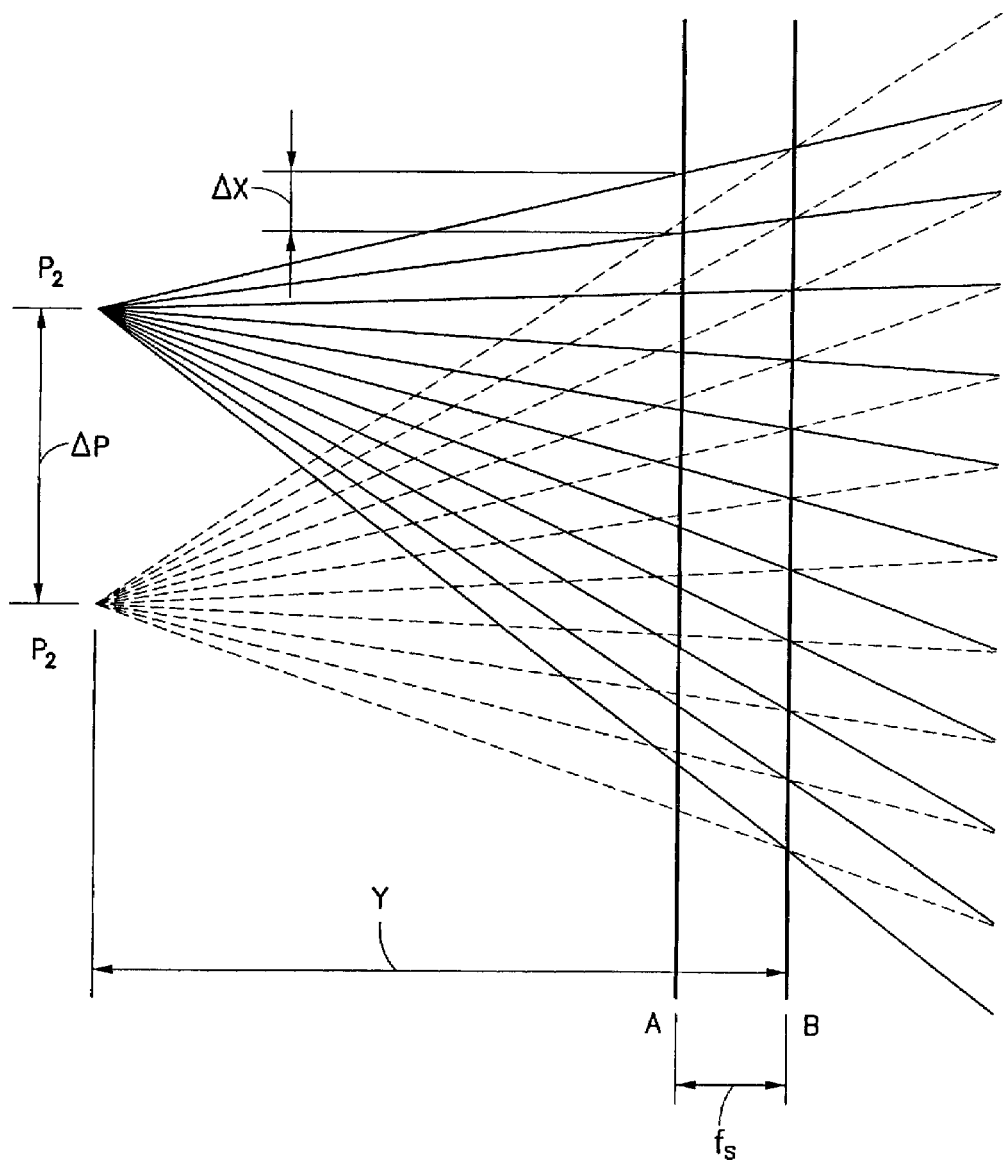
FIG. 58(a) is an optical ray trace of misregistration of virtual images due to vibration.
Figures 58B, 58C, 58D:
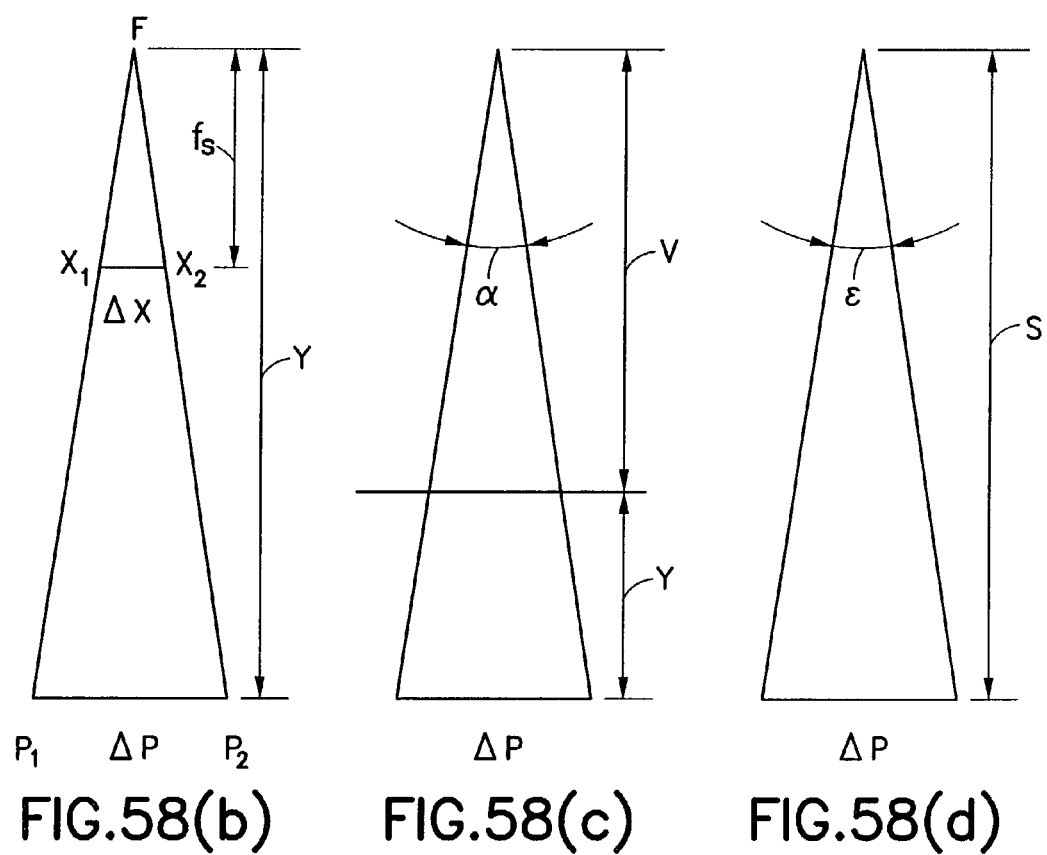
FIGS. 58(b), (c) and (d) are geometric figures needed for misregistration calculations.

We now turn to an analysis of the problem of picture jitter on the screen and stabilization. Previously, when discussing the camera design, a specific analysis was performed for misregistration due to motion of the film. The requirements for stabilization and methods for implementing strict film registration were discussed. At this point, a re-analysis of the problem will be performed with emphasis on the projector motion. FIG. 58(*a*) shows the effect which misregistration of a point on the screen has on the three-dimensional virtual image. A is the screen onto which the projector image is focused, $f_s$ is the focal length of the screen lenticules, and B is the central plane of the screen lenticules. (For a front projection, B is the central plane of the focal points of the cylindrical elements.) Y is the distance of the three-dimensional virtual image of the point P from the screen. Should the projected two-dimensional image of the point on the screen be misregistered by a distance $\Delta x$, the virtual image of point P will be misregistered by a distance $\Delta P$. Referring to FIG. 58(*b*):

$$\frac{\Delta x}{\Delta P} = \frac{f_s}{Y}$$

In the case of the holographic front projection screen:

$$\frac{\Delta x}{\Delta P} = \frac{f_s}{f_s + Y} \approx \frac{f_s}{Y}$$

Now, referring to FIG. 58(*c*), we can see the maximum misregistration $\Delta P$. The viewer closest to the screen is positioned at the apex of the triangle, and V is the distance of this viewer fro the screen.

$$\Delta P = (V+Y)\alpha$$

where $\alpha$ is the angle of minimum visual acuity. Substitute this expression in the previous one, we obtain:

$$\Delta x = \frac{f_s}{Y} \Delta P$$
$$= \frac{f_s \alpha}{Y}(V+Y)$$
$$= f_s \alpha \left(\frac{V}{Y} + 1\right)$$

Let V=EW where W is the width of the screen, and E is a factor indicating the minimum distance at which a viewer can be from the screen. Therefore:

$$\Delta x = f_s \alpha \left(\frac{EW}{Y} + 1\right)$$

But $\frac{f_s}{f_c} = \frac{W}{n\phi}$ $$f_s = \left(\frac{f_c}{n\phi}\right) W$$

Let $K = \frac{f_c}{n\phi} = \frac{(F/\#)}{n}$

K is a characteristic of either the camera or the screen. Therefore, $$x = KW\alpha\left(\frac{EW}{Y}+1\right) \qquad [50]$$

$\Delta x$ is the maximum tolerable lateral movement of the projector. To find the minimum allowable $\Delta x$, we must look at the point in space upon which a small deflection $\Delta x$ would have the greatest effect $\Delta P$. Such a point exists where Y is at infinity. Therefore the minimum allowable lateral deflection is:

$$\lim_{Y \to \infty} \Delta x = KW\alpha \qquad [51]$$

Referring to FIG. 58(*d*), we can calculate the maximum tolerable angular movement:

$$\in = f_s \alpha \left(\frac{E}{\wp Y} + \frac{1}{\wp W}\right)$$

where $\wp$ is defined by equation [44] and s is defined in FIG. 58(*d*).

$$\in = \frac{f_s \alpha}{\wp}\left(\frac{E}{Y} + \frac{1}{W}\right)$$
$$\in = \frac{K\alpha}{\wp}\left(\frac{EW}{Y} + 1\right) \qquad [52]$$

Once again, the minimum allowable angular movement is given by:

$$\lim_{Y \to \infty} \in = \frac{K\alpha}{\wp} \qquad [53]$$

To perform a typical calculation assume: (F/#)=1.7, n=1, 734, W=10 meters =10,000 mm, $\wp$=6, and $\alpha$=2.91×10$^{-4}$ radians. (It will be shown later that for objects at infinity, this angle is much larger by a factor of n/R$\phi$, where R is the resolution of the film.) R=400 lines/mm and $\phi$=1 mm. Therefore, $\alpha$=1.262×10$^{-3}$ radians K=9.8×10$^{-1}$. $\Delta x^{min}$=1.237×10$^{-2}$ mm or approximately 12 microns or 0.0005 inches. $\in_{min}$=2.06×10$^{-7}$ radians=3.28×10$^{-6}$ arc-seconds.

Lateral sideways motion can be eliminated, or reduced to the desired 0.0005 inches by firmly anchoring the projector, and making it more massive. Most of the machine produced vibrations will not orient themselves in this direction. Rotation around both the X-and Z-axes (refer to FIG. 16) can be eliminated both by firmly anchoring the projector and by placing a gyroscope along the Y-axis. This firm anchoring can be accomplished by building a massive concrete table for the projector with the center of the lens positioned directly above the center of gravity of the table. Because no integral imaging is performed in the vertical direction, vibrations causing vertical translation are not important. Forward translation will cause a non-critical defocusing of the image. Finally, after the aforementioned steps are taken to eliminate motions in all of the indicated directions, the one remaining direction, namely Y-axis rotation, will automatically be taken care of.

Using the previous theoretical analysis to calculate the minimum allowable film motion:

$$\frac{\Delta X_{min}}{\Delta F_{min}} = \frac{W}{n\phi}$$

$$\Delta F_{min} = \left(\frac{n\phi}{W}\right)\Delta X_{min} \qquad [54]$$

In our example, $(n\phi/W)=0.1734$, and, therefore, $\Delta F_{min}=2.15$ microns.

This is easier to maintain than the one-half micron figure generated in previous theoretical analysis for the camera. However, it must be remembered that the value for a used in equation [51] is a factor of 4.34 greater than that used to evaluate equation [33]. The previously described film motion mechanism used in the camera, and shown in FIGS. 24(*a*), (*b*) and (*c*) can be used in the integral photograph projector. This mechanism can easily maintain film registration to the desired 2.15 microns.

The discussion now turns to the use of a projector designed to project magnified three-dimensional images from holograms.

It is well known that when a hologram is projected onto a screen in the conventional manner, its ability to reconstruct an image is lost. This is so because the diffracting properties of the surface or volume of the hologram are needed for image reconstruction, and projecting a hologram onto a screen would only produce a picture of light and dark lines on the screen. It is also well known that when a hologram is magnified photographically, its reconstructed image is demagnified. Therefore, a 70 mm hologram which is magnified to normal screen size, would produce an image so small as not to be seen except with a microscope. Furthermore, it is known that when a three-dimensional image is magnified, the magnification occurs disproportionately so that the depth magnification is equal to the square of the magnification in the length and width directions.

It would appear from the above discussion that the three-dimensional image reconstructed from a hologram cannot be magnified for display before a large audience. However, it is possible to apply the basic method of magnification and projection (as is used in the earlier part of this application for integral photographs) even to holograms. The entire key to the process is the conversion of the holographic image to a two-dimensional integral photograph. Once such an integral photograph is produced, it will not be difficult to magnify the three-dimensional image by the methods shown in previous discussions. What follows is, therefore, a discussion of the various methods of producing an integral photograph from a hologram, suitable for magnification. The methods discussed here are not expected to be all-inclusive, and are to be taken as examples only.

Figure 59A:
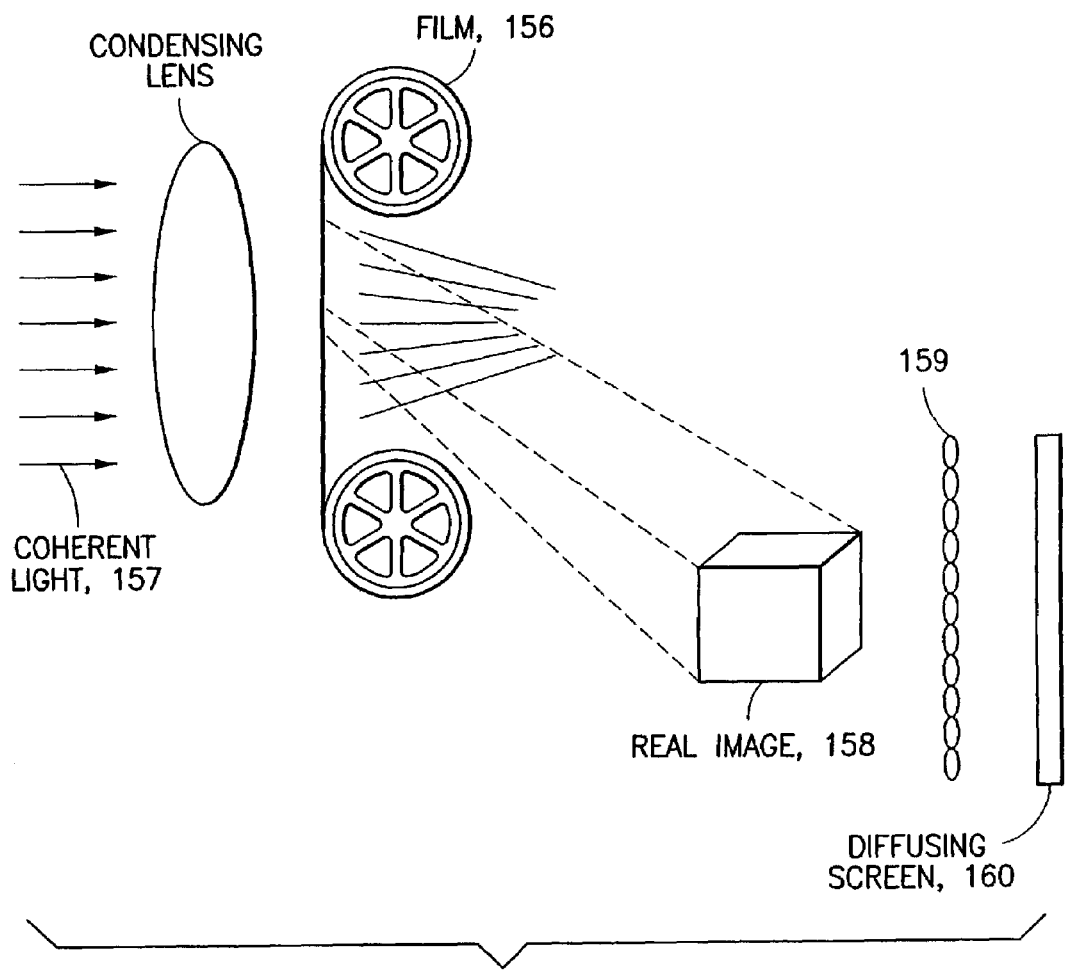
FIG. 59(a) is a schematic showing magnification of a reconstructed real three-dimensional image from a hologram.
Figure 59B:
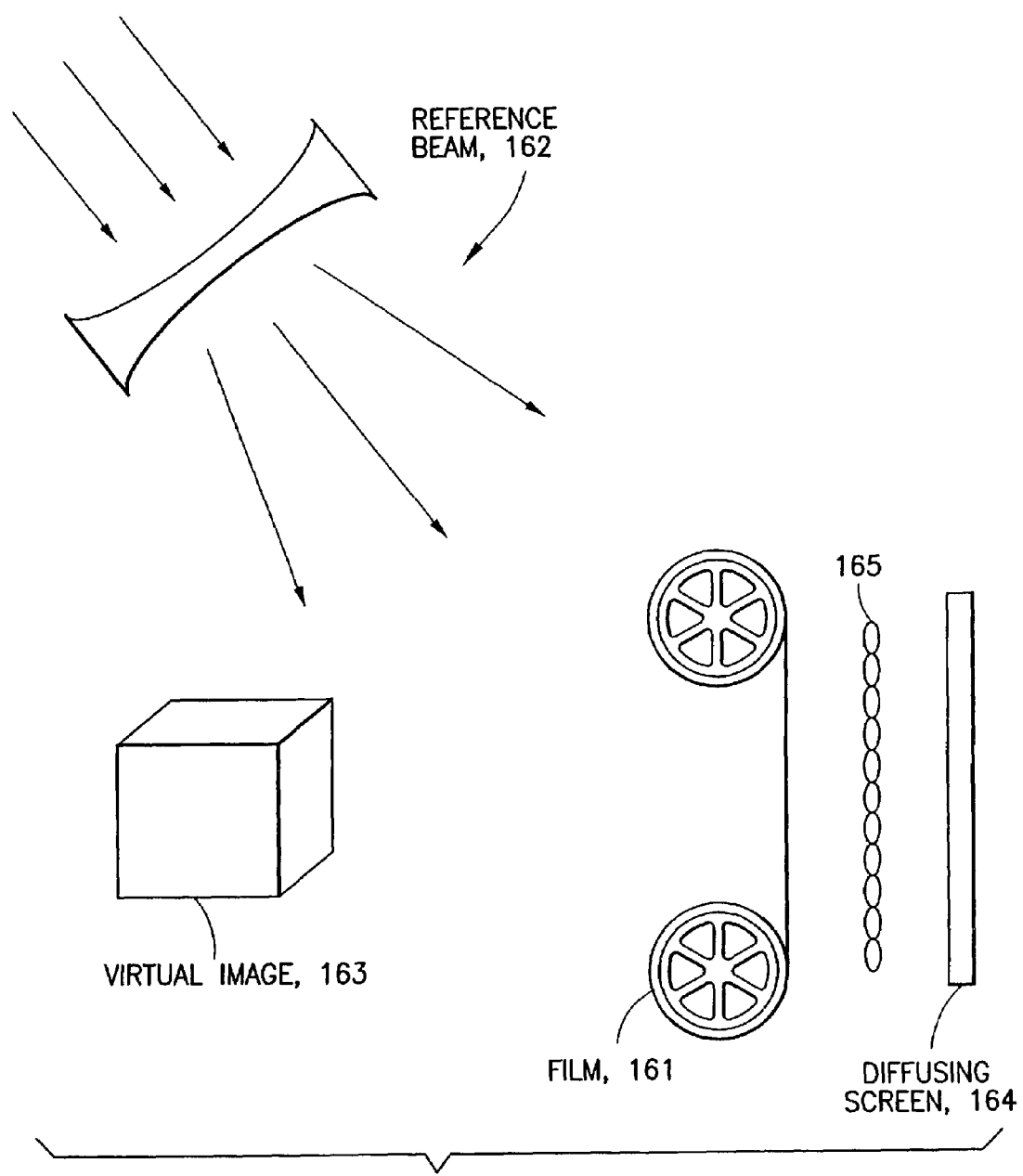
FIG. 59(b) is a schematic showing magnification of a reconstructed three-dimensional virtual image from a hologram.

For the method of direct integral photography of a holographic image, the three-dimensional image is reconstructed from a holographic film. This image may either be real or virtual. A matrix lens array produces the real-time integral photographic image of the object on a diffusing plate (not absolutely necessary) so as to be suitable for magnification and projection. FIGS. 59(*a*) and (*b*) show this method being applied to both real and virtual images projected from the holographic film. In FIG. 59(*a*), a holographic film 156 is illuminated with a reference beam 157 of coherent light. This causes the reconstruction of the real three-dimensional image 158 in space. This image is then transformed into an integral photograph using matrix lens array 159 on diffusing screen 160. Theoretically, there can be another film on the focal plane of the diffusing screen. However, the advantage of this method is that one can directly project the three-dimensional images from holograms for a large audience in a theater without an additional process For reconstruction of the image in the theater, one need only apply the image reconstruction optics previously described on the other side of the diffusing screen. FIG. 59(*b*) shows a similar process for a three-dimensional virtual image reconstructed from a hologram. Once again, holographic film 161 is illuminated with a reference beam 162 resulting in the reconstruction of the virtual image 163. An integral photograph of virtual image 163 is reconstructed on diffusing screen 165 using matrix lens array 164.

Figure 60A:
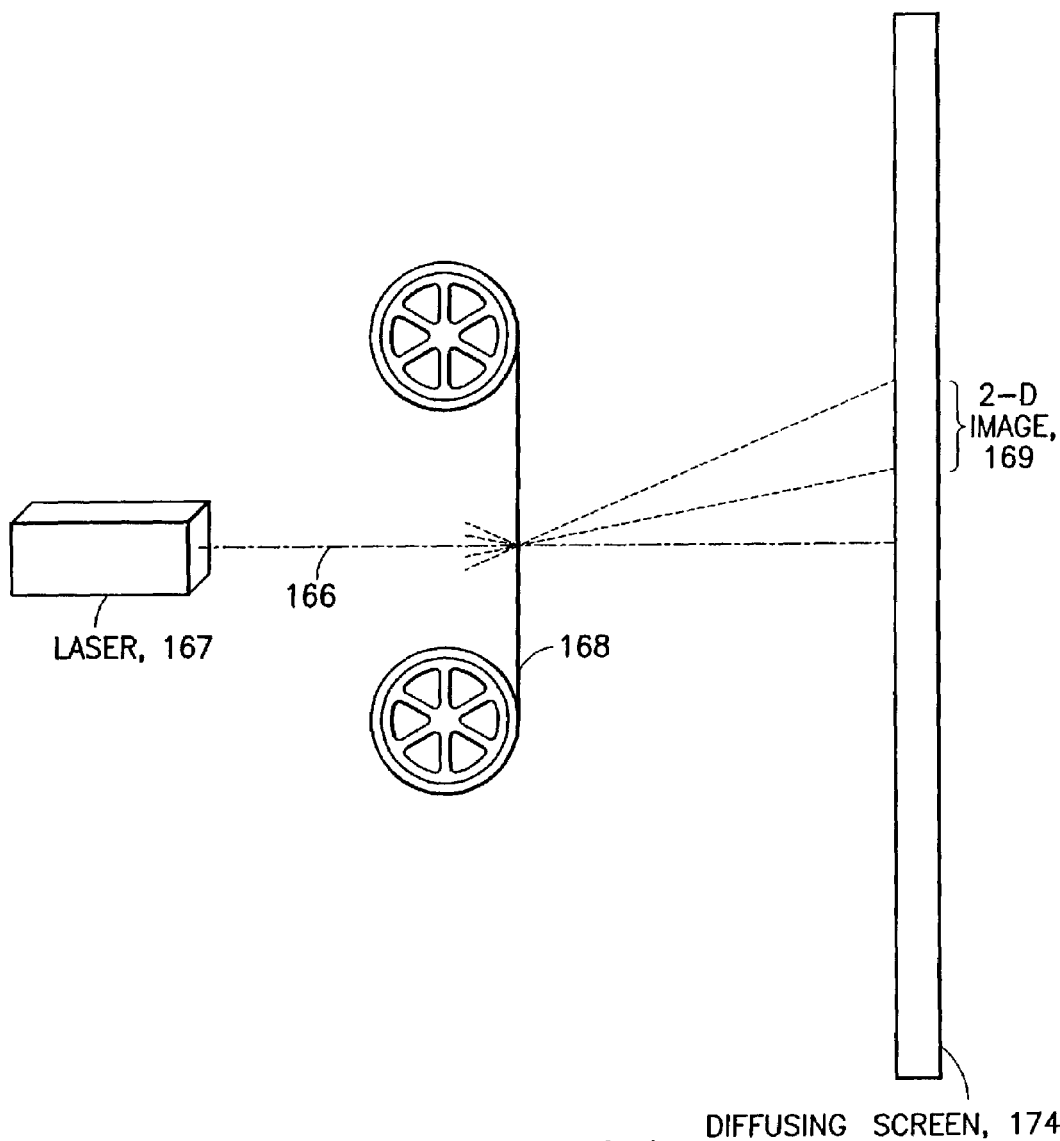
FIG. 60(a) is a schematic showing projection of a two-dimensional image from a hologram.
Figure 60B:
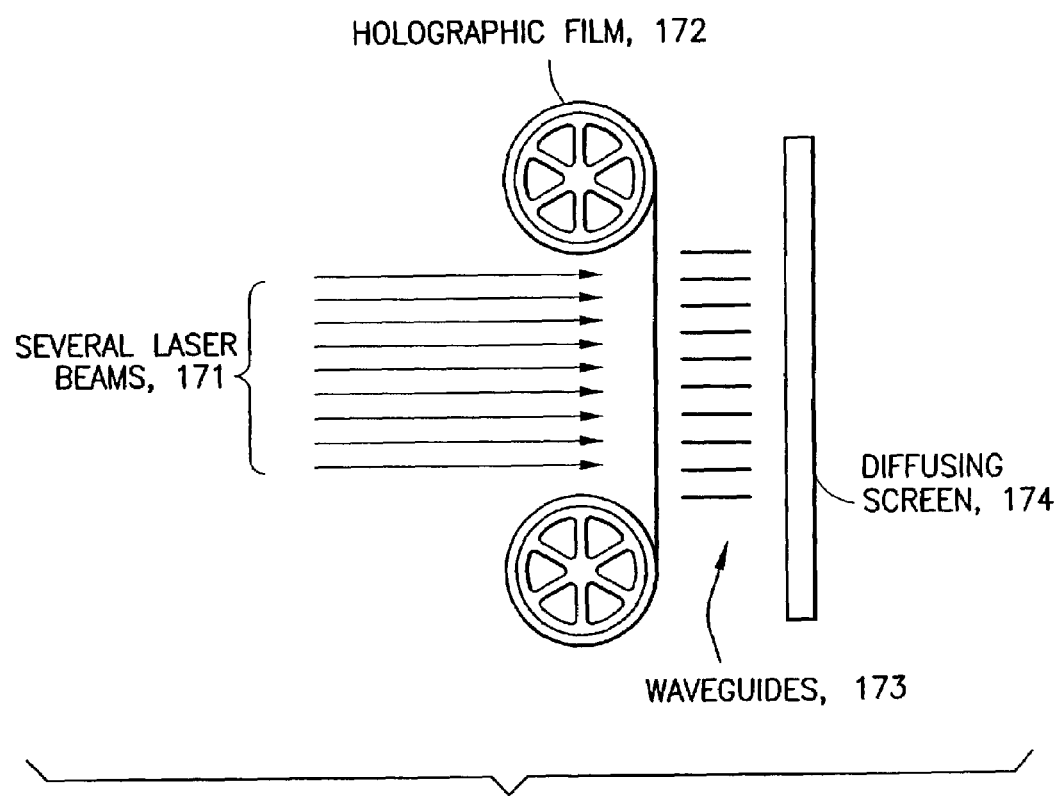
FIG. 60(b) is a schematic showing projection of an integral photograph from a three-dimensional hologram
Figure 61A:
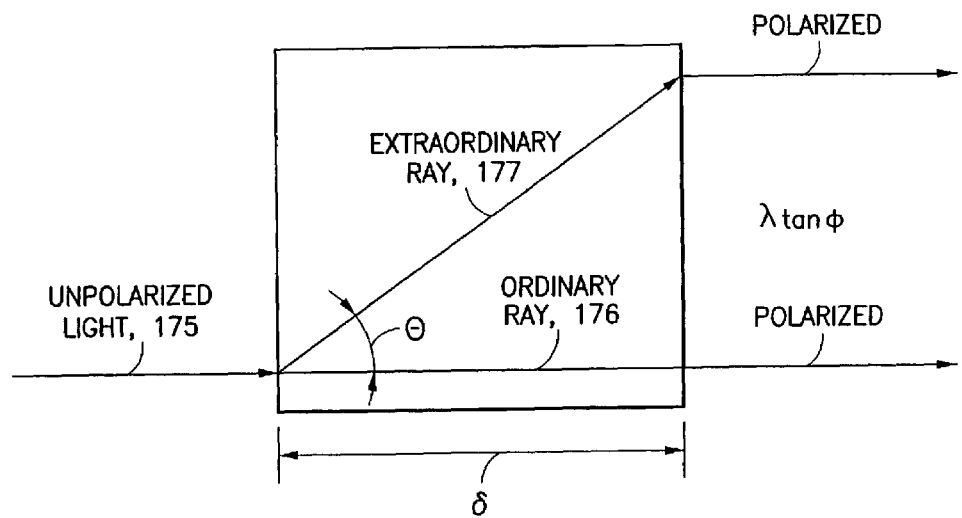
FIG. 61(a) is an optical ray trace and schematic showing the workings of a birefringent crystal.
Figure 61B:
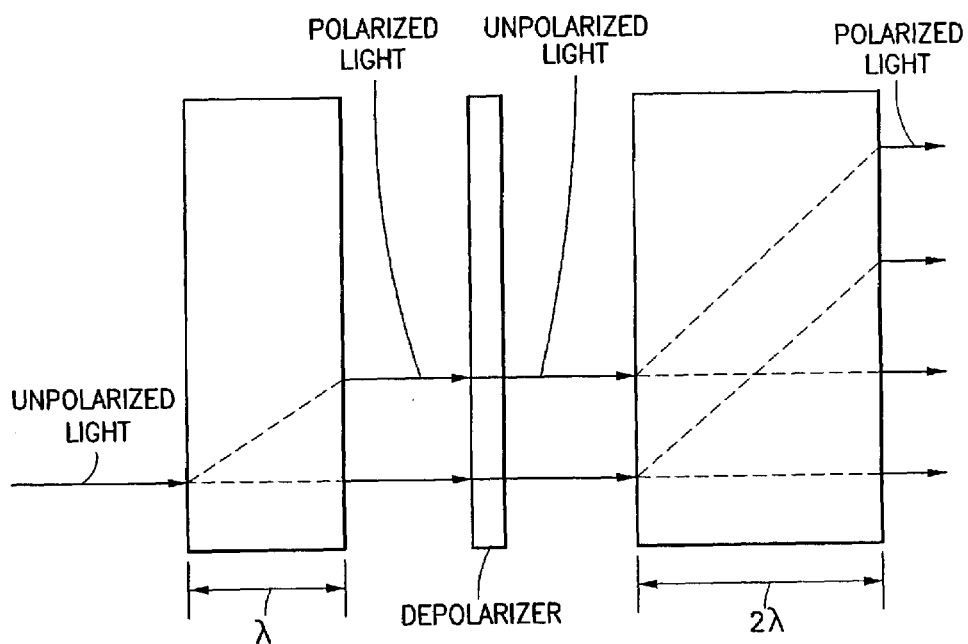
FIG. 61(b) is a schematic showing a method of obtaining parallel beams from one beam using birefringent crystals.
Figure 61C:
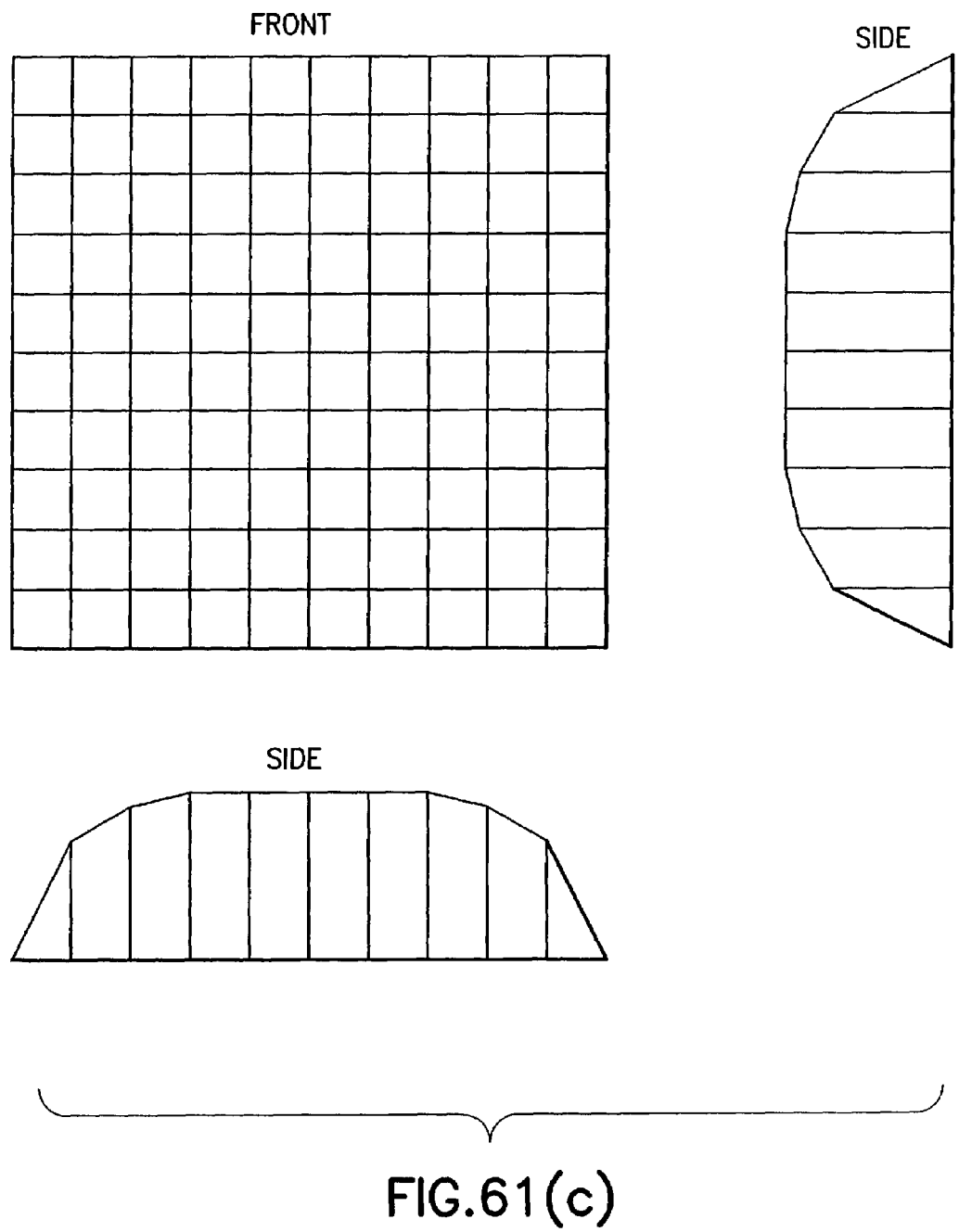
FIG. 61(c) is a drawing of a wedge plate.
Figure 61D:
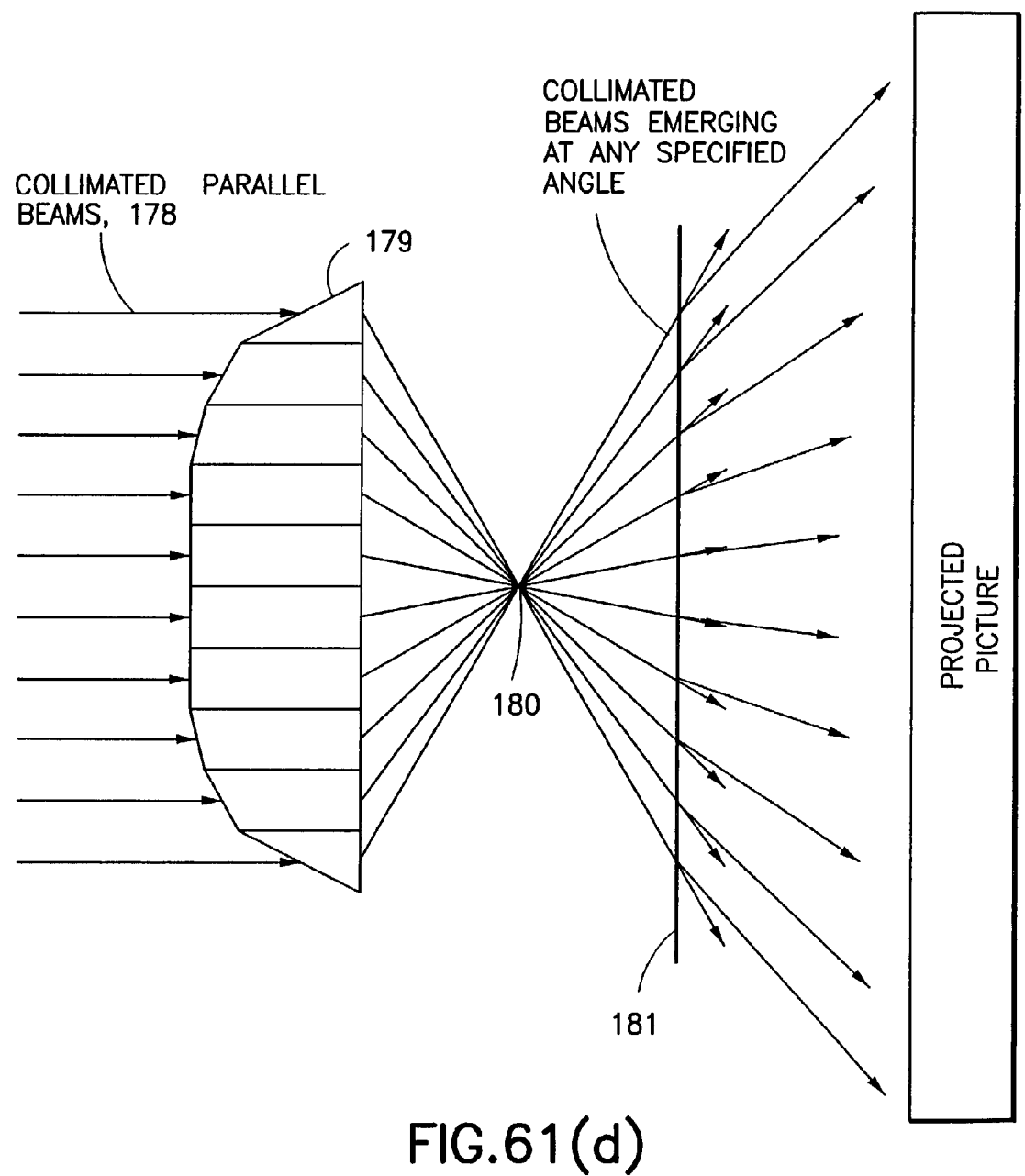
FIG. 61(d) is an optical ray trace and schematic showing how a wedge plate can be used to project an integral photograph.

The discussion now turns to the creation of an integral photograph of the three-dimensional image from multiple two-dimensional projections from a hologram. When a laser beam is allowed to impinge on a hologram, a real image of the object is projected. However, this real image will be representative only of that portion of the hologram upon which the laser beam impinges. If the diameter of the laser beam is small enough, the projected image will be two-dimensional, and will be representative of the entire object or scene as seen from a particular viewing angle. This is illustrated in FIG. 60(*a*). In the figure, optically unprocessed coherent light 166 emanating from laser 167 impinges on a holographic film 168 This causes a two-dimensional image 169 to appear focused on a diffusing screen 170. The smaller the aperture of the coherent light beam 166, the more in-focus the image 169 appears. This projected image 169 is equivalent to an element of an integral photograph. An aperture or waveguide placed by the hologram can effectively give the projected elemental photograph the desired shape. FIG. 60(*b*) shows how many of these elemental photographs can be produced in this manner. In the figure, several optically unprocessed coherent light beams 171 impinge on a holographic film 172 that is in contact with a wave guide 173. The waveguide is also in contact with a diffusing screen 174. The same number of two-dimensional images are produced on the diffusing screen 174 as there are laser beams 171. This method requires the use of several laser beams (as many laser beams are required as are elemental photographs) impinging on the hologram. FIGS. 61(*a*) and (*b*) show how many parallel laser beams can be produced using several birefringent crystals. Materials such as Potassium DiHydrogen Phthalate (KDP) exhibit the property of splitting a ray 175 into an ordinary ray 176 and an extraordinary ray 177 as is shown in FIG. 61(*a*). By using N crystals in series, the length of each, δ, being equal to twice the length of the previous crystal. $2^N$ parallel laser beams are produced from a single beam. FIGS. 61(*c*) and (*d*) show how, by the use of a specially designed prismatic wedge plate, a series of laser beams can be made to emanate from a point in space to impinge on the hologram. In FIG. 61(*d*), collimated coherent light beams 178 impinge on prismatic wedge plate 179. This is the same device illustrated in FIG. 61(*c*). This produces a series of laser beams that are focused at point 180. The same number of beams now diverge from the focal point 180 and impinge on hologram 181 thereby causing a series of two-dimensional pictures to be projected from the hologram. This projected image 169 is equivalent to an element of an integral photograph. An aperture or waveguide placed by the hologram can effectively give the projected elemental photograph the desired shape. FIG. 60(*b*) shows how many of these elemental photographs can be produced in this manner. In the figure, several optically unprocessed coherent light beams 171 impinge on a holographic film 172 that is in contact with a wave guide 173. The waveguide is also in contact with a diffusing screen 174. The same number of two-dimensional images are produced on the diffusing screen 174 as there are laser beams 171. This method requires the use of several laser beams (as many laser beams are required as are elemental photographs) impinging on the hologram FIGS. 61(*a*) and (*b*) show how many parallel laser beams can be produced using several birefringent crystals. Materials such as Potassium DiHydrogen Phthalate (KDP) exhibit the property of splitting a ray 175 into an ordinary ray 176 and an extraordinary ray 177 as is shown in FIG. 61(*a*). By using N crystals in series, the length of each, δ, being equal to twice the length of the previous crystal, $2^N$ parallel laser beams are produced from a single beam. FIGS. 61(*c*) and (*d*) show how, by the use of a specially designed prismatic wedge plate, a series of laser beams can be made to emanate from a point in space to impinge on the hologram. In FIG. 61(*d*), collimated coherent light beams 178 impinge on prismatic wedge plate 179. This is the same device illustrated in FIG. 61(*c*). This produces a series of laser beams that are focused at point 180. The same number of beams now diverge from the focal point 180 and impinge on hologram 181 thereby causing a series of two-dimensional pictures to be projected from the hologram.

Figure 62:
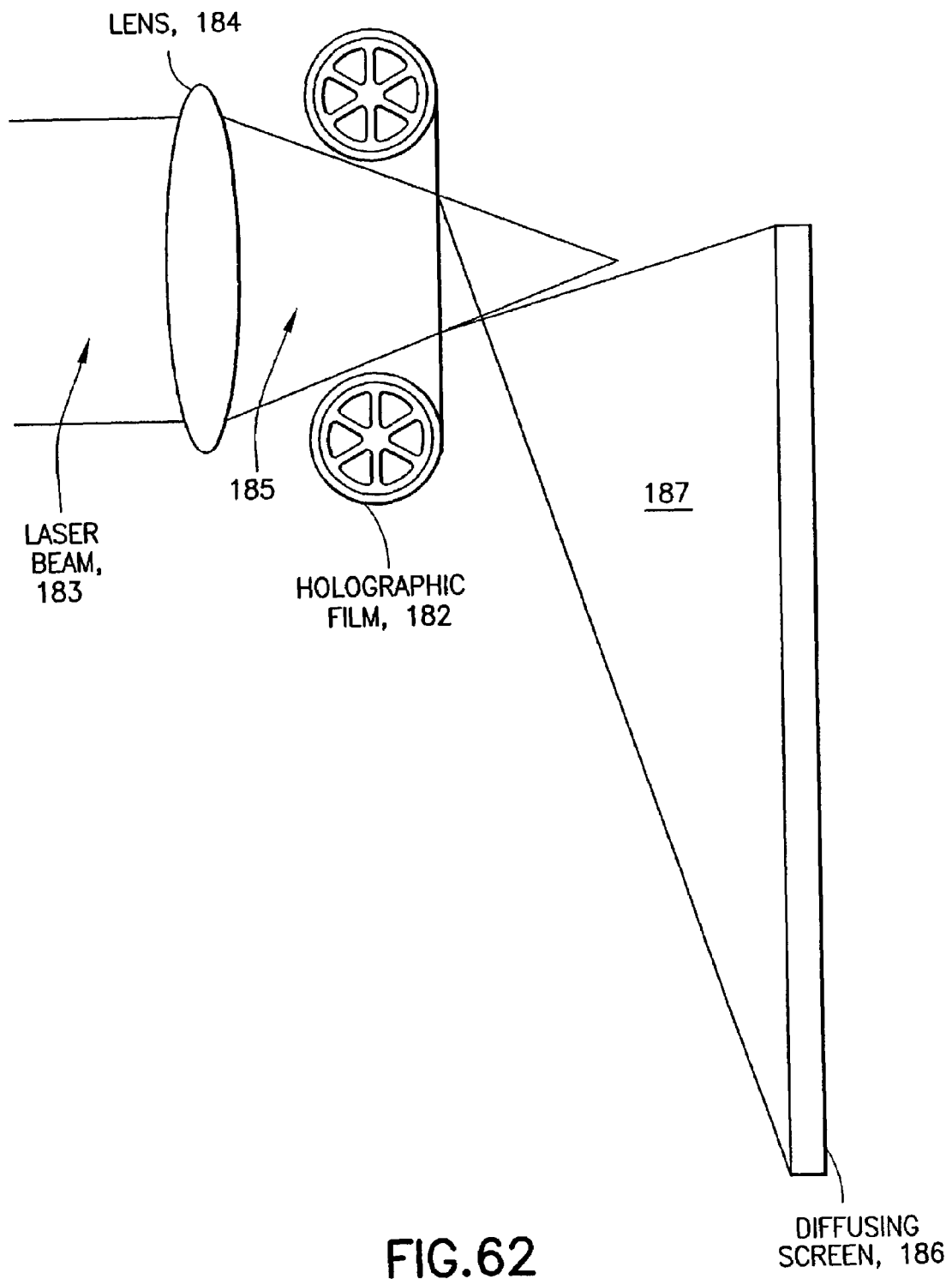
FIG. 62 shows the use of a hologram whose reconstructed real image is a two-dimensional integral photograph
Figure 63A:
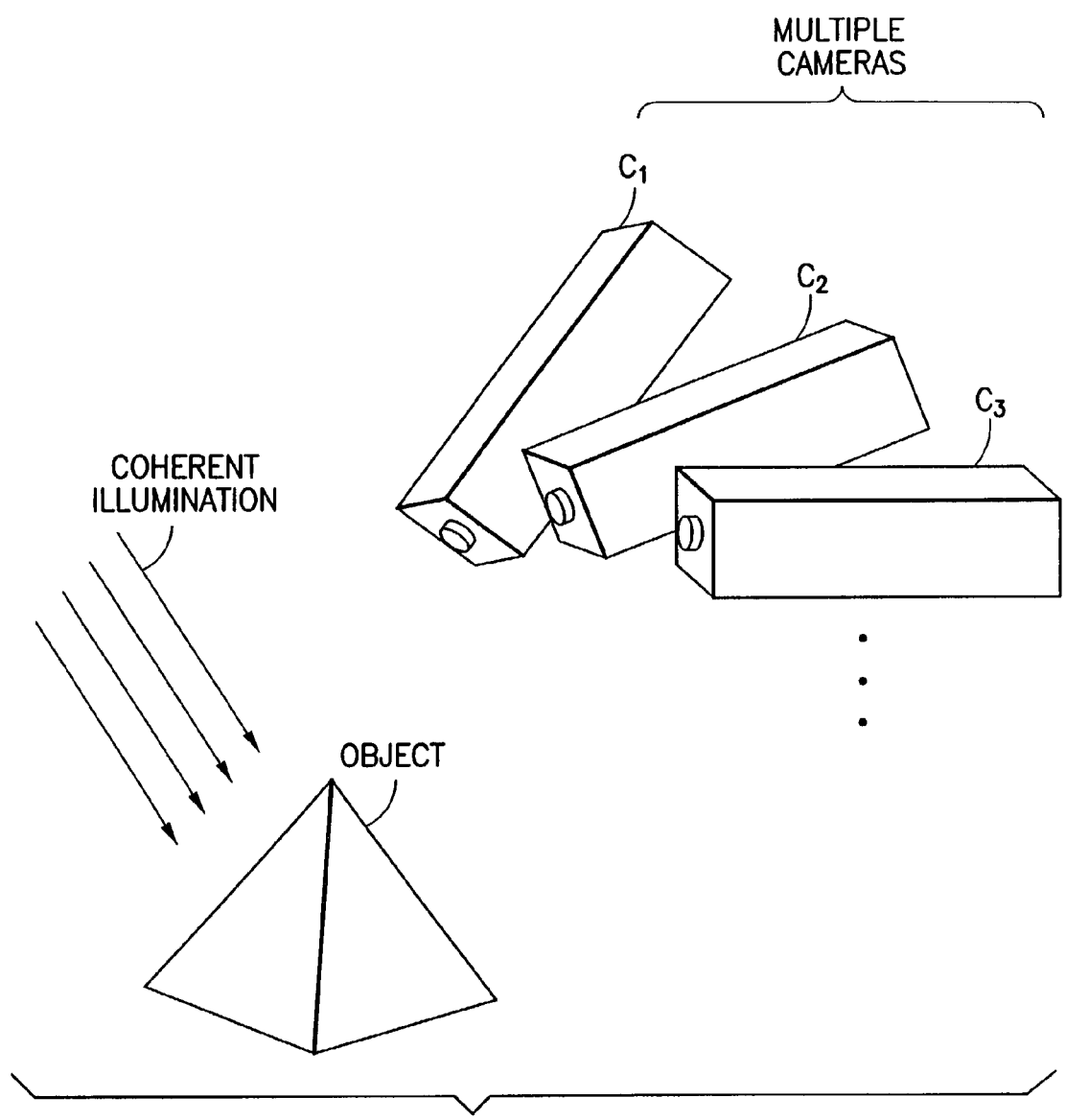
FIG. 63(a) shows a method of taking composite photographs.
Figure 63B:
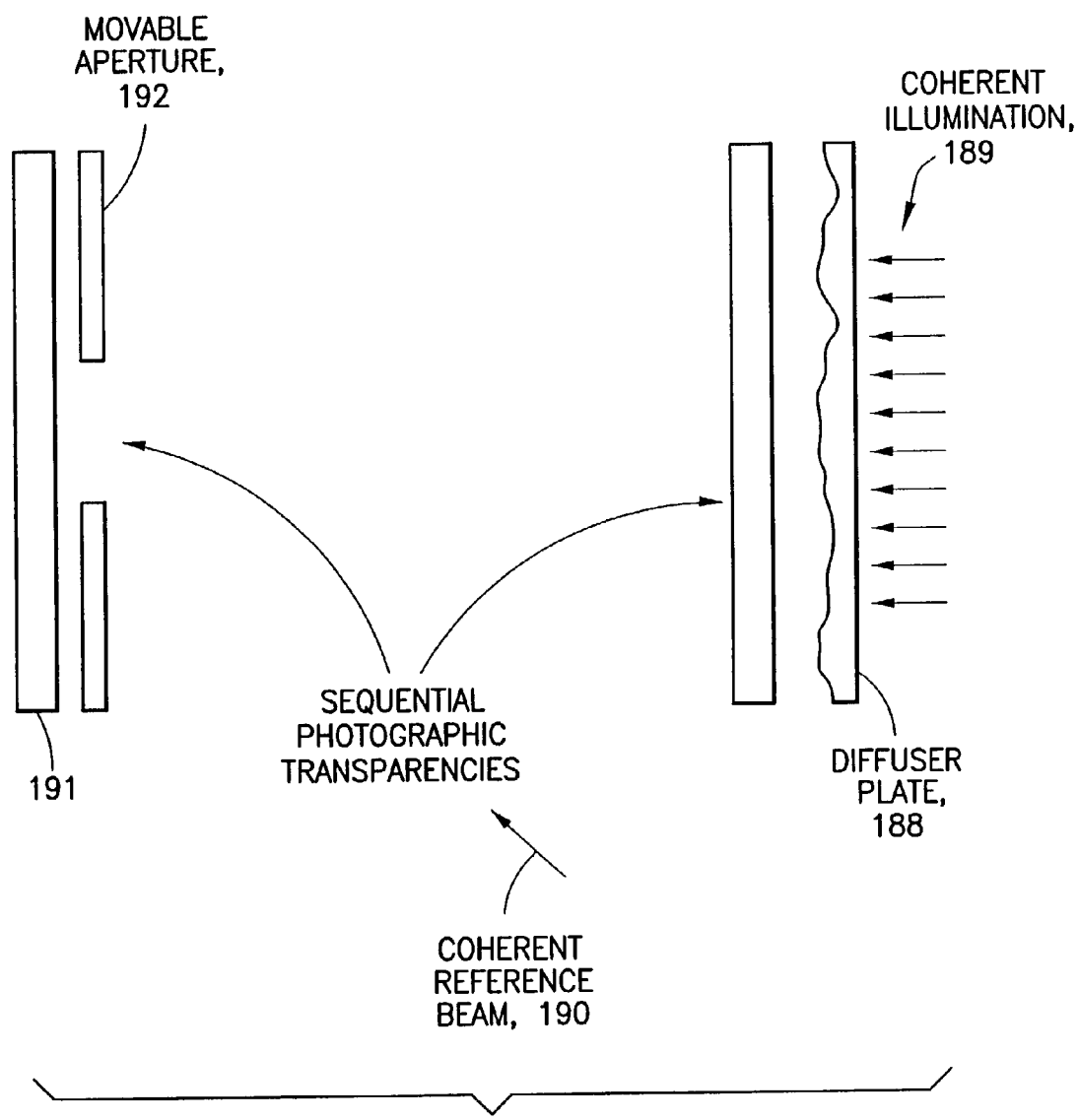
FIGS. 63(b) and (c) are schematics showing how the elemental photographs produced by the method of FIG. 63(a) can be converted to a hologram.
Figure 63C:
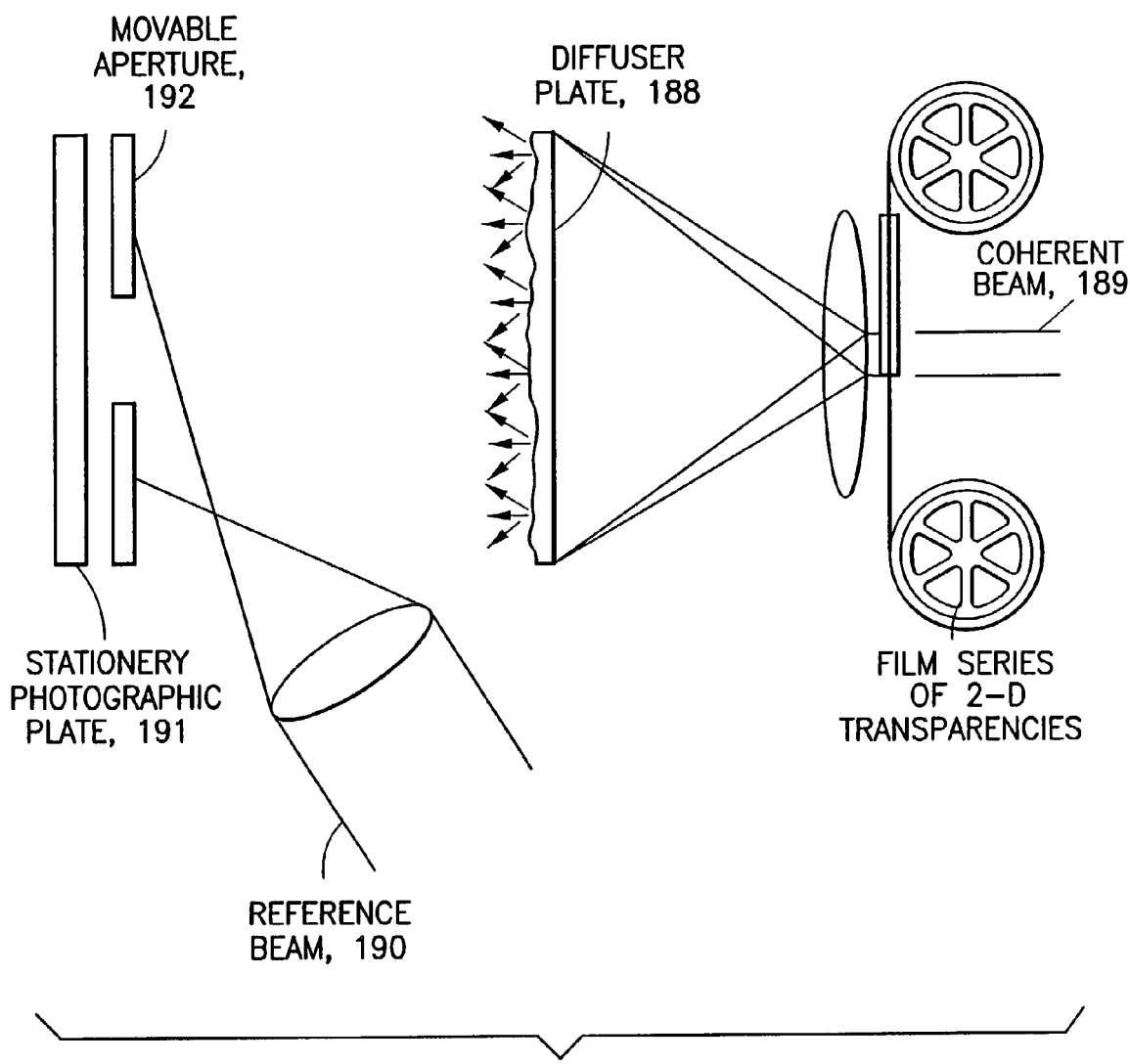
FIG. 63(d) shows a method of taking elemental photographs.
FIG. 63(e) shows a method of synthesis of a hologram on a high resolution photographic plate done in sequence on the same plate when an aperture is moved.
FIG. 63(f) shows the holographic wavefront reconstruction of a pseudoscopic real image.
Figure 63D:
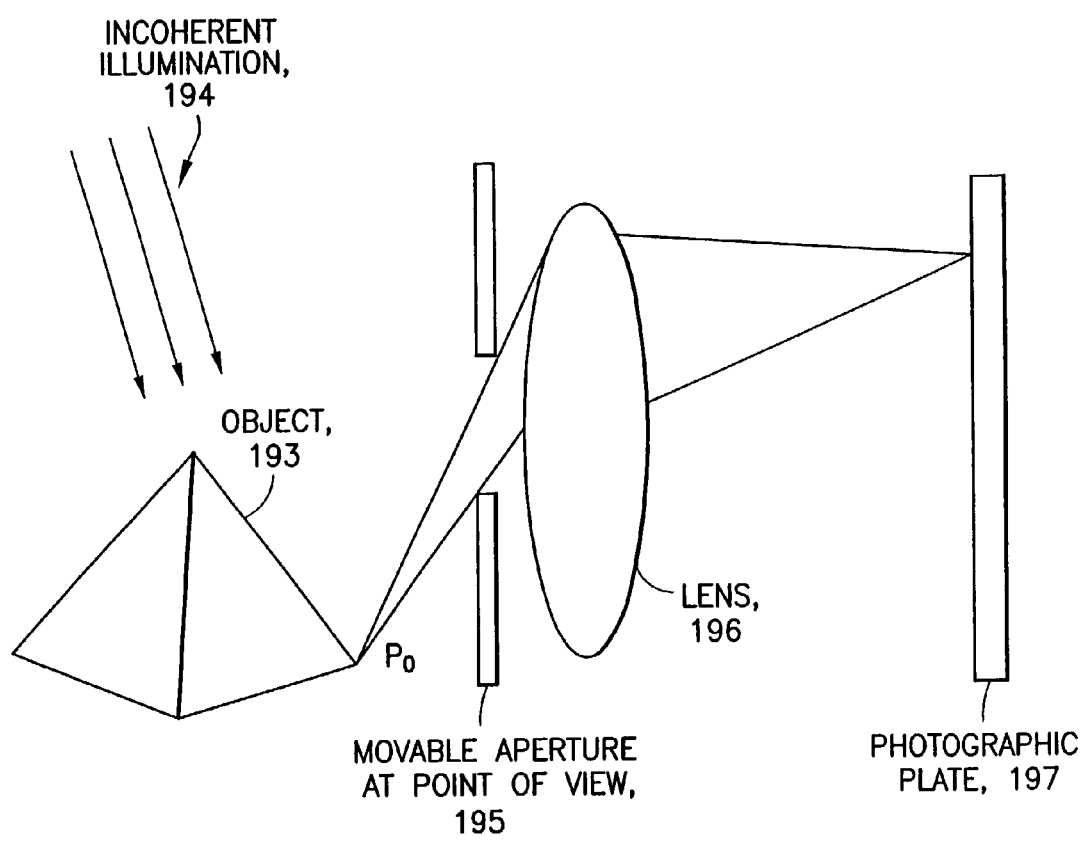
Figure 63E:
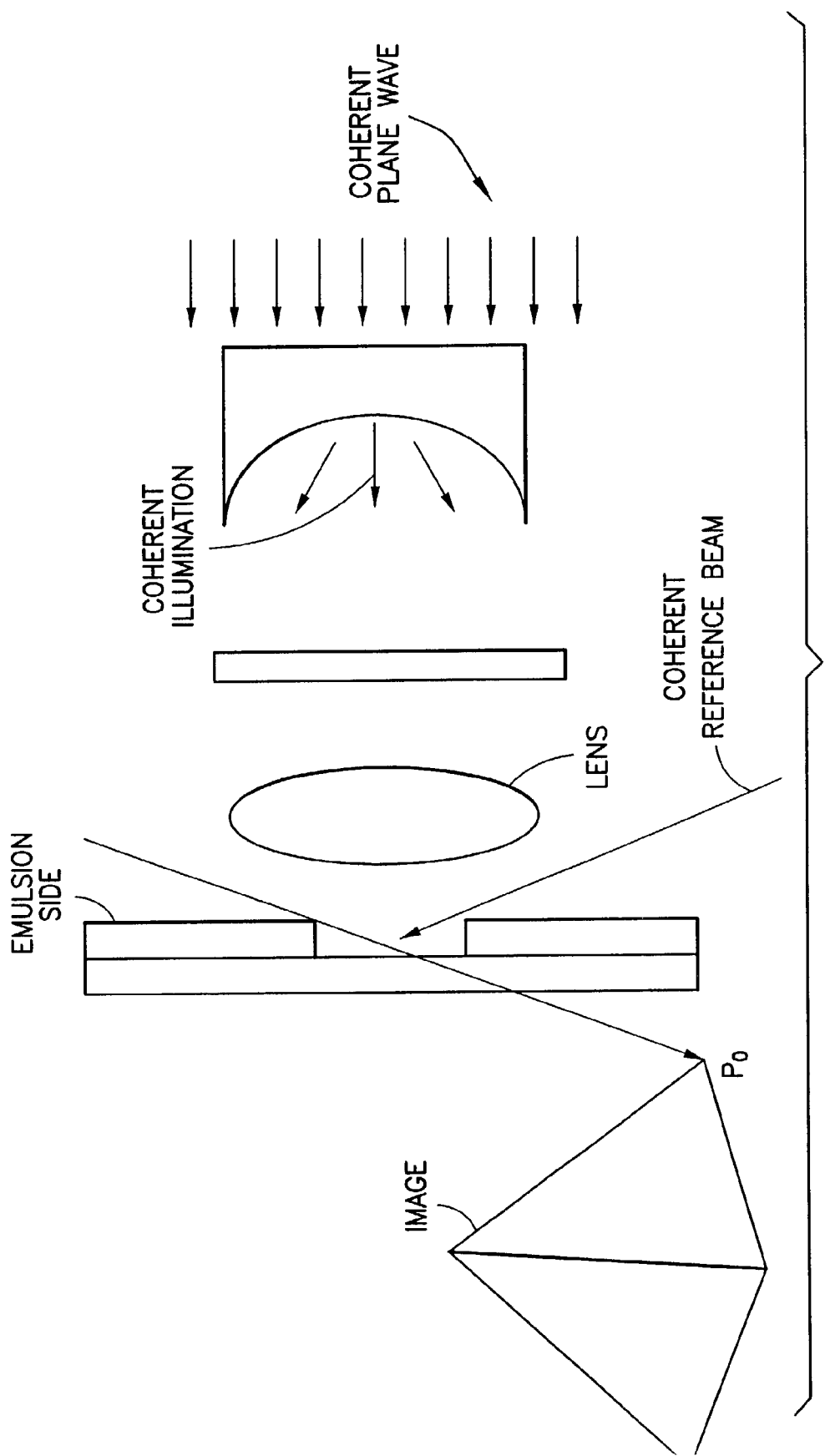
Figure 63F:
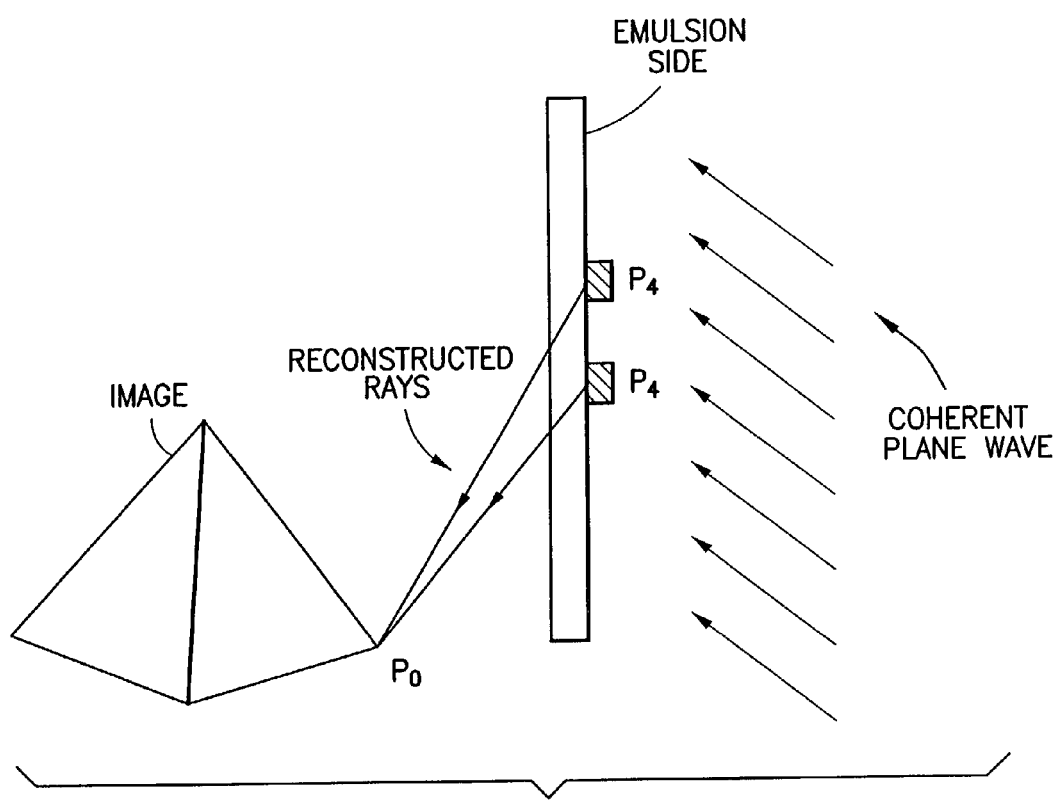

The discussion now proceeds to holography of a two-dimensional integral photographic film. In this method a holographic movie film is used. However, the projected real image of the hologram is a two-dimensional image which is projected onto a diffusing screen (or imaginary image plane). This image is the integral photograph to be projected. This process is illustrated in FIG. 62. Since the initial photograph which sill be taken by the camera is an integral photograph, a hologram can be taken of each frame of the integral photographic film, and the reconstructed image will, therefore, be the integral photograph. Referring to FIG. 62, to construct the hologram 182, a laser beam 183 passing through a standard projection lens 184 serves as the reference beam. The integral photographic frame is projected using the same laser beam onto diffusing screen 186 which produces the object beam 187. The combination of reference beam 185 and object beam 187 produces the hologram. To reverse the process for projection, light impinges upon projection lens 184 and then upon the holographic frame 182. This reconstructs object beam 187 that produces a focused image of the integral photograph on diffusing screen 186. This method contrasts with that of direct holography where holograms are taken of the scene directly. This latter method requires projection techniques as has been previously discussed.

Just as holograms produced from two-dimensional integral photographs can be fabricated, so can they be fabricated from composite two-dimensional photographs. This work is current state-of-the-art. FIG. 63(*a*) shows just how such photographs can be taken with multiple cameras, $C_1, C_2, C_3$, etc. The greater the number of cameras, the better the quality of the three-dimensional reconstruction. FIGS. 63(*b*) and (*c*) show methods of converting these component photographs to a hologram. FIG. 63(*b*) shows this process for a single integral photograph. The photograph is projected (focused) onto a diffuser plate 188 using coherent light 189 The same light produces reference beam 190. This exposes a portion of photographic plate 191 through a movable aperture 192. This is illustrated more completely in FIG. 63(*c*). FIG. 63(*d*) shows another method of producing these component photographs. In this case, the object 193 is photographed using incoherent illumination 194 (such as ordinary white light). A movable aperture 195 allows a restricted view of the object to pass through lens 196 exposing a picture on photographic plate 197. FIG. 63(*e*) shows how to produce a hologram from these photographs. FIG. 63(*f*) shows how the hologram produced from the component photographs of FIG. 61 can be reconstructed.

Reflection holograms can be used more conveniently for the following reasons:
The diffraction efficiency is significantly higher.
Use of white light illumination is more convenient.
Color holograms are more easily produced.

Other than the differences between reflection and transmission holograms for positioning of the illumination with respect to the projected image, all arguments previously expressed for holographic projection of transmission holograms hold true for reflection holograms.

In 1968, Dr. D. J. DeBitetto of Phillips Laboratories, Briarcliff Manor, N.Y., published several articles concerning holographic three-dimensional movies with constant velocity film transport. In these articles, he described holograms produced which allowed bandwidth reduction by elimination of vertical parallax. This was accomplished by making the three-dimensional holograms on a film strip using a horizontal slit as an aperture. The frames were formed by advancing the film each time by the width of the slit. Each frame was animated. After development, the film was illuminated as any hologram would be, and the filmstrip was moved at constant velocity. I have seen Dr. DeBitetto's holographic movies, and they are the best attempts to-date in the field of motion picture holography. The three-dimensional pictures are of extremely high quality. However, vertical parallax was absent.

Figure 64:
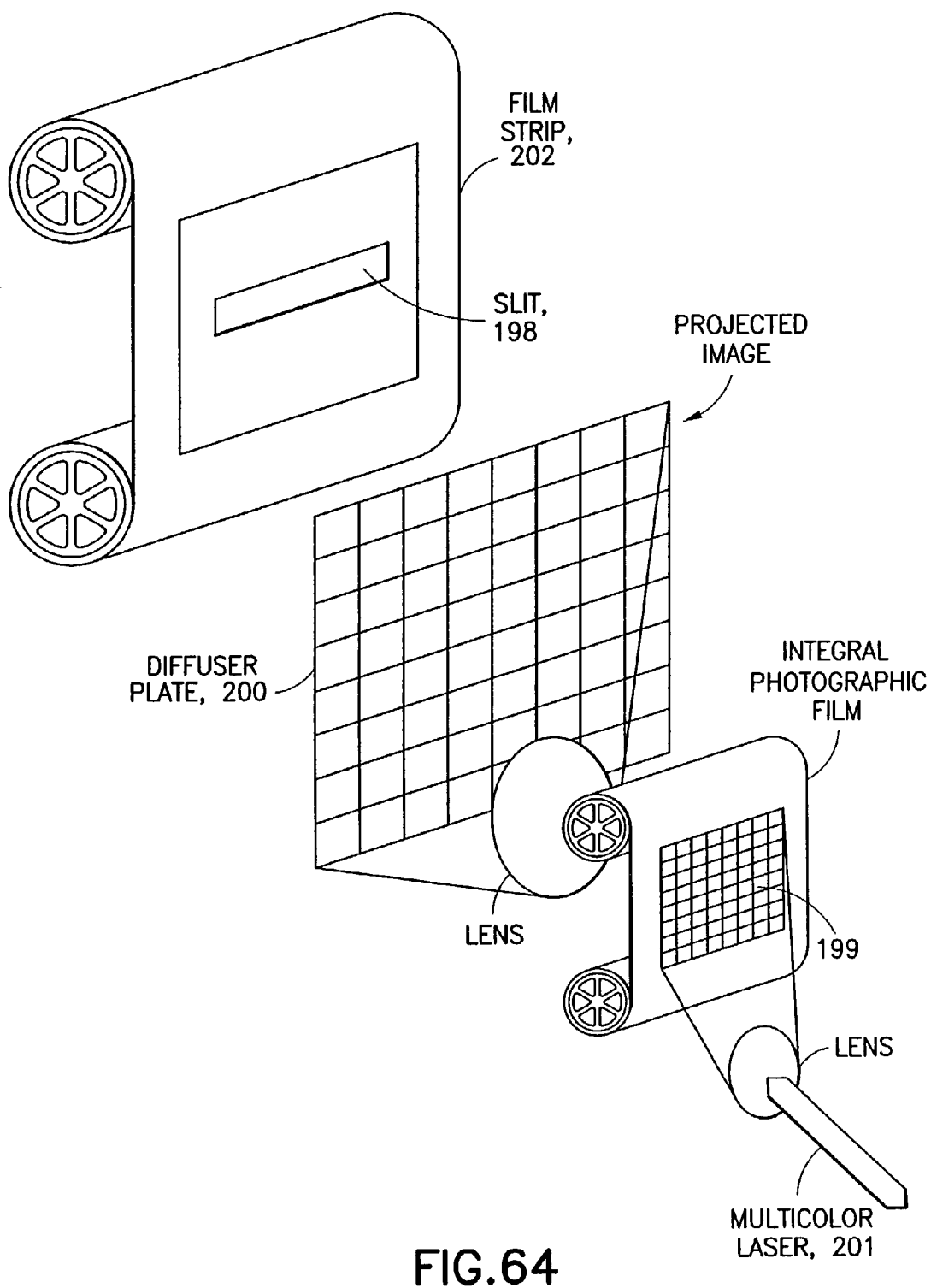
FIG. 64 shows a method of preparing strip holograms

The same technique can by used in our projector. It can be used with direct holography as Dr. DeBitetto did or it can be used with holograms of integral photographs as shown in FIG. 64. In this figure, and by this technique, a horizontal strip hologram 198 is taken of each integral photographic frame 199 (in any format, multiplexed or unmultiplexed), and the holographic film strip is advanced for each frame. This is done by projecting the integral photographic frame 199 onto a diffuser plate 200 using coherent illumination from a multicolor laser 201 (e.g, a white light krypton laser). This becomes the object beam necessary to produce the hologram. It is possible to take several strip holograms of the same frame. Afterwards, the holographic film 202 is played back in the projector at constant velocity.

Dr. DeBitetto takes his holograms as strip holograms in that both the holography and projection must be performed with the slit aperture. This requires the holography of a very large number of small strip frames, the animation of each frame showing only slight or minuscule motion with respect to the previous frame. This is contrasted with the method of taking holographic movies where each frame has a reasonable size both in height and in width (as would be expected in a standard format motion picture film). Obviously, Dr. DeBitetto's technique has the disadvantage of requiring an extremely large number of frames, thus making the process very arduous. However, this patent application submits that the frames be prepared in the standard motion picture format (as opposed to horizontal strip holograms), and that the frame be projected with a horizontal slit aperture. The film is used in the same way as in Dr. DeBitetto's process, and is projected at constant velocity. The image projected from the hologram onto the screen will only change in vertical parallax as the frame moves by the aperture. However if the film format used is that previously described for holography of the original two-dimensional integral photographic film, then the vertical parallax does not change as the frame moves by, because the projected image is two-dimensional and has no vertical (nor horizontal) parallax. The image only changes, therefore, when a new frame comes into view. Therefore, the height of the frame required for the holographic film will depend upon the film velocity and the frame rate. This represents the preferred embodiment for the holographic projector.

Constant velocity is a tremendous advantage for projection of three-dimensional movies. Since film registration must be held to extremely tight tolerances, not having to stop the film for each frame would provide much needed stability, and film registration would be far simpler. Without this constant velocity transport, each frame would have to be registered with the three-point registration system as previously described. Furthermore, constant velocity film transport reduces the probability of film breakage.

Primary projection of holographic films may be accomplished in the same manner as it can for integral photographic films. In addition, the needed magnification can be accomplished by direct projection If the holographic film is produced using a plane reference wavefront, and a new holographic film is produced from it which is demagnified by a scale factor "p", then, when this new demagnified hologram is illuminated by a plane reference wavefront of the same wavelength, an image is produced which is magnified by the same scaling factor "p". If the image of the hologram is a two-dimensional projected image of an integral photograph, primary projection is thus accomplished simply and without aberration. Image unmultiplexing, inversion and final projection are accomplished in the same manner for holographic films as for integral photographic films.

The discussion now turns to intermediate processing of the film. In the previous discussions of the formation of orthoscopic images from pseudoscopic images, image inversion was accomplished during the projection stage. It is considered more desirable to accomplish this operation during the projection stage because it can be done without the inherent loss in resolution (a factor of $\sqrt{2}$) attached to a process in which a new integral photograph or hologram must be copied from the three-dimensional projected image Should it be desired to make a film to be presented to motion picture theaters, which, in turn, when projected, would produce orthoscopic images, then the best method of making such films from the original would be by the projection techniques previously discussed. These projection techniques can be used for film copying as well as for projection onto a screen. However, for the sake of completeness of this application, the methods for image inversion, by making a new integral photograph or hologram from the original reconstructed three-dimensional pseudoscopic image, will be presented.

Figure 65:
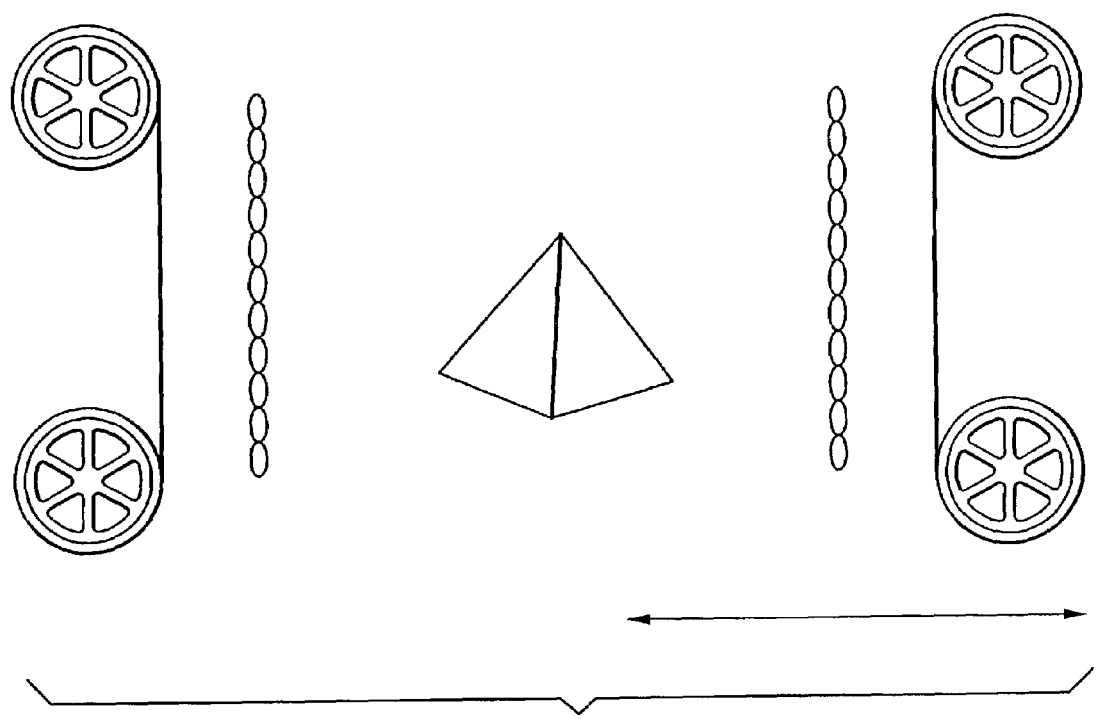
FIG. 65 shows image inversion from pseudoscopy to orthoscopy using integral photography.
Figure 66:
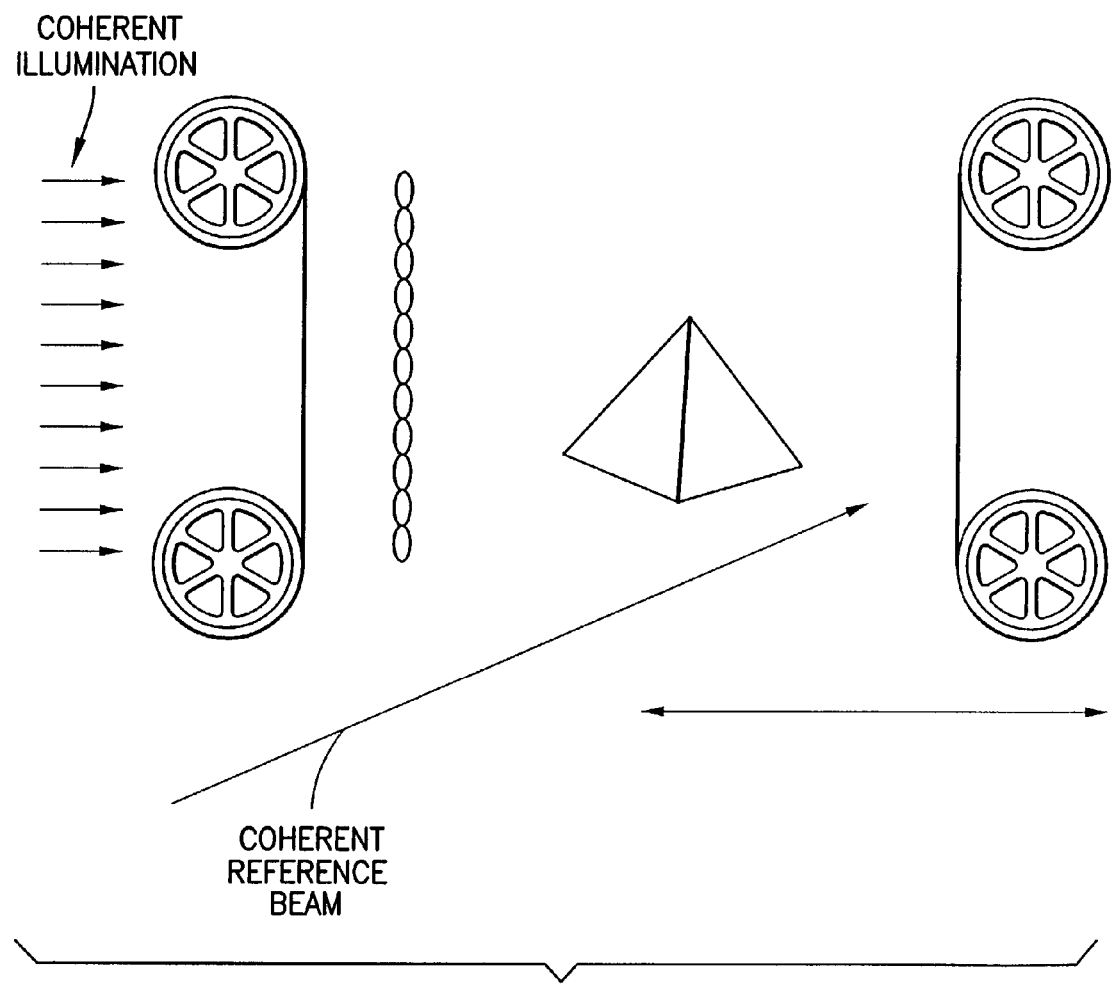
FIG. 66 shows image inversion from pseudoscopy to orthoscopy using holography and integral photography
Figure 67:
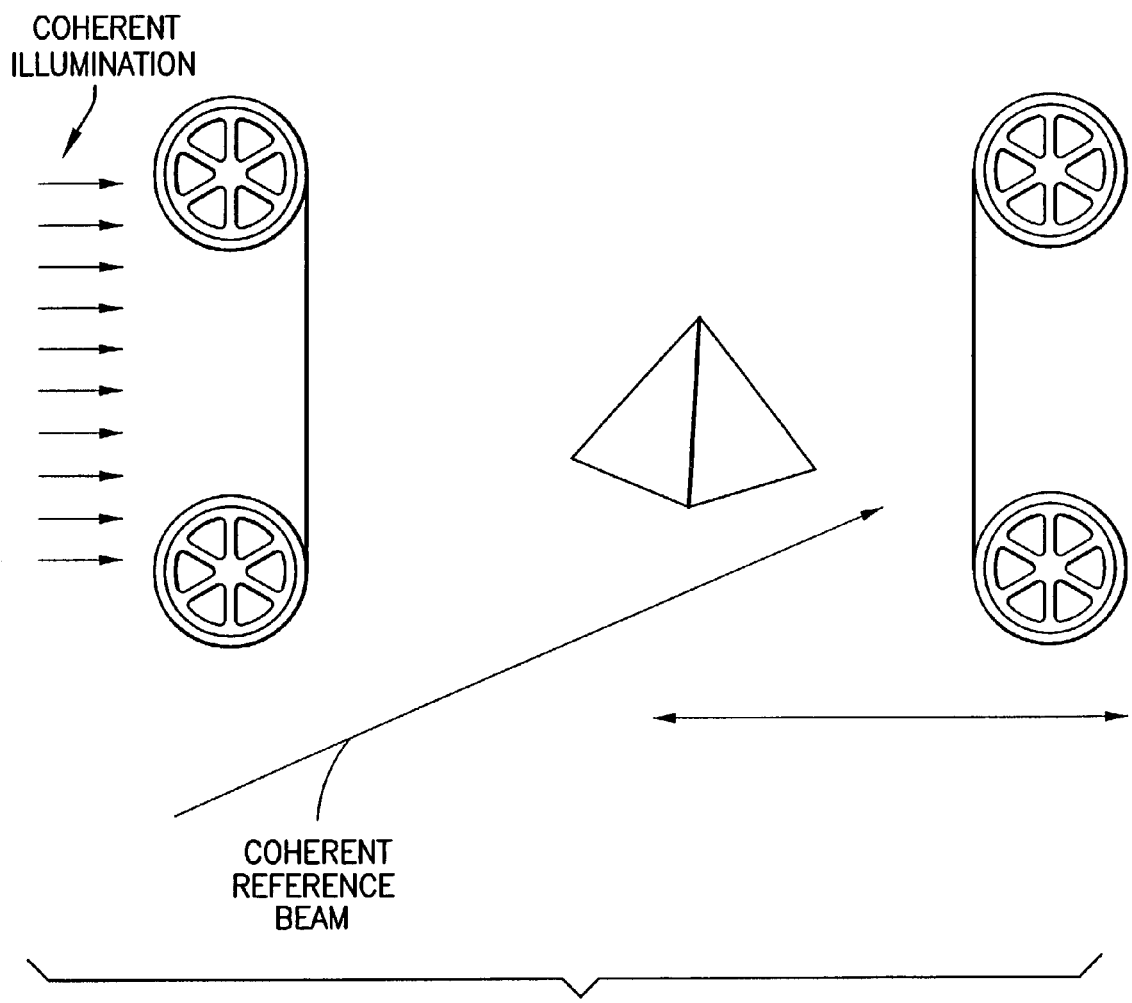
FIG. 67 shows image inversion from pseudoscopy to orthoscopy using holography.

FIGS. 65, 66 and 67 show the standard methods of performing this inversion. FIG. 65 illustrates converting from one integral photograph to another; FIG. 66, from an integral photograph to a hologram; and FIG. 67, from one hologram to another. Note that, in each of these setups the film upon which the new integral photograph or hologram is to be produced may be positioned anywhere with respect to the pseudoscopic image. What is important is that the original reconstructed wavefronts be used to form the new record and not the image.

Figure 68:
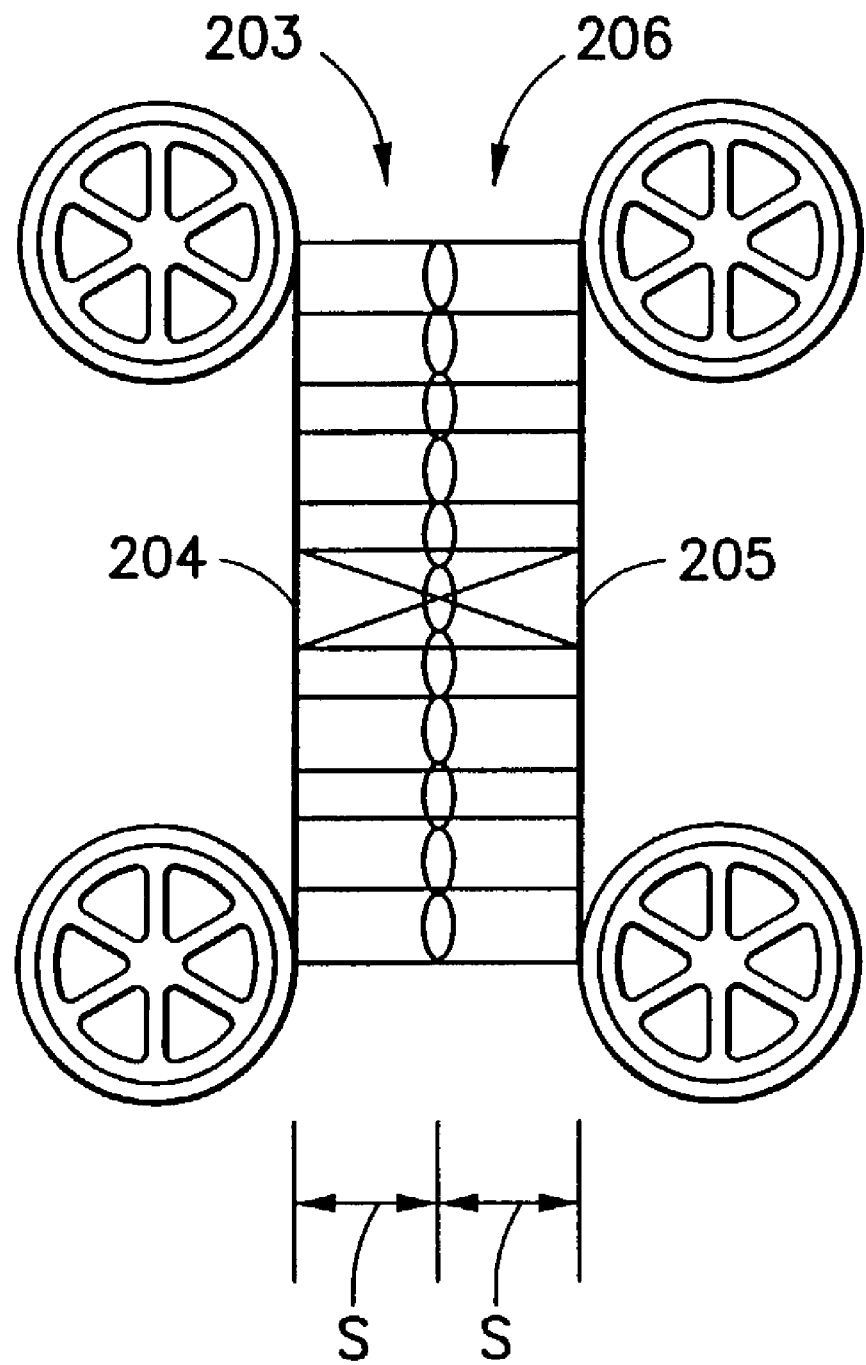
FIG. 68 shows image inversion from pseudoscopy to orthoscopy by element reversal.
Figure 69A:
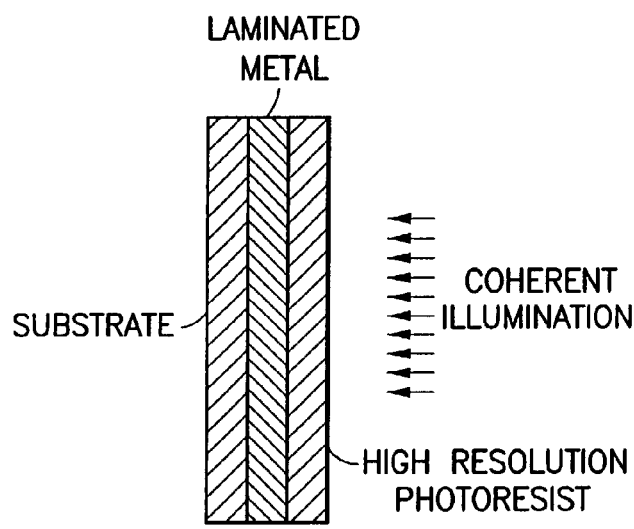
FIG. 69 shows the principles of a holographic printing press.
Figure 69B:
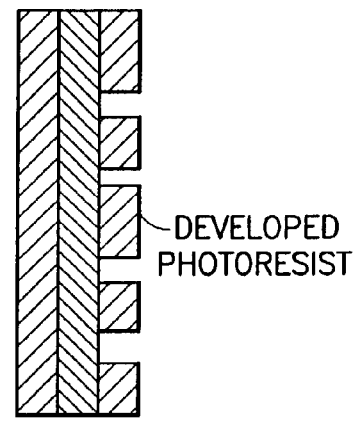
Figure 69C:
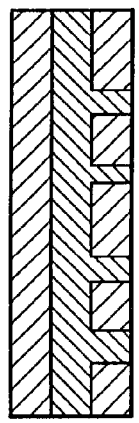
Figure 69D:
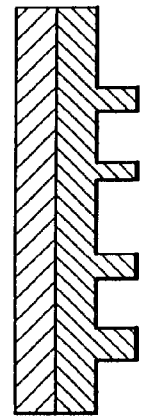
Figure 69E:
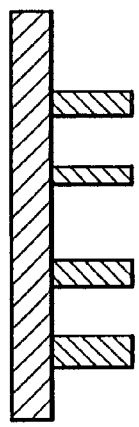
Figure 69F:
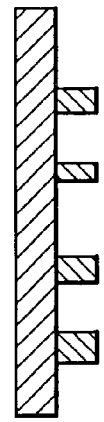

Another method (which is not current state-of-the-art) is shown in FIG. 68. As was shown in FIG. 53 mirror inversion of each elemental photograph in the integral photograph while keeping the original order of the elemental photographs, will produce a film capable of projecting an orthoscopic image. This is accomplished by projecting each elemental photograph onto a new record using a matrix lens array 203 as is shown in FIG. 68. Here both records, 204 and 205, are at a fixed distance s from the matrix lens array 203 determined by the principles of projection. Waveguides or baffles 206 are used to prevent overlapping of the images However, there is much noise from the light scattered from the walls of the waveguides. Furthermore, while the resolution loss of $\sqrt{2}$ is avoided in this case, there is a resolution loss due to the fact that the two-dimensional images are projected. (This loss does not occur in the holographic projection techniques previously described.)

Another concept of this intermediate processing which would be extremely useful for reducing the most expensive parts of the projector, would be to place an unexposed film at the unscrambled image plane 154 of the projector in FIG. 54. As the original integral photographic record is played through the projector, this new film is recording a new unmultiplexed pattern. This film, when used with a standard projection lens call then project the required integral photograph onto the screen.

When performing intermediate processing on integral photographic films, it must be remembered that the integral photographic motion picture film is produced on high resolution black & white film. Therefore, processing is simple and standard with one reservation. Care must be taken to avoid emulsion shrinkage. The exercise of proper care in processing can and will avoid this problem.

There are two elements to be considered when processing holographic films. Holographic films produced photographically or by pressing. Photographically produced holograms are produced on extremely high resolution films, with a resolution approximating 2,000 lines/mm. While processing of these films is somewhat standard, extreme care must be taken to avoid emulsion shrinkage or dimensional changes in the film. Emulsion shrinkage during wet processing will not only cause distortion of the three-dimensional image, but also will cause changes in the color properties of the image.

It is feasible to process holograms in such a way as to avoid major dimensional changes in both the emulsion and the film. However, this processing must be done with great care, and there is a statistical probability that some films will experience degradation Yet, this statistical factor does not make wet processing of holographic films impractical.

Another solution to the processing problem is to use materials that do not require wet processing. These materials will produce only phase holograms. For surface holograms, thermoplastic and photochromic materials are available. For volume holograms, crystalline materials, such as lithium niobate ($LiNbO_3$), and certain optical cements are available. A 1 cc crystal of $LiNbO_3$ can store 1,000 holograms which are temperature erasable. These holograms can be played back by angle tuning the reference beam. Certain optical cements, developed at XEROX Corp., are developable by ultraviolet radiation and have extremely high diffraction efficiencies.

An extremely important method of obtaining consistently processed film is to use a printing press arrangement to emboss a phase-only surface hologram onto a plastic material. Once a metal plate is produced for a holographic frame or picture, holograms can be mass produced both inexpensively and consistently The reproduction process is identical to record processing. Once the master is produced, millions of holograms can be produced from the same original. After the processed hologram is produced, it can be used directly as a high diffraction efficiency phase transmission surface hologram, or a metal can be vacuum deposited onto the surface of the film, and the hologram can be used as a high diffraction efficiency surface reflection hologram.

FIG. 69 illustrates the process for preparing the master. A laminate such as those used in the printed circuit industry is used as the base for the master. This base consists of a metal (such as copper) laminated to a plastic composite substrate (such as fiberglass impregnated with epoxy). A high resolution photoresist is coated onto the metal surface. This photoresist is the same as is used for the semiconductor industry. As is shown in FIG. 69(a), the hologram is then exposed onto the photoresist using coherent illumination. This can either be done by a standard contact printing method or by direct holography. This exposure polymerizes the photoresist only in those areas where exposure has occurred. In the second step, FIG. 69(b), the plate is placed into a developer, and the unpolymerized photoresist is dissolved away. Two alternate processing techniques can be applied here. In the first method [see FIGS. 69(c) and (d)], metal can be plated onto the metal which was exposed by dissolving the photoresist. After plating, the remaining undissolved polymerized photoresist can be removed chemically by a powerful stripper. This leaves a metal plate having surface contours in the metal representative of the hologram. This plate can now be used as the master for the printing process. In the second method [see FIGS. 69(e) and (f)], the metal exposed by dissolving the photoresist is etched away chemically so as to expose the bottom substrate. Then the remaining photoresist is stripped away, and this plate can now be used as the master.

The discussion now turns to the design of an editor for integral photographs and holograms. Unfortunately, it is not practical to perform editing on the reconstructed three-dimensional image, because it would require the building of yet another three-dimensional projector which would be very expensive. (Of course, editing can be done this way, but it is not too advisable.) However, it is very practical to project a two-dimensional picture from the integral photographic or holographic films, and editing can be performed using these two-dimensional images. Other than the image projection mechanism, the editor design is quite standard.

Figure 70A:
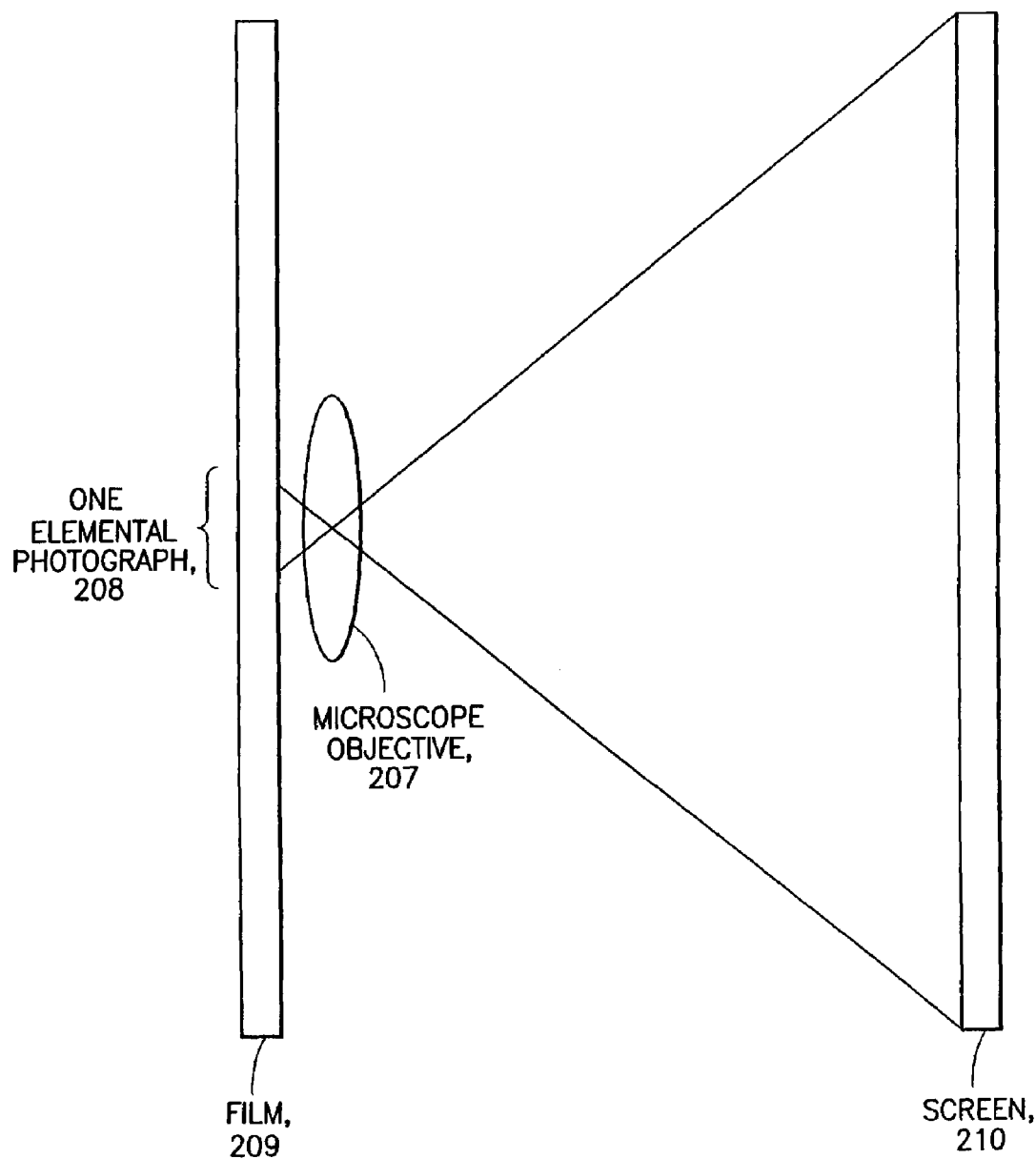
FIG. 70(a) shows an editor for integral photographic film.
Figure 70B:
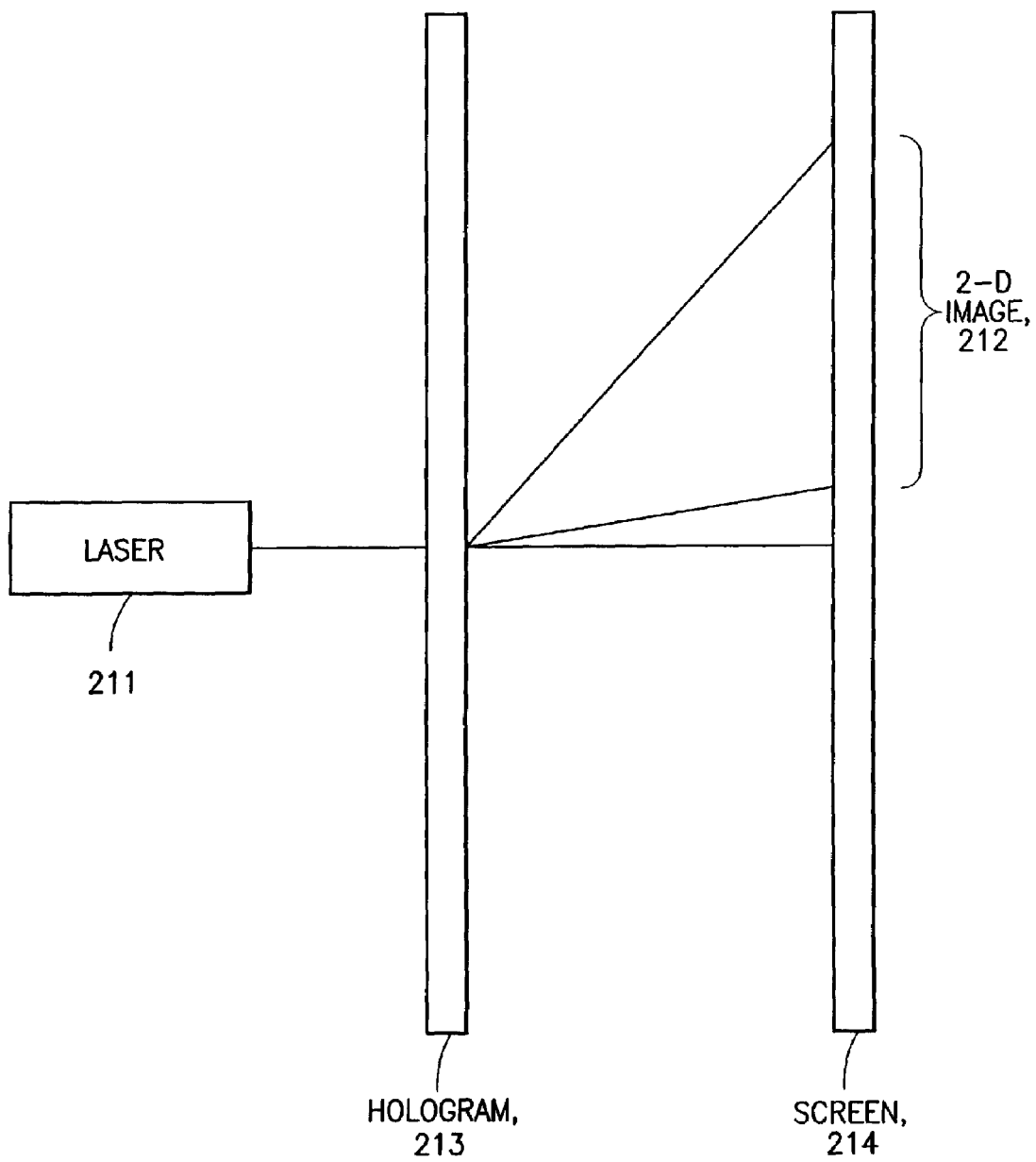
FIG. 70(b) shows an editor for holographic film.

FIG. 70(a) shows how a two-dimensional image can be projected from an integral photograph. A very small lens 207, such as a microscope objective, is used to project only one elemental photograph 208 of the integral photograph 209 onto a translucent screen 210 with a very high magnification. In FIG. 70(b), a laser 211 is used as shown to project a two-dimensional real image 212 from a hologram 213 onto a translucent screen 214. If the holographic film was produced by direct photography of the three-dimensional image then this projected two-dimensional image can be used for editing. If the reconstructed image of the hologram is a two-dimensional integral photograph, then this image can be projected to a two-dimensional elemental photographic image as is shown in FIG. 65(a).

Finally, the application goes on to discuss alternate uses for the devices, methods and processes presented herein. The thrust of this application has been to show the utility of such a system for projection of three-dimensional slides (still photography) and motion pictures before a large audience. The concepts of photography and projection presented herein, even though novel, seem to fall within the general impressions of what photography and projection are supposed to do. No discussion has thus far been presented concerning uses of this system for television, computers, video taping and animation.

Broadcasting integral photographs over the airwaves for display and three-dimensional reconstruction on standard NTSC television sets (or for that matter, any display or 3-D rendering using the NTSC system) is unfeasible. The NTSC standard allows for 512 lines of resolution in the vertical direction. This resolution is insufficient for presentation of the amount of photographic information necessary for three-dimensional reconstruction using the method of magnification and projection presented herein. Firstly, the conventional broadcasting bandwidth is insufficient for transmission of the required information within the time necessary to depict the correct number of motion picture frames for persistence of vision. Secondly, no conventional television sets exist (including HD-TV) that possess the inherent resolution characteristics for this process. However, it is possible to construct a home entertainment system (resembling a television set) that employs the methods and apparatus described in this application. Furthermore, while broadcasting of programming over conventional television broadcast bands or even over conventional cable TV transmission is unfeasible due to bandwidth considerations, it is possible to adequately transmit image information over closed circuit fiber optics cable. This has implications not only for home entertainment but also for computer displays. Using the methods and apparatus described herein, three dimensional computer graphics is feasible. Furthermore, the use of magnetic videotape (or other magnetic media) to record the information necessary for image retrieval using this method is also feasible. So also is the use of CD's of various formats (e.g., laser disc) feasible for this purpose.

It is now feasible to produce animated integral photographs capable of producing three-dimensional cartoons that can be subsequently magnified and projected before a large audience using the methods and apparatus previously described. Each frame of a motion picture (or a still life slide) consists of 1,730 individual elemental pictures. These elemental pictures depict the same scene but from slightly different viewpoints. In the past, animated cartoons were created by an artist drawing individual frames, the difference between successive frames depicting the passage of time. Usually the differences were in slight movement of an object in the scene or of the viewpoint itself. For animated integral photography, the artist can no longer draw only one frame for each instant of time, but he must draw 1,730 frames for the same instant. In the past, this would have added an incredible amount of labor to an artist's endeavors. However, with the aid of a computer, given the current state of computer technology, these elemental pictures can be drawn automatically. Therefore, one can expect to see cartoons as part of the repertoire of three-dimensional motion pictures.

While the preferred and alternate embodiments of the invention have been described in detail, modifications may be made thereto, without departing from the spirit and scope of the invention as delineated in the following claims:

I claim:

1. A system for recording and projecting three-dimensional images comprising:
    a means for producing and storing on film one or more two-dimensional integral photographs consisting essentially of a plurality of two-dimensional elemental pictures that photographically represent a three-dimensional scene;
    a means for magnifying and imaging said one or more integral photographs as one or more magnified integral photographic images; and,
    a means for reconstructing one or more three-dimensional images from said imaged magnified integral photographic images.

2. The system according to claim 1 wherein said means for magnifying said integral photographs produces integral photographic images whose magnification is greater than one.

3. The system according to claim 1 wherein said means for magnifying said integral photographs produces integral photographic images with no magnification.

4. The system according to claim 1 wherein said means for magnifying said integral photographs produces demagnified integral photographic images.

5. The system according to claim 1 further comprising a means for modifying said integral photograph so as to record the photographic information contained therein with adequate resolution on commercially available photographic film.

6. The system according to claim 1 or 5 further comprising film holding means and transporting means.

7. The system according to claim 6 further comprising a means for film stabilization.

8. The system according to claim 5 wherein said means for producing and storing said integral photographs on film further comprises a means for recording said integral photographs in full color on black-and white film.

9. The system according to claim 5 wherein said means for recording said integral photographs further comprises the use of a correcting color plate.

10. The system according to claim 9 wherein said correcting color plate is comprised of a plurality of color filters that each produce monochromatic light having a primary color.

11. The system according to claim 10 wherein said color filters produce alternating red, green, and blue monochromatic light.

12. The system according to claim 5 wherein said means for producing and storing said integral photographs on film further comprises the use of a plurality of lenses.

13. The system according to claim 12 wherein each lens in said plurality of lenses is spherical.

14. The system according to claim 13 wherein said plurality of spherical lenses are hexagonally close-packed.

15. The system according to claim 12 wherein said plurality of lenses comprises a square array of crossed cylindrical lenses.

16. The system according to claim 5 wherein said means for producing and storing said integral photographs on film further comprises the use of a plurality of Fresnel zone lenses.

17. The system according to claim 5 wherein said means for producing and storing said integral photographs on film further comprises the use of a plurality of Gabor zone lenses.

18. The system according to claim 5 wherein said means for producing and storing said integral photographs on film further comprises the use of a plurality of holographic lenses.

19. The system according to claim 16, 17, or 18 wherein said means for producing and storing said integral photographs on film further comprises the means for chromatic correction of the photographic images produced.

20. The system according to claim 19 wherein said means for chromatic correction is a correcting color plate.

21. The system according to claim 20 wherein said correcting color plate is comprised of a plurality of color filters that each produce monochromatic light having a primary color.

22. The system according to claim 21 wherein said color filters produce alternating red, green, and blue monochromatic light.

23. The system according to claim 12 wherein said plurality of lenses comprises a plurality of parallel cylindrical lenses arranged horizontally with their long axes aligned vertically and crossed with a single cylindrical lens having its long axis arranged horizontally, said arrangement serving to provide horizontal parallax only and no vertical parallax.

24. The system according to claim 12 wherein said plurality of lenses comprises a plurality of parallel cylindrical lenses arranged horizontally with their long axes aligned vertically and crossed with an anamorphic system of lenses to correct for optical and chromatic abberations that focus only in the vertical direction, said arrangement serving to provide horizontal parallax only and no vertical parallax.

25. The system according to claim 5 wherein said means for imaging said integral photographs further comprises a means for modifying said integral photographs so as to produce a correct image of the integral photographs where the original integral photographs recorded on film were previously modified during the recording process.

26. The system according to claim 5 wherein said means for imaging said integral photographs further comprises a means for modifying said integral photographs so as to produce a new integral photograph such that when said three-dimensional image is reconstructed therefrom, the reconstruction will be orthoscopic.

27. A system for recording and projecting three-dimensional images comprising:
    a camera that produces and stores on film a two-dimensional integral photograph consisting of a plurality of two-dimensional elemental pictures that photographically represent a three-dimensional scene further comprising:
        a) a camera optical system comprising a plurality of optical elements capable of producing a plurality of two-dimensional elemental images of said three-dimensional scene wherein said optical elements have the same number and arrangement as said two-dimensional images;
        b) a mechanism for focusing said plurality of two-dimensional elemental images onto said film;
        c) a film holding and transport mechanism for producing one or more two-dimensional integral photographs, each integral photograph comprised of said plurality of two-dimensional elemental pictures; and, d) a support structure for said optical system, said film holding and transport mechanism, and said film, said structure allowing the camera to be used as a single unit and enabling said photographic film to be exposed thereby producing said integral photographs, a projector that images said integral photographs; and, a screen that reconstructs a three-dimensional image from said integral photographs comprising a plurality of optical elements having the same number and arrangement as the plurality of said camera optical elements.

28. The system according to claim 27 wherein said camera further comprises active optical elements that modify said plurality of two-dimensional elemental images so as to create said plurality of two-dimensional elemental pictures that are able to be recorded with adequate resolution on commercially available photographic film.

29. The system according to claim 27 or 28 wherein said camera further comprises a correcting color plate.

30. The system according to claim 29 wherein said correcting color plate is comprised of a plurality of color filters that each produce monochromatic light having a primary color.

31. The system according to claim 30 wherein said color filters produce alternating red, green, and blue monochromatic light.

32. The system according to claim 27 wherein said plurality of optical elements of the camera comprises a plurality of lenses.

33. The system according to claim 32 wherein each lens in said plurality of lenses is spherical.

34. The system according to claim 33 wherein said plurality of spherical lenses are hexagonally-close packed.

35. The system according to claim 32 wherein said plurality of lenses comprises a square array of crossed cylindrical lenses.

36. The system according to claim 27 wherein said plurality of optical elements of the camera comprises a plurality of Fresnel zone lenses.

37. The system according to claim 27 wherein said plurality of optical elements of the camera comprises a plurality of Gabor zone lenses.

38. The system according to claim 27 wherein said plurality of optical elements of the camera comprises a plurality of holographic lenses.

39. The system according to claim 36, 37, or 38 wherein said camera further comprises optical elements that correct for chromatic abbe ration.

40. The system according to claim 32 wherein said plurality of lenses comprises a plurality of parallel cylindrical lenses arranged horizontally with their long axes aligned vertically and crossed with a single cylindrical lens having its long axis arranged horizontally, said arrangement serving to provide horizontal parallax only and no vertical parallax.

41. The system according to claim 32 wherein said plurality of lenses comprises a plurality of parallel cylindrical lenses arranged horizontally with their long axes aligned vertically and crossed with an anamorphic system of lenses to correct for optical and chromatic abberations that focus only in the vertical direction, said arrangement serving to provide horizontal parallax only and no vertical parallax.

42. The system according to claim 27 wherein said projector produces a magnified two-dimensional image of the integral photograph.

43. The system according to claim 27 wherein said projector produces a two-dimensional image of the integral photograph having no magnification.

44. The system according to claim 27 wherein said projector produces a demagnified two-dimensional image of the integral photograph.

45. The system according to claim 27 wherein said projector further comprises active optical elements that modify said integral photographs so as to produce a correct image of the integral photographs where the original integral photographs recorded on film were previously modified during the recording process.

46. The system according to claim 27 wherein said projector comprises active optical elements that modify said integral photographs so as to produce new integral photographs such that when said three-dimensional image is reconstructed therefrom, the reconstruction will be orthoscopic.

47. The system according to claim 1 or 27 that reconstructs from said integral photographs magnified three-dimensional images that can be viewed by an audience.

48. The system according to claim 47 that reconstructs said three-dimensional images where the magnification is greater than one.

49. The system according to claim 47 that reconstructs said three-dimensional images where the magnification is equal to one, i.e., without magnification.

50. The system according to claim 47 that reconstructs demagnified three-dimensional images where the magnification is less than one, i.e., with demagnification.

51. An integrated system for the production of a three-dimensional image magnified from a three-dimensional scene by a magnification factor in substantially the same proportions in all three dimensions, said system comprising:

apparatus that produces from said three-dimensional scene a first two-dimensional array comprising a plurality of two-dimensional elemental images; and, apparatus that magnifies said first two-dimensional array to produce a second magnified two-dimensional array comprising the same number and arrangement of elemental images as in said first two-dimensional array; and, apparatus to construct said magnified three-dimensional image of said three-dimensional scene from said second magnified two-dimensional array.

\* \* \* \* \*